US012562964B2

(12) United States Patent
Mueck

(10) Patent No.: US 12,562,964 B2
(45) Date of Patent: Feb. 24, 2026

(54) MULTIRADIO INTERFACE DATA MODEL AND RADIO APPLICATION PACKAGE CONTAINER FORMAT FOR RECONFIGURABLE RADIO SYSTEMS

(71) Applicant: Intel Corporation, Santa Clara, CA (US)

(72) Inventor: Markus Dominik Mueck, Unterhaching (DE)

(73) Assignee: Intel Corporation, Santa Clara, CA (US)

( * ) Notice: Subject to any disclaimer, the term of this patent is extended or adjusted under 35 U.S.C. 154(b) by 127 days.

(21) Appl. No.: 18/547,067

(22) PCT Filed: Mar. 25, 2022

(86) PCT No.: PCT/US2022/021988
§ 371 (c)(1),
(2) Date: Aug. 18, 2023

(87) PCT Pub. No.: WO2022/204537
PCT Pub. Date: Sep. 29, 2022

(65) Prior Publication Data
US 2024/0129194 A1 Apr. 18, 2024

Related U.S. Application Data

(60) Provisional application No. 63/175,788, filed on Apr. 16, 2021, provisional application No. 63/166,154, filed on Mar. 25, 2021.

(51) Int. Cl.
*H04L 41/08* (2022.01)
*G06F 8/71* (2018.01)
(Continued)

(52) U.S. Cl.
CPC ............ *H04L 41/0895* (2022.05); *G06F 8/71* (2013.01); *H04L 41/0806* (2013.01); *H04L 67/60* (2022.05)

(58) Field of Classification Search
CPC ............................... H04L 41/08; H04L 67/60
See application file for complete search history.

(56) References Cited

U.S. PATENT DOCUMENTS

2012/0182121 A1    7/2012    Mueck
2015/0178112 A1    6/2015    Ivanov et al.
(Continued)

FOREIGN PATENT DOCUMENTS

WO    WO2005-013540 A2    2/2005

OTHER PUBLICATIONS

International Search Report and Written Opinion mailed Jul. 6, 2022 for International Patent Application No. PCT/US2022/021988, 12 pages.

*Primary Examiner* — Michael T Vu
(74) *Attorney, Agent, or Firm* — Essential Patents Group, LLP; Christopher K. Gagne

(57) ABSTRACT

The present disclosure is generally related to reconfigurable radio equipment (RREs), and in particular to information models and protocols for the multiradio interface for RREs and radio application packages (RAPs) used for reconfiguring RREs. Various extensions to the information models of the multiradio interface for RREs are provided such that internal state information is included in the information models and protocols of the multiradio interface. Various aspects of RAP container formats and structure are also provided.

8 Claims, 26 Drawing Sheets

(51) Int. Cl.
    *H04L 41/0806*     (2022.01)
    *H04L 41/0895*     (2022.01)
    *H04L 67/60*     (2022.01)

(56)             References Cited

U.S. PATENT DOCUMENTS

2019/0007811 A1*   1/2019  Choi ........................ H04W 4/50
2020/0288301 A1*   9/2020  Choi .................... H04W 8/005
2020/0336900 A1   10/2020  Mueck

* cited by examiner

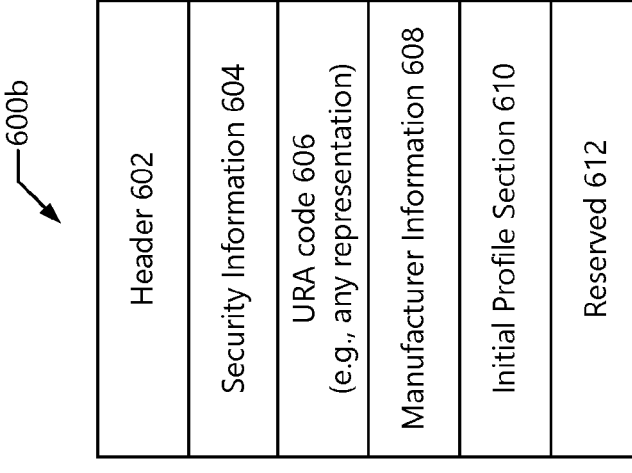

| | Header Size 601 | Header 602 |
|---|---|---|
| | Security Information Size 603 | Security Information 604 |
| | Code Size 605 | URA code 606 (e.g., any representation) |
| | Manufacturer Information Size 607 | Manufacturer Information 608 |
| | Initial Profile Size 609 | Initial Profile Section 610 |
| | Reserved Size 611 | Reserved 612 |

600a

| Header 602 |
|---|
| Security Information 604 |
| URA code 606 (e.g., any representation) |
| Manufacturer Information 608 |
| Initial Profile Section 610 |
| Reserved 612 |

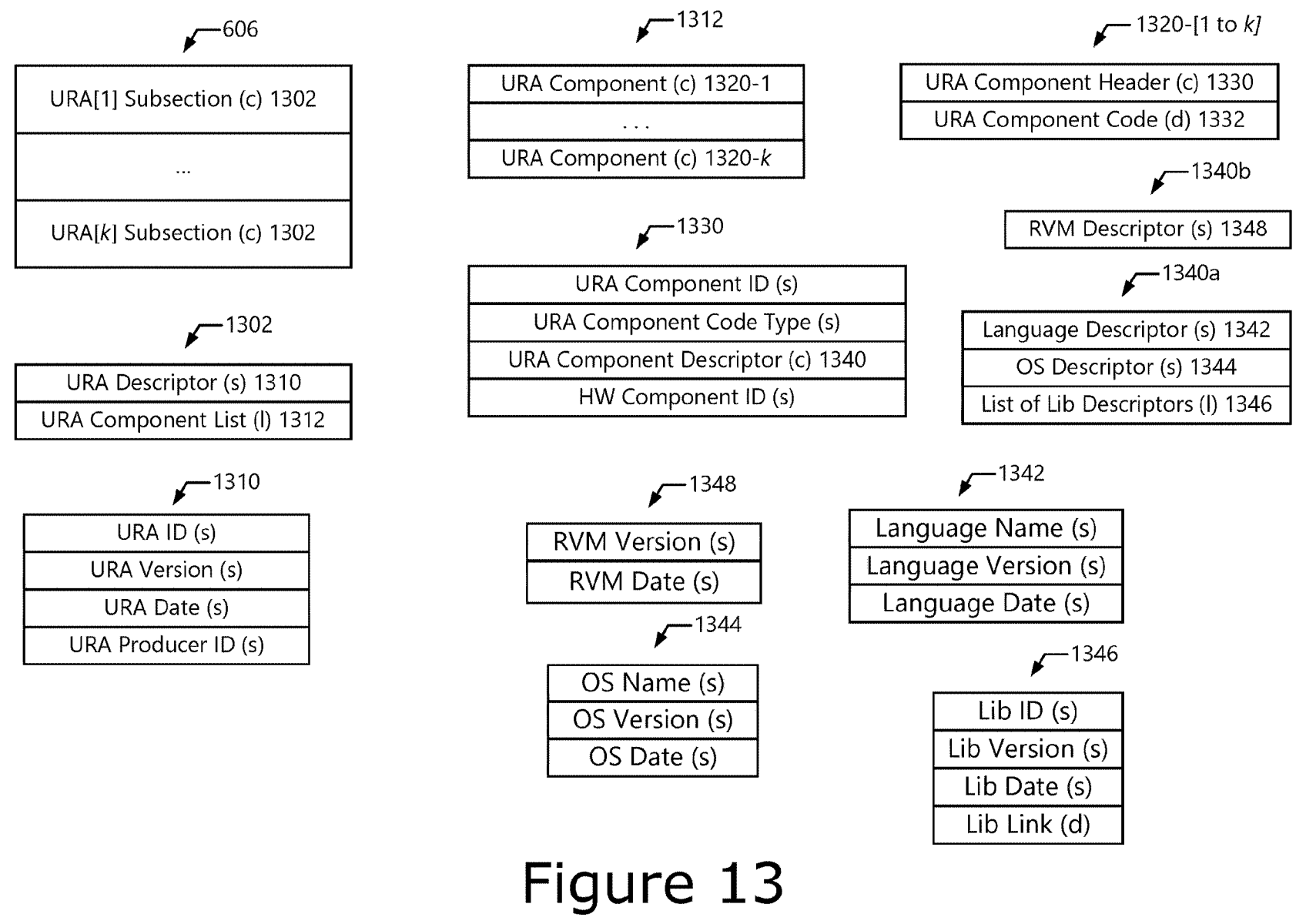

| URA Component Header (c) 1330 |
| URA Component Code (d) 1332 |

1340b

| RVM Descriptor (s) 1348 |

1340a

| Language Descriptor (s) 1342 |
| OS Descriptor (s) 1344 |
| List of Lib Descriptors (l) 1346 |

1342

| Language Name (s) |
| Language Version (s) |
| Language Date (s) |

1346

| Lib ID (s) |
| Lib Version (s) |
| Lib Date (s) |
| Lib Link (d) |

1312

| URA Component (c) 1320-1 |
| ... |
| URA Component (c) 1320-k |

1330

| URA Component ID (s) |
| URA Component Code Type (s) |
| URA Component Descriptor (c) 1340 |
| HW Component ID (s) |

1348

| RVM Version (s) |
| RVM Date (s) |

1344

| OS Name (s) |
| OS Version (s) |
| OS Date (s) |

606

| URA[1] Subsection (c) 1302 |
| ... |
| URA[k] Subsection (c) 1302 |

1302

| URA Descriptor (s) 1310 |
| URA Component List (l) 1312 |

1310

| URA ID (s) |
| URA Version (s) |
| URA Date (s) |
| URA Producer ID (s) |

Figure 13

InstallatorType (s) 1502

InstallatorCode (d) 1504

InstallationParameters (d) 1506

Reserved (d) 1508

608

RAP\Manufacturer

Reserve

Parameters

InstallorCode

InstallorType

| 610 |
| --- |
| URA[1]InitialProfile (d) 1702 |
| ... |
| URA[k]InitialProfile (d) 1702 |

1900

1901

Generate RAP container to include data for installation and/or deployment of one or more RAs — 1911

Send RAP container to one or more REs — 1912

1902

Receive a RAP container including data for installation and/or deployment of one or more RAs — 1921

Install/deploy RA(s) based on the RAP — 1922

2600

2650

2655

CN 2642

2655 cloud 2644

Backend Layer 2640

Edge Layer 2637

ECT 2635

2636 a

DATA

APP 2636 b

DATA 2636 c

DATA

Access Layer 2630

2632

2631

2632

2603a

2603a

2603a

2603a

2603b

2612c

2612a

2605

2612b

Gateway / Intermediate Layer 2610b

Endpoint Layer 2610a    2605

2605

2605

2611

2611

2611

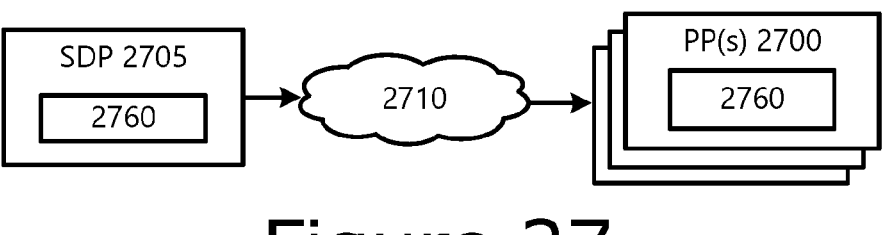

Figure 27

```
2950
    ┌─ 2956
    processor 2952 ◄──► acceleration
    ┌─────────────┐      circuitry 2964          edge devices
    │instructions │                                  2962
    │    2981     │
    └─────────────┘      2966  ┌──────┐
                               │2966y │
    trusted execution   ◄──►   ┌──────┐          edge cloud
    environment 2990           │2966x │            2963
                               └──────┘
                               ┌──────┐
                               │2966z │
                               └──────┘
    ┌─ 2960            network
    memory 2954  ◄──►  interface 2968
    ┌─────────────┐
    │instructions │
    │    2982     │    external        sensors 2972
    └─────────────┘ ◄─► interface 2970
                                       actuators 2974
    storage 2958
    ┌─────────────┐                    pos 2975
    │instructions │
    │    2983     │ ◄──► battery 2926
    └─────────────┘ battery
    output circuitry   monitor /      power block
    2984        ◄──►   charger 2928      2980 input circuitry 2986  ◄──►
```

Figure 29

MULTIRADIO INTERFACE DATA MODEL AND RADIO APPLICATION PACKAGE CONTAINER FORMAT FOR RECONFIGURABLE RADIO SYSTEMS

RELATED APPLICATIONS

The present application is a national stage entry under 35 U.S.C. § 371 of Int'l App. No. PCT/US2022/021988 filed Mar. 25, 2022, which claims priority under 35 U.S.C. § 119(e) to U.S. Provisional App. No. 63/166,154 filed on Mar. 25, 2021 and U.S. Provisional App. No. 63/175,788 filed on Apr. 16, 2021, the contents of each of which are hereby incorporated by reference in their entireties.

TECHNICAL FIELD

The present disclosure is generally related to cybersecurity, edge computing, network communication, and communication system implementations, and in particular, to technologies for reconfigurable radio equipment.

BACKGROUND

The DIRECTIVE 2014/53/EU OF THE EUROPEAN PARLIAMENT AND OF THE COUNCIL of 16 Apr. 2014 ON THE HARMONIZATION OF THE LAWS OF THE MEMBER STATES RELATING TO THE MAKING AVAILABLE ON THE MARKET OF RADIO EQUIP-MENT AND REPEALING DIRECTIVE 1999/5/EC (here-inafter the "Radio Equipment Directive" or "[RED]") establishes a European Union (EU) regulatory framework for placing radio equipment (RE) on the market. The [RED] ensures a single market for RE by setting essential requirements for safety and health, electromagnetic compatibility, and the efficient use of the radio spectrum. The RED also provides the basis for further regulation governing some additional aspects. These include technical features for the protection of privacy, and protection of personal data and against fraud. Furthermore, additional aspects cover interoperability, access to emergency services, and compliance regarding the combination of RE and software.

The [RED] fully replaced the existing Radio & Telecommunications Terminal Equipment (R & TTE) Directive in June 2017. Compared to the R & TTE Directive, there are new provisions in the RED which are not yet "activated", but which will be implemented through so-called "Delegated Acts" and/or "Implementing Acts" by the European Commission in the future. Recently, Expert Groups have been set up by the European Commission for various sub-articles of [RED] Article 3 in order to prepare new "Delegated Acts" and "Implementing Acts" regulating equipment using a combination of hardware and software.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 6, 7, 9, 11, 13, 15, 17, depict example RAP container formats.

FIG. 27 illustrates an example software distribution platform.

FIG. 29 depict example components of a compute node, which may be deployed in an edge computing system(s).

DETAILED DESCRIPTION

Figure 1:
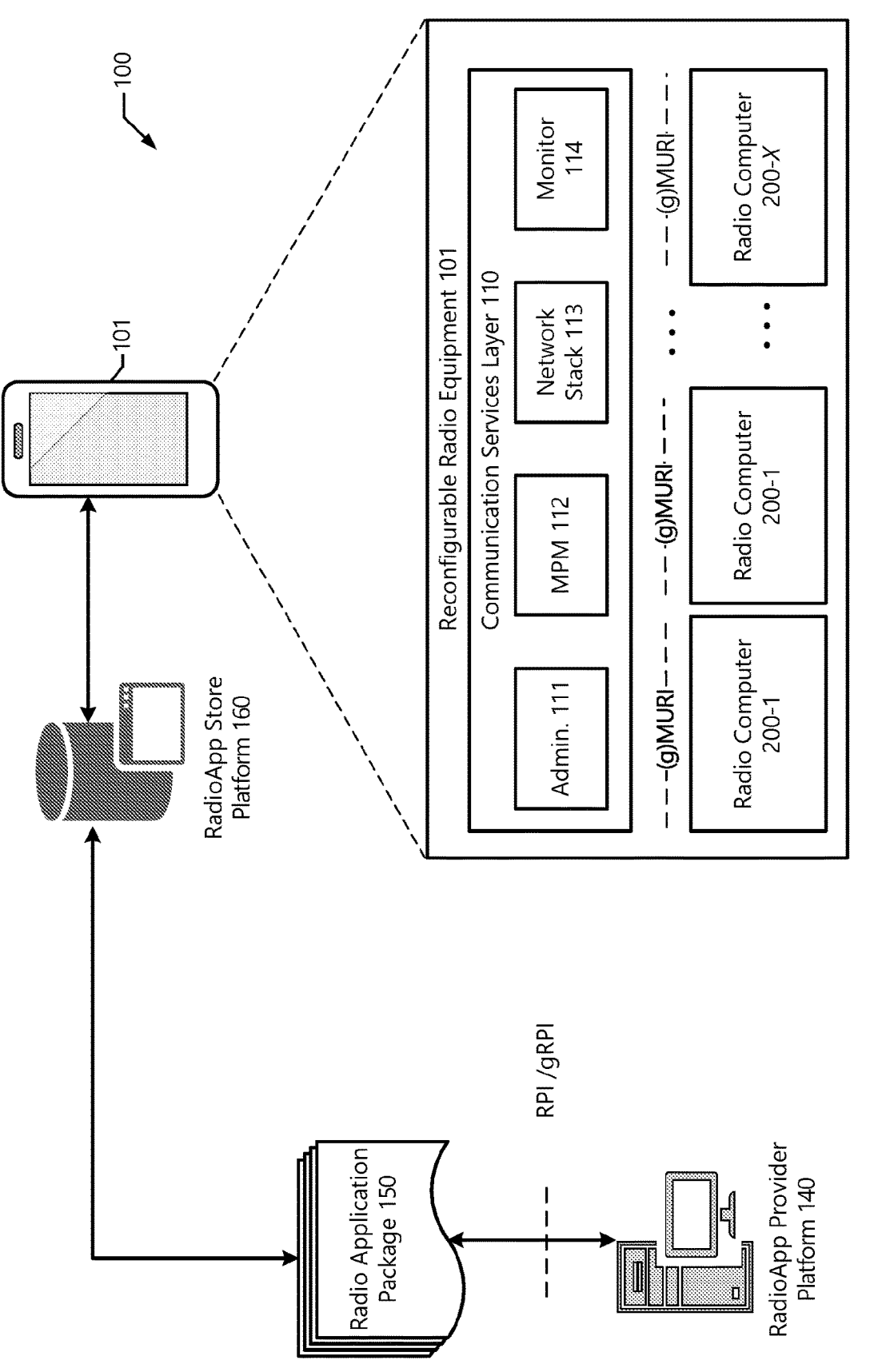
FIG. 1 illustrates an example reconfigurable radio equipment architecture.

The present disclosure is related to various aspects of Reconfigurable Radio Systems (RRS), including reconfigurable equipment (RE) architecture and Cognitive Radio (CR). RRS is based on technologies such as software (SW) reconfiguration through Radio Applications (RAs) and CR whose systems exploit the capabilities of reconfigurable radio and networks for self-adaptation to a dynamically-changing environment with the aim of improving supply chain, equipment and spectrum utilization. A CR is a radio with learning capabilities, or a radio able to obtain knowledge of the radio operational environment and adjust its operational parameters and protocols accordingly. Such an approach has a significant number of benefits in terms of spectrum efficiency and this is much more important when the spectrum is scarce, as it is the case nowadays. Thus, there is great interest in Cognitive Radio technologies at the European level as well as worldwide.

One case study on cognitive technologies is in the use White Spaces (WS) in the UHF band. WS is part of the spectrum which is available for a radio communication application at a given time in a given geographical area on a non-interfering/non protected basis with regard to primary services and other services with a higher priority on a national basis. Coordinated as well as un-coordinated system approaches were developed by ETSI RRS. Another direction relates to the development of Radio Environment Maps technologies, enabling the collection of cognitive radio context information to be exploited for decision making.

SW reconfiguration through RAs is a straightforward extension of the widely applied applications ("Apps") for smartphones. RAs are enabling SW developers to access low-level parameters of a wireless equipment within a controlled execution environment, a so-called Radio Virtual Machine (RVM). ETSI RRS develops standards on the required low-level interfaces as well as solutions for related novel approaches such that a continued compliance with applicable regulations is given.

Additionally, the present disclosure is related to [RED] Article 3(3)(i) and Article 4, which are about the combination of SW and HW. RED Article 3(3)(i) is defined as follows:

3. Radio equipment within certain categories or classes shall be so constructed that it complies with the following essential requirements: [ . . . ] (i) radio equipment supports certain features in order to ensure that software can only be loaded into the radio equipment where the compliance of the combination of the radio equipment and software has been demonstrated.

The European Commission plans to make mandatory the MultiRadio Interface (MURI) (see e.g., [EN303146-1] and the generalized Multi Radio Interface (gMURI) [EN303681-1]. If made mandatory, any radio equipment will be required to meet the corresponding requirements if made available on the single European Market.

The present disclosure discusses internal state information into the available (generalized) MURI data model. This will lead to certainty that internal states are kept in a single location and avoiding potential conflicts related to conflicting internal state information. Embodiments include specific extensions of the available data models such that internal state information is included. The embodiments herein ensure that internal state information is managed at a single location and that any contradictory state information (possibly stored at multiple locations) is avoided. Existing solutions involve an information model including information which is mainly related to the characteristics of information, virtualization containers/OS containers, and the like. However, the existing data model does not include information of any internal states.

The present disclosure also provides a general container format for any Radio Application Package (RAP) supporting the ETSI SW reconfiguration framework. The RAP container can be defined on different levels of abstraction, starting with a rough structure which is quite broadly applicable to a refined internal format. The RAP container provides a general format for providing RAPs to a target platforms in accordance to the overall ETSI Reconfiguration framework. In existing solutions, each manufacturer is forced to use a proprietary format for delivering a RAP such as, for example, a firmware package. The existing approach does not allow for a unified testing approach as required under new regulations. The RAP container discussed herein will enable a unified method for the validation of the ETSI SW reconfiguration framework. For instance, a test approach can include creating a valid RAP in accordance to this invention and then to verify whether the target platform correctly accepts the RAP, installs it and executes it.

The RRS and [RED] discussed herein are applicable to any kind of wireless equipment, including processors/CPUs with connectivity features, mobile devices (e.g., smartphones, feature phones, tablets, wearables (e.g., smart watches or the like), IoT product and/or IoT devices, laptops, wireless equipment in vehicles, industrial automation equipment, and/or the like), network or infrastructure equipment (e.g., Macro, Micro, Femto, and Pico network access nodes (NANs), repeaters, relay stations, access points, RSUs, RAN nodes, backbone equipment, routing equipment, any type of Information and Communications Technology (ICT) equipment, any type of Information Technology (IT) equipment, and/or the like), and systems/applications that are not classically part of a communications network (e.g., medical systems/applications (e.g., remote surgery, robotics, and/or the like), tactile internet systems/applications, satellite systems/applications, aviation systems/applications, vehicular communications systems/applications, autonomous driving systems/applications, industrial automation systems/applications, robotics systems/applications, and/or the like). The embodiments introduce hierarchy levels for various types of equipment, for example, network equipment may have a higher hierarchy level as compared to UEs, or vice versa. Depending on the hierarchy level, some equipment may be treated preferably (less delay) or may have access to more information/data than other equipment.

1. RRE and RRS Aspects

FIG. 1 shows an example reconfigurable RE (RRE) architecture 100 including four sets of interfaces. The RRE 101 includes one or more radio computers 200 (including radio computers 200-1 to 200-X where X is a number) for supporting distributed computations (see e.g., [EN303648]). The RRE 101 is capable of running multiple radios simultaneously (e.g., Radio Computers 1-N, where N is a number), changing the set of radios by loading new Radio Application Packages (RAP) 150 and setting their parameters. For the specific case of Mobile Device Reconfiguration as given in [EN303095], [EN303146-1] to [EN303146-4], [TR103087], and [TS103436], only a single Radio Computer is used in the target platform.

A radio computer 200 is part of an RE 101 working under ROS control and on which RAs 270 can be executed. A radio computer 200 may include elements such as, for example, programmable processors, hardware (HW) accelerators, peripherals, SW, and/or the like. RF part is considered to be part of peripherals. The HW elements of a radio computer 200 are referred to as a radio platform 220 (see e.g., FIG. 2). Each radio computer 200 can execute RA 270 code including various functional blocks (FBs) of which the granularities might be all different depending upon HW platform vendors—depending on the features provided by radio equipment manufacturers, the (3rd party) SW manufacturer develops the entire or partial RA 270 code using the standard programming interfaces as depicted in FIG. 1. A modular SW approach is applied in order to maximize the reusability of SW components. The evolution of RATs can be supported by adding and/or replacing the FBs on a given HW platform.

A RAP 150 is a delivery unit of an RA 270, which may, upon execution of the RA 270, reconfigure the radio communications technologies of the RE 101. An RA 270 is SW that enforces the generation of the transmit radiofrequency (RF) signals or the decoding of the receive RF signals The SW is executed on a particular radio platform 220 or an radio virtual machine (RVM) 271 as part of the radio platform 220.

RAs 270 are applications (apps) that may access low-level parameters of REs 101 in order to update or otherwise alter how the RE 101 uses its radio technology or individual radio computer(s) 200. Additionally or alternatively, RAs 270 include SW that enforces the generation of transmit RF signals and/or the decoding of receive RF signals. In various implementations, the SW of an RA 270 is executed on a particular radio platform 220 and/or an RVM 271 as part of the radio platform 220. RAs 270 may have different forms of representation including, for example, source code including Radio Library (RL) calls of RL native implementation and Radio HAL 2115 calls; as Intermediate Repre-sentations (IRs) including RL calls of RL native implemen-tation and radio HAL 2115 calls; and/or as executable codes for a particular radio platform 220.

In this example, RE 101 reconfiguration through RAs 270 is implemented via the RadioApp Store 160, which is an extension of the app store concept used for most mobile device platforms, such as smartphones and tablet computers, wherein a user may access an RA 270 from the RadioApp Store 160 through the (g) RPI to download and install RAs 270. A user is able to access the RadioApp Store 160, to identify available SW components, download, and install selected components. In some implementations, only SW components that have been previously tested, validated, and included in the Declaration of Conformity (DoC) of the target platform will be made visible to the user.

All RAs 270 are called Unified Radio Applications (URAs) 205 when they exhibit a common behavior from the RRE's 101 point of view in [EN303648]. A URA 205 is an RA 270 that complies with the RRE framework defined in the present disclosure and/or a suitable standard/specifica-tion such as ETSI EN 303 681-3 V1.1.2 (2020 March) ("[EN303681-3]") and/or the like. In order to run multiple URAs 205, the RRE 101 includes a Communication Ser-vices Layer (CSL) 110 and one or more radio computers 200, each of which includes a Radio Control Framework (RCF) (see e.g., RCF 210 of FIG. 2) and radio platform (see e.g., radio platform 220 of FIG. 2).

The CSL 110 is a layer related to communication services supporting generic applications. The CSL 110 supports generic applications like Internet access, enterprise network access, and/or the like. The CSL 110 introduces function-alities for the (de-)installation, selection and configuration of SW components and the management of the data flows (see e.g., [EN303648]). The CSL 110 includes Administrator entity (admin) 111, Mobility Policy Manager entity (MPM) 112, a networking stack entity (NetStack) 113, and a monitor entity 114.

The admin 111 may request installation or uninstallation of URAs 205, and create or delete instances of URAs 205. This includes provisioning information about the URAs 205, URA 205 statuses, and/or other like URA-related informa-tion. Additionally, the admin 111 includes two sub-entities: an Administrator Security Function (ASF) and an RRS Configuration Manager (RRS-CM). The ASF is sub-entity of the admin 111 on the device end-point responsible for ensuring confidentiality, integrity, and authenticity of assets such as the RE Configuration Policy, and RAP(s), and supporting the non-repudiation, remote attestation, and con-figuration enforcement strategies. This may include direct and indirect interactions related to security with the Radio-App Store 160 and other security related entities associated with the RadioApp Store 160. In addition to supporting operations related to asset protection, the ASF acts as a proxy to other security functions on the platform, as detailed in [TR103087]. The RRS-CM is sub-entity of the admin 111 in charge of long-term management as discussed in clause 11 of [TR103087]. In case that a snapshot function is required, the admin 111 may store relevant RAPs, their configuration parameters and information on the URA 205 installation and execution history. When required, the same steps can be executed by the admin 111 to fall back to a previous snapshot.

The MPM 112 includes functions for monitoring of the radio environments and RE capabilities, functions for requesting activation or deactivation of URA 205, and functions for providing information about URA 205 lists.

The MPM 112 also makes selections among different RATs and discover peer communication equipment and arrange-ment of associations. Here, the "association" is a logical communication link to a RAN or a peer equipment. Some control signaling may be necessary to maintain the associa-tion, and no user data transfer may occur with only an association present, but a data flow may be established into an association for this purpose. Additionally, "peer equip-ment" refers to any communication counterpart of a RRE 101, which can be reached by establishing a logical com-munication link (e.g., an association) between the RRE 101 and peer equipment. In addition, the MPM 112 may request a computational/spectral load balancing among baseband processors and RF transceivers in one or more radio plat-forms 220 when the number of baseband processors and RF transceivers in radio platform 220 exceeds one. The require-ment for computational and/or spectral resources varies depending on the situation of each base station in the case of network application. For example, the required traffic of each base station can rapidly and unexpectedly vary due to natural disasters, sports games, accidents, and/or the like When the RRE 101 is shared with multiple stakeholders (e.g., multiple network operators share a single network infrastructure), the policy of using both computational and spectral resources may have to be controlled for a desired performance requirement at each operation.

The NetStack 113 includes functions for sending and receiving user data. The NetStack 113 translates radio com-puter identifiers (IDs) to corresponding target network addresses, and vice versa. The NetStack 113 also manages data flows for basic TX/RX operation. The requirement is described in clause 6.2.4 of [EN303641]. The monitor 114 includes functions to transfer information from URAs 205 to user or proper destination entities in the RE 101. In addition, in case that distributed computation is applied, the monitor 114 receives the computational/spectral resource usage sta-tus. In some implementations, a non-real time OS is used for execution of the admin 111, MPM 112, NetStack 113, and monitor 114 which are part of the CSL 110 as described previously.

A Radio Controller (RC) is a functional component of an RA 270 for transferring context information from corre-sponding RAs 270 to monitor. The RC in an RA 270 ensures the availability of context information (see e.g., clause 6.2.5 of [EN303641]). An RC, which may operate in computa-tional resources in non-real-time, accesses RAs 270 which operates in radio computer in real time. The monitor 114, to which the context information is transferred using an RC, provides context information to the admin 111 and/or MPM 112 for application(s) to be performed using the context information, for example, terminal-centric configuration.

Figure 2:
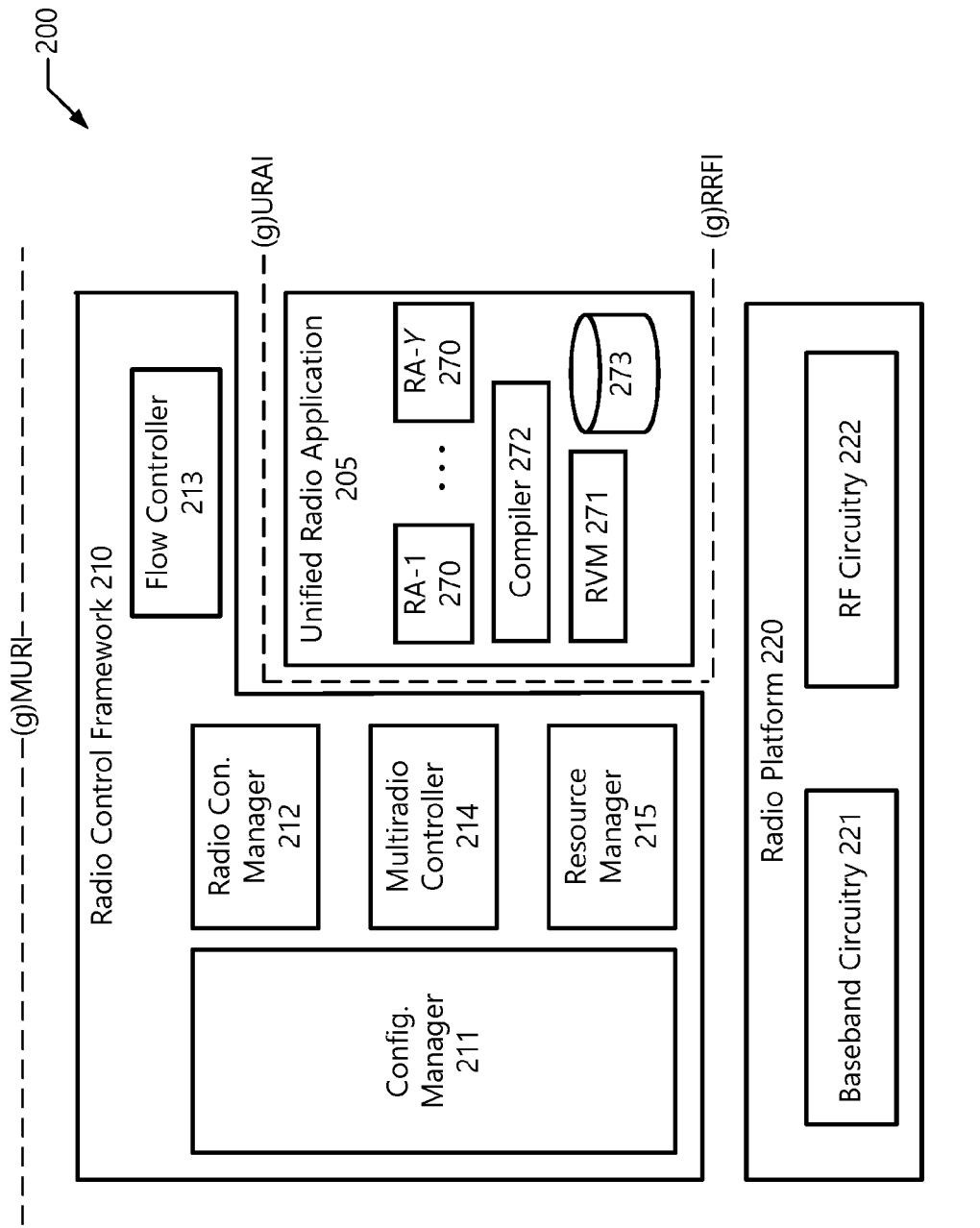
FIG. 2 illustrates an example radio computer architecture.
Figure 4:
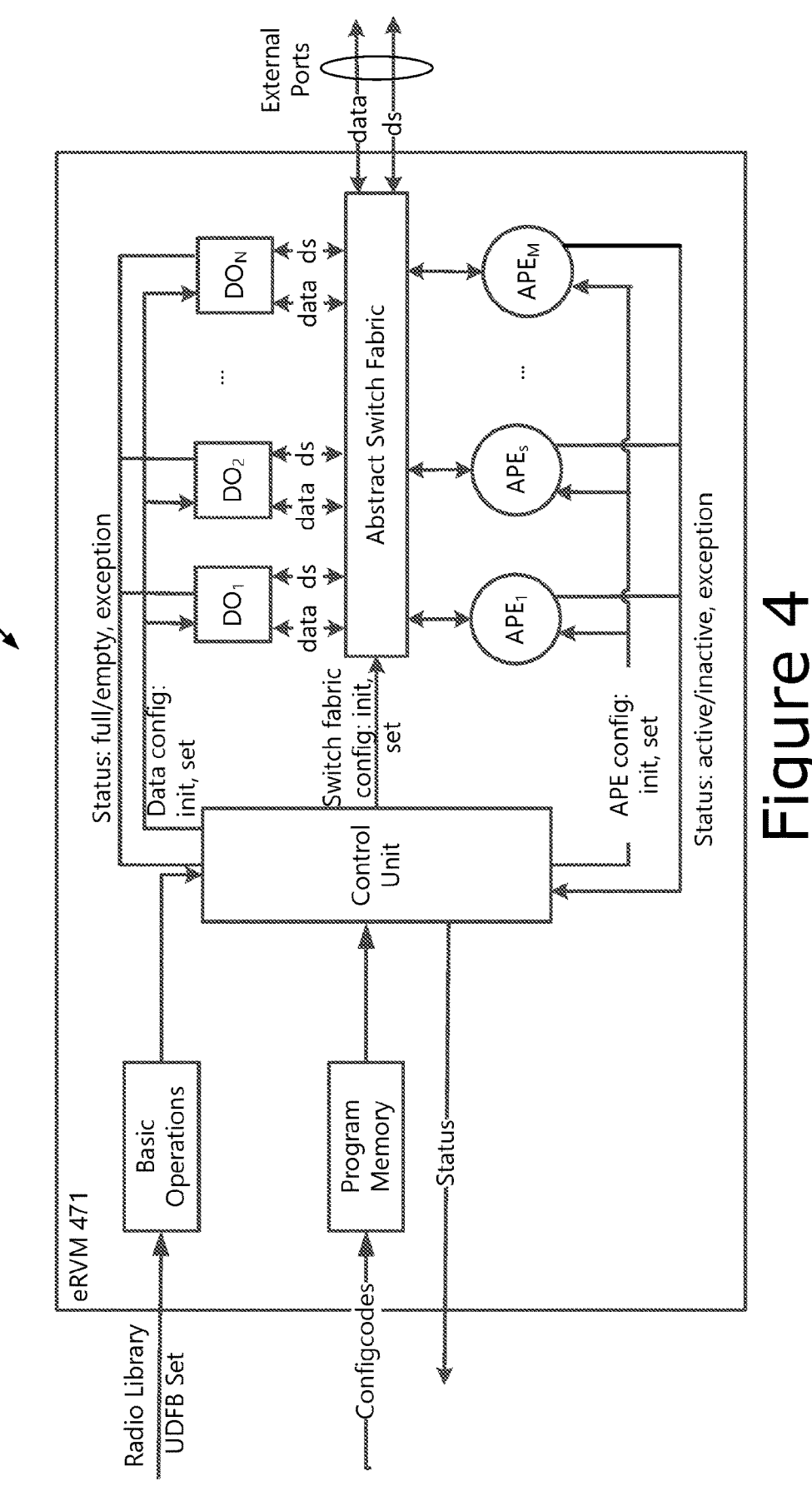
FIG. 4 shows an example architecture of an elementary RVM.

A radio computer 200 is the part of the RE 101 HW working under ROS control and on which RAs 270 are executed. The part of RE 101 HW working under operating system (OS) control and on which Applications, among others, are executed are referred to as "Computational Resources". The operation of Computational Resources is performed by a given OS, which is performed on non-real-time basis, whereas radio computer(s)'s 200 operation is performed by another OS, which should support real-time operations of URA 205. The OS of radio computer(s) 200 is referred to as a Radio OS (ROS) and/or Real-time OS (RTOS) in the present disclosure (see e.g., ROS 2156b in FIG. 21) and can belong to its own radio computer 200. An ROS/RTOS (see e.g., ROS 2156b in FIG. 21) as used herein may refer to any appropriate OS empowered by RCF 210 and may provide RCF capabilities as well as traditional management capabilities related to management of RP such as resource management, file system support, unified access to HW resources, and/or the like. The radio computer(s) 200 include the following components: an ROS/RTOS 2156*b* and the five entities of the RCF 210, specified in clause 4.2.3 of [EN303648] and discussed infra with respect to FIG. 2, are classified into two groups. One group relates to real-time execution and the other group to non-real-time execution as shown by FIG. 4.3.1-1 of [EN303648]. The particular entities of the RCF interface related to real-time and non-real-time execution, can be determined by each vendor. The ROS/RTOS 2156*b* enables management of timing constraints and provides interface between URA 205 and the radio platform 220. The requirements are described in clauses 6.4.9 and 6.2.6 of [EN303641]. Other aspects of the radio computer(s) 200 are discussed in [EN303648].

The RRE 101 also includes four sets of interfaces or reference points for the interconnections among the elements of the RRE 101. These interfaces include the a Multiradio Interface (MURI) (see e.g., [EN303146-1]) and/ or generalized MURI (gMURI) (see e.g., [EN303681-1]), which is/are interfaces between the CSL 110 and an RCF 210 of each radio computer 200.

The radio programming interface (RPI) (see e.g., [EN303146-4]) and generalized RPI (gRPI) (see e.g., [EN303681-4]) (collectively referred to as "(g) RPI") is an interface/reference point allowing an independent and uniform production of RAs 270 (see e.g., [EN303681-4]). For example, a RadioApp provider platform 140 (e.g., an RE manufacturer, an RA developer, and/or the like) may produce one or more RAs 270 and/or RAPs 150, which may be provided to the RadioApp store 160. One or more RAPs 150 may be provided to the RadioApp Store 160 via the (g) RPI, and the RE 101 may request and download RAPs 150 generated by the RadioApp provider platform 140 from the RadioApp Store 160 via a predetermined link. The other interfaces are discussed infra with respect to FIG. 2.

1.1. Radio Computer Architecture

FIG. 2 shows an example radio computer architecture 200. The radio computer architecture 200 may correspond to each of the radio computer(s) 200-1 to 200-X shown by FIG. 1 and/or the communication circuitry 2966 of FIG. 29. The radio computer architecture 200 includes a Radio Control Framework (RCF) 210, a URA 205, and a radio platform 220.

The RCF 210 is control framework which, as a part of the OS (e.g., ROS, RTOS, and/or platform/application OS), extends OS capabilities in terms of radio resource management. The RCF 210 provides a generic environment for the execution of URA 205, and a uniform way of accessing the functionality of the radio computer 200 and individual RAs 270. The RCF 210 provides services to CSL 110 via the (g) MURI. The RCF 210 manages the actual SW execution through a number of functionalities discussed in [EN303648].

The CSL and RCFs interact with each other using the (g) MURI. These interactions may also be applicable to the MURI. The CSL and RCF are the same as discussed previously. As shown in The (g) MURI supports three kinds of services:

Administrative Services: These services are used by some device configuration application e.g. Administrator which is included in the CSL, to (un)install a new URA into the Reconfigurable RE and create/delete an instance of the URA. Installation and loading may take place both at device start-up time to set up the network connection as well as during run-time, whenever reconfiguration of available URAs is needed. (g) MURI does not make any assumption on how and when the Radio Equipment will detect the need of the reconfiguration.

Access Control Services: These services are used by the MPM to maintain the user policies and preferences related to the usage of different RATs and to make a selection between them. Modelling of such preferences and selection algorithms is not in the scope of the present document; however, the (g) MURI specification covers the information exchange of RAT selection decisions between CSL and RCF. The preferences themselves may originate either locally from applications or end user settings as well as in a distributed manner from network operator or from a cognitive radio management framework.

Data Flow Services: These services are used by the networking stack of the Reconfigurable RE, such as the TCP/IP stack. Therefore data flow services represent the set of (logical) link layer services, which are provided in a uniform manner regardless of which URAs are active.

Referring back to both FIGS. 1 and 2, the CSL 110 communicates with one or multiple Radio Computers through the MURI/gMURI interface(s) as defined in [EN303146-1] and [EN303681-1]. There are a number of MURI/gMURI services and service primitives defined which are feed to/from the RCF 210 within the target Radio Computer 200. The RAP 150 is containing a URA 205, which is controlled by the RCF 210 and executed on any type of HW components (e.g., FPGAs, DSPs, ASICs, CPUs, and/or the like).

The RCF 210 is a control framework that includes Configuration Manager entity (CM) 211, Radio Connection Manager entity (RCM) 212, Flow Controller entity (FC) 213, and Multiradio Controller entity (MRC) 214. The RCF 210 may also include a Resource Manager entity (RM) 215, however in some implementations the RM 215 is part of an OS (e.g., ROS, RTOS, and/or platform/application OS). The CM 211 includes functions for installing/uninstalling and creating/deleting instances of URA 205 as well as management of and access to the radio parameters of the URA 205. The RCM 212 includes functions for activating/deactivating URA 205 according to user requests, and to management of user data flows, which can also be switched from one RA 270 to another. A "data flow" refers to a logical channel between the FC 213 and the URA 205 created by the FC 213 to send to or receive data elements (octets, packets or other granularity) from the URA 205. The FC 213 includes functions for sending and receiving user data packets and controlling the flow of signaling packets (e.g., data flows and the like). The MRC 214 include at least functions to schedule the requests for radio resources issued by concurrently executing URA 205, and to detect and manage the interoperability problems among the concurrently executed URA 205. In addition, for distributed computation cases, the MRC 214 includes a function to report spectral resource usage status. The RM 215 includes functions to manage the computational resources, to share them among simultaneously active URA 205, and to guarantee their real-time execution. In addition, for distributed computation cases, RM 215 includes a function to report computational resource usage status. A distributed computation case is a computational model in which components located on networked computers communicate and coordinate their actions by passing messages interacting with each other in order to achieve a common goal.

The RCF 210 may represent functionalities provided by the radio computer 200, and may require all RAs 270 to be subject to a common reconfiguration, multiradio execution and resource sharing strategy framework depending on the concerned Radio Equipment Reconfiguration Class (RERC). Since all RAs 270 exhibit a common behavior from the RRE perspective, those RAs 270 are called URAs 205. The services relate to activation and deactivation, peer equipment discovery and maintenance of communication over user data flows are provided at a Unified Radio Application Interface (URAI) (see e.g., [EN303146-3]) and/or generalized URAI (gURAI) (see e.g., [EN303681-3]), which is an interface between the URA 205 and the RCF 210. The URA 205 represents the SW downloaded and installed onto the target platform as in discussed in [EN303648]. A URA 205 includes one or more RAs, and a plurality of RAs 270 may be referred to as URA 205 when the RAs 270 exhibit common attributes, characteristics, or requirements related to the reconfiguration of the MD. As used herein, "URA" may be used interchangeably with "RA". An "RA" may also be referred to as "RA component(s)", "RRS component(s)", and the like.

The services provided by the URA 205 may be related to activation and deactivation, peer equipment discovery, and/or maintenance of communication over user data flows, which may be provided at the URAI/gURAI interface between the URA 205 and the RCF 210. In some cases, these services may be provided to the CSL 110 via the (g) MURI between the RCF 210 and the CSL 110.

The RAs 270 (including RA-1 270 to RA-Y 270, where Y is a number) are applications that, when executed by one or more processors (e.g., baseband circuitry 221 or the processor circuitry 2952 discussed infra with respect to FIG. 29) may control generation and transmission of transmit (Tx) RF signals, control receipt of receive (Rx) RF signals, and the decode the Rx RF signals. The RAs 270 may be executed/operated in an RVM 271 that is part of the radio platform 220.

Figure 21:
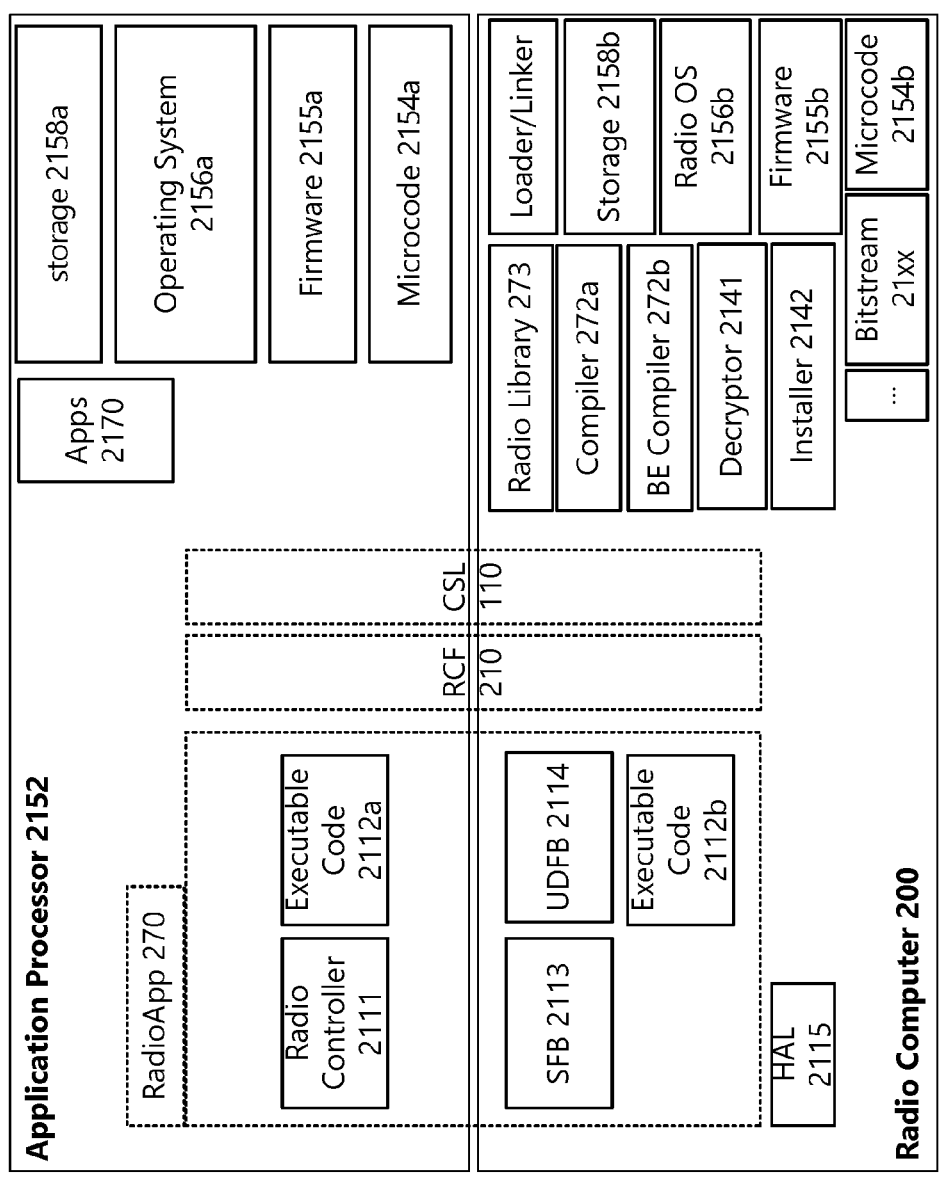
FIG. 21 shows an example RRS operating environment components over an Application Processor and the Radio Computer.
Figure 22:
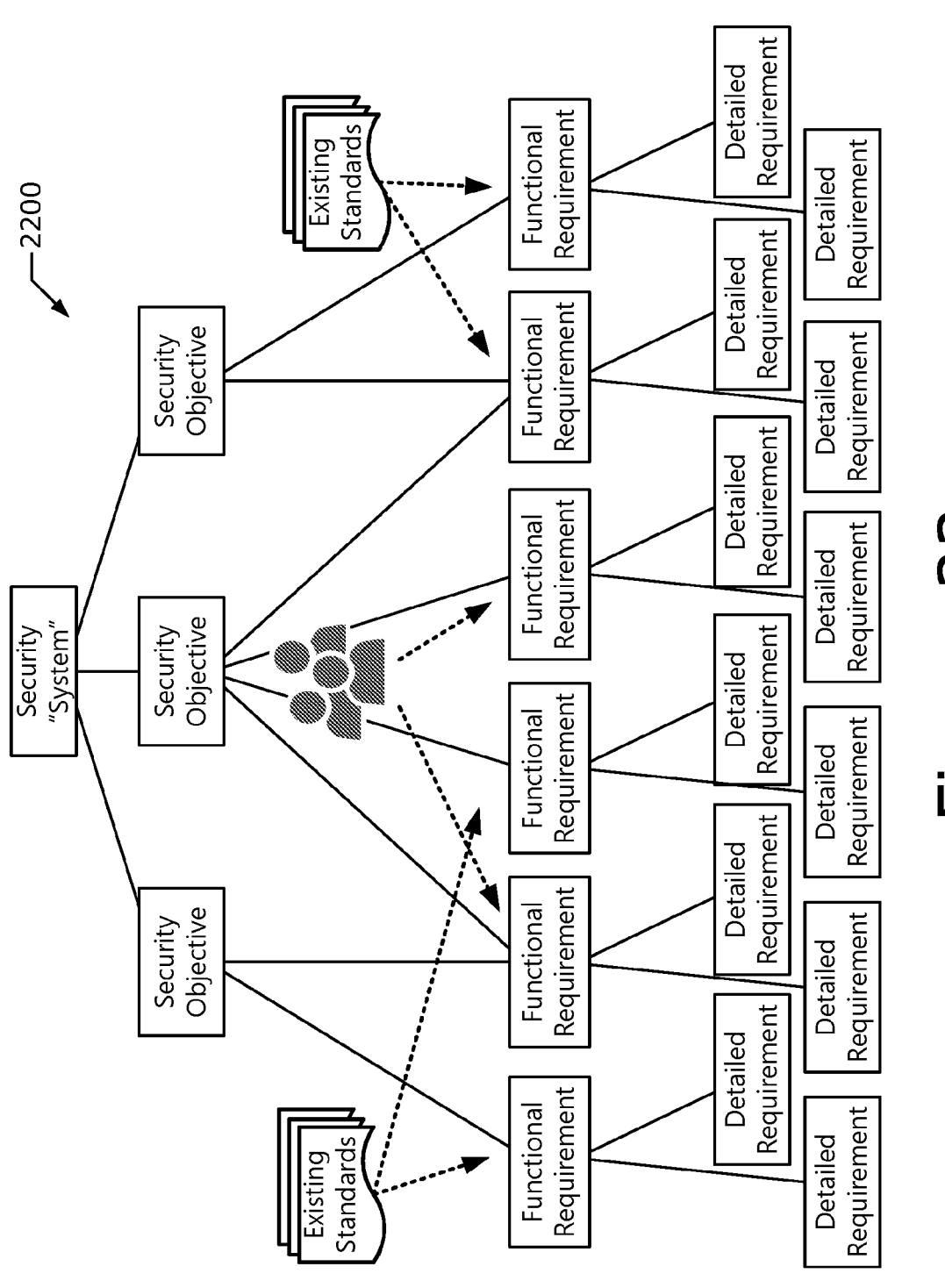
FIG. 22 shows example security objectives and requirements for reconfigurable radio systems (RRS).

The RVM 271 is a controlled execution environment that allows RAs 270 to access low-level radio parameters. The RVM 271 may be an abstract machine independent of the HW, which is capable of executing configcodes. In some implementations, the RVM 271 may be an abstract machine that can be configured by configcodes into an RA. The implementation of the RVM 271 is radio computer-specific and may include a compiler 272 (e.g., including a front-end compiler 272a or back-end compiler 272b as shown by FIG. 21), which may provide Just-in-Time (JIT) or Ahead-of-Time (AOT) compilation of configcodes into executable codes.

The RAs 270 may have different forms of representation including, for example, source codes (also referred to as "RA codes"), intermediate representations (IRs), and executable codes for a particular radio platform 220. The RAs 270 may comprise RA codes including of User Defined FBs (UDFBs), Standard FBs (SFBs), radio controller (RC) codes, and/or executable codes depending on RA 270 design choice and/or executable codes for a particular radio platform 220. The RAs 270 may comprise RA codes including FBs, RC codes, and/or executable codes depending on the RA 270 design choice.

An FB is a function needed for real-time implementation of RA(s) 270. An FB includes not only the modem functions in L1, L2, and L3 but also all the control functions that should be processed in real-time for implementing given RA(s) 270. FBs are categorized into SFBs and UDFBs. SFBs can be shared by many RAs 270. Examples of SFBs include Forward Error Correction (FEC), Fast Fourier Transform (FFT)/Inverse Fast Fourier Transform (IFFT), (de)interleaver, Turbo coding, Viterbi coding, Multiple Input Multiple Output (MIMO), Beamforming, and other like category of SFBs. UDFBs include FBs that are dependent upon a specific RA 270. UDFBs are used to support special function(s) required in a specific RA 270 and/or to support a special algorithm used for performance improvement. In addition, a UDFB can be used as a baseband controller FB, which controls the FBs operating in baseband processor in real-time and to control some context information processed in real-time.

In some implementations, an RA 270 may be expressed as a set of interconnecting SFBs together with one or more UDFBs. In some implementations, a Radio Library (RL) 273 may include some or all of the SFBs, and the SFBs to be provided from the RL 273 may be represented in a platform-independent normative language. The native implementation of the RL 273 may be provided as platform-specific codes of the SFBs for the radio platform 220. The RL 273 may be located in the radio computer circuitry 200, and in some implementations, the RL 273 may be a part of the RVM 271. The RC codes may be used to send context information to the monitor 114 and send/receive data to/from the net stack 113. The RC codes may be executed in a non-real-time environment (e.g., application/host circuitry of the UE/RE 101), and the remaining portion of the RAs 270 may be executed in the real-time environment (e.g., the radio platform 220).

SFBs are implemented through a RHAL 2115 when the SFB is implemented on dedicated HW accelerators. SFBs are classified into two groups, those requiring dedicated HW accelerators and those not requiring dedicated HW accelerators. In case that a HW accelerator is used, it is accessed through the RHAL. In the other case, platform specific code is provided for the concerned SFB by the RL 273. When executable code is provided, the SFBs and UDFBs needed to perform a given URA 205 are already bound in the executable configcodes of URA 205. When source code(s) or IR is/are provided, the UDFBs needed to perform a given URA 205 are included in the configcodes of the URA 205 and are compiled for Source Code (by the compiler 272a) or IR (by the back end compiler 272b, see e.g., FIG. 21), respectively (see e.g., [EN303648]).

The RHAL 2115 is part of the ROS 21xx. The RHAL 2115 abstracts the radio platform 220 and supports SFBs to be implemented using one or more HW accelerators (e.g., FPGAs, CPLDs, programmable ASICs, programmable SoCs, and/or the like) in order for each of those SFBs to be implemented directly on corresponding HW accelerator(s). In some implementations, the RHAL is platform specific and is not standardized.

Compiling the source codes of an RA 270 may yield configcodes. When an RA 270 provider develops high level code based on a target platform (e.g., the RE 101 or a specific radio platform 220), a result of compiling the RA 270 source codes or URA 205 codes is/are configcodes that is/are executable on the target platform. In addition, the RE 101 may support different types of RA 270 source codes or URA 205 codes wherein some RAs 270 and/or URA 205 may run directly on the ROS as executable codes while others may run as an RVM 271 configured by configcodes. When the RA 270 provider develops high level code without considering a target platform, a result of front-end compiling of RA 270 source codes is an IR, which may be back-end compiled for operating on a specific target platform. In this case, the configcodes may be configuration codes of an RVM 271 instance. Back-end compilation may occur within the radio computer circuitry 200 or by a cloud computing service.

In some implementations, the RE 101 may include a shadow radio platform 220, or may interact with a cloud based shadow radio platform 220. The shadow radio platform 220 is a platform where configcodes can be directly executed when it corresponds to the target radio platform 220 or, when it corresponds to an RVM 271, compiled and executed. If the shadow radio platform 220 corresponds to the target radio platform 220, then a front-end compiler will generate the executable code for the target radio platform 220 and configcodes are equivalent to the executable code for that radio platform 220.

An RA 270 provider may generate an RAP 150, which may be a delivery unit of an RA 270 from the RadioApp Store 160 to the RE 101. As used herein, the term "RAP" may be used interchangeably with RA 270 and may be referred to as RAP 150. A RAP 150 may include RA 270 codes of an RA 270 and configuration metadata for the RE 101. The metadata may include (g)RPI information, which is a descriptive interface detailing how the RA 270 is structured and how its sub-components are synchronized together; bindings to the HW abstraction layer (HAL) 2115, when applicable; bindings to linkable libraries, when applicable; and a pipeline configuration. Additionally or alternatively, the metadata can include descriptive RAP metadata, structural RAP metadata, administrative RAP metadata, and/or legal RAP metadata as discussed infra. RAPs 150 may be provided to the RadioApp Store 160 via the (g)RPI, and the RE 101 may request and download RAPs 150 generated by an RA 270 provider from the RadioApp Store 160 via a predetermined link. The configuration metadata may include a DoC that is associated with the RE 101 and also indicates installation parameters of the RA 270 component included in the RAP 150. The DoC may be separate from the RAP 150, but provided to the RE 101 in a same digital signature as the RAP 150. Additionally or alternatively, the DoC may be accessed from a remote resource.

In some implementations, the RE 101 may compile a RAP 150 to generate executable code for the radio platform 220. In such implementations, URA 205 configcodes may be downloaded to the radio computer circuitry 200 in the form of source code or IR, and may be transformed into corresponding executable code through the compiler 272. Where URA 205 configcodes are source codes or IR, the source codes or IR may be compiled at a RE 101 or compiled by a cloud computing service. When the compilation process is performed by a cloud computing service (not within the radio computer), the URA 205 configcodes may be downloaded into the radio computer circuitry 200 in the form of executable code as a result of the compilation at the cloud (not shown). In this case, the compiler 272 and RL 273 may not be included in the RE 101, and instead, the vendor of the radio platform 220 may provide the compiler 272 and the RL 273 at the cloud in accordance with the radio platform 220.

The radio platform 220 is the part of RE 101 HW that relates to radio processing capability, including programmable HW components, HW accelerators, RF transceiver, and antenna(s). The radio platform 220 comprises HW capable of generating RF signals or receiving RF signals, including baseband and RF processing. By nature, it is heterogeneous HW including different processing elements such as fixed accelerators (e.g., ASICs, or reconfigurable accelerators such as FPGAs, programmable SoCs, and/or the like). In case of multiple radio computers 200, there is an independent radio platform 220 for each of the radio computers 200.

The radio platform 220 comprises baseband circuitry 221 and radiofrequency (RF) circuitry 222 (or RF transceiver

222). The baseband circuitry 222 may be processor circuitry that may implement one or more layer operations that are "below" layer operations of a network protocol stack 113. These operations may include, for example, PHY operations, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The RF transceiver 222 is the part of radio platform 220 that converts baseband signals from the baseband circuitry 222 into radio signals for transmission, and converts received radio signals into baseband signals for processing by the baseband circuitry 222. The RF transceiver 222 manages input/output signals from/to one or several RAs 270. Several RAs 270 that are simultaneously in active state may be served by one or multiple RF transceivers 222. The Reconfigurable Radio Frequency Interface (RRFI) (see e.g., [EN303146-2]) and/or generalized RRFI (gRRFI) (see e.g., [EN303681-2]) is an interface between URA 205 and RF Transceiver(s) 222. This interface enables the exchange of control and data information between the RAs 270 and the RF transceiver 222.

The baseband processor(s) 221 may be the same or similar to the baseband circuitry 296$x$ of FIG. 29 and RF Transceiver(s) 222 may be the same or similar to one or more of the transceivers 29$y$, 29$z$ of FIG. 29. In some implementations, the baseband circuitry 221 and/or RF circuitry 222 may include HW elements such as digital signal processors (DSPs), Application Specific Integrated Circuit (ASICs), a field-programmable gate array (FPGAs), radio-frequency integrated circuits (RFICs), and/or other HW element.

Referring back to both FIGS. 1 and 2, the CSL 110 communicates with one or multiple Radio Computers through the MURI/gMURI interface(s) as defined in [EN303146-1] and [EN303681-1]. There are a number of MURI/gMURI services and service primitives defined which are feed to/from the RCF 210 within the target Radio Computer 200. The RAP 150 is containing a URA 205, which is controlled by the RCF 210 and executed on any type of HW components (e.g., FPGAs, DSPs, ASICs, CPUs, and/or the like).

1.2. Radio Virtual Machine

As introduced in [EN303095], the RVM 271 is an Abstract Machine which is capable of executing configcodes. The RVM 271 executes a particular algorithm presented as a data flow chart. In other words, the RVM 271 is the result of replacing all operators and tokens in a particular data flow chart with Abstract Processing Elements (APEs) and Data Objects (DOs), respectively. Each APE executes computations marked by the replaced operator identifier. These computations are taken from a RL 273, which is also included in an RVM 271.

Figure 3:
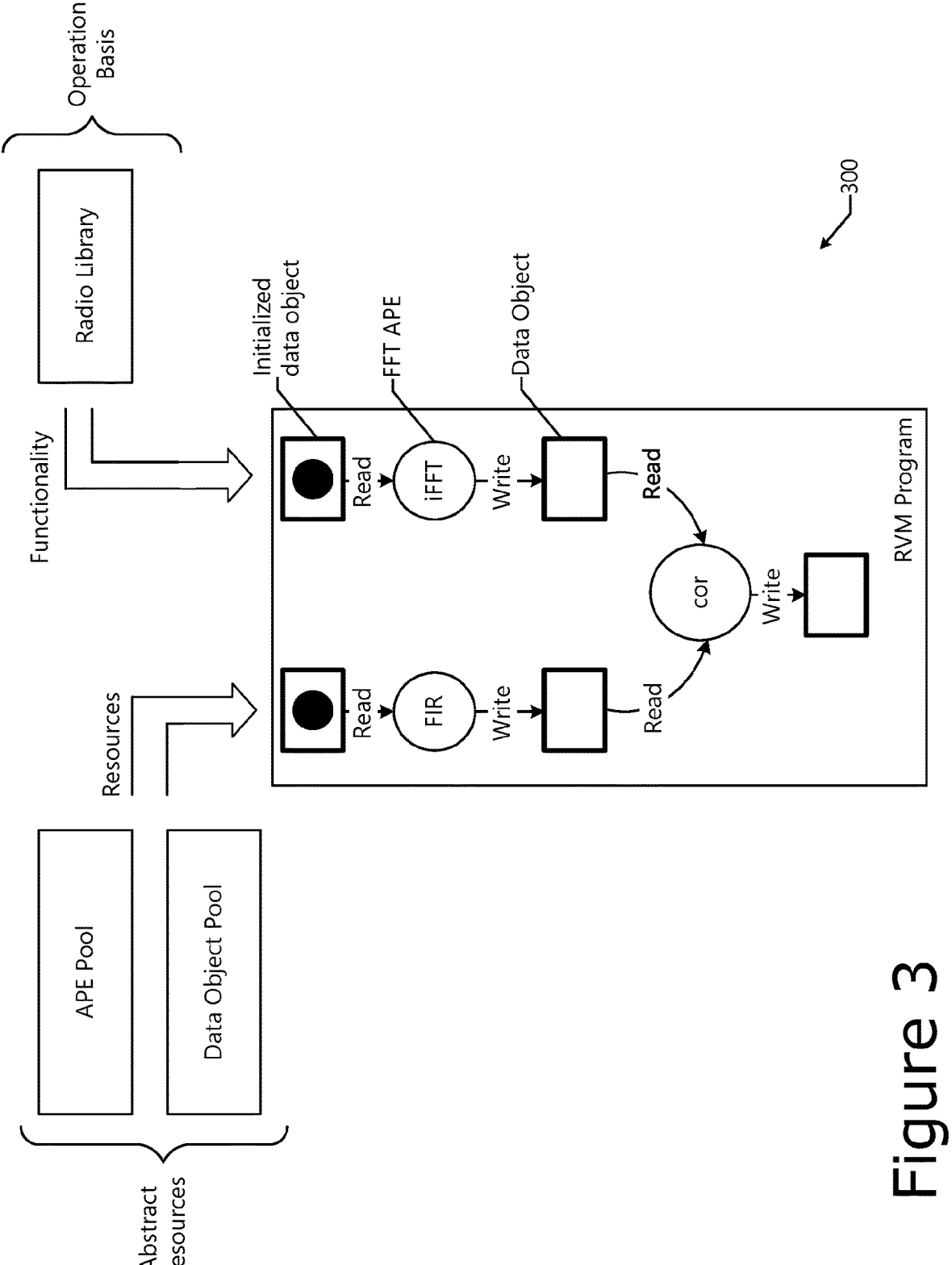
FIG. 3 illustrates a conceptual view of a radio virtual machine (RVM) processing.

FIG. 3 illustrates a conceptual view of RVM processing. The implementation of a RVM 271 is target Radio Computer 200 specific. The RVM 271 has access to a back-end (BE) compiler (e.g., on the platform itself or externally as described in [EN303095], clause 4.4.1) for JIT or AOT compilation of configcodes. The RVM process includes one or more APEs in an APE Pool, one or more DOs in a DO Pool, and a RL 273. The RVM 271 is independent of the underlying HW.

Each APE abstracts a computational resource corresponding to an operation in a particular data flow chart. Each APE abstracts computational resource(s) that executes any computations downloaded from the RL 273. A "computational resource" may refer to part of RE HW working under OS control and on which applications (e.g., RA(s) 270), among others, are executed. Each APE is connected with one or more input DOs and one or more output DOs. APEs are reactive. Any computations are started if all input DOs are filled with real data.

In this context, a "data flow chart" is a reactive data flow computational model including data and operators where data are connected with operators. A "data flow" may be a logical channel between a Flow Controller (FC) 213 and an Unified Radio Applications (URAs) 205 created by the FC 213 to send to or receive data elements (e.g., octets, packets, PDUs, and/or other granularity) from URA. The operators in a data flow chart are abstract computations that are triggered by full data (e.g., when a DO is in a "full state"). Results of operator computations are written in connected output data if they are empty.

DOs are typeless tokens that abstract any type of data. Each DO abstracts a memory resource. In other words, a DO is an abstracted memory for storing data used during the procedure of Radio processing. Each DO provides a container for storing data. A DO can be empty if there is no data in the container or it can be full if there is data in the container. Each DO acknowledges connected APEs about its status whether it empty or full. One or more APEs from the RVM 271 can be connected with a DO. In the applied model, memory is considered be flat and infinite, and each DO is allocated in the infinite and flat memory. Any RVM 271 has access to this memory.

The RL 273 includes normative definitions/native implementation of all SFBs [EN303095] for front-end/back-end compilation. The RL 273 may be a native radio library and/or a reference radio library. The native radio library provides platform-specific description of each SFB that represents the target platform HW. The reference radio library provides normative definition of each SFB. There may be multiple such Reference Radio Libraries. For a given RA 270, a unique Reference RL 273 is used. The computations included in the RL 273 are represented in terms of normative definitions or native implementations of SFBs depending upon whether the Radio Library is used for front-end or back-end compilation, respectively.

In some implementations, UDFBs may be created through a combination of SFBs and represented as a data flow chart to be executed in the RVM 271. Alternatively, a UDFB is implemented as a stand-alone module/function that can be mapped into one APE (e.g., the UDFB can be considered atomic); or into an eRVM 471 and/or RVM 271 (e.g., not atomic). In general, UDFBs are not included into the RL 273, but they are part of a RAP.

The RVM 271 begins to work immediately after some DOs initialization. Usually, all APEs execute computations asynchronously and concurrently. One or more APEs execute computations synchronously according to a clock signal provided by a sync source as discussed above. An individual APE executes the allocated operator if all the corresponding input DOs are full. APEs access DOs with operations "read", "read-erase", or "write". After reading input data from the DOs, the APE executes the allocated operator and, if output DOs are empty, then the APE writes processed data. Any full output DO blocks the corresponding write operation. An output DO can become an input DO for a subsequent operator, this input DO can activate a subsequent operator.

The RVM 271 executes computations until reaching the state when all APEs become inactive. In this state, there are not enough full DOs, which can activate the inactive operators. The result of computations are full DOs, which cannot activate the inactive operators. The state or operation of a given APE is independent on the state of other APEs (e.g., each APE is atomic).

Additionally, the RVM 271 enables an RA 270 to choose one among multiple available RVM protection classes for code to be executed on the RVM 271 as well as a protection class for the RF front-end. RVM protection classes are introduced in order to find a trade-off between (re-) certification effort and baseband code development flexibility. A high-level RVM class corresponds to full reconfigurability of the low-level parameters of an RVM 271, and accordingly necessitates a relatively more extensive certification testing process after the RVM 271 has been reconfigured. A low-level RVM class corresponds to a limited reconfigurability of the low-level parameters of an RVM 271. One or more medium- or intermediate-level RVM classes may also be established between the two extreme RVM classes that correspond to intermediate levels of reconfigurability of the low-level parameters of an RVM 271. An intermediate-level RVM class, for example, would allow more flexibility for reconfiguring low-level parameters of an RVM 271 than the lowest-level RVM 271 class, but would not permit the degree of reconfigurability that would be associated with the highest-level RVM class. Details about RVM protection classes are discussed in ETSI TS 103 641 V1.1.1 (2019 March) ("[TS103641]"). Depending on the combination of chosen RF & RVM protection classes, the required re-certification process of the SW reconfigurable radio platform 220 will be more or less complex. An RE architecture 100 may include an RF Transceiver chain, Analog-to-Digital converters, Digital-to-Analog converters, Baseband Processor(s) 221, and the like (see e.g., FIG. 2). The RVM 271 controls RF Transceiver chain, in particular for selection of an RF Protection Class. Additionally, the RVM 271 may be, or may include, and elementary RVM (eRVM) 471.

FIG. 4 shows an example architecture 400 of an eRVM 471. The eRVM 471 includes Basic Operations, Program memory, Control Unit (CU), Abstract Switch Fabric (ASF) as well as APEs and DOs. The basic operations in eRVM 471 include operations provided by the RL 273 and/or a UDFB Set. Three cases can be considered: i) where a RAP includes only SFBs; ii) where a RAP includes only UDFBs; iii) where a RAP includes SFBs and UDFBs. Additionally or alternatively, the Basic Operations may include: i) SFBs only; ii) UDFBs only; or iii) SFBs and UDFBs.

The basic operations include operators either provided from the RL 273 as SFBs and/or from a UDFB set as UDFBs, each of which is mapped onto one single APE. Since UDFBs might be implemented as a stand-alone module/function which can be mapped into one APE. In this case, the Basic Operations include operators provided by the UDFB Set as well as by the RL 273 as SFBs. Note that those UDFBs are atomic. For an RVM 271, the SFB or UDFB can be mapped onto an APE, RVM 271, or eRVM 471. In the eRVM 471 case, the mapping to RVM 271 or eRVM 471 is not possible since it is the lowest level of hierarchy (see e.g., clause 6.3 of [EN303146-4] and/or clause 6.3 of [EN303681-4]). Note that from an execution perspective, there is no difference between SFBs and UDFBs. The target platform may or may not provide accelerators for some/all SFBs and/or UDFBs.

The program memory is provided with Configcodes which determine the eRVM 471 configuration. The CU generates Initialization and Set-up instructions for APEs, DOs, and the ASF based on decoding Configcodes stored in the Program memory. The ASF connects APEs and DOs in accordance with CU signals. One DO can be connected with multiple APEs, and/or one APE can be connected with multiple DOs. Additionally, one or more DOs from other eRVMs 471 can be connected with the ASF through external data ports.

Each DO is represented by a unique number including DO1, DO2, . . . , DON, where N is a number. Each DO is configured by a config instruction that includes an init field that initializes DO according to the specific initialization procedure (depending on implementation); and a set field with an instruction which sets up the DO attributes such as DO_ID, access time, size, and/or the like (as shown in clause 6.2 of [EN303146-4] and/or clause 6.2 of [EN303681-4]). The DOs communicate with APEs through an ASF interface that includes a data status (ds) signal to indicate whether the DO is full or empty; and data lines directed to or from DO to read or write data to or from APEs. The status interface provides the status information of DO to CU and includes a full/empty describes whether DO is full of data or empty; and exception describes the reason of fail when an APE operates with the DO.

Each APE is represented by a unique number including APE1, APE2, . . . , APEM, where M is a number. APEs are configured by a config instruction which includes an init field that brings the op code operation from Basic Operations; and a set field that sets up APE attributes such as the number of ports, port types, the execution cost and time. An APE's ports connect the APE to the ASF and includes a data interface including a ds signal to indicate whether the DO is full or empty; and one or more data lines to read or write data through the ASF. A status interface provides status information of the APE to the CU and includes an active/inactive interface that describes state of the APE, such as active and inactive; and an exception interface that describes the reason of fail when an APE's operation has an error. An APE is active when it has consumed input DOs and processes them. The APE transitions to the inactive state with a corresponding indication to the CU immediately after processing all the data associated to/with the APE.

The ASF connects APEs and DOs (e.g., as shown by FIG. 6.5 in [EN303146-4] and/or [EN303681-4]). One DO can be connected to multiple APEs, and/or one APE can be connected to multiple DOs. The ASF connects DOs and APEs through ports which include one or more data ports (internal) connect the ASF to DOs via interface lines; data ports (external) that connect the ASF to DOs from other eRVM 471 and/or RVMs 271; and processing ports connect the ASF to APEs via one or more respective interface lines. Each connector of the ASF connects ports bounded to a DO with ports bounded to an APE. Each connector has the same interface lines as ports do (e.g., ds, data, and/or the like). Connectors convey interface values between ports when they appear in corresponding ports. The CU configures the ASF using the following commands: init, which associates data ports with DOs and processing ports with APEs; and set, which creates connections between data ports and processing ports. Other aspects of the RVM 271 and eRVM 471 are discussed in more detail in [EN303146-4] and/or [EN303681-4].

The RVM 271 as illustrated in FIGS. 3 and 4 is/are used to represent an algorithm in a concurrent manner. The description of an algorithm is usually independent on implementation choices, including a synchronous or asynchronous implementation approach. In some implementations, a compiler processes the algorithm description such that the desired implementation approach is applied. In practice, however, it can be preferred by a designer to facilitate the tasks of a compiler and describe the algorithm closer to an HW implementation level, including provisions for a synchronous or asynchronous implementation approach. This is a common approach in HW design programming languages such as Very High Speed Integrated Circuit Hardware Description Language (VHDL). Other HW description languages and/or other programming languages may be used to develop the RVM 271. Also, some critical applications that require deterministic behavior(s) may need to be implemented using a synchronous approach.

1.3. Radio Equipment Interface Aspects

FIGS. 1 and 2 show the overall architecture as defined for the Multi Radio Interface and the generalized Multi Radio Interface (collectively referred to as "(g)MURI") (see e.g., [EN303146-1] and [EN303681-1]), the Unified Radio Application Interface and the generalized Unified Radio Application Interface (collectively referred to as "(g) URAI") (see e.g., [EN303146-3] and [EN303681-3]), and the Reconfigurable Radio Frequency Interface and the generalized Reconfigurable Radio Frequency Interface (collectively referred to as "(g)RRFI") (see e.g., [EN303146-2] and [EN303681-2]). The CSL 110 communicates with one or multiple Radio Computers through the (g)MURI (see e.g., [EN303146-1] and [EN303681-1])). There are a number of (g)MURI services and service primitives defined which are fed to/from the RCF 210 within the target Radio Computer 200. The RAP 150 may contain a (Unified) Radio Application 205, 270, which is controlled by the RCF 210 and executed on any type of HW components (e.g., including but not limited to FPGAs, DSPs, CPUs, baseband chips, and/or the like). [EN303146-1] and [EN303681-1] include definitions of the (g)MURI including an information model.

Figure 5A:
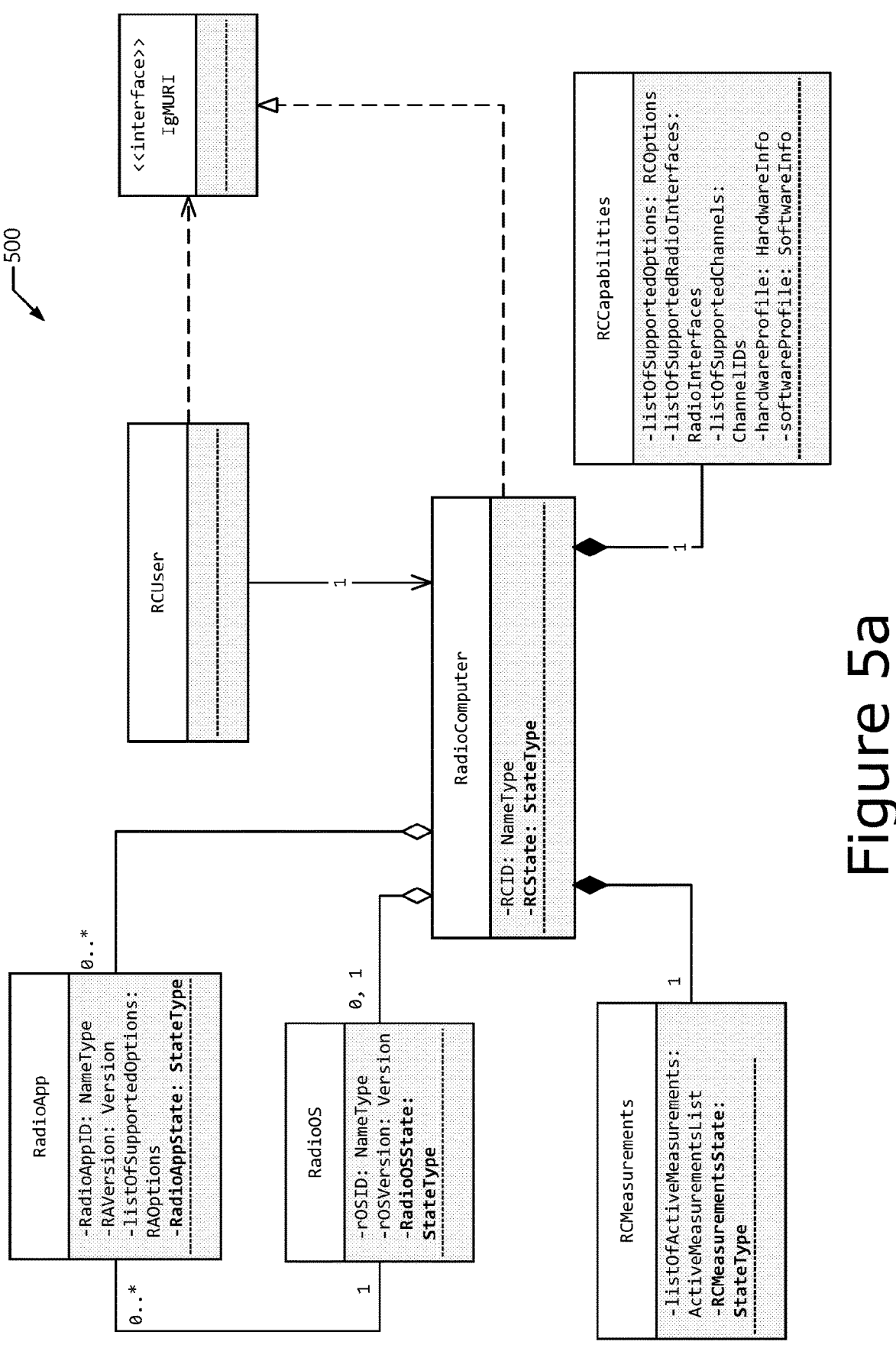
FIGS. 5a, 5b, and 5c depict a Unified Modeling Language (UML) class diagram for Radio Computer classes related to a (generalized) Multi Radio Interface.
Figure 5B:
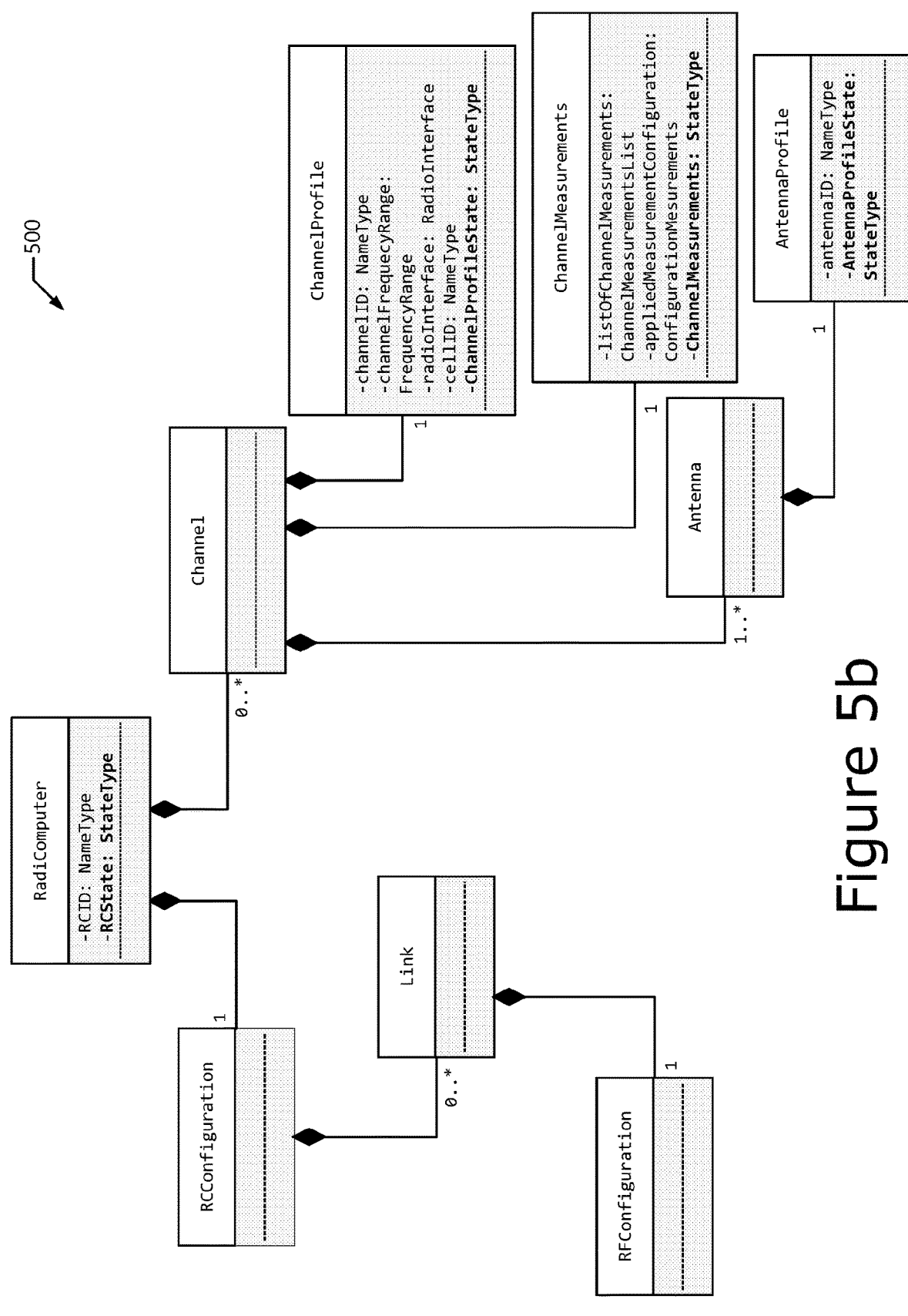
Figure 5C:
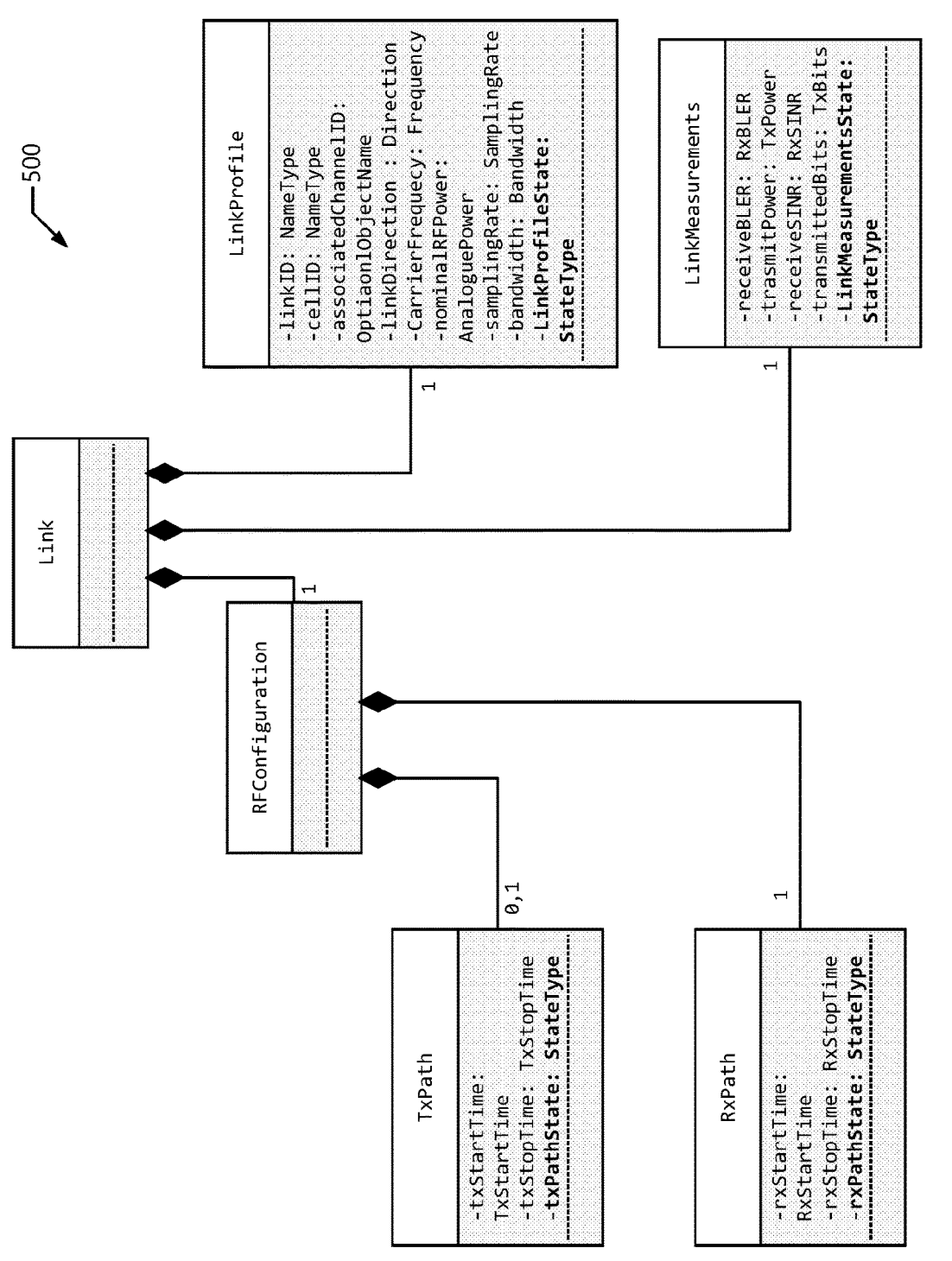

FIGS. 5a, 5b, and 5c depict a Unified Modeling Language (UML) class diagram 500 for radio computer classes related to (g)MURI. The UML class diagram 500 specifies the relations among all the classes of the radio computer 200 and is extended to include internal state information. In some implementations, one or more of the depicted class extensions may be omitted from the (g)MURI data model 500. Each box in FIG. 5 may follow the template of Table 1.3a and/or Table 1.3b.

TABLE 1.3a

| Template for defining Classes |
| Class name |
| --- |
| Attributes: attributeType<br>Operations: returnType |

TABLE 1.3b

| Template for defining Interfaces and/or Classes<br>Class<Class name>[(abstract class)]<br><Description of the class><br>OPERATIONS |
| --- |

| | Return type: | Value type: |
| --- | --- | --- |
| <Operation name> | <Operation return type> | <Operation value type> |
| <Description of the operation> | | |

In Table 1.3a, the name of the class appears in the first partition. The second partition shows the class attributes, where the attribute type (attributeType) appears after a colon (":"). The attributes map onto member variables (data members) in code. The third partition shows the class operations (methods), where a return type (return Type) of the operation (method) appears after a colon (":") following the parameter name. The operations are services the class provides, and the return type of a method is shown after the colon at the end of the method signature. The dash or minus symbol ("-") denotes private attributes or operations. In Table 1.3b, the "<Class name>" is the name of the Class as it appears in the corresponding model. Additional information is also included in case the class in question has been specified as an abstract one. The operations field describes the operations that have been defined in the class. In particular, the "<Operation name>" identifies the name of an operation, as it is included in the class definition; "<Return type>" identifies the type of return value at the corresponding operation (details related to the ASN.1 module are specified in annex B of [EN303681-1]); and the "<Value type>" identifies the access levels for member functions: public, private, protected.

Additionally in FIGS. 5a, 5b, and 5c, each line and/or arrow type represents a relationship between depicted elements, where an arrow points at the feature of the diagram which is being explained by the annotation. In particular, a solid line without an arrow represents an association. An association is a relationship between two classifiers, such as classes or use cases, that describes the reasons for the relationship and the rules that govern the relationship. An association represents a structural relationship that connects two classifiers. In some cases, an association end specifies the role that the object at one end of a relationship performs, and each end of a relationship has properties that specify the role of the association end, its multiplicity, visibility, navigability, and constraints. A solid line with an arrow represents a directed association, which is an association relationship that is navigable in only one direction such that control flows from one classifier to another. An arrow with a dashed line represents a dependency (which can be a general dependency or a specialized dependency including one of an abstraction, a substitution, or a usage). A dependency is a relationship in which one element uses or depends on another element.

An unfilled (white) triangle-head arrow with a solid line represents a generalization or inheritance. A generalization relationship is a relationship in which one model element (the child) is based on another model element (the parent). Generalization relationships indicates that the child receives all of the attributes, operations, and relationships that are defined in the parent. An unfilled (white) triangle-head arrow with a dashed line represents a realization, which is a relationship between two model elements, in which one model element (client) realizes the behavior that the other model element (supplier) specifies. An interface realization relationship is a specialized type of implementation relationship between a classifier and a provided interface. The interface realization relationship specifies that the realizing classifier must conform to the contract that the provided interface specifies.

A filled-in (black) diamond with a solid line represents an composition. A composition association relationship represents a whole-part relationship and is a form of aggregation. A composition association relationship specifies that the lifetime of the part classifier is dependent on the lifetime of the whole classifier. A composition association relationship appears as a solid line with a filled diamond at the association end, which is connected to the whole, or composite, classifier. An empty (white) diamond with a solid line represents an aggregation. An aggregation relationship shows a classifier as a part of, or subordinate to, another classifier. An aggregation is an association in which objects are assembled or configured together to create a more complex object. Aggregation also uses a control object to decide how the assembled objects respond to changes or instructions that might affect the collection. The unfilled diamond is the association end, which is connected to the classifier that represents the aggregate.

Additional aspects of UML and or information model classes are discussed in *OMG® Unified Modeling Language® (OMG UML®)*, version 2.5.1, Object Management Group (OMG®) Document No. formal/2017-12-05 (December 2017) an *IEEE Standard for Architectural Building Blocks Enabling Network-Device Distributed Decision Making for Optimized Radio Resource Usage in Heterogeneous Wireless Access Networks*, IEEE Std 1900.4-2009, pp. 1-130 (27 Feb. 2009), the contents of each of which are hereby incorporated by reference in their entireties. The UML diagram of FIG. 5 does not contain any provisions for covering internal state information. The Radio Computer classes related to (g)MURI are defined by Table 1.3.0 (see e.g., section 7.1 of [EN303146-1] and section 7.2 of [EN303681-1]).

TABLE 1.3.0

| Class | Description |
|---|---|
| RCUser | This class describes information related to a user of the Radio Computer. Each instance of RCUser class depends on one instance of RadioComputer class. |
| RadioApp | This class describes an installed Radio Application (e.g., RA 270). Each instance of a "Radio Computer" class can relate to zero or several instances of RadioApp class (0 . . . *). Each instance of RadioApp class is associated with one instance of Radio OS class. |
| RadioOS | This class describes an installed Radio OS. Each instance of a "Radio Computer" class can relate to zero or one instance of RadioOS class (0, 1). Each instance of RadioOS class is associated with zero or several instances of RadioApp class (0 . . . *). |
| RadioComputer | This class contains all URA(s) related information about resources and interactions related to HW and SW of a reconfigurable RE, for example, computational/spectral resource usage, collection of context information, channel measurement results, and/or the like |
| RCCapabilities | This class contains information about Radio Computer capabilities including HW, SW, transmission and measurement capabilities such as supported RATs and maximum transmission power. Each instance of RadioComputer class has only one instance of RCCapabilities class as a member. |
| Channel | This class contains one radio channel that may or may not be used by an active radio link. Each instance of RadioComputer class can have zero, one or several instances of Channel class as members (0 . . . *). In case of an active radio link, at least one Channel class is available. |

TABLE 1.3.0-continued

| Class | Description |
|---|---|
| ChannelProfile | This class contains general information about the radio channel such as channel ID, center frequency, bandwidth, and used RAT. Each instance of Channel class has only one instance of Channel Profile class as a member. |
| ChannelMeasurements | This class contains current measurements (instantaneous measurement data and related metadata) and the applied measurement configuration related to this radio channel such as interference and load measurements. Each instance of Channel class has only one instance of ChannelMeasurements class as a member. |
| Antenna | This class contains information about antenna selection. Each instance of Channel class has at least one instance of Antenna class as a member (1 . . . *). |
| AntennaProfile | This class contains general information about this antenna, such as antenna port, applicable frequency range and antenna gain. Each instance of Antenna class has only one instance of AntennaProfile class as a member. |
| Link | This class contains information about one active URA and the corresponding connection between the Reconfigurable RE and the Radio Access Network (RAN). Each instance of RCConfiguration class has zero, one or several instances of Link class as members (0 . . . *). Each instance of Link class is associated with one instance of Channel class. |
| LinkProfile | This class contains general information about this active connection, for example, link Identification (ID), serving cell ID, channel used, and/or the like. Each instance of Link class has only one instance of LinkProfile class as a member. |
| LinkMeasurements | This class contains current measurements (instantaneous measurement data and related metadata) related to this active connection, such as Block Error Rate (BLER), power, and Signal to Interference plus Noise Ratio (SINR) measurements. Each instance of Link class has only one instance of LinkMeasurements class as a member. |
| RFConfiguration | This class contains information about the configuration of the RF transceiver. Each instance of Link class has only one instance of RFConfiguration class as a member |
| TxPath | This class contains information about one transmit path. Each instance of RFConfiguration class has zero or one instance of TxPath class as a member (0, 1). |
| RxPath | This class contains information about one receive path. Each instance of RFConfiguration class has only one instance of RxPath class as a member. |
| RCMeasurements | This class contains current measurements (instantaneous measurement data and related metadata) related to Reconfigurable RE such as battery capacity, user mobility, RE location determination, and connection history information. Each instance of RadioComputer class has only one instance of RCMeasurements class as a member. |

In Table 1.3.0, the Channel Class may be separate from the Link Class, and/or the Channel Measurements may be based on any RE configuration which may or may not be used for the final Link Configuration.

The radio computer classes defined in UML class diagram 500 are also shown by Table 1.3.1 to Table 1.3.17.

TABLE 1.3.1

RadioComputer Class

Class RadioComputer
This class contains all URA related information about resources
and interactions related to HW and SW of a reconfigurable RE.
DERIVED FROM
ATTRIBUTES

| | | | |
|---|---|---|---|
| RCID | Value type: | Possible access: | Default value: |
| | Field | Read-Write | Not specified |

This attribute describes ID of a Radio Computer.

| | | | |
|---|---|---|---|
| RCState | Value type: | Possible access: | Default value: |
| | State Type | Read-Write | Inactive |

This attribute describes the internal state of a Radio Computer. Examples
include: inactive, active, processing a RadioApplicationPackage (RAP), and/or the like.
CONTAINED IN
CONTAINS      RCCapabilities [1], RCConfiguration [1], RCMeasurements [1], Channel
                   [*], RadioAPP [*], RadioOS [0-1]
SUPPORTED EVENTS

TABLE 1.3.2

RadioApp Class

Class RadioApp
This class describes installed Radio Application (e.g., RA 270).
DERIVED FROM
ATTRIBUTES

| | | | |
|---|---|---|---|
| RadioAppID | Value type: | Possible access: | Default value: |
| | Name Type | Read | Not specified |

TABLE 1.3.2-continued

| RadioApp Class | | | |
|---|---|---|---|
| This attribute describes ID of installed Radio Application (e.g., RA 270). | | | |
| RAVersion | Value type: | Possible access: | Default value: |
| | Version | Read | Not specified |
| This attribute describes a version of Radio Application (e.g., RA 270). | | | |
| listOfSupportedOptions | Value type: | Possible access: | Default value: |
| | RAOptionsList | Read | Not specified |
| This attribute contains a list of supported options. | | | |
| RadioAppState | Value type: | Possible access: | Default value: |
| | State Type | Read/Write | Inactive |
| This attribute describes the internal state of a RadioApp. Examples include: inactive, active, installed, uninstalled, executed, available, unavailable, and/or the like. | | | |
| CONTAINED IN | RadioComputer | | |
| CONTAINS | | | |
| SUPPORTED EVENTS | | | |

TABLE 1.3.3

| RadioOS Class | | | |
|---|---|---|---|
| Class RadioOS | | | |
| This class describes installed Radio OS. | | | |
| DERIVED FROM | | | |
| ATTRIBUTES | | | |
| rOSID | Value type: | Possible access: | Default value: |
| | Name Type | Read | Not specified |
| This attribute describes ID of Radio OS. | | | |
| rOSVersion | Value type: | Possible access: | Default value: |
| | Version | Read | Not specified |
| This attribute describes a version of Radio OS. | | | |

TABLE 1.3.3-continued

| RadioOS Class | | | |
|---|---|---|---|
| RadioOSState | Value type: | Possible access: | Default value: |
| | State Type | Read/Write | Active |
| This attribute describes the internal state of a RadioOS. Examples include: Active, Inactive, Error, Interrupted, and/or the like. | | | |
| CONTAINED IN | RadioComputer | | |
| CONTAINS | | | |
| SUPPORTED EVENTS | | | |

TABLE 1.3.4

| RCCapabilities Class | | | |
|---|---|---|---|
| Class RCCapabilities | | | |
| This class contains information about Radio Computer capabilities including HW, SW, transmission and measurement capabilities. | | | |
| DERIVED FROM | | | |
| ATTRIBUTES | | | |
| listOfSupportedOptions | Value type: | Possible access: | Default value: |
| | RCOptionsList | Read-Write | Not specified |
| This attribute describes a list of supported options. | | | |
| listOfSupportedRadioInterfaces | Value type: | Possible access: | Default value: |
| | RadioInterfacesList | Read-Write | Not specified |
| This attribute describes radio interfaces supported by this Radio Computer. | | | |
| listOfSupportedChannels | Value type: | Possible access: | Default value: |
| | ChannelIDsList | Read-Write | Not specified |
| This attributes describes frequency channels supported by this Radio Computer. | | | |
| hardwareProfile | Value type: | Possible access: | Default value: |
| | HardwareInfo | Read-Write | Not specified |
| This attributes describes HW capabilities of this Radio Computer. | | | |
| softwareProfile | Value type: | Possible access: | Default value: |
| | SoftwareInfo | Read-Write | Not specified |
| This attributes describes SW capabilities of this Radio Computer. | | | |
| CONTAINED IN | RadioComputer | | |
| CONTAINS | | | |
| SUPPORTED EVENTS | | | |

TABLE 1.3.5

| Channel Class |
|---|
| Class Channel |
| This class describes one frequency channel that may or may not have active connections on it. |
| DERIVED FROM |
| ATTRIBUTES |

TABLE 1.3.5-continued

| Channel Class | |
|---|---|
| CONTAINED IN | RadioComputer |
| CONTAINS | ChannelProfile [1], ChannelMeasurements [1], Antenna [+] |
| SUPPORTED | |
| EVENTS | |

TABLE 1.3.6

| ChannelProfile Class | | | | |
|---|---|---|---|---|

Class ChannelProfile
This class contains general information about this frequency channel.
DERIVED FROM
ATTRIBUTES

| | | | | |
|---|---|---|---|---|
| channelID | Value type: NameType | Possible access: Read | Default value: Not specified | |

This attribute describes ID of channel.

| | | | |
|---|---|---|---|
| channelFrequencyRange | Value type: FrequencyRange | Possible access: Read | Default value: Not specified |

This attribute describes a value of channel frequency range.

| | | | |
|---|---|---|---|
| radioInterface | Value type: RadioInterface | Possible access: Read | Default value: Not specified |

This attribute describes a radio interface.

| | | | |
|---|---|---|---|
| cellID | Value type: NameType | Possible access: Read | Default value: Not specified |

This attribute describes ID of connected cell.

| | | | |
|---|---|---|---|
| ChannelProfileState | Value type: State Type | Possible access: Read/Write | Default value: NotAvailable |

This attribute describes the internal state of a ChannelProfile. Examples
include: Available, Processed, NotAvailable, Updated, and/or the like.

| | |
|---|---|
| CONTAINED IN | Channel |
| CONTAINS | |
| SUPPORTED EVENTS | |

TABLE 1.3.7

| ChannelMeasurements Class | | | | |
|---|---|---|---|---|

Class ChannelMeasurements
This class contains current measurements related to this frequency channel.
DERIVED FROM
ATTRIBUTES

| | | | |
|---|---|---|---|
| listOfChannelMeasurements | Value type: ChannelMeasurementsList | Possible access: Read | Default value: Not specified |

This attribute describes a list of channel measurements.

| | | | |
|---|---|---|---|
| appliedMeasurementsConfiguration | Value type: ConfigurationMeasurements | Possible access: Read | Default value: Not specified |

This attribute describes configuration option of the RE, e.g. which Antenna(s) have been used, which RF front-
end(s) have been used, and/or the like.

| | | | |
|---|---|---|---|
| ChannelMeasurementsState | Value type: State Type | Possible access: Read/Write | Default value: NotAvailable |

This attribute describes the internal state of ChannelMeasurements. Examples
include: Available, Processed, NotAvailable, Updated, and/or the like.

| | |
|---|---|
| CONTAINED IN | Channel |
| CONTAINS | |
| SUPPORTED EVENTS | |

TABLE 1.3.8

| Antenna Class |
|---|

Class Antenna
This class contains information about antenna selection.

| | |
|---|---|
| DERIVED FROM | |
| ATTRIBUTES | |
| CONTAINED IN | Channel |
| CONTAINS | AntennaProfile [1] |
| SUPPORTED EVENTS | |

TABLE 1.3.9

| AntennaProfile Class | | | |
|---|---|---|---|

Class AntennaProfile
This class contains general information about this antenna.
DERIVED FROM
ATTRIBUTES

| | | | |
|---|---|---|---|
| antennaID | Value type: Name Type | Possible access: Read | Default value: Not specified |

This attribute describes ID of antenna.

| | | | |
|---|---|---|---|
| AntennaProfileState | Value type: State Type | Possible access: Read/Write | Default value: Available |

This attribute describes the internal state of AntennaProfile. Examples
include: Available, Processed, NotAvailable, Updated, and/or the like.

TABLE 1.3.9-continued

| AntennaProfile Class | |
|---|---|
| CONTAINED IN | Antenna |
| CONTAINS | |
| SUPPORTED | |
| EVENTS | |

TABLE 1.3.10

| RCConfiguration Class | |
|---|---|
| Class RCConfiguration<br>This class contains information about the<br>current configuration of Radio Computer.<br>DERIVED FROM<br>ATTRIBUTES | |
| CONTAINED IN | RadioComputer |
| CONTAINS | Link [*] |
| SUPPORTED EVENTS | |

TABLE 1.3.11

| Link Class | |
|---|---|
| Class Link | |
| This class contains information about one active Radio Application | |
| (e.g., RA 270) and corresponding connection between | |
| Reconfigurable Radio Equipment and RANs. | |
| DERIVED FROM | |
| ATTRIBUTES | |
| CONTAINED IN | RCConfiguration |
| CONTAINS | LinkProfile [1], LinkMeasurements [1], RFConfiguration [1] |
| SUPPORTED | |
| EVENTS | |

TABLE 1.3.12

| LinkProfile Class | | | |
|---|---|---|---|
| Class LinkProfile | | | |
| This class contains general information about this active connection. | | | |
| DERIVED FROM | | | |
| ATTRIBUTES | | | |
| linkID | Value type:<br>Name Type | Possible access:<br>Read | Default value:<br>Not specified |
| This attribute describes ID of link about activated connection. | | | |
| cellID | Value type:<br>Name Type | Possible access:<br>Read-Write | Default value:<br>Not specified |
| This attribute describes ID connected cell. | | | |
| associatedChannelID | Value type:<br>OptionalObjectName | Possible access:<br>Read-Add-Remove | Default value:<br>Not specified |
| This attribute describes ID of associated channel. | | | |
| linkDirection | Value type:<br>Direction | Possible access:<br>Read | Default value:<br>Not specified |
| This attribute describes a direction of link. | | | |
| carrierFrequency | Value type:<br>FrequencyRange | Possible access:<br>Read-Write | Default value:<br>Not specified |
| This attribute describes a value of carrier frequency. | | | |
| nominalRFPower | Value type:<br>AnaloguePower | Possible access:<br>Read | Default value:<br>Not specified |
| This attribute describes a value of nominal power. | | | |
| samplingRate | Value type:<br>SamplingRate | Possible access:<br>Read-Write | Default value:<br>Not specified |
| This attribute describes a value of sampling rate. | | | |
| Bandwidth | Value type:<br>Bandwidth | Possible access:<br>Read-Write | Default value:<br>Not specified |
| This attribute describes a value of bandwidth. | | | |
| This attribute describes the internal state of LinkProfile. Examples include: | | | |
| Active, InActive, Available, Processed, NotAvailable, Updated, and/or the like. | | | |
| CONTAINED IN | Link | | |
| CONTAINS | | | |
| SUPPORTED EVENTS | | | |

TABLE 1.3.13

| LinkMeasurements Class | | | |
|---|---|---|---|

Class LinkMeasurements
This class contains current measurements related to this active connection.
DERIVED FROM
ATTRIBUTES

| receiveBLER | Value type: | Possible access: | Default value: |
|---|---|---|---|
| | RxBLER | Read-Write | Not specified |

This attribute describes a value of BLER for received data.

| transmitPower | Value type: | Possible access: | Default value: |
|---|---|---|---|
| | TxPower | Read-Write | Not specified |

This attribute describes a power of transmit signal.

| receiveSINR | Value type: | Possible access: | Default value: |
|---|---|---|---|
| | RxSINR | Read-Write | Not specified |

This attribute describes a value of SINR for received data.

| transmitted Bits | Value type: | Possible access: | Default value: |
|---|---|---|---|
| | TxBits | Read-Write | Not specified |

This attribute describes transmitted bits.

| LinkMeasurementTypes | Value type: | Possible access: | Default value: |
|---|---|---|---|
| | State Type | Read-Write | NotAvailable |

This attribute describes the internal state of LinkMeasurements.
Examples include: Active, InActive, Available,
Processed, NotAvailable, Updated, and/or the like.
CONTAINED IN        Link
CONTAINS
SUPPORTED EVENTS

TABLE 1.3.14

| RFConfiguration Class | |
|---|---|

Class RFConfiguration
This class contains information about the configuration of RF transceiver.
DERIVED FROM
ATTRIBUTES
CONTAINED IN        Link
CONTAINS        TxPath [0-1], RxPath [1]
SUPPORTED EVENTS

TABLE 1.3.15

| TxPath Class | | | |
|---|---|---|---|

Class TxPath
This class describes one transmit path.
DERIVED FROM
ATTRIBUTES

| txStartTime | Value type: | Possible access: | Default value: |
|---|---|---|---|
| | TxStartTime | Read-Write | Not specified |

This attribute defines the time when the transceiver start transmission.

| txStopTime | Value type: | Possible access: | Default value: |
|---|---|---|---|
| | TxStopTime | Read-Write | Not specified |

This attribute defines the time when the transceiver stop transmission.

| txPathState | Value type: | Possible access: | Default value: |
|---|---|---|---|
| | State Type | Read-Write | Available |

This attribute describes the internal state of TxPath. Examples include: Active, InActive, Available, NotAvailable, and/or the like.
CONTAINED IN        RFConfiguration
CONTAINS
SUPPORTED
EVENTS

TABLE 1.3.16

| RxPath Class | | | |
|---|---|---|---|

Class RxPath
This class describes one receive path.
DERIVED FROM
ATTRIBUTES

| rxStartTime | Value type: | Possible access: | Default value: |
|---|---|---|---|
| | RxStartTime | Read-Write | Not specified |

This attribute defines the time when the transceiver start reception.

| rxStop Time | Value type: | Possible access: | Default value: |
|---|---|---|---|
| | RxStop Time | Read-Write | Not specified |

This attribute defines the time when the transceiver stop reception.

| rxPathState | Value type: | Possible access: | Default value: |
|---|---|---|---|
| | State Type | Read-Write | Available |

This attribute describes the internal state of RxPath. Examples include: Active, InActive, Available, NotAvailable, and/or the like.
CONTAINED IN        RFConfiguration
CONTAINS
SUPPORTED EVENTS

TABLE 1.3.17

| RCMeasurements Class | | | |
|---|---|---|---|

Class RCMeasurements
This class contains current measurements related to Reconfigurable Radio Equipment.
DERIVED FROM
ATTRIBUTES

| listOfActiveMeasurements | Value type: | Possible access: | Default value: |
|---|---|---|---|
| | ActiveMeasurementsList | Read-Add-Remove | Not specified |

This attribute describes a list of active measurements.

| RCMeasurementsState | Value type: | Possible access: | Default value: |
|---|---|---|---|
| | State Type | Read-Write | InActive |

TABLE 1.3.17-continued

| RCMeasurements Class |
| --- |
| This attribute describes the internal state of RCMeasurements. Examples include: Active, InActive, Available, NotAvailable, and/or the like. |

| CONTAINED IN | RadioComputer |
| --- | --- |
| CONTAINS | |
| SUPPORTED EVENTS | |

1.4. Radio Application Package (RAP) Containers

As alluded to previously, [RED] Article 3(i) states that REs 101 within certain categories or classes are constructed so that the RE 101 supports certain features in order to ensure that SW can only be loaded into the RE 101 where the compliance of the combination of the radio equipment and SW has been demonstrated. A RAP 150 can be used to provide new RAs 270 to a target RE 101. As discussed in [EN303648] for REs 101 in general, and in [EN303095] for the specific case of mobile devices, the RAP 150 is used for distribution and installation of RA codes on to target RREs 101.

The procedure of distributing and executing RA codes includes design time, installation time, and run time. During design time, the RA codes provider 140 will generate a RAP 150 that includes metadata (e.g. for pipeline configuration and/or the like) and RA codes (e.g., config codes, RC codes, and/or the like). In case RC codes are executed in the non-real-time environment, the RC codes are compiled to be executed in given computational resources and/or application processor before they are included in the RAP 150. As examples, the design time may include generating or producing RC code and FBs. The FBs may be standard FBs (SFBs) and/or user-defined FBs (UDFBs). RL headers may be part of the RC codes and the FBs. The RC codes are compiled and packaged into a RAP 150 with the FBs. RAP metadata (e.g., for pipeline configuration) is also added to the RAP 150. The FBs may be compiled using a same or different compiler as the RC codes, using separate compiler(s) than the compiler used for the RC codes, or the FBs may be encrypted prior to being added to the RAP 150. In one implementation, the RC codes are compiled for execution by an application processor (AP) before inclusion in the RAP 150. Additionally or alternatively, the FBs are compiled in accordance with a given radio computer 200 (or compiled for execution by a specific radio computer). Additionally or alternatively, the FBs are compiled using an FE compiler 272. Additionally or alternatively, the FBs are encrypted using an encryptor or a suitable encryption scheme. The information provided in a RAP 150 is based on the level of reprogrammability of the concerned platform (e.g., RRE 101).

The metadata included in a RAP 150 can be descriptive RAP metadata, structural RAP metadata, administrative RAP metadata, legal RAP metadata, and/or some combination thereof. Descriptive RAP metadata includes descriptive information/data about a resource (e.g., a target reconfiguration platform, compiler type, and/or the like) used for discovery and identification. The descriptive RAP metadata includes elements such as, for example, title, abstract, author, keywords, and the like. Structural RAP metadata includes information/data about the structure of a RAP 150. The structural RAP metadata indicates how compound objects are put together, for example, where to find information fields related to code, security, and so forth, and describing the types, versions, relationships, and other characteristics of digital materials. Administrative RAP metadata includes information/data to help manage a resource such as, for example, resource type, permissions, when and how it was created, and/or the like. Legal RAP metadata includes legal designations or expressions (if any) such as, for example, creator or author name, copyright holder, license name and/or information, virtual patent markings, and/or the like. Additionally or alternatively, the metadata included in a RAP 150 includes the various information in the RAP container fields and subfield discussed infra. In various implementations, the metadata may be generated or otherwise arranged in a suitable information object (InOb) of a suitable format such as any of those discussed herein. The RAP 150 including the compiled RA code, FBs, and metadata may be packaged or otherwise arranged into a suitable package format or archive format.

During installation time, the RAP 150 will be downloaded from a RadioApp store 160 and installed in the RRE 101 (see e.g., FIG. 1). The RA codes, including RC codes, and the RAP metadata included in the RAP are installed in the reconfigurable RE 101. The RC codes are installed in the computational resources for operations that do not have to be executed in real-time processing such as context information processing, while the FB codes (e.g., SFBs and UDFBs) are installed in the radio computers 200 to be processed in real-time. Additional aspects of the distribution and execution of RA codes is discussed in ETSI TS 103 648 V1.1.1 (2020-01) ("[TS103648]"), the contents of which are hereby incorporated by reference in its entirety.

When distributing configcodes that are executable in a given RRE 101 (see e.g., FIG. 1), the FBs (e.g., SFBs & UDFBs) are executed on the radio computer 200. They are compiled for each target platform during the design time to generate the corresponding configcodes. This means that UDFB and SFB code are compiled in accordance with a given radio computer before they are included in the RAP during the design time. After compilation, the configcodes including both UDFB and SFB codes are installed and loaded into reconfigurable RE to be operated on the ROS.

When distributing configcodes in a form of platform-independent source code for static and/or dynamic linking, the RA codes include the RC and UDFB codes only. As for the SFBs, the metadata provides information for efficient compilation. The function calls of the SFBs that are needed to execute the target URA are contained in the configcodes. The configcodes including the UDFBs are compiled (e.g., in RRE 101 or in the cloud 2644) during the installation time. The native implementation of SFBs is done before run time and is contained in the native library. In the case of static linking, the linking of UDFBs with SFBs is performed during installation time. During the run time, the compiled codes are loaded to be executed on the ROS. In the case of dynamic linking, the linking of UDFBs with SFBs is performed during run time.

When configcodes are provided in a platform-independent IR, the RA codes that include the UDFB codes are front-end compiled during the design time. At the installation time, the front-end compiled UDFB codes of Configcodes are back-end compiled at reconfigurable RE to be translated into an executable code specific to a given radio computer. The native implementation of SFBs is done before run time and is contained in the native library. In the case of static linking, the linking of UDFBs with SFBs is performed during installation time. During the run time, the back-end compiled codes are loaded to be executed on the ROS. In the case of dynamic linking, the linking of UDFBs with SFBs is performed during run time.

The present disclosure provides definition(s) of the specific format of a RAP 150 to be delivered to a target platform (e.g., an RE 101 or the like). In particular, the present disclosure provides definition(s) of the "container" format for delivering RAPs 150. The container formats discussed herein may be specified by a suitable standard/specification, such as the ETSI RRS standardization as an input. It provides a general format for providing RAs 270 and/or RAPs 150 to a target platform in accordance to the overall ETSI Reconfiguration framework as defined in [EN303681-1], [EN303146-1], [EN303681-2], [EN303146-2], [EN303681-3], and [EN303146-3], the contents of each of which are hereby incorporated by reference in their entireties. In previous solutions, each manufacturer and/or RAP 150 developers had used a proprietary format for delivering a RAs 270, such as a firmware package or the like. The existing approaches do not allow for a unified testing approach as required under the new regulations (e.g., [RED]).

The present disclosure provides a general container format for any RAP 150 supporting the ETSI SW reconfiguration framework is provided. The container is defined at different levels of abstraction, starting with a rough structure which is quite broadly applicable to a refined internal format. The aspects discussed herein enable a unified method for the validation of the ETSI SW reconfiguration framework. For example, a test approach may include creating a valid RAP 150 and then verifying whether the target platform correctly accepts the RAP 150, installs the RAP 150, and executes the RAP 150.

FIGS. 1 and 2 show the overall architecture as defined for the Multi Radio Interface (MURI) and the generalized MURI (gMURI) (collectively referred to as "(g)MURI") (see e.g., [EN303146-1] and [EN303681-1]), the Unified Radio Application Interface (URAI) and the generalized URAI (gURAI) (collectively referred to as "(g)URAI") (see e.g., [EN303146-3] and [EN303681-3]), and the Reconfigurable Radio Frequency Interface (RRFI) and the generalized RRFI (gRRFI) (collectively referred to as "(g)RRFI") (see e.g., [EN303146-2] and [EN303681-2]). The CSL 110 communicates with one or multiple Radio Computers through the (g)MURI (see e.g., [EN303146-1] and [EN303681-1])). There are a number of (g)MURI services and service primitives defined which are fed to/from the RCF 210 within the target radio computer 200. The RAP 150 may contain a (Unified) Radio Application 205/270, which is controlled by the RCF 210 and executed on any type of HW components (e.g., including but not limited to FPGAs, DSPs, CPUs, baseband chips, and/or the like).

The present disclosure provides embodiments for the structure of RAPs 150 to be delivered through the RadioApp Store 160 as illustrated in FIG. 1. The embodiments discussed herein may be specified by future harmonised standards supporting the implementation of [RED] Article 3(3)(i) on the combination of HW & SW.

1.4.1. RAP Container Structure

As mentioned previously, a RAP 150 delivers SW code to a target platform (e.g., RE 101 or radio platform 220) with an RA 270 including SW that it affects one or more requirements of the [RED]. The RA 270 may be delivered in one of the following formats: source codes including RL 273 calls of RL 273 native implementation and RHAL 2115 calls; Intermediate Representations (IRs) including RL 273 calls of RL 273 native implementation and RHAL 2115 calls; and Executable codes for a particular radio platform 220.

Config codes are source codes or IRs that is to be compiled at a given RE 101. Configcodes are produced as a result of compiling the source codes of an RA 270, which is either configuration codes of an RVM 271 or executable codes for a particular target platform 101, 220. When an RA provider 140 makes high level code based on a target platform 101, 220, a result of compiling RA source codes is configcodes, which are executable on the target platform 101, 220. In the other case, when an RA provider 140 makes a high level code without considering a target platform 101, 220, a result of front-end compiling of RA source codes is an IR, which should be back-end compiled for operating on a specific target platform 101, 220. Besides the SW code itself, additional information (info) can be added into the RAP container, in particular: header information; security information (e.g., on encryption, integrity protection, proof of source, and/or the like); and/or manufacturer information (e.g., installation details, profile information, and/or the like). Each of the information elements (IEs) in a RAP container can be combined with a length indication (e.g., a number of bytes, words, and/or the like). An example high level RAP container format may be as shown by FIG. 6.

FIG. 6 illustrates example Radio Application Package (RAP) container formats 600a and 600b. The RAP container formats 600a and 600b include, header IE 602, a security information IE 604, a code IE 606, a manufacturer information IE 608 (also referred to as "Installation Code section 608" or the like), an initial profile section IE 610, and a reserved section 612. The various IEs shown by FIG. 6 may be arranged in any suitable order. In the examples of FIG. 6, the security information IE 604 is placed after header IE 602 so that access to the security information is straightforward, not requiring an analysis of the additional fields before analyzing the security information.

The RAP container format 600a also includes a header size IE 601, a security information size IE 603, a code size IE 605, a manufacturer information size IE 607, an initial profile size IE 609, and a reserved size 611. In order to keep the approach flexible, each of the IEs are combined with a length indication such that manufacturers can adapt the size of any information element as required. The values contained in the length indicators 601, 603, 605, 607, 609, and 611 may be expressed as a number of bits, nepits, bytes, octets, nibbles, crumbs, words, blocks, pages, and/or any other unit of information. In some implementations, the size of the unit of information indicated by the size IEs may be adapted to the underlying architecture. For example, the size of a "word" may be specified to correspond to X number of bits, such as, for example, 8 bits, 16 bits, 32 bits, 64 bits, 128 bits, 256 bits, or similar. Alternatively, a RAP 150 may first list all size blocks/IEs (e.g., header size 601, then code size 603, then security info size 605, and then manufacturer info size 607) and then the information blocks/IEs follow (e.g., header 602, security information 604, code 606, manufacturer information 608, and/or the like). Also, any suitable additional size blocks/IEs and information blocks/IEs may be added or removed as needed. In RAP container format 600b, the field/IE size information is included in header 602, where the size information may have the same or similar format as discussed for format 600*a*.

Figures 7, 8:
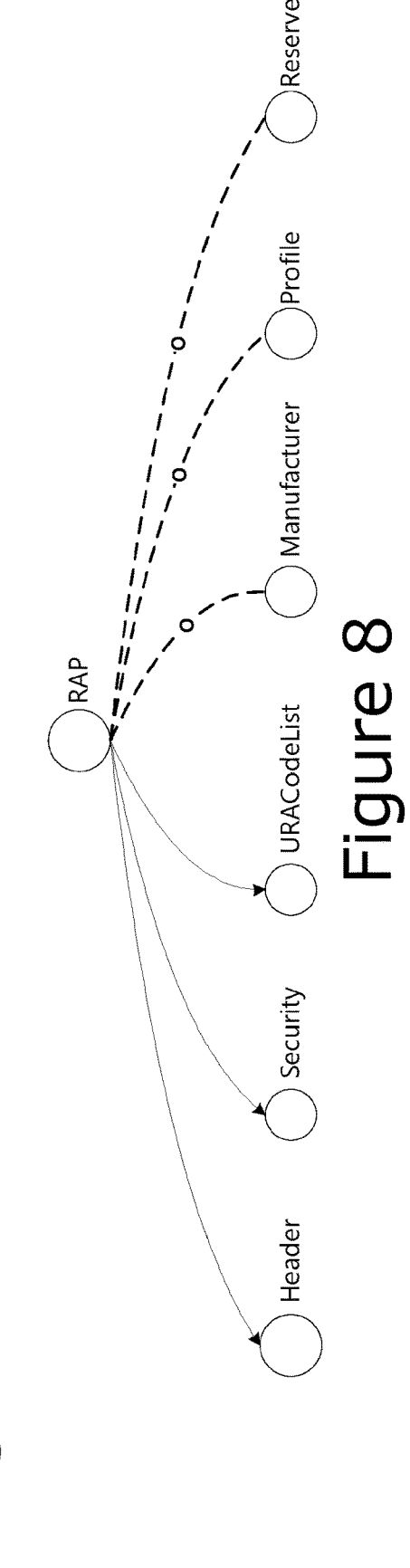
FIGS. 8, 10, 12, 14, 16, and 18 depict example RAP tree structures.

FIG. 7 shows a RAP container 700 as a complex bit represented by rectangles that follow each other to create the sequence. Each field/IE is the same as those discussed previously with respect to FIG. 6. Each field/IE in FIG. 7 represents a sequence of bits in the RAP bit field. The left-most bit in the RAP field is the least significant bit having a value of 0, and the right-most bit is the most significant bit having a value of Size (BitField)–1 (labeled as "$S_{FB}-1$" in FIG. 7). In FIGS. 6, 7, 9, 11, 13, 15, and 17 the RAP fields may have different sizes but are shown as having a same width for the sake of clarity.

In some implementations, the RAP 150 includes one or more mandatory fields and zero or more optional fields. In one example, the one or more mandator fields may include the RAP header 602, security section 604, and the URA code section 606, and the optional fields include the manufacturer info section 608, the initial profile 610, and the reserved section 612. The description and/or arrangement of the IEs, DFs, DEs, data containers, in Table 1.4-2, Table 1.4-4, Table 1.4-8, and Table 1.4-6 may be adapted as required and/or desired. In particular, the order of the IEs, DFs, DEs, and/or the like in Table 1.4-2, Table 1.4-4, Table 1.4-8, and Table 1.4-6 is/are only exemplary, and the order and/or arrangement of IEs, DFs, DEs, and/or the like in Table 1.4-2, Table 1.4-4, Table 1.4-8, and Table 1.4-6 may be changed and/or adapted in any way as appropriate and/or as desired. Also, certain IEs, DFs, DEs, and/or the like may be omitted and/or new IEs, DFs, DEs, and/or the like may be added as appropriate and/or as desired.

The RAP 150 and all internal elements of the RAP 150 are represented by bit fields, which have one of the following types: static bit field (labeled as "S"), dynamic bit field (labeled as "D"), List bit field (labeled as "L"), or Complex bit field (labeled as "C"). A static bit field has a predefined size and includes data. The size of the RAP bit field Size (BitField) is defined as the number of its bits. The format of the static bit field is as follows: {Data}. A dynamic bit field has a variable data size and includes two parts including a first part including or indicating the explicit data size value and a second part is a data field itself. The size of the data size (sub)field is static. The format of the dynamic bit field is as follows: {Size|Data}. A list bit field is a list of any type bit fields with an implicit size where each bit field from the list is followed by a padding bit which points out a next (following) bit field. For example, if PaddingBit=1, then the next bit field is an element of the list; otherwise PaddingBit=0. Any dynamic, static, or list bit field can be an element of the list bit field. The format of the list bit field is as follows: {PaddingBit|Data| . . . }. Complex bit field is any combination of any of the aforementioned bit field types. The size of the complex field is calculated as the sum of sizes of all bit fields included in the complex field.

FIGS. 8, 10, 12, 14, 16, and 18 illustrates example graph data structures of RAP container elements. The RAP 150 is a complex hierarchical bit field, which is a sequence of bits. The RAP bit field is represented as a graph with specific properties. FIG. 8 shows a graph of the RAP container and FIGS. 10, 12, 14, 16, and 18 shows respective graphs for different sections of the RAP container. The graph properties of each graph in FIGS. 8, 10, 12, 14, 16, and 18 insures RAP writing operations only take place when the RAP 150 is created. The graph properties also control how RAP reading operations take place, during which some or all RAP 150 elements are decoded.

The RAP graphs of FIGS. 8, 10, 12, 14, 16, and 18 include nodes and edges between the nodes. Each node of a RAP graph represents a bit field. Two nodes are connected by an edge if one of the nodes is a part of another node, assuming that the one bit field is a part of another bit field. The RAP graphs in FIGS. 8, 10, 12, 14, 16, and 18 are tree data structures were there is only a pass between any pair of graph nodes. All the RAP graph elements are ordered in the following ways. From the top to the bottom, each RAP graph is structured by layers. Nodes from the upper layer are connected to nodes from the adjusted lower layer. There are no edges between nodes from the same layer. An edge between an upper layer node and a lower layer node means that a bit field represented by the lower layer node is a part of the bit field represented by the upper layer node. From the left-side of a graph to the right-side of the graph, nodes from the same layer have fixed layer positions, which defines a position of the RAP element in the RAP bit field sequence. In particular, elements/nodes in the left-side of the graph are placed before the right-side RAP elements in the graph. Bellow the RAP graph nodes are denoted by circles and edges by lines. Some of the RAP elements can be optional. In such case corresponding nodes can be omitted in the RAP graph structure and related edges are drawn as dotted lines. They also will be labeled by the letter "o" ("optional") or by a particular condition defining the related option. All other edges are drawn with the solid lines.

FIG. 8 shows an example top-level RAP graph of a RAP 150, which is the highest layer of the RAP graph. The top-level RAP graph includes only one RAP node, which represents the whole RAP bit field. The lower layer includes nodes representing respective RAP sections/IEs from FIG. 6 and as described in Table 1.4-1.

TABLE 1.4-1

| RAP Container | | | |
| --- | --- | --- | --- |
| N | Node name | Node type | Bit field |
| 1 | Header | mandatory | the RAP header |
| 2 | Security | mandatory | the Security section |
| 3 | URACodeList | mandatory | URA codes (any representation). The URA code list including code sections for a few Radio Applications (e.g., RAs 270) |
| 4 | Manufacturer | optional | the Manufacturer Information section |
| 5 | Profile | optional | the Initial Profile section |
| 6 | Reserve | optional | Reserved for the future use |

1.4.2. Example RAP Container Information

As mentioned previously, a RAP container may include blocks/IEs for each of a header 602, security information 604, code 606, and manufacturer information 608, as well as respective size blocks/IEs for each of the header 602, security information 604, code 606, and manufacturer info 608. The following tables provide Information Elements (IEs), data fields (DFs), data elements (DEs), and/or other data structures for each of these blocks.

1.4.2.1. RAP Header

In some implementations, the header 602 may include the following data: Radio Application Package (RAP) Identifier (ID); RAP origin, source, and/or creator ID, RAP version (e.g., in the form of a sequence of numbers, characters, and the like); RAP creation or release date (at least for the indicated RAP version); target platform requirements including, for example, a list of valid target (hardware) platform identifiers (IDs), a list of valid target Operating Systems (OSs) including OS ID, OS version, OS creation or release date (at least for the indicated OS version), and OS origin, source, and/or creator ID; and/or additional or alternative information on RAP structure, in particular information of following blocks and related block size (e.g., as illustrated above, all block sizes (e.g., first "header size", then "code size", then "security size" then "manufacturer information size") and information blocks (e.g., "header", "code", "security information", "manufacturer information", and/or the like) locations and structures are indicated. Also, any suitable additional size blocks and information blocks may be added or removed as suitable. Information to be added if applicable can include, for example, a list of valid RVMs 271 including, for each listed RVM 271, RVM ID, RVM version, RVM creation or release date (at least for the indicated RAP version), and RVM origin, source and/or creator ID; and/or a list of valid RLs 273 including, for each valid RL 273, an RL ID, an RL version, an RL creation or release date (at least for the indicated RL version), and an RL origin, source, and/or creator ID. Additionally or alternatively, the header info 602 may include the info/data, IEs, DFs, DEs, and/or the like as shown by Table 1.4-2.

In other implementations, the aforementioned information may be included in other RAP container sections/IEs as discussed in more detail infra. In these implementations, the header section 602 is a sequence of static fields whose size is discussed in Table 1.4-10 (infa). The format of the header 602 sequence shown by FIG. 9, and the header graph structure is shown by FIG. 10.

Figure 9:
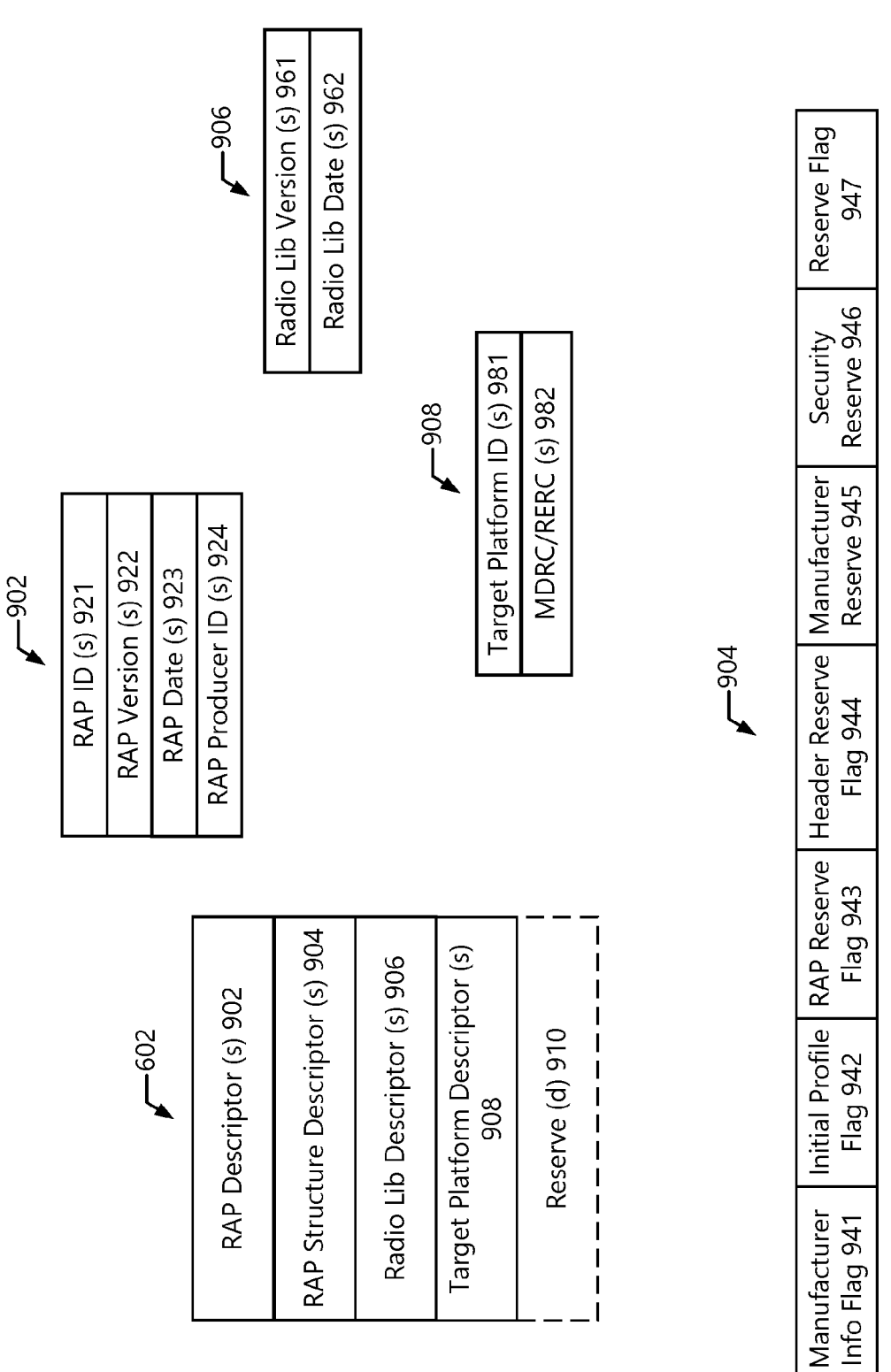
Figure 10:
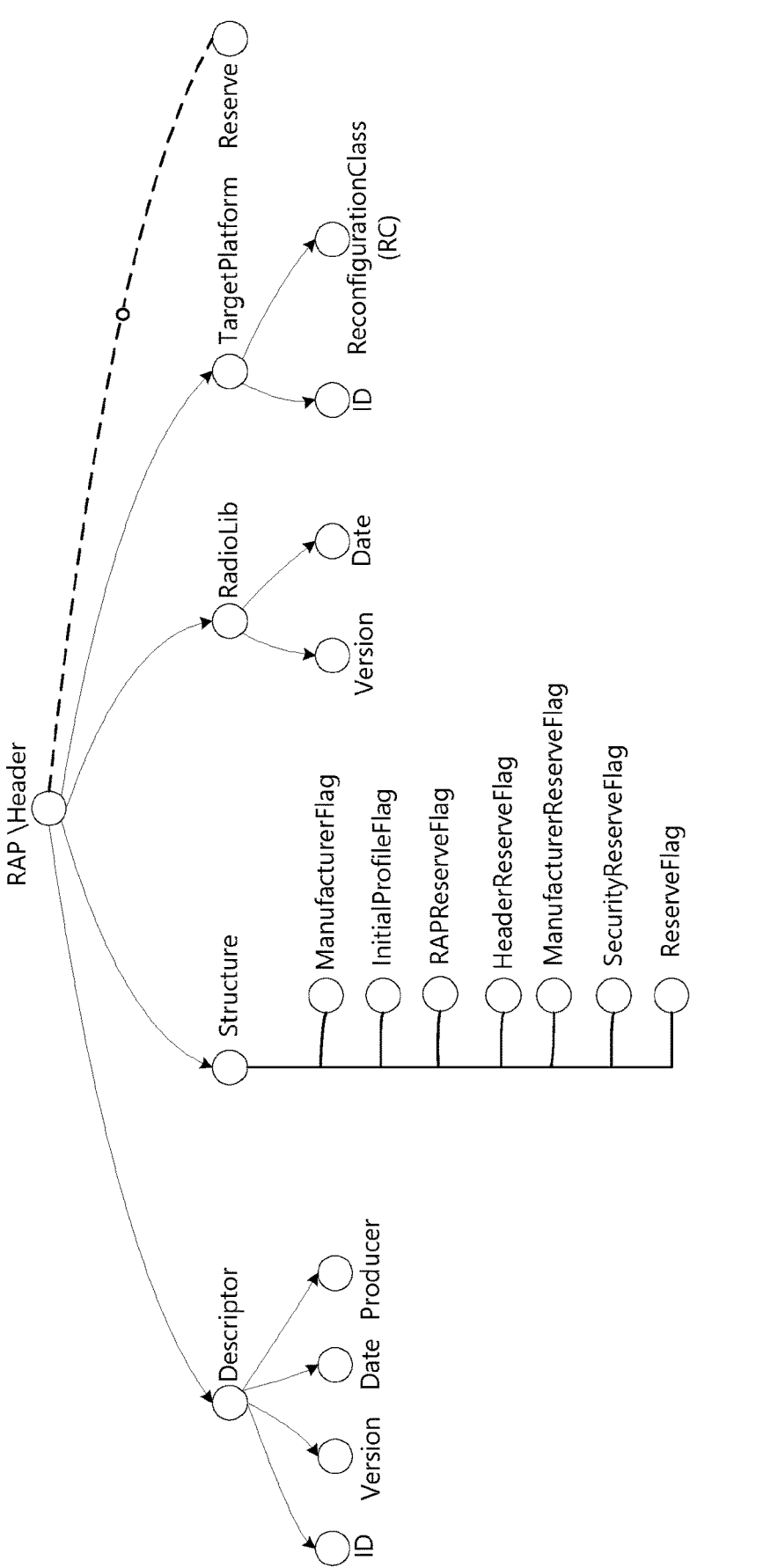

In the example of FIG. 9, the header 602 includes a RAP descriptor 902, a RAP structure descriptor 904, a radio library descriptor 906, a target platform descriptor 908, and/or a reserved field 910. The reserved field 910 is a dynamic field and is an optional in this example. The reserved field 910 is included when a header reserve flag 944 is set to "1", and is not included when the header reserve flag 944 is set to "0". The RAP descriptor 902 includes the following static fields: RAP ID 921, RAP Version 922, RAP Date 923, and RAP Producer ID 924, each of which may be the same or similar as those described in Table 1.4-2.

The RAP structure descriptor 904 includes multiple 1-bit flags that define the structure of the RAP 150 by indicating whether corresponding RAP bit fields are included or not.

TABLE 1.4-2

Header Information for RAP container

| Information Element, Data Field, or Data Element Name | Description | Size |
|---|---|---|
| | RAP Data | |
| RAP Identifier (ID) | ID of the RAP 150 | 8, 16, 32, 64, or 128 bits |
| RAP origin/source/creator | ID of a RadioApp Provider 140 that created and/or owns the RAP 150 | 8, 16, 32, 64, or 128 bits |
| RAP version | Version number of the RAP 150 | 8, 16, 32, 64, or 128 bits |
| RAP date | Date of creation, update, release, and/or the like of the RAP 150 | 8, 16, 32, 64, or 128 bits |
| | Target Platform Data | |
| Target Platform ID | list of platform IDs for each valid target (e.g., HW) platform | 8, 16, 32, 64, or 128 bits |
| Target Operating System (OS) ID | list of OS IDs for each valid target platform/OS | 8, 16, 32, 64, or 128 bits |
| Target OS origin/source/creator | list of OS origins/sources/creators for each valid target platform/OS | 8, 16, 32, 64, or 128 bits |
| Target OS version | list of OS version numbers for each valid target platform/OS | 8, 16, 32, 64, or 128 bits |
| Target OS date | list of creation, update, release, and/or the like, date of each valid target platform/OS | 8, 16, 32, 64, or 128 bits |
| Following info blocks/IEs | List of info blocks/IEs following the header (e.g., "code", "security info", "manufacturer info", and/or the like) | 8, 16, 32, 64, or 128 bits |
| Block/IE sizes | List of sizes of the following info blocks/IEs; may include size of header (e.g., "header size", "code size", then "security info size", "manufacturer info size", and/or the like) | 8, 16, 32, 64, or 128 bits |
| Block/IE Locations | Locations of the header and following info blocks/IEs within the RAP container (e.g., "header", "code", "security info", "manufacturer info", and/or the like). | 8, 16, 32, 64, or 128 bits |
| | Radio Virtual Machine (RVM) Data (Optional) | |
| RVM ID | ID of the RVM 271 | 8, 16, 32, 64, or 128 bits |
| RVM origin/source/creator | ID of a RVM developer and/or RadioApp Provider 140 that created and/or owns the RVM 271 | 8, 16, 32, 64, or 128 bits |
| RVM version | Version number of the RVM 271 | 8, 16, 32, 64, or 128 bits |
| RVM date | Date of creation, update, release, and/or the like, of the RVM 271 | 8, 16, 32, 64, or 128 bits |
| | Radio Library (RL) Data (Optional) | |
| RL ID | ID of the RL 273 | 8, 16, 32, 64, or 128 bits |
| RL origin/source/creator | ID of a RL developer and/or RadioApp Provider 140 that created and/or owns the RL 273 | 8, 16, 32, 64, or 128 bits |
| RL version | Version number of the RL 273 | 8, 16, 32, 64, or 128 bits |
| RL date | Date of creation, update, release, and/or the like of the RL 273 | 8, 16, 32, 64, or 128 bits |

For each of the 1-bit flags, if the value is set to "1" the corresponding field is included in the RAP 150, and if the value is set to "0" the corresponding field is not included in the RAP 150. For example the ManufacturerInfoFlag 941 indicates whether the manufacturer info 608 is included in the RAP 150, the InitialProfileFlag 942 indicates whether the initial profile info 610 is included included in the RAP 150, the RAPReserveFlag 943 indicates whether the reserved info 612 is included in the RAP 150, the Header-ReserveFlag 944 indicates whether the reserved field 910 is included in the header 602, the ManufacturerReserve flag 945 indicates whether the reserved field 1508 is included in the manufacturer info section 608, the SecurityReserve flag 946 indicates whether the reserved field 1108 (see e.g., FIG. 11) is included in the security info section 604, and the ReserveFlag 947 indicates whether the reserved field 612 is included in the RAP 150. The radio library (lib) descriptor field 906 includes the following static fields: radio lib version field 961 and a radio lib date field 962, each of which may be the same or similar as those described in Table 1.4-2. The target platform descriptor field 908 includes the following static fields: the Target Platform ID 981 and an Mobile Device Reconfiguration Classes (MDRC)/Radio Equipment Reconfiguration Classes (RERC) field 992 including an MDRC or RERC code of the target platform, which may be the same or similar as those described in Table 1.4-2.

FIG. 10 shows a header section subtree structure. Elements of the header section subtree are described in Table 1.4-3.

dynamic proof of origin bit field 1106, and a dynamic reserve bit field 1108. In some cases, some, none, or all of these security features may be implemented, and/or a subset may be identified. For some of the features in Table 1.4-4, the exact representation may be further defined, and for the time being, a field of fixed or flexible size may be reserved.

The security profile 1102 includes information on the structure of the security info section 604 and a list of additional (e.g., non-mandatory) security information related to the RAP 150, which is included in the reserve IE 1108 of the security section 604 (e.g., security information beyond mandatory elements). The security info section 604 may include the order of and/or arrangement of (sub)fields/IEs within the security info section 604, and/or a list of the specific types of information included in the security info section 604. The reserve field 1108 includes the additional (e.g., non-mandatory) security features listed in the security profile 1102, which may be any of those discussed in [TS103436] and/or newly introduced/added security features such as those not yet formulated. For example, the additional (e.g., non-mandatory) security features listed in the security profile 1102 and included in the reserve field 1108 can include: for security tier #1 in [TS103436], signature creation, trusted timestamp, secure storage, remote attestation, local and/or remote configuration control, and longterm management; for security tier #2 in [TS103436], remote attestation, and remote configuration control, and longterm management; and other implementation specific security features for security tier #3 in [TS103436].

TABLE 1.4-3

| | | Header Section | |
|---|---|---|---|
| N | Node name | Node type | Bit field |
| 1 | Descriptor | mandatory | the RAP header descriptor |
| 2 | Descriptor\ID | mandatory | The RAP ID |
| 3 | Descriptor\Version | mandatory | The RAP version |
| 4 | Descriptor\Date | mandatory | The RAP day issue |
| 5 | Descriptor\Producer | mandatory | The RAP producer |
| 6 | Structure | mandatory | The bit field for the RAP structure description |
| 7 | Structure\ManufacturerFlag | mandatory | ManufacturerFlag = 1 than Manufacturer is a part of the RAP and otherwise if ManufacturerFlag = 0 |
| 8 | Structure\InitialProfileFlag | mandatory | InitialProfileFlag = 1 than Profile is a part of the RAP and otherwise if InitialProfileFlag = 0 |
| 9 | Structure\RAPReserveFlag | mandatory | RAPReserveFlag = 1 than Reserve is a part of the RAP and otherwise if RAPReserveFlag = 0 |
| 10 | Structure\HeaderReserveFlag | mandatory | HeaderReserveFlag = 1 than Header\Reserve is a part of the RAP and otherwise if HeaderReserveFlag = 0 |
| 11 | Structure\ManufacturerReserveFlag | mandatory | ManufacturerReserveFlag = 1 than Manufacturer\Reserve is a part of the RAP and otherwise if ManufacturerReserveFlag = 0 |
| 12 | Structure\SecurityReserveFlag | mandatory | SecurityReserveFlag = 1 than Security\Reserve is a part of the RAP and otherwise if SecurityReserveFlag = 0 |
| 13 | Structure\ReserveFlag | mandatory | ReserveFlag = 1 than Reserve is a part of the RAP and otherwise if ReserveFlag = 0 |
| 14 | RadioLib | mandatory | The Radio Lib description |
| 15 | RadioLib\Version | mandatory | The Radio Lib version |
| 16 | RadioLib\Date | mandatory | The Radio Lib day issue |
| 17 | TargetPlatform | mandatory | The target platform description |
| 18 | TargetPlatform\ID | mandatory | The target platform ID |
| 19 | TargetPlatform\ReconfigurationClass | mandatory | The target platform Reconfiguration Class (see FIG. 2, 3) |
| 20 | Reserve | mandatory | The RAP reserved bit field |

1.4.2.2. Security Section

Figure 11:
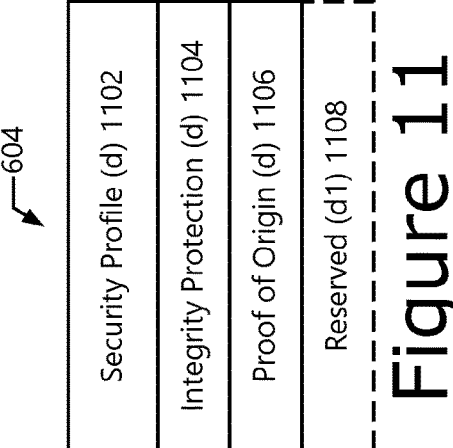

FIG. 11 shows an example security section 604. The security features in security info section 604 and Table 1.4-4 are based on the security analysis performed and described in [TR103087] and [TS103436]. As shown by FIG. 11, the security section 604 includes a dynamic security profile bit field 1102, a dynamic integrity protection bit field 1104, a The integrity protection IE 1104 includes security information related to data in transit as discussed in section 7.2.1 of [TS103436], and data in storage as discussed in section 7.2.2 of [TS103436]. For example, the integrity verification capability is implemented for data in transit using TLS with a cipher suite selection of "TLS_ECDHE_ECDSA_WITH_AES_128_CBC_SHA", and each party is identified by an attested public key certificate containing their public key attested by the root CA for the RRS. The proof of integrity of any data in storage (e.g., DoC, individual component, and the like) is implemented by calculating a cryptographic hash using the Secure Hash algorithm defined in FIPS 186-4 or as updated by SHA-3, and the calculated hash is stored in a secured enclave distinct from the data in storage.

Additionally or alternatively, the integrity protection field 1104 includes a proof of integrity of the RA 270 and/or RAP 150, an RE configuration policy, and/or DoC of the RA 270 and/or RAP 150. Reservation of a field of flexible size (e.g., combination of a "field length" indicator in number of Bytes/words, to be followed by the information itself). In some implementations, the proof of integrity information is a hash of a predefined or predetermined size (e.g., 8 bits, 16 bits, 32 bits, 64 bits, 128 bits, 256 bits, 512 bits, 1024 bits, 2048 bits, or any multiple integer). Additionally or alternatively, the hash is combined with an ID of a predefined or predetermined size (e.g., 8 bits, 16 bits, 32 bits, 64 bits, 128 bits, 256 bits, 512 bits, 1024 bits, 2048 bits, or any multiple integer) indicating the hash calculation algorithm, or the integrity protection field 1104 otherwise includes the hash algorithm ID.

The proof of origin field 1106 includes security information related to proof of original and/or non-repudiation services as discussed in section 6.5 of [TS103436], as defined in Information technology—Open Systems Interconnection—Security frameworks for open systems: Non-repudiation framework—Part 4, ISO/IEC 10181-4, ed. 1 (April 1997), and/or as defined in Information security, cybersecurity and privacy protection—Evaluation criteria for IT security—Part 2: Security functional components, ISO/IEC FDIS 15408-2, ed. 3 (May 2011). For example, the proof of original information can include evidence of an origin of a transmitted RAP 150 and associated events and messages, evidence of receipt of a received RAP 150 and associated events and messages, capabilities to verify the evidence of origin, and the like. The evidence of origin or receipt includes transaction details such as, for example, time (timestamp) of the transaction, recipient details, originator details, metadata of the supplied information including the information type (e.g., DoC or RAP 150), digital signature of the information, and/or the like.

Additionally or alternatively, the proof of origin IE 1106 includes a proof of the identity of the developer of RA 270, the issuer of the RE Configuration Policy, and/or the issuer of the DoC; Reservation of a field of flexible size (e.g., combination of a "field length" indicator in number of bytes/words, to be followed by the information itself). In some implementations, the information includes a digital signature with a predetermined or predefined size (e.g., 8 bits, 16 bits, 32 bits, 64 bits, 128 bits, 256 bits, 512 bits, 1024 bits, 2048 bits, or any multiple integer). Additionally or alternatively, the information includes an ID with a predetermined or predefined size (e.g., 8 bits, 16 bits, 32 bits, 64 bits, 128 bits, 256 bits, 512 bits, 1024 bits, 2048 bits, and/or any multiple integer) combined with the digital signature or otherwise indicating the digital signature algorithm.

The additional security features listed in the security profile 1102 and/or included in the reserve IE 1108 may include one or more of the following information and/or the information shown by Table 1.4-4.

Prevention of an asset installation when the asset is not provided by a legitimate actor; Reservation of a field of flexible size (e.g., combination of a "field length" indicator in number of Bytes/words, to be followed by the information itself). In some implementations, this information includes a list of legitimate actors using their respective IDs.

Use of the reconfiguration feature as a security update mechanism. Reservation of a field of flexible size (e.g., combination of a "field length" indicator in number of Bytes/words, to be followed by the information itself). In some implementations, the information includes a list of SW components installed for the purpose of security protection.

Proof of conformance of the radio platform 220 and RA 270 to the regulatory DoC, considering that the set of installed RAs 270 can change over time. Reservation of a field of flexible size (e.g., combination of a "field length" indicator in number of Bytes/words, to be followed by the information itself). In some implementations, the information includes a (digital) DoC or a pointer to such a (digital) DoC (e.g., available at a specific web address or the like).

Prevention of illegitimate use of the DoC (in particular against counterfeit). Reservation of a field of flexible size (e.g., combination of a "field length" indicator in number of Bytes/words, to be followed by the information itself). In some implementations, this information includes a list of valid (digital) DoC versions or pointers to such a (digital) DoC versions, e.g., available at a specific web address. Only SW components may be installed that are covered under valid (digital) DoC versions. Other SW components need to be rejected.

Audit functionalities including a non-repudiation framework and remote attestation. Reservation of a field of flexible size (e.g., combination of a "field length" indicator in number of Bytes/words, to be followed by the information itself). In some implementations, this information includes a list (such as IDs) of valid remote attestation requestors or valid originators of related/similar requests. Also, specific valid request types may be indicated.

Long-term management framework (e.g., transition of equipment responsibility from one manufacturer to another). Reservation of a field of flexible size (e.g., combination of a "field length" indicator in number of bytes/words, to be followed by the information itself). In some implementations, this information includes details on transition of responsibility, for example transition to a new (digital) DoC and a related new responsible entity.

Prevention of masquerade of stakeholders in the RRS value chain. Reservation of a field of flexible size (e.g., combination of a "field length" indicator in number of bytes/words, to be followed by the information itself). In some implementations, this information includes or allows the identification of stakeholders, such as information for a handshake procedure or the like.

Prevention of code theft information. Reservation of a field of flexible size (e.g., combination of a "field length" indicator in number of Bytes/words, to be followed by the information itself). The code can be encrypted and details for encrypting and/or decrypting the code can be included such as, for example, the encryption method/scheme, requirements on public/private keys, and/or the like.

Supply chain integrity and assurance (which underpins the aforementioned measures). Reservation of a field of flexible size (e.g., combination of a "field length" indicator in number of Bytes/words, to be followed by the information itself). In some implementations, this information is related to the validity of some or all elements in the supply chain, including IDs, digital signatures, and/or the like.

In some implementations, the security information 604 (including info/data on encryption, integrity protection, proof of source, and/or the like) may include the info/data, IEs, DFs, DEs, and/or the like as shown by Table 1.4-4.

TABLE 1.4-4

| Information Element, Data Field, or Data Element Name | Description/Comments | Size |
|---|---|---|
| | Security Information for RAP container | |
| | Proof of Integrity | |
| Integrity of RA 270/RAP 150 | This field contains a cryptographic mechanism (e.g., hash) of an RA 270. May be included in a reserved field of flexible size (e.g., combination of a length/size indicator field followed by the info field itself). | 8, 16, 32, 64, 128, 256, 512, 1024, 2048 bits, or any multiple integer |
| Integrity of RE Configuration Policy | This field contains a cryptographic mechanism (e.g., hash) of an RA Configuration Policy. May be included in a reserved field of flexible size (e.g., combination of a length/size indicator field followed by the info field itself). | 8, 16, 32, 64, 128, 256, 512, 1024, 2048 bits, or any multiple integer |
| Integrity of DoC | This field contains a cryptographic mechanism (e.g., hash) of a DoC. May be included in a reserved field of flexible size (e.g., combination of a length/size indicator field followed by the info field itself). | 8, 16, 32, 64, 128, 256, 512, 1024, 2048 bits, or any multiple integer |
| Integrity ID (e.g., hash ID) | This field contains an identifier indicating the cryptographic algorithm (e.g., hash algorithm) used to calculate an associated Integrity of RA 270, Integrity of RE Configuration Policy, and/or Integrity of DoC value/code. May be combined with its associated Integrity of RA 270, Integrity of RE Configuration Policy, and/or Integrity of DoC value/code in the designated and/or reserved field. | 8, 16, 32, 64, 128, 256, 512, 1024, 2048 bits, or any multiple integer |
| | Proof of Identity | |
| Identity of RA developer and/or RA provider 140 | This field contains a cryptographic mechanism (e.g., Digital Signature, Digital Certificate, and/or the like) of an RA developer/provider 140. May be included in a reserved field of flexible size (e.g., combination of a length/size indicator field followed by the info field itself). | 8, 16, 32, 64, 128, 256, 512, 1024, 2048 bits, or any multiple integer |
| Identity of RE Configuration Policy issuer | This field contains a cryptographic mechanism (e.g., Digital Signature, Digital Certificate, and/or the like) of an issuer of an RE Configuration Policy associated with an RA 270 and/or RE 101. May be included in a reserved field of flexible size (e.g., combination of a length/size indicator field followed by the info field itself). | 8, 16, 32, 64, 128, 256, 512, 1024, 2048 bits, or any multiple integer |
| Identity of DoC issuer | This field contains a cryptographic mechanism (e.g., Digital Signature, Digital Certificate, and/or the like) of an issuer of a DoC associated with an RA 270. May be included in a reserved field of flexible size (e.g., combination of a length/size indicator field followed by the info field itself). | 8, 16, 32, 64, 128 256, 512, 1024, 2048 bits, or any multiple integer |
| Identity ID (e.g., hash ID) | This field contains an identifier indicating the cryptographic algorithm (e.g., digital signature, certificate, hash algorithm, and/or the like) used to generate an associated Identity of RA developer and/or RA provider 140, Identity of RE Configuration Policy issuer, and/or Identity of DoC issuer value/code. May be combined with its associated Identity of RA developer and/or RA provider 140, Identity of RE Configuration Policy issuer, and/or Identity of DoC issuer value/code in the designated and/or reserved field. | 8, 16, 32, 64, 128, 256, 512, 1024, 2048 bits, or any multiple integer |
| | Prevention of Malware Installation | |
| List of non-malicious actors | This field contains a list of identifiers of each identified or known legitimate actor (e.g., list of RA providers 140). This list may be used to prevent installation of malicious assets (e.g., malware) and/or installation of assets that are not provided by a legitimate actor. May be included in a reserved field of flexible size (e.g., combination of a length/size indicator field followed by the info field itself). | 8, 16, 32, 64, 128, 256, 512, 1024, 2048 bits, or any multiple integer |
| | Security Update Mechanism | |
| List of Security Components | This field contains a list of software (SW) components that may be installed for the purpose of security protection. This allows the reconfiguration feature to be used as a security update mechanism. | 8, 16, 32, 64, 128, 256, 512, 1024, 2048 bits, or any multiple integer |

TABLE 1.4-4-continued

Security Information for RAP container

| Information Element, Data Field, or Data Element Name | Description/Comments | Size |
|---|---|---|
| | May be included in a reserved field of flexible size (e.g., combination of a length/size indicator field followed by the info field itself). | |

Proof of Conformance

| Information Element, Data Field, or Data Element Name | Description/Comments | Size |
|---|---|---|
| Declaration of Conformity (DoC) | This field contains a digital DoC or a pointer to a digital DoC. The DoC pointer may be a web address, URL, or other resource identifier. The DoC provides proof of conformance of the radio platform 220 and radio application (e.g., RA 270) to a regulatory DoC, considering that the set of installed radio applications (e.g., RAs 270) can change over time. May be included in a reserved field of flexible size (e.g., combination of a length/size indicator field followed by the info field itself). | 8, 16, 32, 64, 128, 256, 512, 1024, 2048 bits, or any multiple integer |
| Valid DoCs | This field contains a list of valid digital DoC versions or valid DoC pointers. This prevents illegitimate use of DoCs, in particular, against counterfeit DoCs. Only SW components may be installed that are covered under valid (digital) DoC versions; other SW components are rejected. May be included in a reserved field of flexible size (e.g., combination of a length/size indicator field followed by the info field itself). | 8, 16, 32, 64, 128, 256, 512, 1024, 2048 bits, or any multiple integer |

Audit Functionalities

| Information Element, Data Field, or Data Element Name | Description/Comments | Size |
|---|---|---|
| Valid Remote Attestation Requestors | This field contains a list of valid remote attestation requestors, or valid originators of related/similar requests. The list may include IDs of each requestor. May be included in a reserved field of flexible size (e.g., combination of a length/size indicator field followed by the info field itself). | 8, 16, 32, 64, 128, 256, 512, 1024, 2048 bits, or any multiple integer |
| Remote Attestation Request Types | This field contains a list of valid request types that may be used for remote attestation requests or related/similar requests. May be included in a reserved field of flexible size (e.g., combination of a length/size indicator field followed by the info field itself). | 8, 16, 32, 64, 128, 256, 512, 1024, 2048 bits, or any multiple integer |

Long-Term Management Framework

| Information Element, Data Field, or Data Element Name | Description/Comments | Size |
|---|---|---|
| Transition Responsibility | This field contains information regarding transition of responsibility, for example, transition to a new digital DoC and a related new responsible entity (e.g., transition of equipment responsibility from one manufacturer to another). This field may include a DE/DF of a previous/currently responsible entity and another DE/DF of a new responsible entity. May be included in a reserved field of flexible size (e.g., combination of a length/size indicator field followed by the info field itself). | 8, 16, 32, 64, 128, 256, 512, 1024, 2048 bits, or any multiple integer |

Prevention of masquerade of stakeholders in the RRS value chain

| Information Element, Data Field, or Data Element Name | Description/Comments | Size |
|---|---|---|
| Stakeholder ID(s) | This field contains a list of identifiers of each identified or known stakeholder in an RRS value chain related to a particular RE 101 or RAP 150. This list may enable the identification of stakeholders, such as information for handshake procedures and/or the like. May be included in a reserved field of flexible size (e.g., combination of a length/size indicator field followed by the info field itself). | 8, 16, 32, 64, 128, 256, 512, 1024, 2048 bits, or any multiple integer |

Prevention of Code and/or Data Theft

| Information Element, Data Field, or Data Element Name | Description/Comments | Size |
|---|---|---|
| Encryption Method | This field contains information about an encryption method used to secure code and/or data May be included in a reserved field of flexible size (e.g., combination of a length/size indicator field followed by the info field itself). | 8, 16, 32, 64, 128, 256, 512, 1024, 2048 bits, or any multiple integer |
| Key Info | This field contains information about requirements on public/private keys such as a public key, data to be used to generate public and/or private keys, and/or the like. May be included in a reserved field of flexible size (e.g., combination of a length/size indicator field followed by the info field itself). | 8, 16, 32, 64, 128, 256, 512, 1024, 2048 bits, or any multiple integer |

TABLE 1.4-4-continued

| Security Information for RAP container | | |
|---|---|---|
| Information Element, Data Field, or Data Element Name | Description/Comments | Size |
| *Supply Chain Integrity and Assurance* | | |
| Supply Chain Info | This field contains information related to supply chain integrity and assurance, which underpins all of the above measures. The Supply Chain Info is related to the validity of all elements in the supply chain, including IDs, digital signatures, and/or the like<br><br>May be included in a reserved field of flexible size (e.g., combination of a length/size indicator field followed by the info field itself). | 8, 16, 32, 64, 128, 256, 512, 1024, 2048 bits, or any multiple integer |

Figure 12:
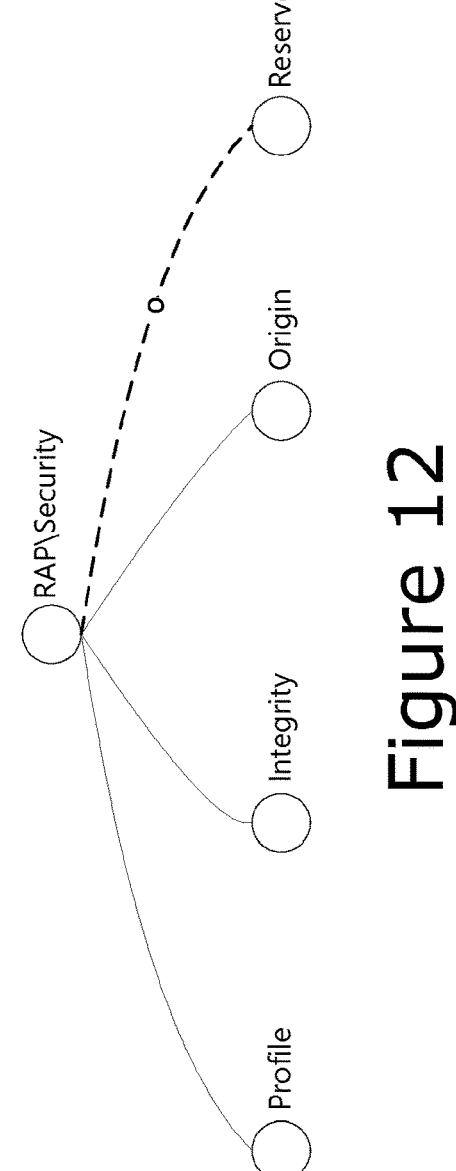

FIG. 12 shows a security section subtree structure 1200. Elements of the security section subtree are described in Table 1.4-5.

TABLE 1.4-5

| | Security Section | | |
|---|---|---|---|
| N | Node name | Node type | Bit field |
| 1 | Profile | mandatory | Description of security profile. Indication of the security features implemented for the specific case (e.g., taken out of the identified list of options available in the RRS security study) |
| 2 | Integrity | mandatory | Parameterization for Integrity Protection (e.g., Hash Algorithm, Hash size, and/or the like) |
| 3 | Origin | mandatory | Parameterization for Proof of Origin (e.g., Digital signature algorithm, digital signature size, and/or the like) |
| 4 | Reserve | optional | Reserved for the future use |

1.4.2.3. Code Section

FIG. 13 shows the URA package code section 606, which includes a list of individual URA subsection 1302. Each URA[k] subsection 1302 (where k is a number) includes a static URA descriptor field 1310 and a list of URA components 1312. The URA descriptor field 1310 includes information describing the URA code, and includes a static URA ID field (e.g., containing an identity or identifier of the URA code), a static URA version field (e.g., containing an version or release number of the URA code), a static URA date field (e.g., containing a date and/or time the URA code was created, released, or otherwise made public), and a static URA producer ID field (e.g., containing an identity or identifier of the producer or developer of the URA code).

The list of URA components 1312 provides information about individual URA[k] components 1320, which are the subject for reconfiguration. Each URA component field 1320 in the URA component list 1312 includes a URA component header 1330 and the a dynamic URA component code field 1332 that includes the code of the URA component.

The URA component header 1330 provides information to correctly interpret the SW of the URA component code. The URA component header 1330 includes a static URA component ID bit field (e.g., containing an identity or identifier of the URA component code); a static URA component code type bit field (e.g., containing a code type ("CodeType") of the URA component code); a static URA component descriptor bit field 1340; and a static HW component ID bit field (e.g., containing an identity or identifier of the HW component code that is relevant to the URA component). In some implementations, the URA component descriptor field 1340 is optional and may be omitted. The CodeType in the URA component code type bit field may indicate that the URA component is one of the three types of URA component such as source code including Radio Library calls of Radio Library native implementation and RHAL 2115 calls, IRs including Radio Library calls of Radio Library native implementation and RHAL 2115 calls, and/or executable codes for a particular radio platform 220. The URA component descriptor field 1340 provides URA component configuration information.

The URA component descriptor field 1340 may be an RVM descriptor field 1340b for an IR URA component, or the URA component descriptor field 1340 may be a source code component descriptor field 1340a for a source code URA component. The URA component descriptor bit field 1340b is used when a CodeType parameter is set to "IR" and the MDRC/RERC field 992 has a value of 5, 6, or 7 (e.g., MDRC/RERC∈{5, 6, 7}). The URA component descriptor bit field 1340b includes an RVM descriptor field 1348. The URA component descriptor bit field 1340a is used when a CodeType parameter is set to "source" (e.g., Code Type=«source») and the MDRC/RERC field 992 has a value of 5, 6, or 7 (e.g., MDRC/RERC∈{5, 6, 7}). The URA component descriptor bit field 1340a includes a static language descriptor bit field 1342, a static OS descriptor bit field 1344, and a static list of the Lib descriptors field 1346.

The RVM descriptor field 1348 is a static bit field including a static RVM version bit field (e.g., containing a version or release number of the RVM 271); and a static RVM date bit field (e.g., containing a date and/or time the RVM 271 was created, released, or otherwise made public). The RVM descriptor may be in the form of "RVM Descriptor={Version, Date}".

The language descriptor field 1342 includes a static language name bit field (e.g., containing a name, identity, or identifier of the language of the URA component); a static language version bit field (e.g., containing an version or release number of the URA component in a particular language); and a static language date bit field (e.g., containing a date and/or time URA component in the particular language was created, released, or otherwise made public). In these examples, the "language" in the language descriptor field 1342 may refer to a programming language, scripting language, and/or the like. The language descriptor may be in the form of "Language Descriptor={Name, Version, Date}".

The OS descriptor bit field 1344 includes a static OS name bit field (e.g., containing a name, identity, or identifier of the OS that the URA component is configured or built for); a static OS version bit field (e.g., containing an version or release number of the OS intended to run or operate the URA component); and a static OS date bit field (e.g., containing a date and/or time OS or OS version was created, released, or otherwise made public). In these examples, the "OS" in the OS descriptor bit field 1344 may refer to the ROS and/or RTOS of a radio computer (see e.g., ROS 2156*b* in FIG. 21). The OS descriptor may be in the form of "OS Descriptor={Name, Version, Date}".

The lib descriptors field 1346 forms a list of library descriptors, which includes information on required RLs 273 (e.g., for RL 273 calls of RL 273 native implementation and/or for compiling or otherwise operating a corresponding SW component). Each lib descriptor 1346 includes a static Lib name field (e.g., containing a name, identity, or identifier of the radio libraries 273 used by the URA component), a static Lib version field (e.g., containing an version or release number of the radio libraries 273 used by the URA component), a static Lib date bit field (e.g., containing a date and/or time Lib or Lib version was created, released, or otherwise made public), and a dynamic Lib link bit field (e.g., containing a link to the indicated ID/version of the radio libraries 273). The lib descriptor 1346 may be in the form of "Lib Descriptor={LibID, Version, Date, Link}". In some implementations, the lib descriptors 1346 may include an ID of a origin/source/creator, type of radio libraries 273, and/or other like information.

In some implementations, URA component descriptor field 1340*a* or 1340*b* may also include a user type field including information of a type of user the URA component is intended for (e.g., private, corporate, specific subscription plan, and/or the like), which may be complemented with information on a related version numbers, dates, and the like.

In various implementations, the code info section 606 and related information may include the info/data, IEs, DFs, DEs, and the like, as shown by Table 1.4-6.

TABLE 1.4-6

| Code Information for RAP container | | |
| --- | --- | --- |
| Information Element, Data Field, or Data Element Name | Description/Comments | Size |
| URA header(s) | | |
| URA ID | ID of the URA 205 | 8, 16, 32, 64, or 128 bits |
| URA origin/source/creator | ID of creator and/or owner of the URA 205. | 8, 16, 32, 64, or 128 bits |
| Version | Version number of the URA 205 | 8, 16, 32, 64, or 128 bits |
| Date | Date of creation, update, release, and/or the like of URA 205 | 8, 16, 32, 64, or 128 bits |
| Code (URA) Information | | |
| Code Type | This field indicates whether the URA is one of the 3 types of code: Source codes including Radio Library calls of Radio Library native implementation and Radio HAL 2115 calls; Intermediate Representation (IRs) including Radio Library calls of Radio Library native implementation and radio HAL 2115 calls; or Executable codes for a particular radio platform 220 | 8, 16, 32, 64, or 128 bits |
| Code (URA) Format | This field includes information on the Code Format such as text, executable (exe/com), pearl, script, and/or the like | 8, 16, 32, 64, or 128 bits |
| Code (URA) Configuration | | |
| Language | This field indicates the programming language, scripting language, and/or markup language of the URA 205 | 8, 16, 32, 64, or 128 bits |
| User Type | This field indicates an intended or desired user such as private, corporate/enterprise, governmental/regulator, specific subscription plan, and/or the like | 8, 16, 32, 64, or 128 bits |
| Version | Version number related to Language and/or User Type field(s) | 8, 16, 32, 64, or 128 bits |
| Date | Date related to Language and/or User Type field(s) | 8, 16, 32, 64, or 128 bits |
| Library Information | | |
| Library ID | ID(s) of required or desired libraries (e.g., one or more RLs 273) | 8, 16, 32, 64, or 128 bits |
| Library Type | This field includes an indication of the library types of the required or desired libraries | 8, 16, 32, 64, or 128 bits |
| Library origin/source/creator | ID(s) of creator and/or owner of the libraries (e.g., one or more RLs 273) | 8, 16, 32, 64, or 128 bits |
| Version | Version number of the libraries (e.g., one or more RLs 273) | 8, 16, 32, 64, or 128 bits |
| Date | Date of creation, update, release, and/or the like of the libraries (e.g., one or more RLs 273) | 8, 16, 32, 64, or 128 bits |
| Library Resource(s) | Link or other reference to latest version of the required or desired libraries (e.g., one or more RLs 273) | 8, 16, 32, 64, or 128 bits |

TABLE 1.4-6-continued

| Code Information for RAP container | | |
|---|---|---|
| Information Element, Data Field, or Data Element Name | Description/Comments | Size |
| | Code (URA) | |
| Code (URA) | This field includes the code (URA) itself. May be included in a reserved field of flexible size (e.g., combination of a length/size indicator field followed by the info field itself). | 8, 16, 32, 64, 128, 256, 512, 1024, 2048 bits, or any multiple integer |

Figure 14:
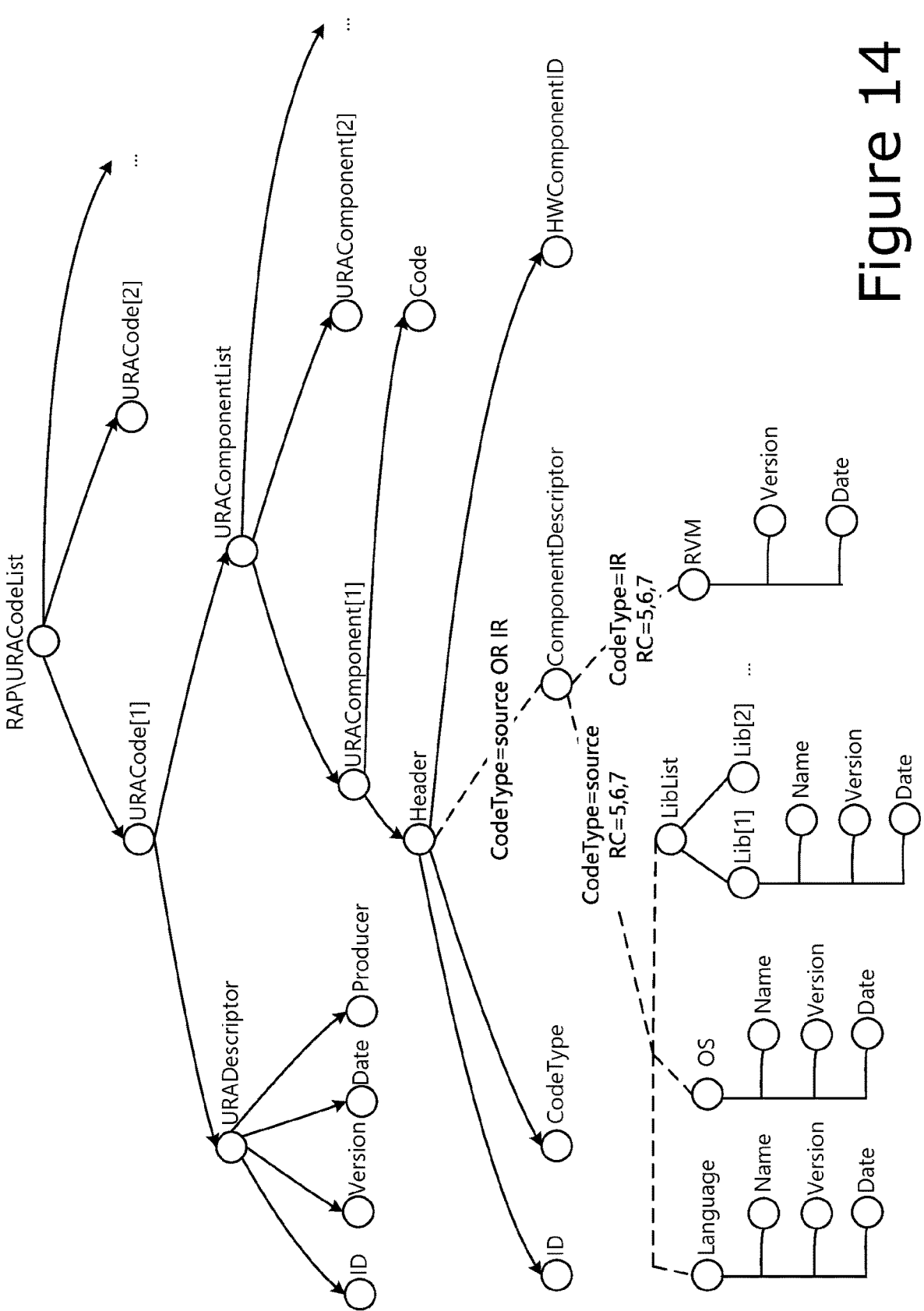

FIG. 14 shows a URA code subtree structure 1400. Elements of the URA code section are described in Table 1.4-7.

TABLE 1.4-7

| N | Node name | Node type | Bit field |
|---|---|---|---|
| | | URA Code Section | |
| 1 | URACode[k] | mandatory | The URA code section for Radio Application k. The RAP can provide program code for a few Radio Applications in one package. |
| 2 | URACode[k]\URADescriptor | | The descriptor of URA code section |
| 3 | URACode[k]\URADescriptor\ID | mandatory | The URA k ID |
| 4 | URACode[k]\URADescriptor\Version | mandatory | The URA k version |
| 5 | URACode[k]\URADescriptor\Date | mandatory | The URA k day issue |
| 6 | URACode[k]\URADescriptor\Producer | mandatory | The URA k producer |
| 7 | URACode[k]\URAComponentList | mandatory | The URA component list for particular Radio Application |
| 8 | URACode[k]\URAComponentList\ URAComponent[n] | mandatory | Description of a particular URA component n for a particular Rafio Application k |
| 9 | URACode[k]\URAComponentList\ URAComponent[n]\Header | mandatory | The header of a particular URA component |
| 1 0 | URACode[k]\URAComponentList\ URAComponent[n]\Code | mandatory | Code section of a particular URA component |
| 1 1 | URACode[k]\URAComponentList\ URAComponent[n]\Header\ID | mandatory | Code component ID |
| 1 2 | URACode[k]\URAComponentList\ URAComponent[n]\Header\CodeType | mandatory | Code type of the code component. CodeType = "source" for source code, CodeType = IR for intermedia representation (config code), CodeType = "bin" for executable machine code. |
| 1 3 | URACode[k]\URAComponentList\ URAComponent[n]\Header\ ComponentDescriptor | optional | CodeType = "source" OR "IR". URA component code description |
| 1 4 | URACode[k]\URAComponentList\ URAComponent[n]\Header\ HWComponentID | mandatory | HW component ID on which the component code is mapped |
| 1 5 | URACode[k]\URAComponentList\ URAComponent[n]\Header\ ComponentDescriptor\Language | optional | CodeType = "source" & RC $\epsilon$ {5, 6, 7}, language specification for source code of the URA component |
| 1 6 | URACode[k]\URAComponentList\ URAComponent[n]\Header\ ComponentDescriptor\OS | optional | CodeType = "source" & RC $\epsilon$ {5, 6, 7}, Operating System specification for source code of the URA component |
| 1 7 | URACode[k]\URAComponentList\ URAComponent[n]\Header\ ComponentDescriptor\LibList | optional | CodeType = "source" & RC $\epsilon$ {5, 6, 7}, specification of libraries used for source code compilation of the corresponding URA component |
| 1 8 | URACode[k]\URAComponentList\ URAComponent[n]\Header\ ComponentDescriptor\Language\ID | mandatory | The language ID for specificatation of the URA component |
| 1 9 | URACode[k]\URAComponentList\ URAComponent[n]\Header\ ComponentDescriptor\ Language\Version | mandatory | The language version for specification of the URA component |
| 2 0 | URACode[k]\URAComponentList\ URAComponent[n]\Header\ ComponentDescriptor\Language\Date | mandatory | The language date issue for specification of the URA component |
| 2 1 | URACode[k]\URAComponentList\ URAComponent[n]\Header\ ComponentDescriptor\OSVID | mandatory | The OS ID for specificatation of the URA component |
| 2 2 | URACode[k]\URAComponentList\ URAComponent[n]\Header\ ComponentDescriptor\OS\Version | mandatory | The OS version for specification of the URA component |

TABLE 1.4-7-continued

| | URA Code Section | | |
|---|---|---|---|
| N | Node name | Node type | Bit field |
| 23 | URACode[k]\URAComponentList\URAComponent[n]\Header\ComponentDescriptor\OS\Date | mandatory | The OS date issue for specification of the URA component |
| 24 | URACode[k]\URAComponentList\URAComponent[n]\Header\ComponentDescriptor\LibList\Lib[m] | optional | CodeType = "source" & RC e {5, 6, 7}, specification of libraries used for source code compilation of the corresponding URA component |
| 25 | URACode[k]\URAComponentList\URAComponent[n]\Header\ComponentDescriptor\LibList\Lib[m]VID | mandatory | The library m ID used for compilation of the URA component |
| 26 | URACode[k]\URAComponentList\URAComponent[n]\Header\ComponentDescriptor\LibList\Lib[m]\Version | mandatory | The library m version for compilation of the URA component |
| 27 | URACode[k]\URAComponentList\URAComponent[n]\Header\ComponentDescriptor\LibList\Lib[m]\Date | mandatory | The library m date issue for compilation of the URA component |
| 28 | URACode[k]\URAComponentList\URAComponent[n]\Header\ComponentDescriptor\LibList\Lib[m]\Link | mandatory | The link to the location of the library m. |
| 29 | URACode[k]\URAComponentList\URAComponent[n]\Header\ComponentDescriptor\RVM | optional | CodeType = "IR" & RC ∈ {5, 6, 7}, RVM specification for execution of IR of the URA component |
| 30 | URACode[k]\URAComponentList\URAComponent[n]\Header\ComponentDescriptor\RVM\Version | mandatory | The RVM version for for execution of IR of the URA component |
| 31 | URACode[k]\URAComponentList\URAComponent[n]\Header\ComponentDescriptor\RVM\Date | mandatory | The RVM date issue for for execution of IR of the URA component |

1.4.2.4. Manufacturer Section

Figures 15, 16:
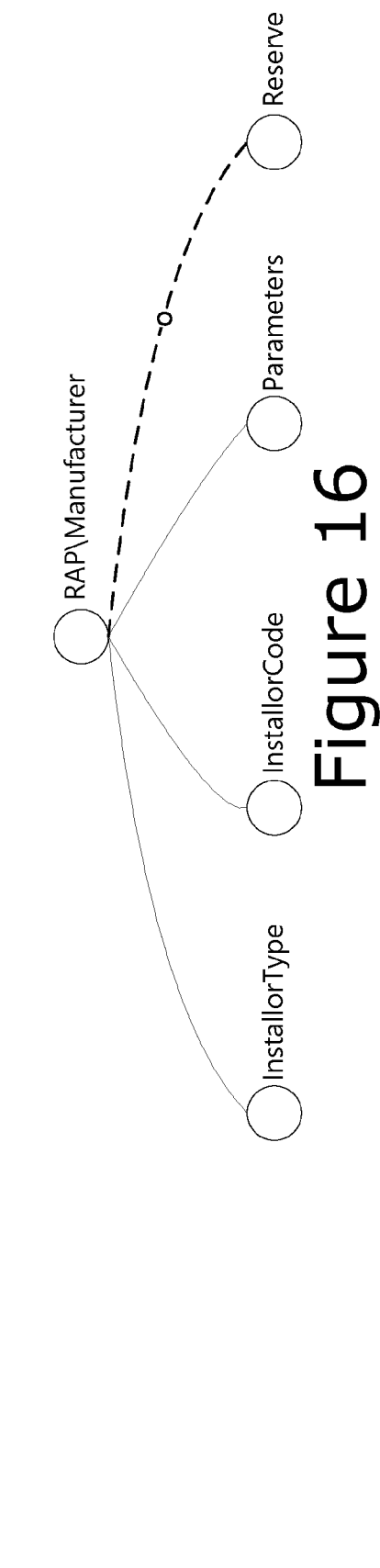

FIG. 15 shows an example manufacturer info section 608. The manufacturer info section 608 is a bit field that may be included in a RAP 150 when the ManufacturerInfoFlag 941 is set to "1" (see e.g., FIG. 9). The manufacturer section 608 includes a static InstallatorType field 1502 (also referred to as "InstallerType field 1502"), a dynamic InstallatorCode field 1504 (also referred to as "InstallerCode field 1504" or "InstallationCode field 1504"), a dynamic InstallationParameters field 1506, and a dynamic reserved field 1508. The manufacturer reserved field 1508 includes additional information not included in the fields 1502, 1504, and/or 1506. The reserved field 1508 is included in a RAP 150 container when the ManufacturerReserveFlag 945 is set to "1" (see e.g., FIG. 9). The structure and size of the fields in the manufacturer info section 608 can be defined by the manufacturer providing the RAP 150.

The InstallatorType field 1502 includes information related to an installation or setup type used for installation of the RA code. Examples of installation types include attended installation, unattended installation, silent installation, headless installation, scheduled or automated installation, clean installation, network installation, and/or the like.

The InstallatorCode field 1504 includes code of an installation program, installer, and/or other code used to install the RA code and associated files, such as applications, drivers, firmware, and/or other software into the target platform. Additionally or alternatively, the InstallatorCode field 1504 can include code of a package-management system used to automate the installation, configuration, and/or updating processes of the RA code. The InstallationParameters field 1506 includes parameters associated with the installation code in the InstallatorCode field 1504 and/or the InstallatorType field 1502. For example, the installation parameters can include installation path/file directory, installation type, admin info, (re)boot behavior, refresh behavior, installation time, and/or the like. Additionally or alternatively, the manufacturer information section 608 may include any combination of the following data.

Installation details (e.g., a list of such "installation details", each of which contains the details for a specific platform version, OS version, RVM version, and/or the like). Reservation of a field of flexible size (e.g., combination of a "field length" indicator in number of bytes/words, to be followed by the information itself). In some implementations, the information will be installation related information of a predefined or predetermined size (e.g., 8 bits, 16 bits, 32 bits, 64 bits, 128 bits, 256 bits, 512 bits, 1024 bits, 2048 bits, and/or any multiple integer). Installation related information may include, for example, installation parameters (e.g., included in InstallationParameters field 1506), access codes to the platform (e.g., included in InstallatorCode field 1504), specific installation and/or authentication steps to perform in a specific order, and/or other like information. This information may be provided through some installation InOb (e.g., script, markup language document, and the like), installation code, and/or the like.

Installation profiles and/or a list of installation profiles, each of which for a specific type of user (e.g., private, corporate, government, first-responder, and/or the like), a user having a given subscription plan, and/or the like. Reservation of a field of flexible size (e.g., combination of a "field length" indicator in number of Bytes/words, to be followed by the information itself). In some implementations, the information includes installation profile related information having a predefined or predetermined size (e.g., 8 bits, 16 bits, 32 bits, 64 bits, 128 bits, 256 bits, 512 bits, 1024 bits, 2048 bits, and/or any multiple integer). The installation profile related information may include specific initial parameterization for URAs 205, and/or the like.

In some implementations, the manufacturer section 608 (e.g., including info/data details, profile information, and/or the like) may include the info/data, IEs, DFs, DEs, and the like, as shown by Table 1.4-8.

TABLE 1.4-8

| Information Element, Data Field, or Data Element Name | Description/Comments | Size |
|---|---|---|
| | Manufacturer (Installation) Information for RAP container | |
| Installation Details | This field contains a list of installation details, each of which contains the details for a specific platform version, OS version, RVM version, and/or the like.<br>May be included in a reserved field of flexible size (e.g., combination of a length/size indicator field followed by the info field itself). | 8, 16, 32, 64, 128, 256, 512, 1024, 2048 bits, or any multiple integer |
| Installation Parameters | This field contains parameters related to installation of an RA 270 and/or RAP 150 (e.g., installation path/file directory, installation type, admin info, (re)boot behavior, refresh behavior, installation time, and/or the like).<br>May be included in a reserved field of flexible size (e.g., combination of a length/size indicator field followed by the info field itself). | 8, 16, 32, 64, 128, 256, 512, 1024, 2048 bits, or any multiple integer |
| Access Codes | This field contains access codes to the platform (e.g., permissions, passcodes, and/or the like).<br>May be included in a reserved field of flexible size (e.g., combination of a length/size indicator field followed by the info field itself). | 8, 16, 32, 64, 128, 256, 512, 1024, 2048 bits, or any multiple integer |
| Installation Operations | This field contains indicates specific operations/steps for installation of an RA 270 and/or RAP 150 to be performed in a specific order. This may be provided through an installation script or installation code.<br>May be included in a reserved field of flexible size (e.g., combination of a length/size indicator field followed by the info field itself). | 8, 16, 32, 64, 128, 256, 512, 1024, 2048 bits, or any multiple integer |
| Installation Profiles | This field contains one or more installation profiles, which may be a list of such "installation profiles each of which for a specific type of user (e.g., private, enterprise, government, research, and/or the like) or a specific subscription plan, and/or the like.<br>Installation profile related information may include specific initial parameterization for Unified Radio Applications (URAs) 205, and/or the like.<br>May be included in a reserved field of flexible size (e.g., combination of a length/size indicator field followed by the info field itself). | 8, 16, 32, 64, 128, 256, 512, 1024, 2048 bits, or any multiple integer |

FIG. 16 shows a manufacturer information section subtree structure. Elements of the manufacturer information section subtree are described in Table 1.4-9.

TABLE 1.4-9

| | | Manufacturer Information Section | |
|---|---|---|---|
| N | Node name | Node type | Bit field |
| 1 | InstallatorType | mandatory | Describes a type of installor (e.g., cmake, make, script, a specific installator for complex code (e.g., installator does everything), and/or the like). |
| 2 | InstallatorCode | mandatory | Executable code for the Installator |
| 3 | Parammeters | mandatory | Installation parameters |
| 4 | Reserve | Optional | Reserved for the future use |

In some implementations, the content of the "Installator-Type" field can be manufacturer specific or common to multiple RAPs of multiple manufacturers. Additionally or alternatively, the target platform may be heterogeneous platforms including different and/or multiple types of HW elements (e.g., including FPGAs, CPUs, GPUs, and so forth) and some platform specific installation procedure may need to be defined by the manufacturer. In some implementations, the code information section 606 and/or other sections in the RAP may be sufficient to install and execute a URA. In these implementations, the installation section is used to facilitate the installation procedure, and this facilitation information may be provided by the manufacturer.

1.4.2.5. Initial Profile Section

Figures 17, 18:
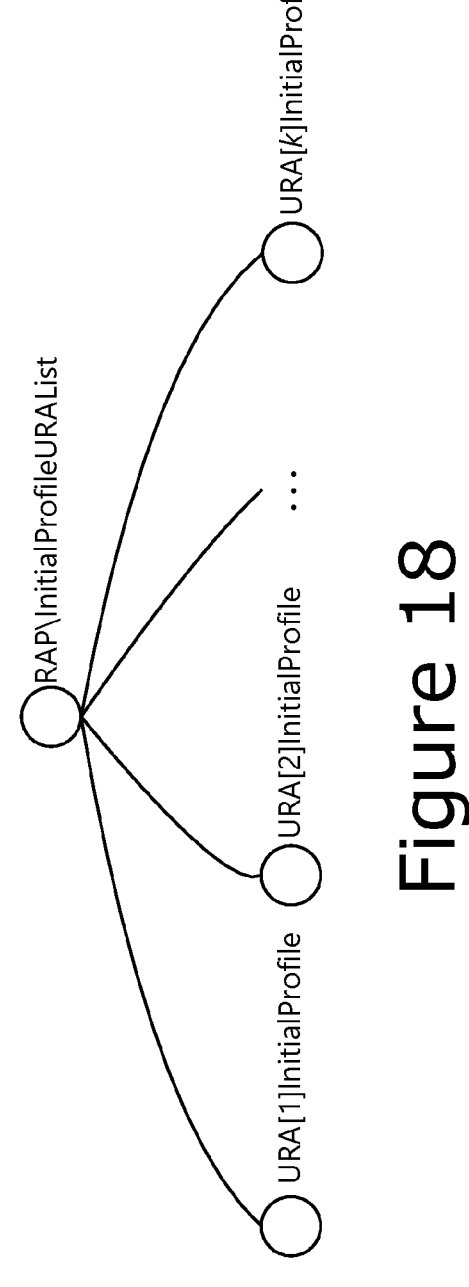

FIG. 17 shows an example initial profile section 610. In some implementations, the initial profile section 610 is an optional field that is included in a RAP 150 when the InitialProfileFlag 942 is set to "1". The initial profile section 610 includes or represents a list of initial profiles of each URA[k] (where k is a number of URAs or URA components) Each URA[k] initial profile, for some k, is a dynamic field whose structure and size are defined by the manufacturer or developer of the URA. Each initial profile in the list of initial profiles may be a default or initial InOb including a set of configurations or settings for a corresponding URA component, and/or an InOb that instructs the target platform how to set up or configure various aspects of the corresponding URA component during or after installation of the RA code. In some implementations, the initial profile InOb may be a script, mark-up language document, and/or the like in any suitable format such as any of those discussed herein.

FIG. 18 shows an initial profile subtree structure, which represents a list of initial profiles for each URA[k] from the RAP 150. Each URA[k] initial profile is a bit field whose internal structure is recognized by a particular URA.

1.4.2.6. RAP Container Format Aspects

The information contained in a RAP 150 structure is shown by Table 1.4-10, which summarizes information about bit fields of the RAP 150. The column "Path\Node Name" in Table 1.4-10 provides a path from the root node of the RAP container (see e.g., FIG. 9), which is "RAP" to the target node with corresponding "Node Name". This node represents a bit field characterized in the next columns, including: the "Type" provides information about the type of the bit fields which might be static (s), dynamic (d), list (l) or complex (c); the "Opt" column indicates optional property of the bit field which might be mandatory (m) or optional (o); and the "Size" column provides information about the size of the bit field if they are static and information about the size of the subfield "Data Size" in case of dynamic bit fields.

TABLE 1.4-10

| | | RAP Fields | | | |
|---|---|---|---|---|---|
| N | Path\Node Name | RAP Element | Type | Opt | Size (bits) |
| 0 | RAP | RAP | c | m | |
| 1 | RAP\header | RAP Header | c | m | |
| 2 | RAP\code | URA Code Section | c | m | |
| 3 | RAP\security | Security Section | c | m | |
| 4 | RAP\manufacturer | Manufacturer Infor Section | c | o | |
| 5 | RAP\initial_profile | Initial Profile | c | o | |
| 6 | RAP\reserve | Reserve | d | o | 16 |
| 7 | RAP\header\descriptor | RAP Descriptor | s | m | 128 |
| 8 | RAP\header\structure | RAP Structure Descriptor | s | m | 8 |
| 9 | RAP\header\RadioLib | Radio Lib Descriptor | s | m | 56 |
| 10 | RAP\header\TargetPlatform | Target Platform Descriptor | s | m | 16 |
| 11 | RAP\header\reserve | RAP Header Reserve | d | o | 8 |
| 12 | RAP\code\URACodeList | URA Code List | l | m | |
| 13 | RAP\security\profile | Security Profile | d | m | 8 |
| 14 | RAP\security\integrity | Integrity Protection | d | m | 8 |
| 15 | RAP\security\origin | Proof of Origin | d | m | 8 |
| 16 | RAP\security\reserve | Security Reserve | d | o | 8 |
| 17 | RAP\manufacturer\InstallatorType | Installator Type | S | m | 8 |
| 18 | RAP\manufacturer\InstallatorCode | Installator Code | d | m | 64 |
| 19 | RAP\manufacturer\parameters | Installation Parameters | d | m | 16 |
| 20 | RAP\manufacturer\reserve | Manufacturer Info Reserve | d | o | 16 |
| 21 | RAP\initial_profile\URAList | URA Initial Profile List | l | m | |
| 22 | RAP\initial_profile\URAList\URA[1]InitialProfile | Initial profile of URA[1] | d | m | |
| 23 | RAP\header\descriptor\id | RAP ID | s | m | 64 |
| 24 | RAP\header\descriptor\version | RAP Version | s | m | 32 |
| 25 | RAP\header\descriptor\date | RAP Date | s | m | 24 |
| 26 | RAP\header\descriptor\producer | RAP Producer ID | s | m | 8 |
| 27 | RAP\header\structure\ManufacturerFlag | Manufacturer Info Flag | s | m | 1 |
| 28 | RAP\header\structure\InitialProfileFlag | Initial Profile Flag | s | m | 1 |
| 29 | RAP\header\structure\RAPReserveFlag | RAP Reserve Flag | s | m | 1 |
| 30 | RAP\header\structure\HeaderReservFlag | RAP Header Reserve Flag | s | m | 1 |
| 31 | RAP\header\structure\ManufacturerReserve | Manufacturer Info Reserve Flag | s | m | 1 |
| 32 | RAP\header\structure\SecurityReserve | Security Reserve Flag | s | m | 1 |
| 33 | RAP\header\structure\ReserveFlags | Reserve Flags | s | m | 2 |
| 34 | RAP\header\RadioLib\Version | Radio Lib Version | s | m | 32 |
| 35 | RAP\header\RadioLib\Date | Radio Lib Date | s | m | 24 |
| 36 | RAP\header\TargetPlatform\ID | Target Platform ID | s | m | 8 |
| 37 | RAP\header\TargetPlatform\ReconfigurationCode | MDRC/RERC | s | m | 8 |
| 38 | RAP\code\URACodeList\URACode[1] | URA[1] Subsection | c | m | |
| 39 | RAP\code\URACodeList\URACode[1]\URADescriptor | URA Descriptor | s | m | 128 |
| 40 | RAP\code\URACodeList\URACode[1]\URAComponentList | URA Component List | l | m | |
| 41 | RAP\code\URACodeList\URACode[1]\URADescriptor\ID | URA ID | s | m | 64 |
| 42 | RAP\code\URACodeList\URACode[1]\URADescriptor\Version | URA Version | s | m | 32 |
| 43 | RAP\code\URACodeList\URACode[1]\URADescriptor\Date | URA Date | s | m | 24 |
| 44 | RAP\code\URACodeList\URACode[1]\URADescriptor\producer | URA Producer ID | s | m | 8 |
| 45 | RAP\code\URACodeList\URACode[1]\URAComponentList\URAComponent[1] | URA Component 1 | c | m | |
| 46 | RAP\code\URACodeList\URACode[1]\URAComponentList\URAComponent[1]\Header | URA Component Header | c | m | |

TABLE 1.4-10-continued

RAP Fields

| N | Path\Node Name | RAP Element | Type | Opt | Size (bits) |
|---|---|---|---|---|---|
| 47 | RAP\code\URACodeList\ URACode[1]\URAComponentList\URAComponent[1]\ Code | URA Component Code | d | m | 64 |
| 48 | RAP\code\URACodeList\ URACode[1]\URAComponentList\URAComponent[1]\ header \ID | URA Component ID | s | m | 64 |
| 49 | RAP\code\URACodeListl URACode[1]\URAComponentList\URAComponent[1]\ header\Code Type | URA Component Code Type | s | m | 8 |
| 50 | RAP\code\URACodeList\ URACode[1]\URAComponentList\URAComponent[1]\ header\ComponentDescriptor | URA Component Descriptor | c | m | |
| 51 | RAP\code\URACodeList\ URACode[1]\URAComponentList\URAComponent[1]\ header\HWComponentID | HW Component ID | s | m | 8 |
| 52 | RAP\code\URACodeList\ URACode[1]\URAComponentList\URAComponent[1]\ header\ComponentDescriptor\Language | URA Component Language Descriptor | s | m | 64 |
| 53 | RAP\code\URACodeList\ URACode[1]\URAComponentList\URAComponent[1]\ header\ComponentDescriptor\OS | URA Component OS Descriptor | s | m | 64 |
| 54 | RAP\code\URACodeList\ URACode[1]\URAComponentList\URAComponent[1]\ header\ComponentDescriptor\LibList | List of Lib Descriptors | l | m | |
| 55 | RAP\code\URACodeList\ URACode[1]\URAComponentList\URAComponent[1]\ header\ComponentDescriptor\RVM | URA Component RVM Descriptor | s | m | 56 |
| 56 | RAP\code\URACodeList\ URACode[1]\URAComponentList\URAComponent[1]\ header\ComponentDescriptor\Language\Name | URA Component Language Name | s | m | 8 |
| 57 | RAP\code\URACodeList\ URACode[1]\URAComponentList\URAComponent[1]\ header\ComponentDescriptor\Language\Version | URA Component Language version | s | m | 32 |
| 58 | RAP\code\URACodeList\ URACode[1]\URAComponentList\URAComponent[1]\ header\ComponentDescriptor\Language\Date | URA Component Language Date | s | m | 24 |
| 59 | RAP\code\URACodeList\ URACode[1]\URAComponentList\URAComponent[1]\ header\ComponentDescriptor\OS\Name | URA Component OS Name | s | m | 8 |
| 60 | RAP\code\URACodeList\ URACode[1]\URAComponentList\URAComponent[1]\ header\ComponentDescriptor\OS\Version | URA Component OS version | s | m | 32 |
| 61 | RAP\code\URACodeList\ URACode[1]\URAComponentList\URAComponent[1]\ header\ComponentDescriptor\OS\Date | URA Component OS Date | s | m | 24 |
| 62 | RAP\code\URACodeList\ URACode[1]\URAComponentList\URAComponent[1]\ header\ComponentDescriptor\LibList\Lib[1] | Lib Descriptor | c | m | |
| 63 | RAP\code\URACodeList\ URACode[1]\URAComponentList\URAComponent[1]\ header\ComponentDescriptor\LibList\Lib[1]\Name | URA Component Lib Name | s | m | 64 |
| 64 | RAP\code\URACodeList\ URACode[1]\URAComponentList\URAComponent[1]\ header\ComponentDescriptor\LibList\Lib[1]\Version | URA Component Lib version | s | m | 32 |
| 65 | RAP\code\URACodeList\ URACode[1]\URAComponentList\URAComponent[1]\ header\ComponentDescriptor\LibList\Lib[1]\Date | URA Component Lib Date | s | m | 24 |
| 66 | RAP\code\URACodeList\ URACode[1]\URAComponentList\URAComponent[1]\ header\ComponentDescriptor\LibList\Lib[1]\Link | URA Component Lib Link | d | m | 16 |
| 67 | RAP\code\URACodeList\ URACode[1]\URAComponentList\URAComponent[1]\ header\ComponentDescriptor\RVM\Version | URA Component RVM Version | s | m | 32 |
| 68 | RAP\code\URACodeList\ URACode[1]\URAComponentList\URAComponent[1]\ header\ComponentDescriptor\RVM\Date | URA Component RVM Date | s | m | 24 |

1.4.3. RAP Procedures

Figure 19:
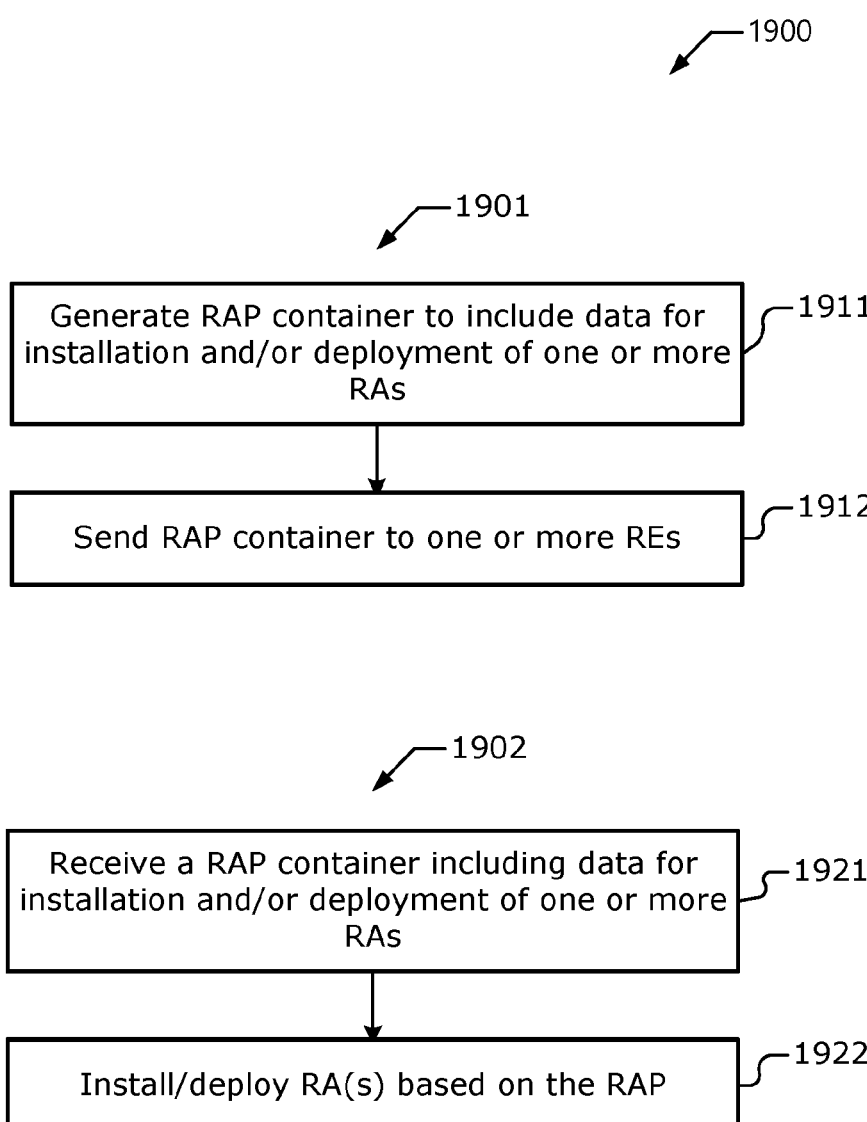
FIGS. 19 and 20 illustrate an example process and procedures for practicing various aspects discussed herein.

FIG. 19 illustrates example processes 1901 and 1902 for practicing the example embodiments discussed herein. Process 1901 may be operated by a RadioApp store 160 and/or RadioApp provider platform 140. Process 1901 begins at operation 1911 where a RAP container 150 is generated to include data for installation and/or reemployment of one or more RAs 270. The RAP container 150 may include the data/information as discussed previously with respect to FIG. 5. At operation 1912, the RAP container 150 is sent to, for example, an RE 101 for installation and/or deployment of the one or more RAs 270. Process 1902 may be operated by an RE 101. Process 1902 begins at operation 1921 where the RE 101 receives a RAP container 150 that includes data for installation and/or reemployment of one or more RAs 270. The RAP container 150 may also include the data/information as discussed previously with respect to FIG. 5. At operation 1922, the RE 101 installs the one or more RAs 270 using the data contained in the RAP container 150.

Figure 20:
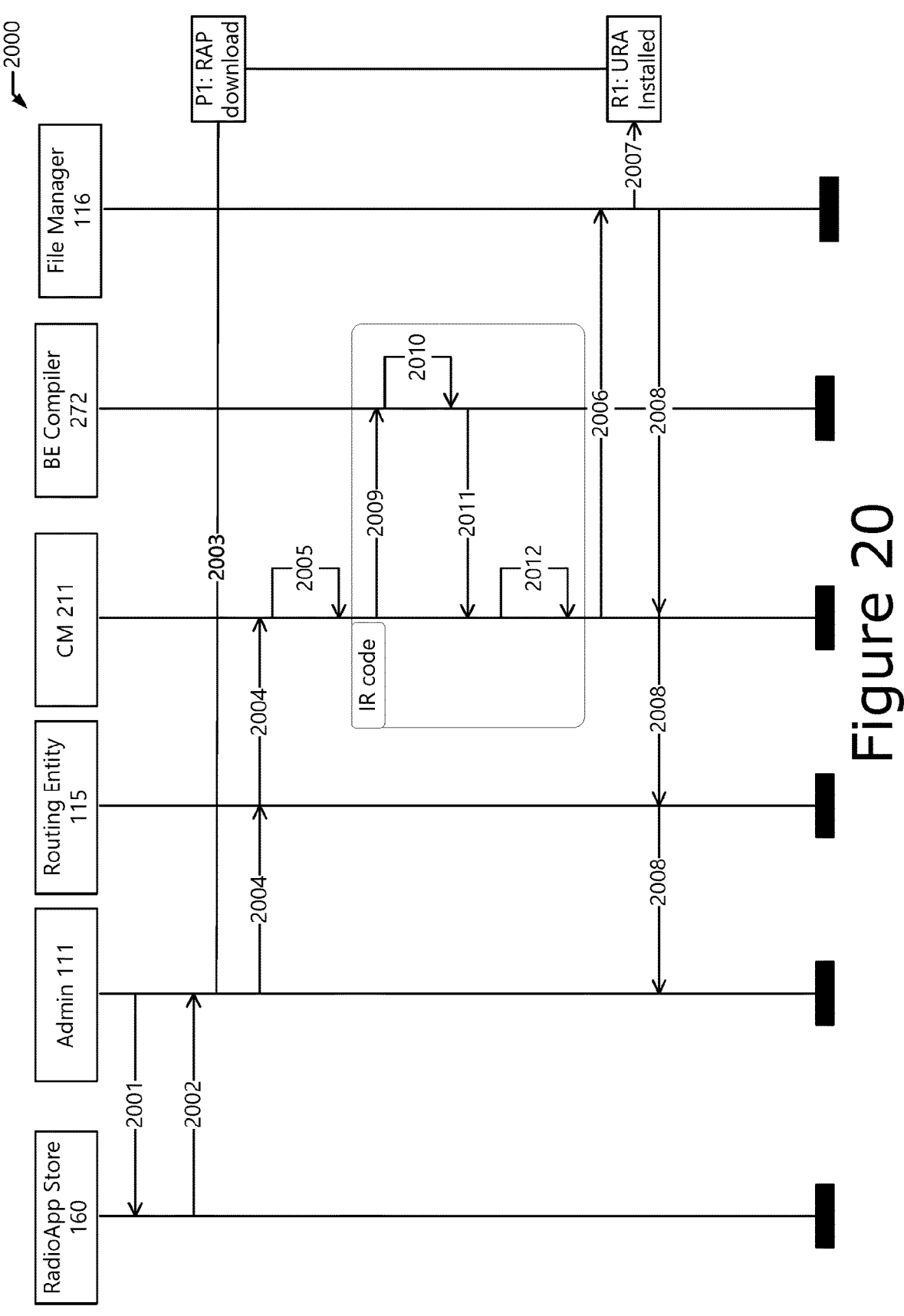

FIG. 20 illustrates a URA installation procedure 2000 that involves downloading a RAP container 150. Procedure 2000 begins at operation 2001 where the admin 111 sends a download request (DownloadRAPReq) signal including RAP (P1) identification (ID) (e.g., DownloadRAPReq(P1: ID)) to the RadioApp Store 160. At operation 2002, the admin 111 receives a download confirmation (Download-RAPCnf) signal including RAP (P1) ID and RAP (e.g., DownloadRAPCnf(P1: ID, RAP)) from the RadioApp Store 160. At operation 2003, the admin 111 begins and/or initiates creation of the RAP (e.g., CreatingRAP (P1:ID)).

At operation 2004, the admin 111 sends an installation request (InstallRAReq) signal including RAP (P1) ID and radio computer ID (e.g., InstallRAReq(P1:ID, RC:ID)) corresponding to $RC_x$ 200 (where "x" indicates the transmission mode including unicast (x=U), multicast (x=M), and broadcast (x=B)) to a routing entity 115. The routing entity 115 is an entity disposed between the CSL 110 and one or more RC 200 (not shown by FIG. 1), which is responsible for directing network packets from their source toward their destination through intermediate network nodes by specific packet forwarding mechanisms (see e.g., [TS103648]). Operation 2004 also involves the routing entity 115 transfers the InstallRAReq signal to CM 211 in the target RC 200 (RC1) based on radio computer ID to request URA installation.

At operation 2005, the CM 211 first performs the URA code certification procedure in order to verify its compatibility, authentication, and the like. Then, at operation 2006, the CM 211 sends the InstallRAReq signal including RAP (P1) ID (e.g., InstallRAReq(P1:ID, RC:ID)) to a File Manager (FM) 116 to perform installation of the URA 205. At operation 2007, the FM 116 performs installation of the URA 205 (e.g., CreateRA(R1:ID)). At operation 2008, the FM 116 transfers an installation confirmation (Install-RACnf) signal including URA (R1) ID (e.g., InstallRACnf (P1:ID, RC:ID)) to the CM 211, which transfers the Install-RACnf signal including URA (R1) ID and radio computer (RC1) ID to the admin 111 via routing entity.

If the downloaded URA 205 is an IR, at operation 2009 the CM 211 first sends a compile request (CompileReq) signal including RAP (P1) ID (e.g., CompileReq(P1:ID)) to BE compiler 272. After completion of back-end compilation at operation 2010, BE compiler 272 transfers a compile confirmation (CompileCnf) signal including RAP (P1) ID (e.g., CompileCnf(P1:ID)) to the CM 211 at operation 2011, which performs a certification of the back-end compiled URA code at operation 2012. After the URA code certification procedure is successfully completed at operation 2012, the URA installation takes place at operations 2006 to 2008.

In case of installation failure, the CM 211 reports the failure of URA installation using an installation confirmation (InstallRAFailCnf) signal including RAP (P1) ID, radio computer (RC1) ID, and failure reason to the admin 111 via routing entity 115.

1.5. Radio Application Operating Environment Aspects

FIG. 21 shows the components and functions of a system 2100 involved in the installation and execution of RAs 270 across an application processor 2152 and a radio computer 200. Depending on the specific implementation and/or design choices, not all elements may be present.

The application processor 2152 includes or is capable of accessing applications (apps) 2170, storage 2158a, an operating system (OS) 2156a, firmware 2155a, and microcode 2154a. The application processor 2152 and the storage 2158a may be the same or similar as the processor circuitry 2952 and the CRM circuitry 2960 discussed infra with respect to FIG. 29.

The RA 270, RC 2111, executable code 2112a, 2112b SFB 2113, UDFB 2114, RCF 210, CSL 110, HAL 2115, RL 273, (front-end) compiler 272a, back-end (BE) compiler 272b, decryptor 2141, and installer 2142 are specific to the RRS, and the RL 273, compiler 272a, BE compiler 272b, decryptor 2141, and installer 2142 may be provided as online services prior to the installation phase on the RE 101.

When the compiler 272a or the BE compiler 272b are provided as online services, the RE 101 only sees the compilation result, which is the RAP 150 on the RadioApp Store 160. The RE 101 does not communicate with the compiler 272a or BE compiler 272b provided as online services, the RadioApp Store 160 does.

As exemplified the RA 270, the CSL 110, and the RCF 210 may span the application processor 2152 and the radio computer 200. In addition, the RE 101 may support different types of URA 205 codes meaning that some URA 205 may run directly on the ROS 2156b as executable codes while others may run as an RVM 271 configured by configcodes.

In some implementations, the RVM 271 is not a virtual execution environment, but rather an abstract machine that is configured by configcodes into an RA 270. The RA 270 interfaces with the radio platform 220 via the RRFI (see e.g., [EN303146-2] and [EN303681-2]) and with the RCF 210 via the URAI (see e.g., ETSI TS 103 146-3 v1.1.1 (2016 February) ("[TS103146-3]", [EN303146-3], and [EN303681-3]).

Table X provides an overview of the possible locations of the compilers and the Radio Library, depending on the MDRC and design choice. The term "C_On" indicate the situation where everything is compiled online, while the term "C_RE" indicate the situation where UDFBs are compiled on the RE 101. As the design choice moves towards platform independent source code/IR MDRC and dynamic linking, the number of components related to security critical processes on the RE 101 (installation, runtime) increases.

TABLE X

| Compilers and Radio Library locations | | | | | | |
|---|---|---|---|---|---|---|
| | MDRC-2, MDRC-3, MDRC-4 | | | MDRC-5, MDRC-6, MDRC-7 | | |
| Component\Phase | Design | Install | Runtime | Design | Install | Runtime |
| Compiler Platform-independent source code, static | C_RE | | | | | |
| Compiler Radio Library | | | | C_On C_On | C_RE C_RE | |

TABLE X-continued

| | MDRC-2, MDRC-3, MDRC-4 | | | MDRC-5, MDRC-6, MDRC-7 | | |
|---|---|---|---|---|---|---|
| Component\Phase | Design | Install | Runtime | Design | Install | Runtime |
| Platform-independent source code, dynamic | | | | | | |
| Compiler | | | | C_On | C_RE | |
| Radio Library | | | | C_On | | C_On, C_RE |
| Intermediate Representation, static | | | | | | |
| FE Compiler | | | | C_On, C_RE | | |
| BE Compiler | | | | | C_RE | |
| Radio Library | | | | | C_RE | |
| Intermediate Representation, static | | | | | | |
| FE Compiler | | | | C_On, C_RE | | |
| BE Compiler | | | | | C_RE | |
| Radio Library | | | | | C_RE | C_On, C_RE |

Various other aspects of the RRS components and RA environment are discussed in [TR103087] and [EN303095].

1.6. RRS Security Aspects

One of the challenges for a successful commercial deployment of Software Defined Radio (SDR) and Cognitive Radio (CR) technologies on top of Reconfigurable Radio Systems (RRS), is to provide an adequate level of security. While SDR and CR based systems should guarantee the same level of security of conventional wireless communication systems, they may also present new vulnerabilities or security threats, and so does RRS. To an external observer, able to only observe the radio interface (the wireless link), a radio equipment should not be detectable as being reconfigurable and thus RRS devices should not be distinguishable from non-RRS devices at this level of observation.

ETSI TR 187 011 V2.1.1 (2008 July) identifies means to define objectives and requirements in security standards and makes the following distinctions that have to be noted:

An objective is the expression of what a security system should be able to do in very broad terms whereas a requirement is a more detailed specification of how an objective is achieved. Objectives may be considered to be desires rather than mandates. Security requirements are derived from the security objectives and, in order to make this process simpler, requirements can be further subdivided into functional requirements and detailed requirements.

Functional security requirements identify the major functions to be used to realize the security objectives. They are specified at a level which gives an indication of the broad behaviour expected of the asset, generally from the user's perspective. Detailed security requirements, as their name implies, specify a much lower-level of behaviour which would, for example, be measurable at a communications interface.

Figure 23:
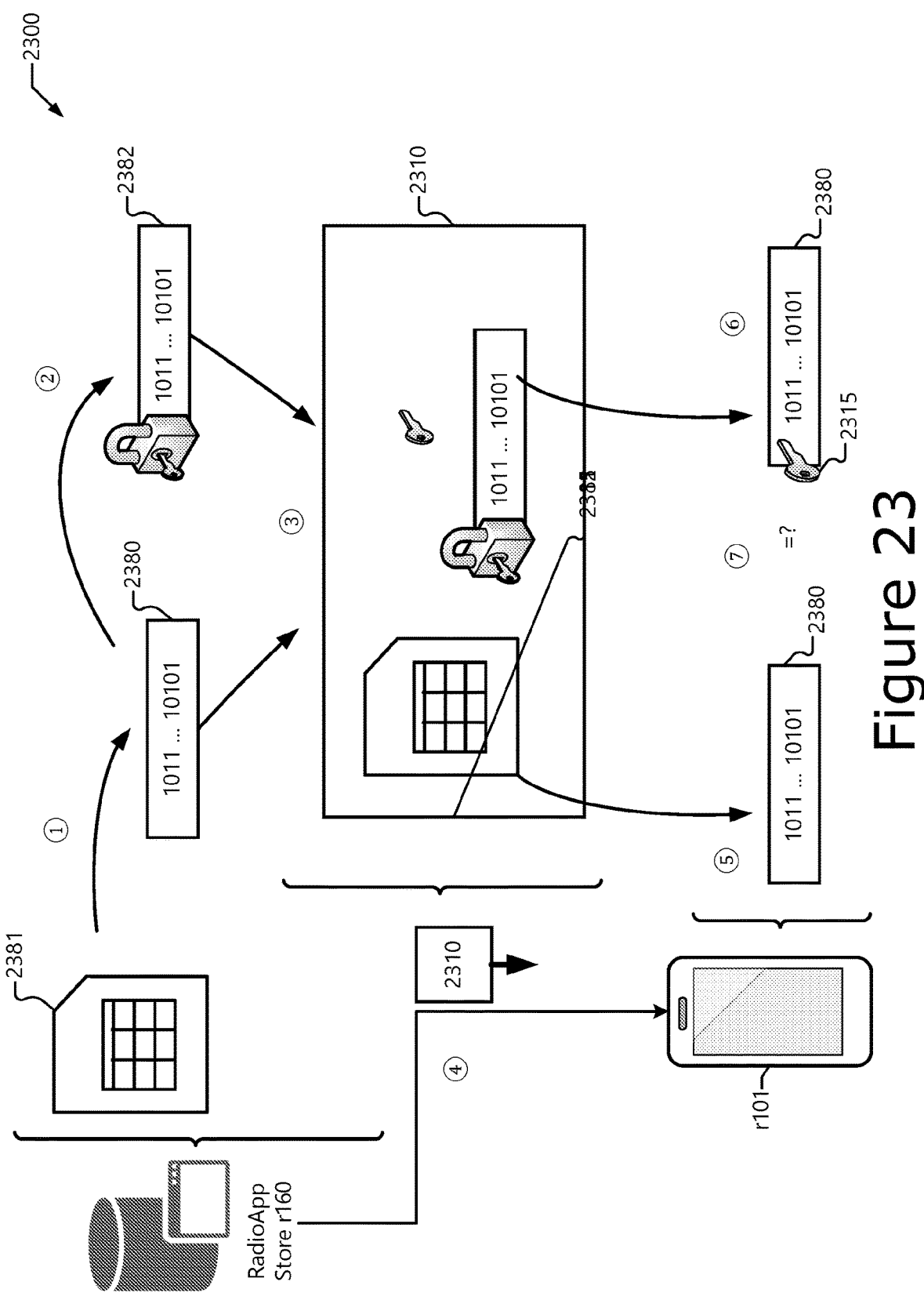
FIG. 23 depicts an example process for creating a digital signature, and authenticating and verifying the digital signature.

FIG. 23 shows security objectives and requirements 2300 for RRS. Functional requirements can be extracted from existing specifications and from other input and that they are combined to achieve the security objectives of the target system. Each functional requirement is realized by a number of implementation requirements. The security objectives include broad intentions (what) including realistic, achievable, measurable, and relevant intentions. The functional requirements include behavioral building blocks such as new and/or existing features, act together to meet the defined objective(s), and/or may relate to more than one objective. The detailed requirements include implementation details (how) such as atomic requirements, structured requirements (e.g., preconditions, stimulus, and response), and categorized (e.g., mandatory, recommended, and optional) requirements.

Each objective is identified against the affected stakeholders or system assets, an indication of the level of system intervention required to meet the objective is given. The following technical objectives for telecommunications services security in the context of RRS hold:

Prevention of masquerade: being able to determine that a user claiming to be Alice is always Alice, Bob is always Bob, and Bob cannot pretend to be Alice; and applies to both masquerade of the user and of the system or service.

Ensure availability of the telecommunications services: the service is to be accessible and usable on demand by an authorized entity.

Maintain privacy of communication: where the parties to a call communicate across public networks mechanisms should exist to prevent eavesdropping; and the only delivery points for communication have to be the legitimate parties to the call.

The Communications Security (ComSec) attributes of a particular radio configuration belong to the radio configuration, the role of RRS in loading and operating a particular radio configuration is to assure the user and operator that the system complies with the base requirements of the technology that the RRS configured radio is being deployed as. For example, if the RRS device is configured as a GSM-900 MHz device it has to comply to the security and system requirements of GSM-900 MHz in addition to any constraints implied by the RRS nature of the device. The security provisions of many RATs (e.g., GSM, LTE, SAE, [IEEE80211])) lie at layers 2 and 3 of the OSI protocol stack and do not directly relate to the physical radio properties addressed by RRS at layer 1.

Some objectives for telecommunication systems include: 1) controlled Access to resources: the system should ensure that unauthorized actors are prevented from gaining access to information or resources of the network or devices; 2)

service availability: the system should be able to provide the required communication services as described in specific service level agreements; 3) protection of confidentiality: the system should provide capabilities to ensure the confidentiality of stored and communicated data; 4) protection of system integrity: the systems should be able to guarantee the integrity of system and its components; 5) protection of data integrity: the system should be able to guarantee the integrity of stored and communicated data; 6) compliance to regulatory framework: the system should be able to guarantee the compliance to the regulations active in the area, where the system operates; and/or 7) accountability: the system should ensure that an entity cannot deny the responsibility for any of its performed actions. In this context, accountability is used as a synonym of Non-Repudiation. 8) Verification of identities: a telecommunication network should provide capabilities to establish and verify the claimed identity of any actor in the telecommunication network.

ComSec is that part of the security domain that deals with the security of a communications channel. The identification of a communications channel in ToE #1 between the Radio-App Store 160 and the RRS-enabled RE 101 is one such channel. The channel itself has a number of characteristics, identified in ToE #1, that open it to attack and for which the following security objectives apply:

Confidentiality: the RRS platform should provide means to ensure that the content of communication between the RadioApp Store 160 and the RE 101 are protected from exposure to unauthorized 3rd parties.

Integrity: the RRS platform should provide means to verify that the content of communication between the Radio-App Store 160 and RE 101 has not been manipulated prior to processing at receipt.

Authenticity: the RRS platform should provide means for the RadioApp Store 160 to verify the identity of the RE. The RRS platform should provide means for the RE 101 to verify the identity of the RadioApp Store 160.

Availability: the RRS platform should provide means to detect and prevent denial of access to the communications channel between the RadioApp Store 160 and the RE 101.

1.6.1. Objectives Arising from Red Analysis

A detail analysis of the [RED] is given in annex A of [TR103087]. The objectives stated below have been extracted from this analysis:

The RRS framework should ensure measures are provided to prevent installation of malicious RAPs.

The RRS framework should ensure measures are provided to prevent modification of an RAP after installation. One motivation is that the RRS framework should maintain The RRS framework should provide means to verify the legitimacy of the DoC and CE marking. This includes the DoC in complete for as well as the combination of the simplified DoC with the referenced complete DoC. These assets are essential to market surveillance and traceability as detailed in clause 7.4.3 of [TR103087].

The RRS platform should provide means to be able to uniquely identify the master copy of the DoC.

Where CE marking and DoC are provided for display of the radio equipment by means of user interaction the RRS platform should provide means to assure that the marking is resistant to tampering. NOTE 3: Where conformity assessment is carried through annex IV, Module H of the [RED], the CE marking plays a critical role in traceability.

The RRS platform should provide means to validate data used to describe the installation requirements of the RAP (the RAP metadata) against the capabilities of the RE 101 and prohibit installations where a mismatch is identified. The assumption is that the set of capabilities offered by the RE 101 (as one of the MDRC variants) is a superset of the capabilities required by a RA with a validated DoC.

1.6.2. Objectives Related to RAP Analysis

The following objectives have been identified from the analysis of Target Of Evaluation (ToE) #2 in [TR103087]:

Integrity: The RRS platform should provide means to verify that the RAP has not been modified between having been made available by the RAP originator and having been downloaded on the RE.

Authenticity: The RRS platform should provide means for the RE 101 to verify the source of the content supplied via the RadioApp Store 160.

Accountability: The RRS platform should allow for a manufacturer to determine whether they did or did not install a given RA 270 on the device, in more details: the RRS platform should provide means to prevent the RadioApp Store 160 denying provision of an App 270 to the RE 101; the RRS platform should provide means to prevent the RE 101 denying receipt of an RA 270 from the RadioApp Store 160; and/or the RRS platform should provide means to prevent the RE 101 denying installation of an RA 270 from the RadioApp Store 160.

1.6.3. RRS Platform Security Classifications

RRS device security is defined by assignment of mandatory security features to the RE 101 and accompanying system in a series of classes or tiers. To avoid confusion with the term class used in the context of Mobile Device Reconfiguration Class (MDRC) the security levels are referred to as tiers, e.g., Tier #1, Tier #2, Tier #3. Each security tier has associated features that are mandatory or optional and are summarized in table 0. The features in Table 1.6-1 require that an RRS device implements a HW root of trust (see e.g., clause 9 of [TS103436]).

TABLE 1.6-1

| | | | Summary of Security features in RRS RE by tier | | | | |
|---|---|---|---|---|---|---|---|
| Tier | Signature validation | Signature creation | Trusted timestamp | Secure store | Remote attestation | Configuration control | Long term management |
| 1 | M | | | | | | |
| 2 | M | M | M | M | | Local - M Remote - O | |
| 3 | M | M | M | M | M | Local - M Remote - M | M | compliance of the RE 101 to the [RED] (e.g., regarding spectrum usage, health and safety, access to emergency services)

1.6.3.1. Signature Validation

Electronic signature validation is provided in all RRS platforms for the validation of the source and integrity of any downloaded RA 270. As defined in clause 5.3 of [TS103436], the RA 270 is be signed and the public key certificate of the signing authority, and any other identifying certificates used in the distribution chain, are provided along with the RA 270. The RE 101 is able to verify the signature and only acts on the content if the authenticity and integrity of the RAP 150 is verified. If the RAP 150 cannot be authenticated, or if the integrity validation fails, the RAP 150 is discarded.

1.6.3.2. Signature Creation

For the purposes of the non-repudiation service defined in clause 5.4 of [TS103436], the RE 101 is able to generate evidence of actions related to the use of RAs 270 and sign the evidence (actions may include installation, deletion, operation). For Tier #2, the RE acts as a Secure Signature Creating Device (SSCD), and for Tier #3 the RE 101 acts as a Qualified Signature Creation Device (QSCD) in accordance with Regulation (EU) No 910/2014 of the European Parliament and of the Council of 23 Jul. 2014 on electronic identification and trust services for electronic transactions in the internal market and repealing Directive 1999/93/EC ("[eIDAS]").

The [eIDAS] directive does not require all signatures to be compliant but as one of the purposes of the non-repudiation service in RRS is to provide proof of an action occurring, that may be tested within a legal framework such as that used for market control of radio equipment, requiring Tier #3 equipment's non-repudiation signatures to be created using a QSCD is intended to increase the assurance of the corresponding RRS equipment across the market control domain.

1.6.3.3. Trusted Timestamp

For the purposes of the non-repudiation service defined in clause 5.4 of [TS103436], the RE is be able to generate evidence of the time any actions related to the use occurred and include the timestamp in the evidence generated.

1.6.3.3.1. Public Key Infrastructure (PKI)-Based Trusted Timestamps

For Tier #2 devices, a Trusted Timestamp complying to Adams et al., "Internet X.509 Public Key Infrastructure Time-Stamp Protocol (TSP)", Internet Engineering Task Force (IETF) Request for Comments (RFC) 3161 (August 2001) ("[RFC3161]") and/or Santesson et al., "ESS-CertIDv2 Update for RFC 3161", IETF RFC 5816 (March 2010) ("[RFC5816]") may be generated. For Tier #3 devices a Trusted Timestamp complying to American National Standard for Financial Services (ANSI): "Trusted Time Stamp Management and Security", Accredited Standards Committee X9, Inc., X9.95 (16. Dec. 2016) ("[ANSI X9.95]") may be generated that in addition to providing 3rd party assurance of the time of the action also provides for proof of the integrity of the timestamped data.

1.6.3.3.2. Blockchain-Based Trusted Timestamps

An alternative to PM-based trusted timestamps is to adopt a blockchain based approach such as that defined in Gipp et al., "Decentralized Trusted Timestamping using the Crypto Currency Bitcoin", National Institute of Informatics Tokyo, Japan (13 Feb. 2015), which is hereby incorporated by reference in its entirety. The a blockchain based approach removes the requirement for a centralized Trusted Timestamp Authority (TTA) and replaces it with the distributed trust model of a blockchain.

1.6.3.4. Secure Storage

In addition to security keys held by the RRS elements to allow for validation of signed content, and for Tier 2 and Tier 3 systems to generate signed content the following elements is maintained in secure storage: evidence generated by the non-repudiation service; and proofs of RAP 150 integrity and the binding of a RAP 150 to the RE 101.

Proofs of RAP integrity and the binding to an RE 101 require the use of a Root of Trust for Measurement as described in clause 9 of [TS103436]. The characteristics to be met by the secure storage element are the following: Tamper resistant; Tamper evident; and Persistent.

1.6.3.5. Remote Attestation

Remote attestation for RRS enables an RE to prove to a remote system the authenticity and integrity of its HW and SW configuration. Thus for RRS the authorized remote system is able to determine the level of trust in the integrity of the RE. The remote attestation service extends the non-repudiation service by allowing for online attestation and delivery of proof (e.g., for non-repudiation the evidence of an action is made available to a trusted third party at the time of the action, whereas for remote attestation evidence of the integrity of the platform is given on demand). The scope of remote attestation is limited, as defined in [TR103087], to the following use cases: verification of compliance to the essential requirements of the [RED] by the market surveillance authority; Verification of RRS platform status for device management purpose by the manufacturer; verification of the active set of RAs 270 by the disturbance control authority; and verification of specific type and version of an RA 270 for access control by a mobile network operator. The detail definition of the remote attestation service is given in clause 10 of [TS103436].

1.6.3.6. Configuration Control 1.6.3.6.1. Local Configuration Control

The purpose of configuration control is to only allow installation and operation of RAPs 150 that are listed in the RE Configuration Policy. The RE Configuration Policy is made available to a policy enforcement entity and the following pseudo code may be implemented (see e.g., clause 11 of [TS103436]): IF «RAP» EXISTS IN «RE Configuration Policy» THEN PERMIT, ELSE DENY.

1.6.3.6.2. Remote Configuration Control

The remote configuration control service extends the local configuration control service by enabling the authorized party to be external to the RE (see e.g., clause 11.4 of [TS103436]).

1.6.3.6.3. Long Term Management

The long-term management service extends the local configuration control service by enabling the transfer of configuration authority over the RRS Platform from one entity to another (see e.g., clause 11.5 of [TS103436]).

1.6.4. Digital Signature Aspects

FIG. 23 shows a process 2300 for creating a digital signature and authenticating and verifying the digital signature in accordance with various embodiments, is shown. Process 2300 is a cryptographically based signature assurance scheme and is used in the context of public key infrastructure (PM) schemes in which a public key used in the signature scheme is tied or bound to an RE 101 and/or an RA 270 by a digital identity certificate issued by a certificate authority. Process 2300 may be used to provide an RE 101 with assurance that a RAP 270 is obtained from a trusted source and that the DoC 481 of the RE 101 is a true statement of the legality of the device. In this regard, the RE 101 may use process 2300 to verify the RAP's integrity and the authenticity of the source (e.g., the RadioApp Store 160), and that the RAP 270 has been allowed on their specific RE 101 by verifying the attestation of the RE manufacturer.

Referring now to FIG. 23, process 2300 may begin at operation 1 where the RadioApp Store 160 (or other DoC/RAP providing entity) may calculate a cryptographic hash 2380, for example, by using a package or document 2381 as an input to a hash function (e.g., SHA-3 and/or the like). The document 2381 may be a DoC or a RAP 105.

At operation 2, the RadioApp Store 160 may generate an encrypted hashcode 2382 by encrypting the hashcode 2380 using a private key of the RadioApp Store 160.

At operation 3, the RadioApp Store 160 may generate a digital signature 2310 (also referred to as a "DoC signature 2310", an "attribute signature 2310", and the like) by packaging the (unencrypted and unhashed) document 2381 with the encrypted hashcode 2382. In some embodiments, the digital signature 2310 may also include a public key 2315 of the signer, while in other embodiments, the public key 2315 may be provided separate from the digital signature 2310.

At operation 4, the RadioApp Store 160 may provide the digital signature 2310 to the RE 101. When the document 2381 is the RAP 105, the digital signature 2310 may be obtained by the RE 101 in the DownloadRAPCnf signal/message. When the document 2381 is the DoC 481, the digital signature 2310 may be obtained by the RE 101 in the DownloadRAPCnf signal/message, or the digital signature 2381 may be obtained from a remote system (e.g., the RadioApp Store 160 or other like entity) using a pointer or location ID, for example, a URL, and/or the like, and providing the remote system with an RE ID, RE type ID, and/or the like. In some embodiments, the digital signature may include two documents 2381, wherein a first document 2381 is the RAP 105 and a second document 2381 is the DoC.

Once received, at operation 5 the RE 101 may extract the document 2381 from the digital signature 2310 and may calculate the hashcode 2380 by hashing the document 2381. At operation 6, the RE 101 may decrypt the encrypted hashcode 2380 using a public key 2315 of the sender (e.g., the RadioApp Store 160). At operation 23, the RE 101 may compare the hashcode 2380 calculated using the DoC with the decrypted hashcode 2380. If the two values do not match, then the document 2381 may have been changed after signing or the digital signature may not have been generated using the private key of the sender. In this way, the hashcode 2380 calculated from the document 2381 may provide proof of integrity of the document 2381, and the encryption of the hashcode 2380 with the sender's private key may provide proof of authenticity of identity of the source/sender. In this way, the document 2381 may be considered to be bound to the public key of the sender.

In various embodiments, the public key (or portions thereof) of the sender may include or be based on an RE type ID (e.g., a unique identifier for a particular type of device or equipment). In such embodiments, the document 2381 (e.g., either the DoC or the RAP 105) may be considered to be bound to an RE type. In various embodiments, the public key (or portions thereof) of the sender may include or be based on an RE ID (e.g., a unique identifier for a particular device, such as a serial number). In such embodiments, the document 2381 (e.g., either the DoC or the RAP 105) may be considered to be bound to an RE instance.

1.7. Modular Software Reconfiguration for Radio Equipment Embodiments

The SW reconfiguration approaches discussed herein enable reconfiguration of REs through SW as specified in ETSI EN 303 641 v1.1.2 (2020 March) ("[EN303641]"), ETSI EN 303 648 v1.1.2 (2020 March) ("[EN303648]"), ETSI EN 303 681-1 v1.1.2 (2020 June) ("[EN303681-1]"), ETSI EN 303 681-2 v1.1.2 (2020 June) ("[EN303681-2]"), and ETSI EN 303 681-4 V1.1.2 (2020 June) ("[EN303681-

4]"), and the use cases discussed in ETSI TR 103 585 v1.1.1 (2018 February) ("[TR103585]"); the overall framework is complemented by security solutions such as those discussed in ETSI TS 103 436 v1.2.1 (2018 February) ("[TS103436]"). The specific case of Mobile Device reconfiguration is addressed in ETSI EN 303 095 v1.3.1 (2018 May) ("[EN303095]"), ETSI EN 303 146-1 v1.3.1 (2018 June) ("[EN303146-1]"), ETSI EN 303 146-2 v1.1.5 (2016 March) ("[EN303146-2]"), ETSI EN 303 146-3 v1.3.1 (2018 June) ("[EN303146-3]"), ETSI EN 303 146-4 v1.1.1 (2017 January) ("[EN303146-4]"), ETSI TR 103 087 v1.2.1 (2017 November) ("[TR103087]"), and [TS103436]. The SW reconfiguration approaches have been designed from a holistic perspective with an emphasis on the needs of commercial equipment, addressing: technical requirements (e.g., code portability and efficiency), security requirements (e.g., security delivery and installation of SW components), and regulatory requirements (e.g., technical solutions for re-certification of platforms when radio characteristics are modified).

In various implementations, reconfiguration can be performed on an individual level (e.g., users choosing among new features for their respective component) or en-mass (e.g., automatic upgrade of all platforms). Reconfigurable REs may also be tailored to the needs of the [RED], which includes articles on SW reconfiguration. Specific attention is given to security requirements, addressing in particular: proof of conformance of the radio platform 220 and radio applications to the regulatory DoC, considering that the set of installed radio applications can change over time; proof of the integrity of radio applications; proof of the identity of the developer of radio applications; built-in support for security updates; and prevention of code theft.

Moving from today's HW design principles to SW reconfiguration solutions will likely require a paradigm change, which can take place in a gradual step-wise approach. For example, in a first-generation implementation, the functionality may be limited to a replacement of specific (hardwired) components by executable SW, designed specifically for a given target platform. Features such as secure delivery of SW components and installation will be sufficient to address this need. HW resources (e.g., FPGA resources) may be added to the original design to enable the replacement. Second-generation implementations may build on the first-generation implementations to design portable and highly (power) efficient code based on the RVM 271. The RVM 271 is a representation of a radio algorithm and may be somewhat different from other virtual machine concepts as generally applied in the computer science and IT arts. Furthermore, the level of autonomy of the platform may evolve over time, including distributed selection of the most relevant features and dynamic replacement of corresponding SW components.

With the above features, the SW reconfiguration solution is suited to meet the requirements of 5G and beyond applications. For example, it will enable automotive communication platforms to remain relevant over the lifetime of a vehicle and to address platform vulnerabilities which may arise over the lifetime of a vehicle, enable product adaptation to specific market needs for Internet of Things (IoT) solutions, and/or the like.

1.7.1. Use Case 1—Smartphone Reconfiguration

Figure 24:
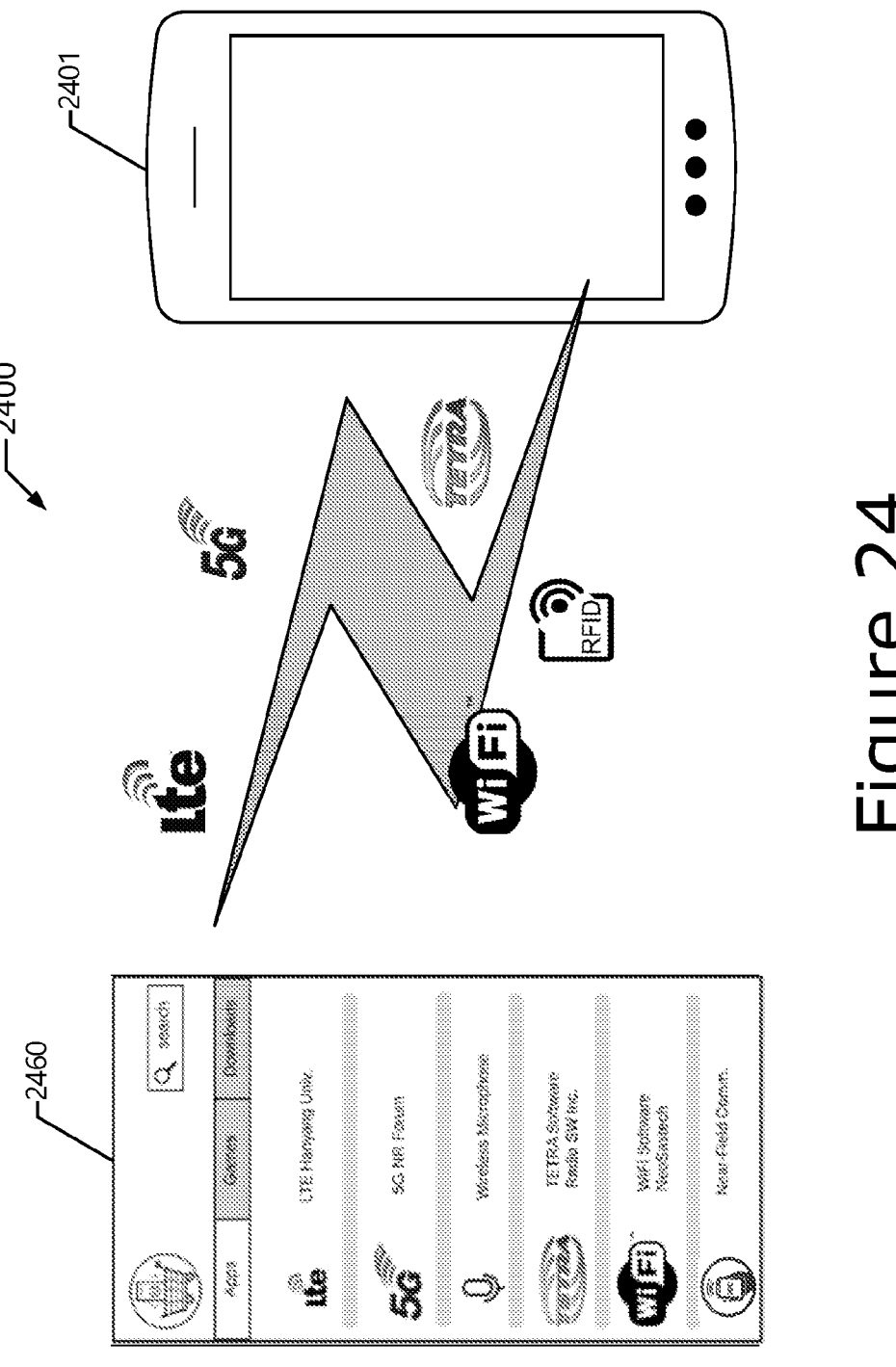
FIG. 24 illustrates an example smartphone reconfiguration use case.

FIG. 24 shows an example smartphone reconfiguration use case 2400. In today's world, the usage of smartphone apps is ubiquitous. These apps provide new tools or games to the end-user without altering any radio parameters. The ETSI SW reconfiguration solution provides a framework for introducing RadioApps 270, which are apps that extend or modify existing radio features and define solutions for technical, certification, and security needs.

Such RadioApps 270 will be used to optimize the operation of a smartphone 2401 in general or for usage in a specific market with special needs. In an example, Radio-Apps 270 are used to optimize the operation of a smartphone 2401 in response to the introduction of new features on the network side as they evolve in future releases of 3GPP standards. In addition, an optimum configuration is identified (e.g., new power-efficient modulation and coding schemes, and/or the like) to meet power efficiency (see e.g., Siaud et al., *Green-oriented multi-techno link adaptation metrics for 5G heterogeneous networks*, EURASIP J Wireless Com Networking, 2016, Art. No. 92, pp. 1-13 (1 Apr. 2016)), predictable QoS, and other requirements. An example of specific market usages, in an industrial environment, new mechanisms may be added through SW reconfiguration taking the specific characteristics of the usage environment into account. Beyond the provisioning of additional modules, the ETSI framework also allows for the replacement of entire RATs in cases where sufficient computational resources are available.

1.7.2. Use Case 2—Automotive Applications

Automotive communication is currently a key trend in the industry. Solutions for Vehicle-to-Everything (V2X) communications, including Vehicle-to-Vehicle (V2V), Vehicle-to-Infrastructure (V2I), and/or the like, are currently being developed with the objective to guarantee a safe(r) driving environment for the future. The challenge is to ensure that a radio communications component remains relevant over the entire lifetime of a vehicle, e.g. ten years and beyond. It is almost certain that a V2X framework feature-set will evolve within this period. SW reconfiguration will enable manufacturers to replace specific SW, and thus, maintain related feature-sets up to date without requiring changes to the HW. This approach reduces the overall cost for change since a vehicle does not need to be upgraded by an authorized dealer (as it would be required for HW changes), but the process is handled through over-the-air remote control.

1.7.3. Use Case 3—Radio Access Network (RAN) Reconfiguration

With the evolution of wireless standards, network functions need to be updated. In this use case, the installation of RadioApps can be used to provide updated or new features which address the radio characteristics of the network. Network functions are distributed across a variety of physical entities which all require dedicated SW updates for the provisioning of a specific new service. Such equipment may then be further connected to a larger network, for example through wireless or cabled backbone network access. In this use case, the network operator is able to alter or extend the functionalities of this equipment through installation of suitable RadioApps.

1.7.4. Use Case 4—Internet-of-Things Device Reconfiguration

Future IoT devices, including 5G and beyond, will address a substantial variety of use cases, encompassing for example gaming, voice communication, medical applications, industrial automation, and/or the like. Each such application has its particular needs in terms of features, form factors, and/or the like. Due to quasi-infinite possibilities, it is unlikely that chipmakers will offer tailored components for each application. Rather, a limited number of generic and reconfigurable components will be made available which are suitably tailored to the target market through SW components. The ETSI SW reconfiguration solution provides a suitable ecosystem to support the future IoT market needs.

1.7.5. Use Case 5—Radio Reconfiguration Through an External Component

This use case concerns standalone radio external components that embed all the capabilities necessary to radio processing. The host device is not involved in radio processing but may configure operational parameters as allowed by the external component (e.g., a USB Stick). Thus, the separation between the host device and the external component is clear and embodied by the physical interface between the two. On the host device, only a device driver is necessary to operate the external component and integrate it into the networking stack. In order to reconfigure the external component, the host device may be used as a staging area to store Radio Applications which are then loaded on the external component via the device driver (e.g., the device driver may leverage the Administrator).

1.7.6. Use Case 6—Reconfigurable Satellite Telecom Payload

Figure 25:
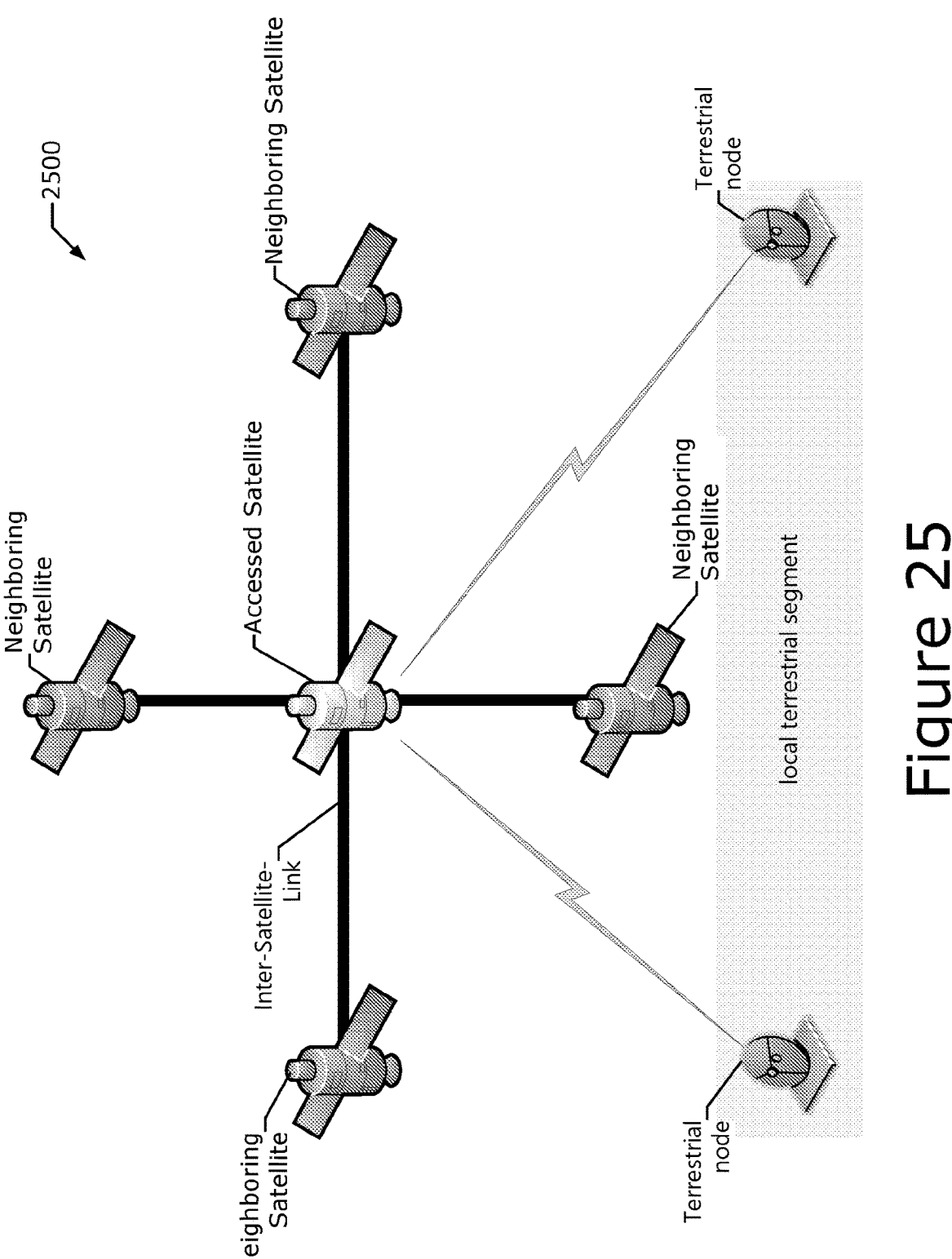
FIG. 25 illustrates an example of software reconfiguration enabling satellite telecom payload.

FIG. 25 shows a satellite SW reconfiguration example 2500 for enabling satellite telecom payload. The lifetime of satellites varies from a few years for Low Earth Orbiting (LEO) satellites 2501 and 2502 until 10 or even 15 years for Geostationary Earth Orbit (GEO) satellites. The satellites 2501 and 2502 may be the same or similar the one or more satellites 2801 discussed infra with respect to FIG. 28. This fact and the rapid progress in the field of digital communications raise the problem of technological obsolescence of onboard telecom payload. The emergence of new signal processing algorithms and new standards that provide reliable and high-speed transmission of information requires the reconfiguration of the onboard equipment. Satellite communication systems are considered as a part of the global network infrastructure with the integrated satellite segment. Therefore, they should be provisioned within the same management framework as the terrestrial segment, including the management approach for radio SW reconfiguration.

1.7.7 Use Case 7—Bug-Fix and Security Updates

Bug-fixes and security updates are essential to the maintenance of SW, and as such also for a Radio Application throughout its lifecycle. Bug-fixes help ensure that Radio Applications will behave according to specification even after the Radio Application has been installed on a device. Security updates help ensure the integrity of an implementation. Application security is an evolving field and implementations believed to be secure at some point in time may later become insecure as new attack methods are devised.

1.7.8. Use Case 8—Medical Applications

Medical applications, such as remote surgery, monitoring of patient's life support data, and the like, require highly reliable and stable communication systems. Still, SW reconfiguration is expected to be broadly applied in order to enable users to have access to latest SW updates and best possible functionalities. For example, in this context it is of specific importance to immediately remedy any incorrect behavior or security vulnerabilities in order to ensure a maximum level of protection.

2. Edge Computing System Configurations and Arrangements

Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, and/or the like) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, and/or the like) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of SW that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, and/or the like). The orchestration functions may be used to deploy the isolated user-space instances, identifying and scheduling use of specific HW, security related functions (e.g., key management, trust anchor management, and/or the like), and other tasks related to the provisioning and lifecycle of isolated user spaces. Applications that have been adapted for edge computing include but are not limited to virtualization of traditional network functions including include, for example, Software-Defined Networking (SDN), NFV, distributed RAN units and/or RAN clouds, and the like. Additional example use cases for edge computing include computational offloading, Content Data Network (CDN) services (e.g., video on demand, content streaming, security surveillance, alarm system monitoring, building access, data/content caching, and/or the like), gaming services (e.g., AR/VR, and/or the like), accelerated browsing, IoT and industry applications (e.g., factory automation), media analytics, live streaming/transcoding, and V2X applications (e.g., driving assistance and/or autonomous driving applications).

The present disclosure provides specific examples relevant to various edge computing configurations provided within and various access/network implementations. Any suitable standards and network implementations are applicable to the edge computing concepts discussed herein. For example, many edge computing/networking technologies may be applicable to the present disclosure in various combinations and layouts of devices located at the edge of a network. Examples of such edge computing/networking technologies include [MEC]; [O-RAN]; [ISEO]; [SA6Edge]; Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes of the present disclosure.

Figure 26:
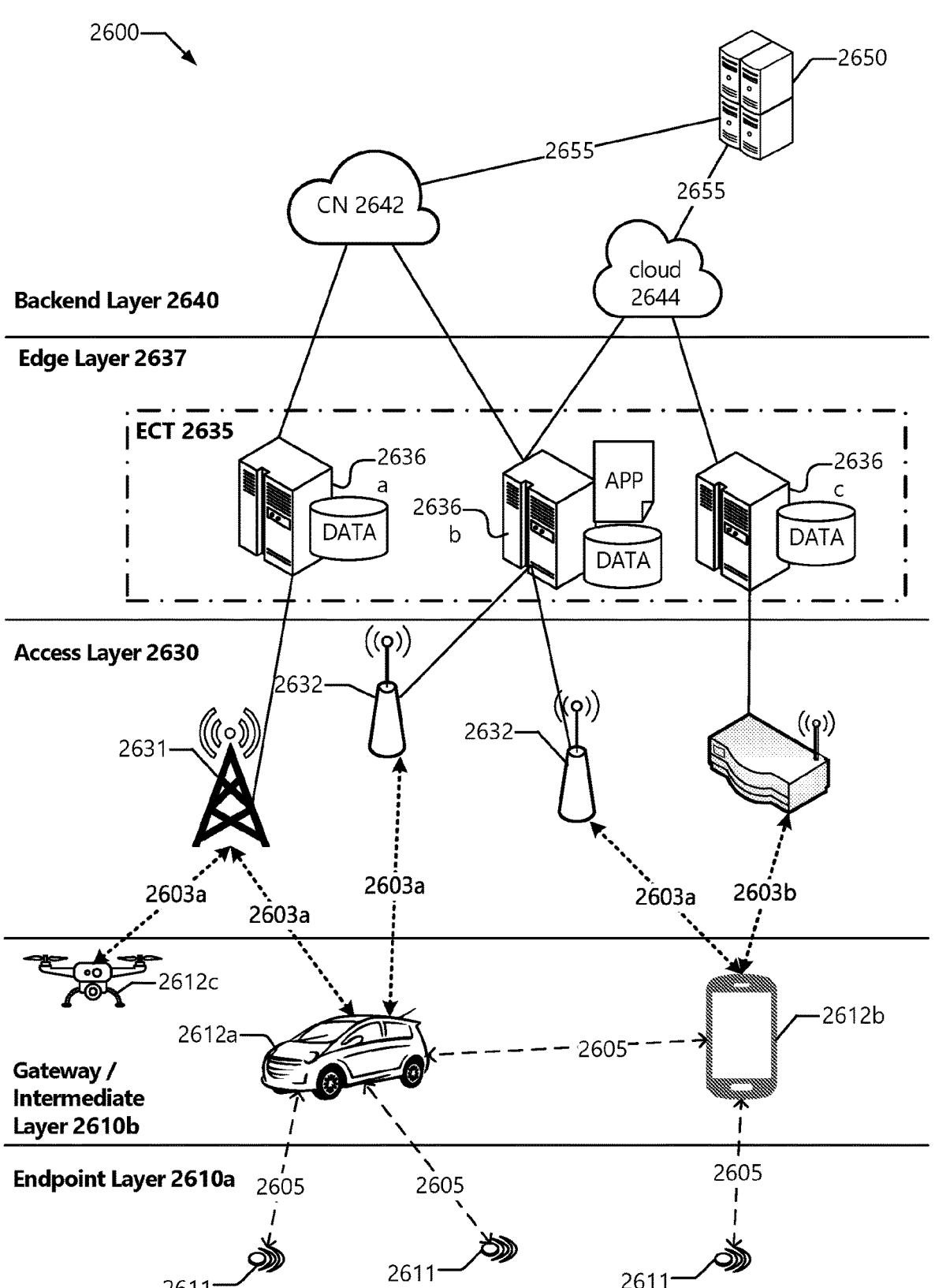
FIG. 26 illustrates an example edge computing environment.

FIG. 26 illustrates an example edge computing environment 2600 including different layers of communication, starting from an endpoint layer 2610a (also referred to as "sensor layer 2610a", "things layer 2610a", or the like) including one or more IoT devices 2611 (also referred to as "endpoints 2610a" or the like) (e.g., in an Internet of Things (IoT) network, wireless sensor network (WSN), fog, and/or mesh network topology); increasing in sophistication to intermediate layer 2610b (also referred to as "client layer 2610b", "gateway layer 2610b", or the like) including various user equipment (UEs) 2612a, 2612b, and 2612c (also referred to as "intermediate nodes 2610b" or the like), which may facilitate the collection and processing of data from endpoints 2610a; increasing in processing and connectivity sophistication to access layer 2630 including a set of network access nodes (NANs) 2631, 2632, and 2633 (collectively referred to as "NANs 2630" or the like); increasing in processing and connectivity sophistication to edge layer 2637 including a set of edge compute nodes 2636a-c (collectively referred to as "edge compute nodes 2636" or the like) within an edge computing framework 2635 (also referred to as "ECT 2635" or the like); and increasing in connectivity and processing sophistication to a backend layer 2640 including core network (CN) 2642, cloud 2644, and server(s) 2650. The processing at the backend layer 2640 may be enhanced by network services as performed by one or more remote servers 2650, which may be, or include, one or more CN functions, cloud compute nodes or clusters, application (app) servers, and/or other like systems and/or devices. Some or all of these elements may be equipped with or otherwise implement some or all features and/or functionality discussed herein.

The environment 2600 is shown to include end-user devices such as intermediate nodes 2610b and endpoint nodes 2610a (collectively referred to as "nodes 2610", "UEs 2610", or the like), which are configured to connect to (or communicatively couple with) one or more communication networks (also referred to as "access networks," "radio access networks," or the like) based on different access technologies (or "radio access technologies") for accessing application, edge, and/or cloud services. These access networks may include one or more NANs 2630, which are arranged to provide network connectivity to the UEs 2610 via respective links 2603a and/or 2603b (collectively referred to as "channels 2603", "links 2603", "connections 2603", and/or the like) between individual NANs 2630 and respective UEs 2610.

As examples, the communication networks and/or access technologies may include cellular technology such as LTE, MuLTEfire, and/or NR/5G (e.g., as provided by Radio Access Network (RAN) node 2631 and/or RAN nodes 2632), WiFi or wireless local area network (WLAN) technologies (e.g., as provided by access point (AP) 2633 and/or RAN nodes 2632), and/or the like. Different technologies exhibit benefits and limitations in different scenarios, and application performance in different scenarios becomes dependent on the choice of the access networks (e.g., WiFi, LTE, and/or the like) and the used network and transport protocols (e.g., Transfer Control Protocol (TCP), Virtual Private Network (VPN), Multi-Path TCP (MPTCP), Generic Routing Encapsulation (GRE), and/or the like).

The intermediate nodes 2610b include UE 2612a, UE 2612b, and UE 2612c (collectively referred to as "UE 2612" or "UEs 2612"). In this example, the UE 2612a is illustrated as a vehicle system (also referred to as a vehicle UE or vehicle station), UE 2612b is illustrated as a smartphone (e.g., handheld touchscreen mobile computing device connectable to one or more cellular networks), and UE 2612c is illustrated as a flying drone or unmanned aerial vehicle (UAV). However, the UEs 2612 may be any mobile or non-mobile computing device, such as desktop computers, workstations, laptop computers, tablets, wearable devices, PDAs, pagers, wireless handsets smart appliances, single-board computers (SBCs) (e.g., Raspberry Pi, Arduino, Intel Edison, and/or the like), plug computers, and/or any type of computing device such as any of those discussed herein.

The endpoints 2610 include UEs 2611, which may be IoT devices (also referred to as "IoT devices 2611"), which are uniquely identifiable embedded computing devices (e.g., within the Internet infrastructure) that comprise a network access layer designed for low-power IoT applications utilizing short-lived UE connections. The IoT devices 2611 are any physical or virtualized, devices, sensors, or "things" that are embedded with HW and/or SW components that enable the objects, devices, sensors, or "things" capable of capturing and/or recording data associated with an event, and capable of communicating such data with one or more other devices over a network with little or no user intervention. As examples, IoT devices 2611 may be abiotic devices such as autonomous sensors, gauges, meters, image capture devices, microphones, light emitting devices, audio emitting devices, audio and/or video playback devices, electro-mechanical devices (e.g., switch, actuator, and/or the like), EEMS, ECUs, ECMs, embedded systems, microcontrollers, control modules, networked or "smart" appliances, MTC devices, M2M devices, and/or the like. The IoT devices 2611 can utilize technologies such as M2M or MTC for exchanging data with an MTC server (e.g., a server 2650), an edge server 2636 and/or ECT 2635, or device via a PLMN, ProSe or D2D communication, sensor networks, or IoT networks. The M2M or MTC exchange of data may be a machine-initiated exchange of data.

The IoT devices 2611 may execute background applications (e.g., keep-alive messages, status updates, and/or the like) to facilitate the connections of the IoT network. Where the IoT devices 2611 are, or are embedded in, sensor devices, the IoT network may be a WSN. An IoT network describes an interconnecting IoT UEs, such as the IoT devices 2611 being connected to one another over respective direct links 2605. The IoT devices may include any number of different types of devices, grouped in various combinations (referred to as an "IoT group") that may include IoT devices that provide one or more services for a particular user, customer, organizations, and/or the like A service provider (e.g., an owner/operator of server(s) 2650, CN 2642, and/or cloud 2644) may deploy the IoT devices in the IoT group to a particular area (e.g., a geolocation, building, and/or the like) in order to provide the one or more services. In some implementations, the IoT network may be a mesh network of IoT devices 2611, which may be termed a fog device, fog system, or fog, operating at the edge of the cloud 2644. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 2644 to Things (e.g., IoT devices 2611). The fog may be established in accordance with specifications released by the OFC, the OCF, among others. Additionally or alternatively, the fog may be a tangle as defined by the IOTA foundation.

The fog may be used to perform low-latency computation/aggregation on the data while routing it to an edge cloud computing service (e.g., edge nodes 2630) and/or a central cloud computing service (e.g., cloud 2644) for performing heavy computations or computationally burdensome tasks. On the other hand, edge cloud computing consolidates human-operated, voluntary resources, as a cloud. These voluntary resource may include, inter-alia, intermediate nodes 2620 and/or endpoints 2610, desktop PCs, tablets, smartphones, nano data centers, and the like. In various implementations, resources in the edge cloud may be in one to two-hop proximity to the IoT devices 2611, which may result in reducing overhead related to processing data and may reduce network delay.

Additionally or alternatively, the fog may be a consolidation of IoT devices 2611 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

Additionally or alternatively, the fog may operate at the edge of the cloud 2644. The fog operating at the edge of the cloud 2644 may overlap or be subsumed into an edge network 2630 of the cloud 2644. The edge network of the cloud 2644 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 2636 or edge devices). The Fog layer resides on top of the edge layer and is a consolidation of networking devices such as the intermediate nodes 2620 and/or endpoints 2610 of FIG. 26.

Data may be captured, stored/recorded, and communicated among the IoT devices 2611 or, for example, among the intermediate nodes 2620 and/or endpoints 2610 that have direct links 2605 with one another as shown by FIG. 26. Analysis of the traffic flow and control schemes may be implemented by aggregators that are in communication with the IoT devices 2611 and each other through a mesh network. The aggregators may be a type of IoT device 2611 and/or network appliance. In the example of FIG. 26, the aggregators may be edge nodes 2630, or one or more designated intermediate nodes 2620 and/or endpoints 2610. Data may be uploaded to the cloud 2644 via the aggregator, and commands can be received from the cloud 2644 through gateway devices that are in communication with the IoT devices 2611 and the aggregators through the mesh network. Unlike the traditional cloud computing model, in some implementations, the cloud 2644 may have little or no computational capabilities and only serves as a repository for archiving data recorded and processed by the fog. In these implementations, the cloud 2644 centralized data storage system and provides reliability and access to data by the computing resources in the fog and/or edge devices. Being at the core of the architecture, the Data Store of the cloud 2644 is accessible by both Edge and Fog layers of the aforementioned edge-fog network.

As mentioned previously, the access networks provide network connectivity to the end-user devices 2620, 2610 via respective NANs 2630. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. Additionally or alternatively, all or parts of the RAN may be implemented as one or more SW entities running on server computers as part of a virtual network, which may be referred to as a cloud RAN (CRAN), Cognitive Radio (CR), a virtual baseband unit pool (vB-BUP), and/or the like. Additionally or alternatively, the CRAN, CR, or vBBUP may implement a RAN function split, wherein one or more communication protocol layers are operated by the CRAN/CR/vBBUP and other communication protocol entities are operated by individual RAN nodes 2631, 2632. This virtualized framework allows the freed-up processor cores of the NANs 2631, 2632 to perform other virtualized applications, such as virtualized applications for various elements discussed herein.

The UEs 2610 may utilize respective connections (or channels) 2603a, each of which comprises a physical communications interface or layer. The connections 2603a are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein.

Additionally or alternatively, the UEs 2610 and the NANs 2630 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 2610 and NANs 2630 may operate using LAA, enhanced LAA (eLAA), and/or further eLAA (feLAA) mechanisms. The UEs 2610 may further directly exchange communication data via respective direct links 2605, which may be LTE/NR Proximity Services (ProSe) link or PC5 interfaces/links, or WiFi based links or a personal area network (PAN) based links (e.g., [IEEE802154] based protocols including ZigBee, IPv6 over Low power Wireless Personal Area Networks (6LoWPAN), WirelessHART, MiWi, Thread, and/or the like; WiFi-direct; Bluetooth/Bluetooth Low Energy (BLE) protocols).

Additionally or alternatively, individual UEs 2610 provide radio information to one or more NANs 2630 and/or one or more edge compute nodes 2636 (e.g., edge servers/hosts, and/or the like). The radio information may be in the form of one or more measurement reports, and/or may include, for example, signal strength measurements, signal quality measurements, and/or the like. Each measurement report is tagged with a timestamp and the location of the measurement (e.g., the UEs 2610 current location). As examples, the measurements collected by the UEs 2610 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet error ratio (PER), packet loss rate, packet reception rate (PRR), data rate, peak data rate, end-to-end (e2e) delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio (Eb/N0), energy per chip to interference power density ratio (Ec/I0), energy per chip to noise power density ratio (Ec/N0), peak-to-average power ratio (PAPR), reference signal received power (RSRP), reference signal received quality (RSRQ), received signal strength indicator (RSSI), received channel power indicator (RCPI), received signal to noise indicator (RSNI), Received Signal Code Power (RSCP), average noise plus interference (ANPI), GNSS timing of cell frames for UE positioning for E-UTRAN or 5G/NR (e.g., a timing between an AP or RAN node reference time and a GNSS-specific reference time for a given GNSS), GNSS code measurements (e.g., the GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurements, thermal noise power measurements, received interference power measurements, power histogram measurements, channel load measurements, STA statistics, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR), and RSRP, RSSI, RSRQ, RCPI, RSNI, and/or ANPI measurements of various beacon, Fast Initial Link Setup (FILS) discovery frames, or probe response frames for WLAN/WiFi (e.g., [IEEE80211]) networks. Other measurements may be additionally or alternatively used, such as those discussed in 3GPP TS 36.214 v16.2.0 (2021 Mar. 31) ("[TS36214]"), 3GPP TS 38.215 v16.4.0 (2021 Jan. 8) ("[TS38215]"), 3GPP TS 38.314 v16.4.0 (2021 Sep. 30) ("[TS38314]"), *IEEE Standard for Information Technology—Telecommunications and Information Exchange between Systems—Local and Metropolitan Area Networks—Specific Requirements—Part* 11: *Wireless LAN Medium Access Control (MAC) and Physical Layer (PHY) Specifications, IEEE Std* 802.11-2020, pp. 1-4379 (26 Feb. 2021) ("[IEEE80211]"), and/or the like. Additionally or alternatively, any of the aforementioned measurements (or combination of measurements) may be collected by one or more NANs 2630 and provided to the edge compute node(s) 2636.

Additionally or alternatively, the measurements can include one or more of the following measurements: measurements related to Data Radio Bearer (DRB) (e.g., number of DRBs attempted to setup, number of DRBs successfully setup, number of released active DRBs, in-session activity time for DRB, number of DRBs attempted to be resumed, number of DRBs successfully resumed, and/or the like); measurements related to Radio Resource Control (RRC) (e.g., mean number of RRC connections, maximum number of RRC connections, mean number of stored inactive RRC connections, maximum number of stored inactive RRC connections, number of attempted, successful, and/or failed RRC connection establishments, and/or the like); measurements related to UE Context (UECNTX); measurements related to Radio Resource Utilization (RRU) (e.g., DL total PRB usage, UL total PRB usage, distribution of DL total PRB usage, distribution of UL total PRB usage, DL PRB used for data traffic, UL PRB used for data traffic, DL total available PRBs, UL total available PRBs, and/or the like); measurements related to Registration Management (RM); measurements related to Session Management (SM) (e.g., number of PDU sessions requested to setup; number of PDU sessions successfully setup; number of PDU sessions failed to setup, and/or the like); measurements related to GTP Management (GTP); measurements related to IP Management (IP); measurements related to Policy Association (PA); measurements related to Mobility Management (MM) (e.g., for inter-RAT, intra-RAT, and/or Intra/Inter-frequency handovers and/or conditional handovers: number of requested, successful, and/or failed handover preparations; number of requested, successful, and/or failed handover resource allocations; number of requested, successful, and/or failed handover executions; mean and/or maximum time of requested handover executions; number of successful and/or failed handover executions per beam pair, and/or the like); measurements related to Virtualized Resource(s) (VR); measurements related to Carrier (CARR); measurements related to QoS Flows (QF) (e.g., number of released active QoS flows, number of QoS flows attempted to release, in-session activity time for QoS flow, in-session activity time for a UE 2610, number of QoS flows attempted to setup, number of QoS flows successfully established, number of QoS flows failed to setup, number of initial QoS flows attempted to setup, number of initial QoS flows successfully established, number of initial QoS flows failed to setup, number of QoS flows attempted to modify, number of QoS flows successfully modified, number of QoS flows failed to modify, and/or the like); measurements related to Application Triggering (AT); measurements related to Short Message Service (SMS); measurements related to Power, Energy and Environment (PEE); measurements related to network service(s) and/or NF service (NFS); measurements related to Packet Flow Description (PFD); measurements related to Random Access Channel (RACH); measurements related to Measurement Report (MR); measurements related to Layer 1 Measurement (L1M); measurements related to Network Slice Selection (NSS); measurements related to Paging (PAG); measurements related to Non-IP Data Delivery (NIDD); measurements related to external parameter provisioning (EPP); measurements related to traffic influence (TI); measurements related to Connection Establishment (CE); measurements related to Service Parameter Provisioning (SPP); measurements related to Background Data Transfer Policy (BDTP); measurements related to Data Management (DM); and/or any other performance measurements such as those discussed in 3GPP TS 28.552 v17.3.1 (2021 Jun. 24) ("[TF5285521]"), 3GPP TS 32.425 v17.1.0 (2021 Jun. 24) ("[TS32425]"), and/or the like.

The radio information may be reported in response to a trigger event and/or on a periodic basis. Additionally or alternatively, individual UEs 2610 report radio information either at a low periodicity or a high periodicity depending on a data transfer that is to take place, and/or other information about the data transfer. Additionally or alternatively, the edge compute node(s) 2636 may request the measurements from the NANs 2630 at low or high periodicity, or the NANs 2630 may provide the measurements to the edge compute node(s) 2636 at low or high periodicity. Additionally or alternatively, the edge compute node(s) 2636 may obtain other relevant data from other edge compute node(s) 2636, core network functions (NFs), application functions (AFs), and/or other UEs 2610 such as Key Performance Indicators (KPIs), with the measurement reports or separately from the measurement reports.

Additionally or alternatively, in cases where is discrepancy in the observation data from one or more UEs, one or more RAN nodes, and/or core network NFs (e.g., missing reports, erroneous data, and/or the like) simple imputations may be performed to supplement the obtained observation data such as, for example, substituting values from previous reports and/or historical data, apply an extrapolation filter, and/or the like. Additionally or alternatively, acceptable bounds for the observation data may be predetermined or configured. For example, CQI and MCS measurements may be configured to only be within ranges defined by suitable 3GPP standards. In cases where a reported data value does not make sense (e.g., the value exceeds an acceptable range/bounds, or the like), such values may be dropped for the current learning/training episode or epoch. For example, on packet delivery delay bounds may be defined or configured, and packets determined to have been received after the packet delivery delay bound may be dropped.

In any of the embodiments discussed herein, any suitable data collection and/or measurement mechanism(s) may be used to collect the observation data. For example, data marking (e.g., sequence numbering, and/or the like), packet tracing, signal measurement, data sampling, and/or timestamping techniques may be used to determine any of the aforementioned metrics/observations. The collection of data may be based on occurrence of events that trigger collection of the data. Additionally or alternatively, data collection may take place at the initiation or termination of an event. The data collection can be continuous, discontinuous, and/or have start and stop times. The data collection techniques/mechanisms may be specific to a HW configuration/implementation or non-HW-specific, or may be based on various SW parameters (e.g., OS type and version, and/or the like). Various configurations may be used to define any of the aforementioned data collection parameters. Such configurations may be defined by suitable specifications/standards, such as 3GPP (e.g., [SA6Edge]), ETSI (e.g., [MEC]), O-RAN (e.g., [O-RAN]), Intel® Smart Edge Open (formerly OpenNESS) (e.g., [ISEO]), IETF (e.g., MAMS [RFC8743]), IEEE/WiFi (e.g., [IEEE80211], [WiMAX], [IEEE16090], and/or the like), and/or any other like standards such as those discussed herein.

The UE 2612*b* is shown as being capable of accessing access point (AP) 2633 via a connection 2603*b*. In this example, the AP 2633 is shown to be connected to the Internet without connecting to the CN 2642 of the wireless system. The connection 2603*b* can comprise a local wireless connection, such as a connection consistent with any [IEEE802] protocol (e.g., [IEEE80211] and variants thereof), wherein the AP 2633 would comprise a WiFi router. Additionally or alternatively, the UEs 2610 can be configured to communicate using suitable communication signals with each other or with any of the AP 2633 over a single or multicarrier communication channel in accordance with various communication techniques, such as, but not limited to, an OFDM communication technique, a single-carrier frequency division multiple access (SC-FDMA) communication technique, and/or the like, although the scope of the present disclosure is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), and/or the like; or Quadrature Amplitude Modulation (QAM) such as M-QAM; and/or the like.

The one or more NANs 2631 and 2632 that enable the connections 2603a may be referred to as "RAN nodes" or the like. The RAN nodes 2631, 2632 may comprise ground stations (e.g., terrestrial access points) or satellite stations providing coverage within a geographic area (e.g., a cell). The RAN nodes 2631, 2632 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 2631 is embodied as a NodeB, evolved NodeB (eNB), or a next generation NodeB (gNB), and the RAN nodes 2632 are embodied as relay nodes, distributed units, or Road Side Unites (RSUs). Any other type of NANs can be used.

Any of the RAN nodes 2631, 2632 can terminate the air interface protocol and can be the first point of contact for the UEs 2612 and IoT devices 2611. Additionally or alternatively, any of the RAN nodes 2631, 2632 can fulfill various logical functions for the RAN including, but not limited to, RAN function(s) (e.g., radio network controller (RNC) functions and/or NG-RAN functions) for radio resource management, admission control, UL and DL dynamic resource allocation, radio bearer management, data packet scheduling, and/or the like Additionally or alternatively, the UEs 2610 can be configured to communicate using OFDM communication signals with each other or with any of the NANs 2631, 2632 over a multicarrier communication channel in accordance with various communication techniques, such as, but not limited to, an OFDMA communication technique (e.g., for DL communications) and/or an SC-FDMA communication technique (e.g., for UL and ProSe or sidelink communications), although the scope of the present disclosure is not limited in this respect.

For most cellular communication systems, the RAN function(s) operated by the RAN or individual NANs 2631-2632 organize DL transmissions (e.g., from any of the RAN nodes 2631, 2632 to the UEs 2610) and UL transmissions (e.g., from the UEs 2610 to RAN nodes 2631, 2632) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 2610 at each transmission time interval (TTI). A TTI is the duration of a transmission on a radio link 2603a, 2605, and is related to the size of the data blocks passed to the radio link layer from higher network layers.

The NANs 2631, 2632 may be configured to communicate with one another via respective interfaces or links (not shown), such as an X2 interface for LTE implementations (e.g., when CN 2642 is an Evolved Packet Core (EPC)), an Xn interface for 5G or NR implementations (e.g., when CN 2642 is an Fifth Generation Core (5GC)), or the like. The NANs 2631 and 2632 are also communicatively coupled to CN 2642. Additionally or alternatively, the CN 2642 may be an evolved packet core (EPC) network, a NextGen Packet Core (NPC) network, a 5G core (5GC), or some other type of CN. The CN 2642 is a network of network elements and/or network functions (NFs) relating to a part of a communications network that is independent of the connection technology used by a terminal or user device. The CN 2642 comprises a plurality of network elements/NFs configured to offer various data and telecommunications services to customers/subscribers (e.g., users of UEs 2612 and IoT devices 2611) who are connected to the CN 2642 via a RAN. The components of the CN 2642 may be implemented in one physical node or separate physical nodes including components to read and execute instructions from a machine-readable or computer-readable medium (e.g., a non-transitory machine-readable storage medium). Additionally or alternatively, NFV may be utilized to virtualize any or all of the above-described network node functions via executable instructions stored in one or more computer-readable storage mediums (described in further detail infra). A logical instantiation of the CN 2642 may be referred to as a network slice, and a logical instantiation of a portion of the CN 2642 may be referred to as a network sub-slice. NFV architectures and infrastructures may be used to virtualize one or more network functions, alternatively performed by proprietary HW, onto physical resources comprising a combination of industry-standard server HW, storage HW, or switches. In other words, NFV systems can be used to execute virtual or reconfigurable implementations of one or more CN 2642 components/functions.

The CN 2642 is shown to be communicatively coupled to an application server 2650 and a network 2650 via an IP communications interface 2655. the one or more server(s) 2650 comprise one or more physical and/or virtualized systems for providing functionality (or services) to one or more clients (e.g., UEs 2612 and IoT devices 2611) over a network. The server(s) 2650 may include various computer devices with rack computing architecture component(s), tower computing architecture component(s), blade computing architecture component(s), and/or the like. The server(s) 2650 may represent a cluster of servers, a server farm, a cloud computing service, or other grouping or pool of servers, which may be located in one or more datacenters. The server(s) 2650 may also be connected to, or otherwise associated with one or more data storage devices (not shown). Moreover, the server(s) 2650 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 2650 offer applications or services that use IP/network resources. As examples, the server(s) 2650 may provide traffic management services, cloud analytics, content streaming services, immersive gaming experiences, social networking and/or microblogging services, and/or other like services. In addition, the various services provided by the server(s) 2650 may include initiating and controlling SW and/or firmware updates for applications or individual components implemented by the UEs 2612 and IoT devices 2611. The server(s) 2650 can also be configured to support one or more communication services (e.g., Voice-over- Internet Protocol (VoIP) sessions, PTT sessions, group communication sessions, social networking services, and/or the like) for the UEs 2612 and IoT devices 2611 via the CN 2642.

The Radio Access Technologies (RATs) employed by the NANs 2630, the UEs 2610, and the other elements in FIG. 26 may include, for example, any of the communication protocols and/or RATs discussed herein. Different technologies exhibit benefits and limitations in different scenarios, and application performance in different scenarios becomes dependent on the choice of the access networks (e.g., WiFi, LTE, and/or the like) and the used network and transport protocols (e.g., Transfer Control Protocol (TCP), Virtual Private Network (VPN), Multi-Path TCP (MPTCP), Generic Routing Encapsulation (GRE), and/or the like). These RATs may include one or more V2X RATs, which allow these elements to communicate directly with one another, with infrastructure equipment (e.g., NANs 2630), and other devices. In some implementations, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize a C-V2X air interface and the WLAN V2X RAT may utilize an W-V2X air interface.

The W-V2X RATs include, for example, *IEEE Guide for Wireless Access in Vehicular Environments (WAVE) Architecture*, IEEE STANDARDS ASSOCIATION, IEEE 1609.0-2019 (10 Apr. 2019) ("[IEEE16090]"), *V2X Communications Message Set Dictionary*, SAE INT'L (23 Jul. 2020) ("[J2735_202007]"), Intelligent Transport Systems in the 5 GHz frequency band (ITS-G5), the [IEEE80211p] (which is the layer 1 (L1) and layer 2 (L2) part of WAVE, DSRC, and ITS-G5), and/or *IEEE Standard for Air Interface for Broadband Wireless Access Systems, IEEE Std* 802.16-2017, pp. 1-2726 (2 Mar. 2018) ("[WiMAX]"). The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including [IEEE80211p] RATs) that may be used in any geographic or political region, the terms "DSRC" (used, among other regions, in the U.S.) and "ITS-G5" (used, among other regions, in Europe) may be used interchangeably throughout this disclosure. The access layer for the ITS-G5 interface is outlined in ETSI EN 302 663 V1.3.1 (2020 January) (hereinafter "[EN302663]") and describes the access layer of the ITS-S reference architecture. The ITS-G5 access layer comprises [IEEE80211] (which now [IEEE80211p]), as well as features for Decentralized Congestion Control (DCC) methods discussed in ETSI TS 102 687 V1.2.1 (2018 April) ("[TS102687]"). The access layer for 3GPP LTE-V2X based interface(s) is outlined in, inter alia, ETSI EN 303 613 V1.1.1 (2020-01), 3GPP TS 23.285 v16.2.0 (2019-12); and 3GPP 5G/NR-V2X is outlined in, inter alia, 3GPP TR 23.786 v16.1.0 (2019-06) and 3GPP TS 23.287 v16.2.0 (2020 March).

The cloud 2644 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, and/or the like), operating systems, virtual machines (VMs), SW/applications, computer files, and/or the like. Cloud computing provides cloud computing services (or cloud services), which are one or more capabilities offered via cloud computing that are invoked using a defined interface (e.g., an API or the like). Some capabilities of cloud 2644 include application capabilities type, infrastructure capabilities type, and platform capabilities type. A cloud capabilities type is a classification of the functionality provided by a cloud service to a cloud service customer (e.g., a user of cloud 2644), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 2644 may provide include, for example, Communications as a Service (CaaS), which is a cloud service category involving real-time interaction and collaboration services; Compute as a Service (CompaaS), which is a cloud service category involving the provision and use of processing resources needed to deploy and run SW; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

Additionally or alternatively, the cloud 2644 may represent one or more cloud servers, application servers, web servers, and/or some other remote infrastructure. The remote/cloud servers may include any one of a number of services and capabilities such as, for example, any of those discussed herein. Additionally or alternatively, the cloud 2644 may represent a network such as the Internet, a local area network (LAN), a wide area network (WAN), a wireless local area network (WLAN), or a wireless wide area network (WWAN) including proprietary and/or enterprise networks for a company or organization, or combinations thereof. The cloud 2644 may be a network that comprises computers, network connections among the computers, and SW routines to enable communication between the computers over network connections. In this regard, the cloud 2644 comprises one or more network elements that may include one or more processors, communications systems (e.g., including network interface controllers, one or more transmitters/receivers connected to one or more antennas, and/or the like), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 2644 may be via a wired or a wireless connection using the various communication protocols discussed infra. More than one network may be involved in a communication session between the illustrated devices. Connection to the cloud 2644 may require that the computers execute SW routines which enable, for example, the seven layers of the OSI model of computer networking or equivalent in a wireless (cellular) phone network. Cloud 2644 may be used to enable relatively long-range communication such as, for example, between the one or more server(s) 2650 and one or more UEs 2610. Additionally or alternatively, the cloud 2644 may represent the Internet, one or more cellular networks, local area networks, or wide area networks including proprietary and/or enterprise networks, TCP/Internet Protocol (IP)-based network, or combinations thereof. In these implementations, the cloud 2644 may be associated with network operator who owns or controls equipment and other elements necessary to provide network-related services, such as one or more base stations or access points, one or more servers for routing digital data or telephone calls (e.g., a core network or backbone network), and/or the like The backbone links 2655 may include any number of wired or wireless technologies, and may be part of a LAN, a WAN, or the Internet. In one example, the backbone links 2655 are fiber backbone links that couple lower levels of service providers to the Internet, such as the CN 2612 and cloud 2644.

As shown by FIG. 26, each of the NANs 2631, 2632, and 2633 are co-located with edge compute nodes (or "edge servers") 2636a, 2636b, and 2636c, respectively. These implementations may be small-cell clouds (SCCs) where an edge compute node 2636 is co-located with a small cell (e.g., pico-cell, femto-cell, and/or the like), or may be mobile micro clouds (MCCs) where an edge compute node 2636 is co-located with a macro-cell (e.g., an eNB, gNB, and/or the like). The edge compute node 2636 may be deployed in a multitude of arrangements other than as shown by FIG. 26. In a first example, multiple NANs 2630 are co-located or otherwise communicatively coupled with one edge compute node 2636. In a second example, the edge servers 2636 may be co-located or operated by RNCs, which may be the case for legacy network deployments, such as 3G networks. In a third example, the edge servers 2636 may be deployed at cell aggregation sites or at multi-RAT aggregation points that can be located either within an enterprise or used in public coverage areas. In a fourth example, the edge servers 2636 may be deployed at the edge of CN 2642. These implementations may be used in follow-me clouds (FMC), where cloud services running at distributed data centers follow the UEs 2610 as they roam throughout the network.

In any of the implementations discussed herein, the edge servers 2636 provide a distributed computing environment for application and service hosting, and also provide storage and processing resources so that data and/or content can be processed in close proximity to subscribers (e.g., users of UEs 2610) for faster response times The edge servers 2636 also support multitenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 2636 from the UEs 2610, CN 2642, cloud 2644, and/or server(s) 2650, or vice versa. For example, a device application or client application operating in a UE 2610 may offload application tasks or workloads to one or more edge servers 2636. In another example, an edge server 2636 may offload application tasks or workloads to one or more UE 2610 (e.g., for distributed ML computation or the like).

The edge compute nodes 2636 may include or be part of an edge system 2635 that employs one or more ECTs 2635. The edge compute nodes 2636 may also be referred to as "edge hosts 2636" or "edge servers 2636." The edge system 2635 includes a collection of edge servers 2636 and edge management systems (not shown by FIG. 26) necessary to run edge computing applications within an operator network or a subset of an operator network. The edge servers 2636 are physical computer systems that may include an edge platform and/or virtualization infrastructure, and provide compute, storage, and network resources to edge computing applications. Each of the edge servers 2636 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to UEs 2610. The VI of the edge servers 2636 provide virtualized environments and virtualized resources for the edge hosts, and the edge computing applications may run as VMs and/or application containers on top of the VI.

In one example implementation, the ECT 2635 is and/or operates according to the MEC framework, as discussed in ETSI GR MEC 001 v3.1.1 (2022 January), ETSI GS MEC 003 v3.1.1 (2022 March), ETSI GS MEC 009 v3.1.1 (2021 June), ETSI GS MEC 010-1 v1.1.1 (2017 October), ETSI GS MEC 010-2 v2.2.1 (2022 February), ETSI GS MEC 011 v2.2.1 (2020 December), ETSI GS MEC 012 V2.2.1 (2022 February), ETSI GS MEC 013 V2.2.1 (2022 January), ETSI GS MEC 014 v2.1.1 (2021 March), ETSI GS MEC 015 v2.1.1 (2020 June), ETSI GS MEC 016 v2.2.1 (2020 April), ETSI GS MEC 021 v2.2.1 (2022 February), ETSI GR MEC 024 v2.1.1 (2019 November), ETSI GS MEC 028 V2.2.1 (2021 July), ETSI GS MEC 029 v2.2.1 (2022 January), ETSI MEC GS 030 v2.1.1 (2020 April), ETSI GR MEC 031 v2.1.1 (2020 October), U.S. Provisional App. No. 63/003, 834 filed Apr. 1, 2020 ("[US'834]"), and Int'l App. No. PCT/US2020/066969 filed on Dec. 23, 2020 ("[PCT '696]") (collectively referred to herein as "[MEC]"), the contents of each of which are hereby incorporated by reference in their entireties. This example implementation (and/or in any other example implementation discussed herein) may also include NFV and/or other like virtualization technologies such as those discussed in ETSI GR NFV 001 V1.3.1 (2021 March), ETSI GS NFV 002 V1.2.1 (2014 December), ETSI GR NFV 003 V1.6.1 (2021 March), ETSI GS NFV 006 V2.1.1 (2021 January), ETSI GS NFV-INF 001 V1.1.1 (2015 January), ETSI GS NFV-INF 003 V1.1.1 (2014 December), ETSI GS NFV-INF 004 V1.1.1 (2015 January), ETSI GS NFV-MAN 001 v1.1.1 (2014 December), and/or Israel et al., *OSM Release FIVE Technical Overview*, ETSI Open Source MANO, OSM White Paper, 1st ed. (January 2019), https:// osm.etsi.org/images/OSM-Whitepaper-TechContent-ReleaseFIVE-FINAL.pdf (collectively referred to as "[ETSINFV]"), the contents of each of which are hereby incorporated by reference in their entireties. Other virtualization technologies and/or service orchestration and automation platforms may be used such as, for example, those discussed in *E2E Network Slicing Architecture*, GSMA, Official Doc. NG.127, v1.0 (3 Jun. 2021), https://www.gsma.com/newsroom/wp-content/uploads//NG.127-v1.0-2. pdf, *Open Network Automation Platform (ONAP) documentation*, Release Istanbul, v9.0.1 (17 Feb. 2022), https://docs.onap.org/en/latest/index.html ("[ONAP]"), 3 GPP Service Based Management Architecture (SBMA) as discussed in 3GPP TS 28.533 v17.1.0 (2021 Dec. 23) ("[TS28533]"), the contents of each of which are hereby incorporated by reference in their entireties.

In another example implementation, the ECT 2635 is and/or operates according to the O-RAN framework. Front-end and back-end device vendors and carriers have worked closely to ensure compatibility. The flip-side of such a working model is that it becomes quite difficult to plug-and-play with other devices and this can hamper innovation. To combat this, and to promote openness and inter-operability at every level, several key players interested in the wireless domain (e.g., carriers, device manufacturers, academic institutions, and/or the like) formed the Open RAN alliance ("O-RAN") in 2018. The O-RAN network architecture is a building block for designing virtualized RAN on programmable HW with radio access control powered by AI. Various aspects of the O-RAN architecture are described in *O-RAN Architecture Description* v05.00, O-RAN ALLIANCE WG1 (July 2021); *O-RAN Operations and Maintenance Architecture Specification* v04.00, O-RAN ALLIANCE WG1 (November 2020); *O-RAN Operations and Maintenance Interface Specification* v04.00, O-RAN ALLIANCE WG1 (November 2020); *O-RAN Information Model and Data Models Specification* v01.00, O-RAN ALLIANCE WG1 (November 2020); *O-RAN Working Group 1 Slicing Architecture* v05.00, O-RAN ALLIANCE WG1 (July 2021) ("[O-RAN.WG1.Slicing-Architecture]"); *O-RAN Working Group 2 (Non-RT RIC and A1 interface WG) A1 interface: Application Protocol* v03.01, O-RAN ALLIANCE WG2 (March 2021); *O-RAN Working Group 2 (Non-RT RIC and A1 interface WG) A1 interface: Type Definitions* v02.00, O-RAN ALLIANCE WG2 (July 2021); *O-RAN Working Group 2 (Non RT RIC and A1 interface WG) A1 interface: Transport Protocol* v01.01, O-RAN ALLIANCE WG2 (March 2021); *O-RAN Working Group 2 AI/ML workflow description and requirements* v01.03 O-RAN ALLIANCE WG2 (July 2021); *O-RAN Working Group 2 Non-RT RIC: Functional Architecture* v01.03 O-RAN ALLIANCE WG2 (July 2021); *O-RAN Working Group 3, Near-Real-time Intelligent Controller, E2 Application Protocol (E2AP)* v02.00, O-RAN ALLIANCE WG3 (July 2021); *O-RAN Working Group 3 Near-Real-time Intelligent Controller Architecture & E2 General Aspects and Principles* v02.00, O-RAN ALLIANCE WG3 (July 2021); *O-RAN Working Group 3 Near-Real-time Intelligent Controller E2 Service Model (E2SM)* v02.00, O-RAN ALLIANCE WG3 (July 2021); *O-RAN Working Group 3 Near-Real-time Intelligent Controller E2 Service Model (E2SM) KPM* v02.00, O-RAN ALLIANCE WG3 (July 2021); *O-RAN Working Group 3 Near-Real-time Intelligent Controller E2 Service Model (E2SM) RAN Function Network Interface (NI)* v01.00, O-RAN ALLIANCE WG3 (February 2020); *O-RAN Working Group 3 Near-Real-time Intelligent Controller E2 Service Model (E2SM) RAN Control* v01.00, O-RAN ALLIANCE WG3 (July 2021); *O-RAN Working Group 3 Near-Real-time Intelligent Controller Near RT RIC Architecture* v02.00, O-RAN ALLIANCE WG3 (March 2021); *O-RAN Fronthaul Working Group 4 Cooperative Transport Interface Transport Control Plane Specification* v02.00, O-RAN ALLIANCE WG4 (March 2021); *O-RAN Fronthaul Working Group 4 Cooperative Transport Interface Transport Management Plane Specification* v02.00, O-RAN ALLIANCE WG4 (March 2021); O-RAN Fronthaul Working Group 4 Control, User, and Synchronization Plane Specification v07.00, O-RAN ALLIANCE WG4 (July 2021) ("[O-RAN.WG4.CUS]"); *O-RAN Fronthaul Working Group 4 Management Plane Specification* v07.00, O-RAN ALLIANCE WG4 (July 2021); *O-RAN Open F1/W1/E1/X2/Xn Interfaces Working Group Transport Specification* v01.00, O-RAN ALLIANCE WG5 (April 2020); *O-RAN Alliance Working Group 5 O1 Interface specification for O-DU* v02.00, O-RAN ALLIANCE WGX (July 2021); *Cloud Architecture and Deployment Scenarios for O-RAN Virtualized RAN* v02.02, 0-RAN ALLIANCE WG6 (July 2021); *O-RAN Acceleration Abstraction Layer General Aspects and Principles* v01.01, O-RAN ALLIANCE WG6 (July 2021); *Cloud Platform Reference Designs* v02.00, O-RAN ALLIANCE WG6 (November 2020); *O-RAN O2 Interface General Aspects and Principles* v01.01, O-RAN ALLIANCE WG6 (July 2021); *O-RAN White Box Hardware Working Group Hardware Reference Design Specification for Indoor Pico Cell with Fronthaul Split Option 6* v02.00, O-RAN ALLIANCE WG7 (July 2021) ("[O-RAN.WG7.IPC-HRD-Opt6]"); *O-RAN WG7 Hardware Reference Design Specification for Indoor Picocell (FR1) with Split Option 7-2* v03.00, O-RAN ALLIANCE WG7 (July 2021) ("[O-RAN.WG7.IPC-HRD-Opt7]"); *O-RAN WG7 Hardware Reference Design Specification for Indoor Picocell (FR1) with Split Option 8* v03.00, 0-RAN ALLIANCE WG7 (July 2021) ("[O-RAN.WG7IPC-HRD-Opt8]"); *O-RAN Open Transport Working Group 9 Xhaul Packet Switched Architectures and Solutions* v02.00, O-RAN ALLIANCE WG9 (July 2021) ("[ORAN-WG9.XPAAS]"); *O-RAN Open X-haul Transport Working Group Management interfaces for Transport Network Elements* v02.00, O-RAN ALLIANCE WG9 (July 2021) ("[ORAN-WG9.XTRP-MGT]"); *O-RAN Open X-haul Transport WG9 WDM-based Fronthaul Transport* v01.00, O-RAN ALLIANCE WG9 (November 2020) ("[ORAN-WG9.WDM]"); *O-RAN Open X-haul Transport Working Group Synchronization Architecture and Solution Specification* v01.00, O-RAN ALLIANCE WG9 (March 2021) ("[ORAN-WG9.XTRP-SYN]"); *O-RAN Operations and Maintenance Interface Specification* v05.00, O-RAN ALLIANCE WG10 (July 2021); *O-RAN Operations and Maintenance Architecture* v05.00, O-RAN ALLIANCE WG10 (July 2021); *O-RAN: Towards an Open and Smart RAN, O-RAN ALLIANCE*, White Paper (October 2018), https://static1.squarespace.com/static/5ad774cce74940d7115044b0/t/5bc79b371905f4197055e8c6/1539808057078/O-RAN+WP+FInal+181017.pdf ("[ORANWP]"), and U.S. application Ser. No. 17/484,743 filed on 24 Sep. 2021 ("[US '743]") (collectively referred to as "[O-RAN]"); the contents of each of which are hereby incorporated by reference in their entireties.

In another example implementation, the ECT 2635 is and/or operates according to the 3rd Generation Partnership Project (3GPP) System Aspects Working Group 6 (SA6) Architecture for enabling Edge Applications (referred to as "3GPP edge computing") as discussed in 3GPP TS 23.558 v17.2.0 (2021-12-31), 3GPP TS 23.501 v17.3.0 (2021 Dec. 31) ("[TS23501]"), 3GPP TS 28.538 v0.4.0 (2021 Dec. 8), and U.S. application Ser. No. 17/484,719 filed on 24 Sep.

2021 ("[US'719]") (collectively referred to as "[SA6Edge] "), the contents of each of which are hereby incorporated by reference in their entireties.

In another example implementation, the ECT 2635 is and/or operates according to the Intel® Smart Edge Open framework (formerly known as OpenNESS) as discussed in Intel® Smart Edge Open Developer Guide, version 21.09 (30 Sep. 2021), available at: https://smart-edge-open.github.io/ ("[ISEO]"), the contents of which is hereby incorporated by reference in its entirety.

In another example implementation, the edge system 2635 operates according to the Multi-Access Management Services (MAMS) framework as discussed in Kanugovi et al., Multi-Access Management Services (MAMS), INTERNET ENGINEERING TASK FORCE (IETF), Request for Comments (RFC) 8743 (March 2020) ("[RFC8743]"), Ford et al., TCP Extensions for Multipath Operation with Multiple Addresses, IETF RFC 8684, (March 2020), De Coninck et al., Multipath Extensions for QUIC (MP-QUIC), IETF DRAFT-DECONINCK-QUIC-MULTIPATH-07, IETA, QUIC Working Group (3 May 2021), Zhu et al., User-Plane Protocols for Multiple Access Management Service, IETF DRAFT-ZHU-INTAREA-MAMS-USER-PROTOCOL-09, IETA, INTAREA (4 Mar. 2020), and Zhu et al., Generic Multi-Access (GMA) Convergence Encapsulation Protocols, IETF DRAFT-ZHU-INTAREA-GMA-14, IETA, INTAREA/Network Working Group (24 Nov. 2021) (collectively referred to as "[MAMS]"), the contents of each of which are hereby incorporated by reference in their entireties. In these implementations, an edge compute node 2635 and/or one or more cloud computing nodes/clusters may be one or more MAMS servers that includes or operates a Network Connection Manager (NCM) for downstream/DL traffic, and the individual UEs 2610 include or operate a Client Connection Manager (CCM) for upstream/UL traffic. An NCM is a functional entity that handles MAMS control messages from clients (e.g., individual UEs 2610 configures the distribution of data packets over available access paths and (core) network paths, and manages user-plane treatment (e.g., tunneling, encryption, and/or the like) of the traffic flows (see e.g., [RFC8743], [MAMS]). The CCM is the peer functional element in a client (e.g., individual UEs 2610 that handles MAMS control-plane procedures, exchanges MAMS signaling messages with the NCM, and configures the network paths at the client for the transport of user data (e.g., network packets, and/or the like) (see e.g., [RFC8743], [MAMS]).

It should be understood that the aforementioned edge computing frameworks/ECTs and services deployment examples are only illustrative examples of ECTs, and that the present disclosure may be applicable to many other or additional edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure.

3. Hardware Components, Configurations, and Arrangements

FIG. 27 illustrates an example software distribution platform (SDP) 2705 to distribute SW 2760, such as the example computer readable instructions 2981, 2982, 2983 of FIGS. 29, to one or more devices, such as example processor platform(s) (pp) 2700, connected edge devices 2962 (see e.g., FIG. 29), and/or any of the other computing systems/devices discussed herein. The SDP 2705 (or components thereof) may be implemented by any computer server, data facility, cloud service, CDN, edge computing framework, and/or the like, capable of storing and transmitting SW (e.g., code, scripts, executable binaries, containers, packages, compressed files, and/or derivatives thereof) to other computing devices (e.g., third parties, the example connected edge devices 2962 of FIG. 29). The SDP 2705 (or components thereof) may be located in a cloud (e.g., data center, and/or the like), a local area network, an edge network, a wide area network, on the Internet, and/or any other location communicatively coupled with the pp 2700.

The pp 2700 and/or connected edge devices 2962 connected edge devices 2962 may include customers, clients, managing devices (e.g., servers), third parties (e.g., customers of an entity owning and/or operating the SDP 2705), IoT devices, and the like. The pp 2700/connected edge devices 2962 may operate in commercial and/or home automation environments. In some examples, a third party is a developer, a seller, and/or a licensor of SW such as the example computer readable media 2981, 2982, 2983 of FIG. 29. The third parties may be consumers, users, retailers, OEMs, and/or the like that purchase and/or license the SW for use and/or re-sale and/or sub-licensing. In some examples, distributed SW causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), and/or the like). In some examples, the pp 2700/connected edge devices 2962 can be physically located in different geographic locations, legal jurisdictions, and/or the like.

In FIG. 27, the SDP 2705 includes one or more servers (referred to as "servers 2705") and one or more storage devices (referred to as "storage 2705"). The storage 2705 store the computer readable instructions 2760, which may correspond to the instructions 2981, 2982, 2983 of FIG. 29. The servers 2705 are in communication with a network 2710, which may correspond to any one or more of the Internet and/or any of the example networks as described herein. The servers 2705 are responsive to requests to transmit the SW to a requesting party as part of a commercial transaction. Payment for the delivery, sale and/or license of the SW may be handled by the servers 2705 and/or via a third-party payment entity. The servers 2705 enable purchasers and/or licensors to download the computer readable instructions 2760 from the SDP 2705.

The servers 2705 are communicatively connected to one or more security domains and/or security devices through which requests and transmissions of the example computer readable instructions 2760 must pass. Additionally or alternatively, the servers 2705 periodically offer, transmit, and/or force updates to the SW 2760 to ensure improvements, patches, updates, and/or the like are distributed and applied to the SW at the end user devices. The computer readable instructions 2760 are stored on storage 2705 in a particular format. A format of computer readable instructions includes, but is not limited to a particular code language (e.g., Java, JavaScript, Python, C, C #, SQL, HTML, and/or the like), and/or a particular code state (e.g., uncompiled code (e.g., ASCII), interpreted code, linked code, executable code (e.g., a binary), and/or the like), and/or any other format such as those discussed herein. In some examples, the computer readable instructions 2760 stored in the SDP 2705 are in a first format when transmitted to the pp 2700. Additionally or alternatively, the first format is an executable binary in which particular types of the pp 2700 can execute. Additionally or alternatively, the first format is uncompiled code that requires one or more preparation tasks to transform the first format to a second format to enable execution on the pp 2700. For example, the receiving pp 2700 may need to compile the computer readable instructions 2760 in the first format to generate executable code in a second format that is capable of being executed on the pp 2700. Additionally or alternatively, the first format is interpreted code that, upon reaching the pp 2700, is interpreted by an interpreter to facilitate execution of instructions. Additionally or alternatively, different components of the computer readable instructions 2982 can be distributed from different sources and/or to different processor platforms; for example, different libraries, plug-ins, components, and other types of compute modules, whether compiled or interpreted, can be distributed from different sources and/or to different processor platforms. For example, a portion of the SW instructions (e.g., a script that is not, in itself, executable) may be distributed from a first source while an interpreter (capable of executing the script) may be distributed from a second source.

Figure 28:
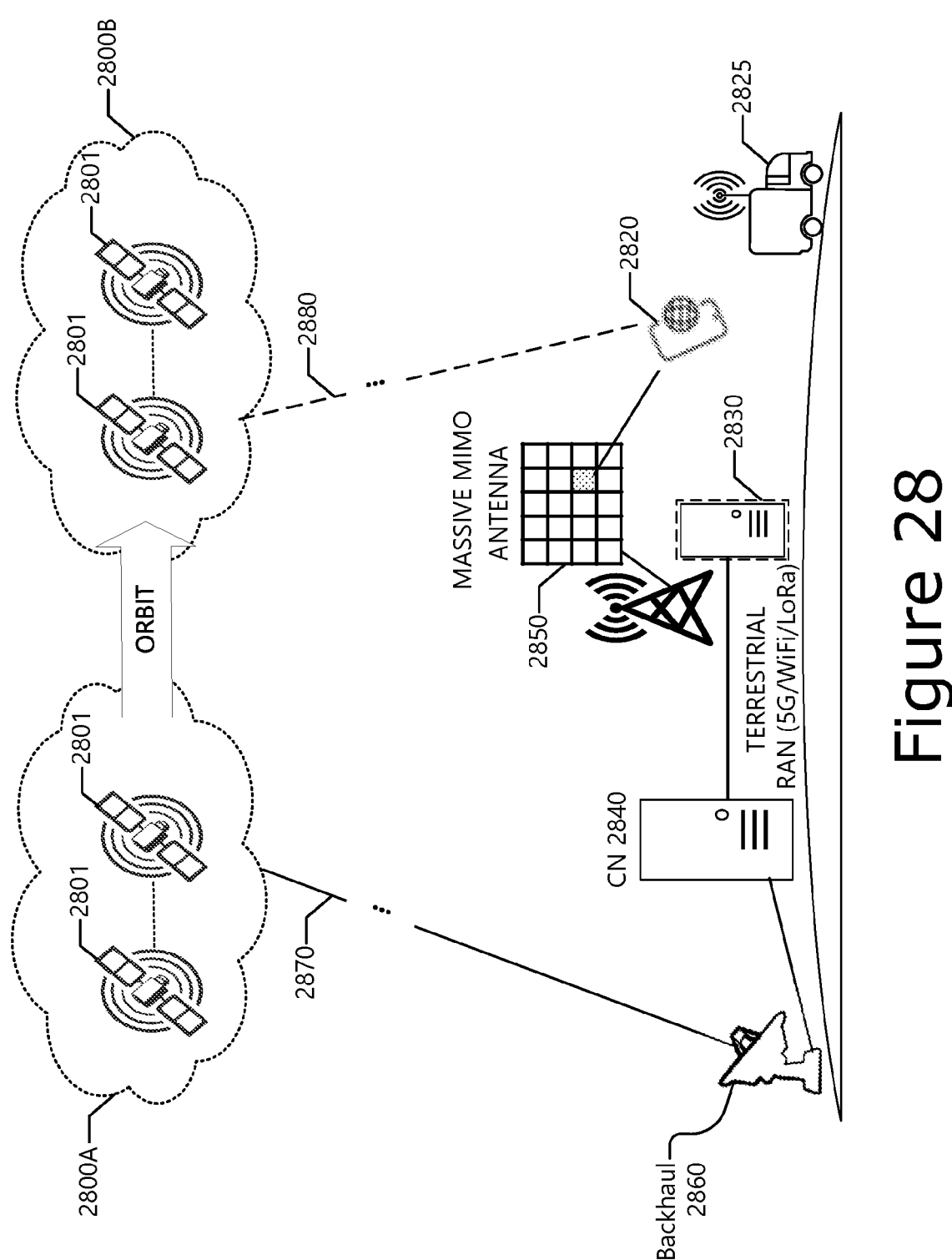
FIG. 28 illustrates an example network connectivity for non-terrestrial and terrestrial settings.

FIG. 28 illustrates an example of network connectivity in non-terrestrial (e.g., satellite) and terrestrial (e.g., mobile cellular network) settings. In FIG. 28, a satellite constellation 2800 (e.g., the constellation at orbital positions 2800A and 2800B in FIG. 28) include multiple satellite vehicles (SVs) 2801 (and numerous other SVs 2801 not shown by FIG. 28), which are connected to each other and to one or more terrestrial networks. Each SV 2801 in the constellation 2800 conducts an orbit around the earth, at an orbit speed that increases as the SV 2801 is closer to earth. LEO constellations (e.g., constellation 2800) are generally considered to include SVs (e.g., SVs 2801) that orbit at an altitude between 160 and 1000 kilometers (km), and at this altitude each SV orbits the earth about every 90 to 120 minutes. The constellation 2800 uses one or multiple SVs 2801 to provide communications coverage to a geographic area on earth. The constellation 2800 may also coordinate with other satellite constellations (not shown), and with terrestrial-based networks, to selectively provide connectivity and services for individual devices (e.g., UEs 2820, 2825) or terrestrial network systems (e.g., network equipment).

In this example, the satellite constellation 2800 is connected via a satellite link 2870 to a backhaul network 2860, which is in turn connected to a CN 2840, which may be the same or similar as the CN 2642 discussed previously. The CN 2840 is used to support cellular (e.g., 5G and/or the like) communication operations with the satellite network (e.g., constellation 2800) and at a terrestrial RAN 2830, which may be the same or similar as a RAN including NANs 2630 discussed previously. In a first example, the CN 2840 is located in a remote location, and uses the satellite constellation 2800 as the exclusive mechanism to reach wide area networks (WANs) and/or the Internet. In a second example, the CN 2840 uses the satellite constellation 2800 as a redundant link to access the WANs and/or the Internet. In a third example, the CN 2840 uses the satellite constellation 2800 as an alternate path to access the WANs and/or the Internet (e.g., to communicate with networks on other continents and the like).

FIG. 28 also depicts a terrestrial RAN 2830 that provides radio connectivity to user equipment (UE) including user device 2820 or vehicle system 2825 on-ground via a massive multiple input multiple output (MIMO) antenna 2850. The UEs 2820, 2825 may be the same or similar as the UEs 2610 discussed previously. A variety of 5G and/or other network communication components and units are not depicted in FIG. 28 for purposes of simplicity/clarity. In some examples, each UE 2820, 2825 also may have its own satellite connectivity hardware (e.g., receiver circuitry and antenna), to directly connect with the satellite constellation 2800 via satellite link 2880. Although a cellular (e.g., 5G) network setting is depicted and discussed herein, other variations of 3GPP, O-RAN, WiFi, and other network specifications may also be applicable.

Other permutations (not shown) may involve a direct connection of the RAN 2830 to the satellite constellation 2800 (e.g., with the CN 2840 accessible over a satellite link 2870, 2880); coordination with other wired (e.g., fiber), laser or optical, and wireless links and backhaul; multi-access radios among the UE, the RAN, and other UEs; and other permutations of terrestrial and non-terrestrial connectivity. Satellite network connections may be coordinated with 5G network equipment and user equipment based on satellite orbit coverage, available network services and equipment, cost and security, and geographic or geopolitical considerations, and the like. With these basic entities in mind, and with the changing compositions of mobile users and in-orbit satellites, the following techniques describe ways in which terrestrial and satellite networks can be extended for various edge computing scenarios.

Additionally or alternatively, the provision of a RAN 2830 from SVs 2801, and the significantly reduced latency from LEO vehicles, enables much more robust use cases, including the direct connection of devices (e.g., UEs 2820, 2825) using 5G satellite antennas at the device, and communication between an edge appliance (not shown) and the satellite constellation 2800 using standard and/or proprietary protocols. As an example, in some LEO settings, one 5G LEO satellite can cover a 500 km radius for 8 minutes, every 12 hours. Connectivity latency to LEO satellites may be as small as one ms. Further, connectivity between the satellite constellation and the UEs 2820, 2825 or the RAN 2830 depends on the number and capability of satellite ground stations. For example, one or more SVs 2801 can communicate with a ground station (e.g., satellite dish 2860 and/or a RAN node), which may host edge computing processing capabilities. The ground station in turn may be connected to a data center via CN 2840 (not shown) for additional processing. With the low latency offered by 5G communications, data processing, compute, and storage may be located at any number of locations (at edge, in satellite, on ground, at core network, at low-latency data center).

Additionally or alternatively, although not shown by FIG. 28, an edge appliance may be located at an SV 2801. Here, various edge compute operations may be directly performed using hardware located at the SV 2801, reducing the latency and transmission time that would have been otherwise needed to communicate with the ground station or data center. Likewise, in these scenarios, edge compute capabilities may be implemented or coordinated among specialized processing circuitry (e.g., acceleration circuitry 2964 of FIG. 29 such as FPGAs, ASICs, and the like) or general purpose processing circuitry (e.g., processor circuitry 2952 of FIG. 29 such as x86 CPUs, and/or the like) located at the SV 2801, the ground station, UEs/devices, and/or other edge appliances not shown, and/or combinations thereof. Additionally or alternatively, although not shown by FIG. 28, other types of orbit-based connectivity and edge computing may be involved with these architectures. These include connectivity and compute provided via balloons, drones, dirigibles, and similar types of non-terrestrial elements. Such systems encounter similar temporal limitations and connectivity challenges (like those encountered in a satellite orbit).

FIG. 29 illustrates an example of components that may be present in a computing node 2950 for implementing the techniques (e.g., operations, processes, methods, and methodologies) described herein. The compute node 2950 provides a closer view of the respective components of node 2900 when implemented as or as part of a computing device (e.g., as a mobile device, a base station, server, gateway, and/or the like). The compute node 2950 may include any combinations of the HW or logical components referenced herein, and it may include or couple with any device usable with an edge communication network or a combination of such networks. The components may be implemented as integrated circuitry (ICs), a System on Chip (SoC), portions thereof, discrete electronic devices, or other modules, instruction sets, programmable logic or algorithms, HW, HW accelerators, SW, firmware, or a combination thereof adapted in the compute node 2950, or as components otherwise incorporated within a chassis of a larger system.

The compute node 2950 may correspond to the RRE 101, RadioApp provider platform 140, and/or RadioApp store platform 160 of FIG. 1; the smartphone 2401 and/or Radio-App Store 2460 in FIG. 24; UEs 2610, NANs 2630, edge compute node(s) 2636, CN 2642 (or compute node(s) therein), cloud 2644 (or compute node(s) therein), and/or server(s) 2650 of FIG. 26; SW distribution platform 2705 and/or processor platform(s) 2700 of FIG. 27; and/or any other component, device, and/or system discussed herein. The compute node 2950 may be embodied as a type of device, appliance, computer, or other "thing" capable of communicating with other edge, networking, or endpoint components. For example, compute node 2950 may be embodied as a smartphone, a mobile compute device, a smart appliance, an in-vehicle compute system (e.g., a navigation system), an edge compute node, a NAN, switch, router, bridge, hub, and/or other device or system capable of performing the described functions.

The compute node 2950 includes processing circuitry in the form of one or more processors 2952. The processor circuitry 2952 includes circuitry such as, but not limited to one or more processor cores and one or more of cache memory, low drop-out voltage regulators (LDOs), interrupt controllers, serial interfaces such as SPI, I2C or universal programmable serial interface circuit, real-time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 2952 may include one or more HW accelerators (e.g., same or similar to acceleration circuitry 2964), which may be microprocessors, programmable processing devices (e.g., FPGA, ASIC, and/or the like), or the like. The one or more accelerators may include, for example, computer vision and/or deep learning accelerators. In some implementations, the processor circuitry 2952 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor circuitry 2952 may be, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, a special purpose processing unit and/or specialized processing unit, or any other known processing elements, or any suitable combination thereof. In some implementations, the processor circuitry 2952 may be embodied as a specialized x-processing unit (xPU) also known as a data processing unit (DPU), infrastructure processing unit (IPU), or network processing unit (NPU). An xPU may be embodied as a standalone circuit or circuit package, integrated within an SoC, or integrated with networking circuitry (e.g., in a SmartNIC, or enhanced SmartNIC), acceleration circuitry, storage devices, storage disks, and/or AI HW (e.g., GPUs or programmed FPGAs). The xPU may be designed to receive programming to process one or more data streams and perform specific tasks and actions for the data streams (e.g., hosting microservices, performing service management or orchestration, organizing or managing server or data center HW, managing service meshes, or collecting and distributing telemetry), outside of a CPU or general purpose processing HW. However, an xPU, a SoC, a CPU, and other variations of the processor circuitry 2952 may work in coordination with each other to execute many types of operations and instructions within and on behalf of the compute node 2950.

The processors (or cores) 2952 may be coupled with or may include memory/storage and may be configured to execute instructions stored in the memory/storage to enable various applications or operating systems to run on the platform 2950. The processors (or cores) 2952 is configured to operate application SW to provide a specific service to a user of the platform 2950. Additionally or alternatively, the processor(s) 2952 may be a special-purpose processor(s)/controller(s) configured (or configurable) to operate according to the elements, features, and implementations discussed herein.

As examples, the processor(s) 2952 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 2952 may be a part of a system on a chip (SoC), System-in-Package (SiP), a multi-chip package (MCP), and/or the like, in which the processor(s) 2952 and other components are formed into a single integrated circuit, or a single package, such as the Edison™ or Galileo™ SoC boards from Intel® Corporation. Other examples of the processor(s) 2952 are mentioned elsewhere in the present disclosure.

The processor(s) 2952 may communicate with system memory 2954 over an interconnect (IX) 2956. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 2958 may also couple to the processor 2952 via the IX 2956. In an example, the storage 2958 may be implemented via a solid-state disk drive (SSDD) and/or high-speed electrically erasable memory (commonly referred to as "flash memory"). Other devices that may be used for the storage 2958 include flash memory cards, such as SD cards, microSD cards, eXtreme Digital (XD) picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 2954 and/or storage circuitry 2958 may also incorporate three-dimensional (3D) cross-point (XPOINT) memories from Intel® and Micron®.

In low power implementations, the storage 2958 may be on-die memory or registers associated with the processor 2952. However, in some examples, the storage 2958 may be implemented using a micro hard disk drive (HDD). Further, any number of new technologies may be used for the storage 2958 in addition to, or instead of, the technologies described, such resistance change memories, phase change memories, holographic memories, or chemical memories, among others.

The components of edge computing device 2950 may communicate over an interconnect (IX) 2956. The IX 2956 may represent any suitable type of connection or interface such as, for example, metal or metal alloys (e.g., copper, aluminum, and/or the like), fiber, and/or the like. The IX 2956 may include any number of IX, fabric, and/or interface technologies, including instruction set architecture (ISA), extended ISA (eISA), Inter-Integrated Circuit (I2C), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX technology, RapidIO™ IX, Coherent Accelerator Processor Interface (CAPI), OpenCAPI, cache coherent interconnect for accelerators (CCIX), Gen-Z Consortium IXs, Hyper-Transport IXs, NVLink provided by NVIDIA®, a Time-Trigger Protocol (TTP) system, a FlexRay system, PROFI-BUS, ARM® Advanced eXtensible Interface (AXI), ARM® Advanced Microcontroller Bus Architecture (AMBA) IX, HyperTransport, Infinity Fabric (IF), and/or any number of other IX technologies. The IX 2956 may be a proprietary bus, for example, used in a SoC based system.

The IX 2956 couples the processor 2952 to communication circuitry 2966 for communications with other devices, such as a remote server (not shown) and/or the connected edge devices 2962. The communication circuitry 2966 is a HW element, or collection of HW elements, used to communicate over one or more networks (e.g., cloud 2963) and/or with other devices (e.g., edge devices 2962). The collection of HW elements include HW devices such as baseband circuitry 296x, switches, filters, amplifiers, antenna elements, and the like to facilitate OTA communications).

The transceiver 2966 may use any number of frequencies and protocols, such as 2.4 Gigahertz (GHz) transmissions under the [IEEE802154] standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 2962. For example, a wireless local area network (WLAN) unit may be used to implement Wi-Fi® communications in accordance with [IEEE80211]. In addition, wireless wide area communications, e.g., according to a cellular or other wireless wide area protocol, may occur via a wireless wide area network (WWAN) unit.

The communication circuitry 2966 (or multiple transceivers 2966) may communicate using multiple standards or radios for communications at a different range. For example, the communication circuitry 2966 may include short-range RAT circuitry 296y to communicate with relatively close devices (e.g., within about 10 meters) based on BLE, or another low power radio, to save power. More distant connected edge devices 2962 (e.g., within about 50 meters) may be reached over ZigBee® circuitry 296y and/or other intermediate power radios 296y. Both communications techniques may take place over a single radio 296$y$ at different power levels or may take place over separate transceivers 296$y$, for example, a local transceiver 296$y$ using BLE and a separate mesh transceiver 296$y$ using ZigBee®.

A wireless network transceiver 296$z$ may be included to communicate with devices or services in the edge cloud 2963 via local or wide area network protocols. The wireless network transceiver 296$z$ may be an LPWA transceiver that follows the [IEEE802154] standards, among others. The edge computing node 2950 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 296$z$, as described herein. For example, the transceiver 296$z$ may include a cellular transceiver that uses spread spectrum (SPA/SAS) communications for implementing high-speed communications. Further, any number of other protocols may be used, such as Wi-Fi® networks for medium speed communications and provision of network communications. The transceiver 296$z$ may include radios that are compatible with any number of 3GPP specifications, such as LTE and 5G/NR communication systems, discussed in further detail at the end of the present disclosure.

A network interface controller (NIC) 2968 may be included to provide a wired communication to nodes of the edge cloud 2963 or to other devices, such as the connected edge devices 2962 (e.g., operating in a mesh). The wired communication may provide an Ethernet connection (see e.g., Ethernet (e.g., IEEE Standard for Ethernet, IEEE Std 802.3-2018, pp. 1-5600 (31 Aug. 2018) ("[IEEE8023]")) or may be based on other types of networks, such as Controller Area Network (CAN), Local Interconnect Network (LIN), DeviceNet, ControlNet, Data Highway+, or PROFINET, among many others. An additional NIC 2968 may be included to enable connecting to a second network, for example, a first NIC 2968 providing communications to the cloud over Ethernet, and a second NIC 2968 providing communications to other devices over another type of network.

Given the variety of types of applicable communications from the device to another component or network, applicable communications circuitry used by the device may include or be embodied by any one or more of components 2964, 2966, 2968, or 2970. Accordingly, in various examples, applicable means for communicating (e.g., receiving, transmitting, and/or the like) may be embodied by such communications circuitry.

The compute node 2950 may include or be coupled to acceleration circuitry 2964, which may be embodied by one or more AI accelerators, a neural compute stick, neuromorphic HW, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 2964 may comprise logic blocks or logic fabric and other interconnected resources that may be programmed (configured) to perform various functions, such as the procedures, methods, functions, and/or the like discussed herein. In such implementations, the acceleration circuitry 2964 may also include memory cells (e.g., EPROM, EEPROM, flash memory, static memory (e.g., SRAM, anti-fuses, and/or the like) used to store logic blocks, logic fabric, data, and/or the like in LUTs and the like.

The IX 2956 also couples the processor 2952 to a sensor hub or external interface 2970 that is used to connect additional devices or subsystems. The additional/external devices may include sensors 2972, actuators 2974, and positioning circuitry 2975. The sensor circuitry 2972 includes devices, modules, or subsystems whose purpose is to detect events or changes in its environment and send the information (sensor data) about the detected events to some other a device, module, subsystem, and/or the like Examples of such sensors 2972 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors, including sensors for measuring the temperature of internal components and sensors for measuring temperature external to the compute node 2950); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and/or the like.

The actuators 2974, allow platform 2950 to change its state, position, and/or orientation, or move or control a mechanism or system. The actuators 2974 comprise electrical and/or mechanical devices for moving or controlling a mechanism or system, and converts energy (e.g., electric current or moving air and/or liquid) into some kind of motion. The actuators 2974 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 2974 may include one or more electromechanical devices such as pneumatic actuators, hydraulic actuators, electromechanical switches including electromechanical relays (EMRs), motors (e.g., DC motors, stepper motors, servomechanisms, and/or the like), power switches, valve actuators, wheels, thrusters, propellers, claws, clamps, hooks, audible sound generators, visual warning devices, and/or other like electromechanical components. The platform 2950 may be configured to operate one or more actuators 2974 based on one or more captured events and/or instructions or control signals received from a service provider and/or various client systems.

The positioning circuitry 2975 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), and/or the like), or the like. The positioning circuitry 2975 comprises various HW elements (e.g., including HW devices such as switches, filters, amplifiers, antenna elements, and the like to facilitate OTA communications) to communicate with components of a positioning network, such as navigation satellite constellation nodes. Additionally or alternatively, the positioning circuitry 2975 may include a Micro-Technology for Positioning, Navigation, and Timing (Micro-PNT) IC that uses a master timing clock to perform position tracking/estimation without GNSS assistance. The positioning circuitry 2975 may also be part of, or interact with, the communication circuitry 2966 to communicate with the nodes and components of the positioning network. The positioning circuitry 2975 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 2975 is, or includes an INS, which is a system or device that uses sensor circuitry 2972 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the platform 2950 without the need for external references.

In some optional examples, various input/output (I/O) devices may be present within or connected to, the compute node 2950, which are referred to as input circuitry 2986 and output circuitry 2984 in FIG. 29. The input circuitry 2986 and output circuitry 2984 include one or more user interfaces designed to enable user interaction with the platform 2950 and/or peripheral component interfaces designed to enable peripheral component interaction with the platform 2950. Input circuitry 2986 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 2984 may be included to show information or otherwise convey information, such as sensor readings, actuator position(s), or other like information. Data and/or graphics may be displayed on one or more user interface components of the output circuitry 2984. Output circuitry 2984 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, and/or the like), with the output of characters, graphics, multimedia objects, and the like being generated or produced from the operation of the platform 2950. The output circuitry 2984 may also include speakers or other audio emitting devices, printer(s), and/or the like. Additionally or alternatively, the sensor circuitry 2972 may be used as the input circuitry 2984 (e.g., an image capture device, motion capture device, or the like) and one or more actuators 2974 may be used as the output device circuitry 2984 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, and/or the like A display or console HW, in the context of the present system, may be used to provide output and receive input of an edge computing system; to manage components or services of an edge computing system; identify a state of an edge computing component or service; or to conduct any other number of management or administration functions or service use cases.

A battery 2976 may power the compute node 2950, although, in examples in which the compute node 2950 is mounted in a fixed location, it may have a power supply coupled to an electrical grid, or the battery may be used as a backup or for temporary capabilities. The battery 2976 may be a lithium ion battery, or a metal-air battery, such as a zinc-air battery, an aluminum-air battery, a lithium-air battery, and the like.

A battery monitor/charger 2978 may be included in the compute node 2950 to track the state of charge (SoCh) of the battery 2976, if included. The battery monitor/charger 2978 may be used to monitor other parameters of the battery 2976 to provide failure predictions, such as the state of health (SoH) and the state of function (SoF) of the battery 2976. The battery monitor/charger 2978 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 2978 may communicate the information on the battery 2976 to the processor 2952 over the IX 2956. The battery monitor/charger 2978 may also include an analog-to-digital (ADC) converter that enables the processor 2952 to directly monitor the voltage of the battery 2976 or the current flow from the battery 2976. The battery parameters may be used to determine actions that the compute node 2950 may perform, such as transmission frequency, mesh network operation, sensing frequency, and the like.

A power block 2980, or other power supply coupled to a grid, may be coupled with the battery monitor/charger 2978 to charge the battery 2976. In some examples, the power block 2980 may be replaced with a wireless power receiver to obtain the power wirelessly, for example, through a loop antenna in the compute node 2950. A wireless battery charging circuit, such as an LTC4020 chip from Linear Technologies of Milpitas, California, among others, may be included in the battery monitor/charger 2978. The specific charging circuits may be selected based on the size of the battery 2976, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2958 may include instructions 2983 in the form of SW, firmware, or HW commands to implement the techniques described herein. Although such instructions 2982, 2983 are shown as code blocks included in the memory 2954 and the storage 2958, any of the code blocks 2982, 2983 may be replaced with hardwired circuits, for example, built into an application specific integrated circuit (ASIC) or programmed into an FPGA, or the like.

In an example, the instructions 2981, 2982, 2983 provided via the memory 2954, the storage 2958, or the processor 2952 may be embodied as a non-transitory machine-readable medium (NTMRM) 2960 including code to direct the processor 2952 to perform electronic operations in the compute node 2950. The processor 2952 may access the NTMRM 2960 over the IX 2956. For instance, the NTMRM 2960 may be embodied by devices described for the storage 2958 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other HW devices in which information is stored for any duration (e.g., for extended time periods, permanently, for brief instances, for temporarily buffering, and/or caching). The NTMRM 2960 may include instructions to direct the processor 2952 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Computer program code for carrying out operations of the present disclosure (e.g., computational logic and/or instructions 2981, 2982, 2983) may be written in any combination of one or more programming languages, including an object oriented programming language such as Python, Ruby, Scala, Smalltalk, Java™, C++, C #, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code 2981, 2982, 2983 for carrying out operations of the present disclosure may also be written in any combination of the programming languages discussed herein. The program code may execute entirely on the system 2950, partly on the system 2950, as a stand-alone SW package, partly on the system 2950 and partly on a remote computer or entirely on the remote computer or server. In the latter scenario, the remote computer may be connected to the system 2950 through any type of network, including a LAN or WAN, or the connection may be made to an external computer (e.g., through the Internet using an Internet Service Provider (ISP)).

In an example, the instructions 2981, 2982, 2983 on the processor circuitry 2952 (separately, or in combination with the instructions 2981, 2982, 2983) may configure execution or operation of a trusted execution environment (TEE) 2990. The TEE 2990 operates as a protected area accessible to the processor circuitry 2902 to enable secure access to data and secure execution of instructions. In some embodiments, the TEE 2990 may be a physical HW device that is separate from other components of the system 2950 such as a secure-embedded controller, a dedicated SoC, or a tamper-resistant chipset or microcontroller with embedded processing devices and memory devices. Examples of such embodiments include a Desktop and mobile Architecture HW (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

Additionally or alternatively, the TEE 2990 may be implemented as secure enclaves, which are isolated regions of code and/or data within the processor and/or memory/storage circuitry of the system 2950. Only code executed within a secure enclave may access data within the same secure enclave, and the secure enclave may only be accessible using the secure application (which may be implemented by an application processor or a tamper-resistant microcontroller). Various implementations of the TEE 2990, and an accompanying secure area in the processor circuitry 2952 or the memory circuitry 2954 and/or storage circuitry 2958 may be provided, for instance, through use of Intel® Software Guard Extensions (SGX), ARM® TrustZone® HW security extensions, Keystone Enclaves provided by Oasis Labs™, and/or the like. Other aspects of security hardening, HW roots-of-trust, and trusted or protected operations may be implemented in the device 2900 through the TEE 2990 and the processor circuitry 2952. Additionally or alternatively, the memory circuitry 2954 and/or storage circuitry 2958 may be divided into isolated user-space instances such as containers, partitions, virtual environments (VEs), and/or the like The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 2904 and/or storage circuitry 2908 may be divided into one or more trusted memory regions for storing applications or SW modules of the TEE 2990.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, and/or the like), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, and/or the like) on one or several remote servers. The source code packages may be encrypted when in transit over a network and decrypted, uncompressed, assembled (e.g., linked) if necessary, and compiled or interpreted (e.g., into a library, stand-alone executable, and/or the like) at a local machine, and executed by the local machine.

FIG. 29 depicts components of a compute node 2950. Some of the components shown may be omitted, additional components may be present, and a different arrangement of the components shown may occur in other implementations. Further, these arrangements are usable in a variety of use cases and environments, including those discussed herein. The components of the device 2950 and/or any of the devices and/or systems discussed herein may be servers, appliances, network infrastructure, machines, robots, drones, and/or any other type of computing devices. For example, an edge cloud may include an appliance computing device that is a self-contained electronic device including a housing, a chassis, a case or a shell. In some circumstances, the housing may be dimensioned for portability such that it can be carried by a human and/or shipped. Alternatively, it may be a smaller module suitable for installation in a vehicle for example. Example housings may include materials that form one or more exterior surfaces that partially or fully protect contents of the appliance, in which protection may include weather protection, hazardous environment protection (e.g., electromagnetic interference (EMI), and/or radio-frequency interference (RFI), electromagnetic radiation, vibration, relatively extreme temperatures, and the like), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications. Example housings and/or surfaces thereof may include or connect to mounting HW to enable attachment to structures such as buildings, telecommunication structures (e.g., poles, antenna structures, and/or the like) and/or racks (e.g., server racks, blade mounts, and/or the like). Example housings and/or surfaces thereof may support one or more sensors (e.g., temperature sensors, vibration sensors, light sensors, acoustic sensors, capacitive sensors, proximity sensors, and/or the like). One or more such sensors may be contained in, carried by, or otherwise embedded in the surface and/or mounted to the surface of the appliance. Example housings and/or surfaces thereof may support mechanical connectivity, such as propulsion HW (e.g., wheels, propellers, and/or the like) and/or articulating HW (e.g., robot arms, pivotable appendages, and/or the like). In some circumstances, the sensors may include any type of input devices such as user interface I-1 W (e.g., buttons, switches, dials, sliders, and/or the like). In some circumstances, example housings include output devices contained in, carried by, embedded therein and/or attached thereto. Output devices may include displays, touchscreens, lights, LEDs, speakers, I/O ports (e.g., USB), and/or the like. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include HW and SW components to manage local issues such as device temperature, vibration, resource utilization, updates, power issues, physical and network security, and/or the like. Example HW for implementing an appliance computing device is described in conjunction with FIG. 29. The edge cloud may also include one or more servers and/or one or more multi-tenant servers. Such a server may include an operating system and implement a virtual computing environment. A virtual computing environment may include a hypervisor managing (e.g., spawning, deploying, destroying, and/or the like) one or more virtual machines, one or more containers, and/or the like. Such virtual computing environments provide an execution environment in which one or more applications and/or other SW, code or scripts may execute while being isolated from one or more other applications, SW, code or scripts.

4. EXAMPLES

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 includes a method of operating a radio application (RA) provider platform, the method comprising: generating an RA package (RAP) container to include: RA code in a code information element (IE) of the RAP container, and metadata in one or more other IEs of the RAP; and uploading the generated RAP container to a RadioApp store platform for delivery to one or more radio computers disposed in one or more reconfigurable radio systems.

Example 2 includes the method of example 1 and/or some other example(s) herein, wherein the method includes: compiling the RA code for execution in a one or more platforms prior to including the RA code in the RAP container.

Example 3 includes a method of operating a radio application (RA) store platform, the method comprising: receiving, from an RA provider platform, a radio application package (RAP), the RAP including RA code in a code information element (IE) of the RAP container and metadata in one or more other IEs of the RAP; receiving, from a reconfigurable radio equipment (RRE), a request to download the RAP; and sending, to the RRE, a response including the requested RAP.

Example 4 includes a method of operating a reconfigurable radio equipment (RRE), the method comprising: sending, to a radio application (RA) store platform, a request to download a radio application package (RAP), the RAP being generated by a RA provider platform; receiving, from the RA store platform, a response including the requested RAP, the requested RAP including RA code in a code information element (IE) of the RAP container and metadata in one or more other IEs of the RAP; and installing the RA code included in the requested RAP using the metadata included in the RAP.

Example 5 includes the method of examples 1-4 and/or some other example(s) herein, wherein the RA codes are platform-specific to the RRE, and a result of compiling the RA code is configuration code that is executable on the RRE.

Example 6 includes the method of examples 1-4 and/or some other example(s) herein, wherein the RA codes are not platform-specific to the RRE, and a result of compiling the RA code is an intermediate representation that requires back-end compiling for operating on the RRE.

Example 7 includes the method of examples 1-6 and/or some other example(s) herein, wherein the code IE includes a set of code subsection fields, wherein each code subsection field of the set of code subsection fields includes a code descriptor field and a component list field including a set of software (SW) components of the code subsection to which the set of SW components belongs.

Example 8 includes the method of example 7 and/or some other example(s) herein, wherein the code descriptor field includes a code identifier (ID) field including an ID of the code subsection to which the code ID field belongs.

Example 9 includes the method of examples 7-8 and/or some other example(s) herein, wherein the code descriptor field includes a code version field including a version of the code subsection to which code version field belongs.

Example 10 includes the method of examples 7-9 and/or some other example(s) herein, wherein the code descriptor field includes a code date field including a creation date of the code subsection in which the code date field is included.

Example 11 includes the method of examples 7-10 and/or some other example(s) herein, wherein the code descriptor field includes a code producer ID field including an ID of a producer or developer of the code subsection to which the code producer ID field belongs.

Example 12 includes the method of examples 7-11 and/or some other example(s) herein, wherein the component list field includes a set of fields, wherein each field in the set of fields corresponds to a corresponding SW component of the set of SW components, and each field includes a code component header field and SW code of the corresponding SW component.

Example 13 includes the method of example 12 and/or some other example(s) herein, wherein the component list field includes a set of component fields, wherein each component field in the set of component fields corresponds to a corresponding SW component of the set of SW components, and each component field includes a code component header field and SW code component field including SW code the corresponding SW component.

Example 14 includes the method of examples 12-13 and/or some other example(s) herein, wherein the code component header field includes a SW component ID field including an ID of the corresponding SW component, a component type field including information indicating a component type of the corresponding SW component, a hardware (HW) component ID field including an ID of a corresponding HW component related to the corresponding SW component, and a component descriptor field.

Example 15 includes the method of example 14 and/or some other example(s) herein, wherein the component descriptor field is a radio virtual machine (RVM) descriptor field when the RA code is an intermediate representation.

Example 16 includes the method of example 15 and/or some other example(s) herein, wherein the RVM descriptor field includes an RVM version field including a version of an RVM related to the corresponding SW component, and an RVM date field including a release date of the RVM related to the corresponding SW component.

Example 17 includes the method of example 14 and/or some other example(s) herein, wherein the component descriptor field is a source code descriptor field when the RA code is a source code.

Example 18 includes the method of example 17 and/or some other example(s) herein, wherein the source code descriptor field includes a language descriptor field, the language descriptor field including a language name field including a name of a programming language in which the corresponding SW component is written, a language version field including a version of the programming language, and a language date field including a date of the version of the programming language.

Example 19 includes the method of examples 17-18 and/or some other example(s) herein, wherein the source code descriptor field includes an operating system (OS) descriptor field, the OS descriptor field including an OS name field including a name of an OS on which the corresponding SW component is to operate, an OS version field including a version of the OS, and an OS date field including a date of the version of the OS.

Example 20 includes the method of examples 17-19 and/or some other example(s) herein, wherein the source code descriptor field includes a library descriptor field, the library descriptor field including a library ID field including an ID of a radio library to be called by the source code of the corresponding SW component, a library version field including a version of the radio library, a library date field including a date of the version of the radio library, and a library link field including a link to the radio library.

Example 21 includes the method of examples 1-20 and/or some other example(s) herein, wherein the one or more other IEs include a security IE.

Example 22 includes the method of example 21 and/or some other example(s) herein, wherein the security IE includes a security profile field, the security profile field including information on a structure of the security IE and a list of non-mandatory security features related to the RA code.

Example 23 includes the method of example 22 and/or some other example(s) herein, wherein the security IE includes a security reserve field, the security reserve field including the non-mandatory security features listed in the security profile.

Example 24 includes the method of examples 21-23 and/or some other example(s) herein, wherein the security IE includes an integrity protection field, the integrity protection field including security information related to data in transit and data in storage.

Example 25 includes the method of examples 21-24 and/or some other example(s) herein, wherein the security IE includes a proof of origin field, the proof of origin field including proof of original information, the proof of original information including evidence of an origin of the RAP or evidence of receipt of the RAP.

Example 26 includes the method of examples 1-25 and/or some other example(s) herein, wherein the one or more other IEs include a manufacturer IE.

Example 27 includes the method of example 26 and/or some other example(s) herein, wherein the manufacturer IE includes an installator type field, the installator type field includes information related to a type of installer used for installation of the RA code.

Example 28 includes the method of example 27 and/or some other example(s) herein, wherein the manufacturer IE includes an installator code field, the installator code field includes code of an installation program for installation of the RA code.

Example 29 includes the method of example 28 and/or some other example(s) herein, wherein the manufacturer IE includes an installator parameters field, the installator parameters field includes one or more parameters associated with the type of installer included in the installator type field or the installation code included in the installator code field.

Example 30 includes the method of example 29, wherein the manufacturer IE includes a manufacturer reserved field, the manufacturer reserved field includes information not included in the installator type field, the installator code field, or t and/or some other example(s) herein the installator parameters field.

Example 31 includes the method of examples 7-30 and/or some other example(s) herein, wherein the one or more other IEs include an initial profile IE, wherein the initial profile IE includes a list of initial profiles, wherein each initial profile in the list of initial profiles includes configuration settings corresponding to an SW component in the code IE.

Example 32 includes the method of examples 21-31 and/or some other example(s) herein, wherein the one or more other IEs include a header IE.

Example 33 includes the method of example 32 and/or some other example(s) herein, wherein the security IE is disposed directly after the header IE in the RAP container.

Example 34 includes the method of examples 32-33 and/or some other example(s) herein, wherein the header IE includes a RAP descriptor field, wherein the RAP descriptor field includes a RAP ID field including an ID assigned to the RAP, a RAP version field including a version of the RAP, a RAP date field including a creation or release date of the RAP, and a RAP producer ID field including an ID of the RA provider platform.

Example 35 includes the method of examples 32-34 and/or some other example(s) herein, wherein the header IE includes a RAP structure descriptor field, the RAP structure descriptor field including a set of flags that define a structure of the one or more other IEs of the RAP container.

Example 36 includes the method of example 35 and/or some other example(s) herein, wherein the set of flags includes a manufacturer information flag, wherein the manufacturer information IE is included in the RAP container when the manufacturer information flag is enabled.

Example 37 includes the method of examples 35-36 and/or some other example(s) herein, wherein the set of flags includes an initial profile flag indicates, wherein the initial profile IE is included in the RAP container when the initial profile flag is enabled.

Example 38 includes the method of examples 35-37 and/or some other example(s) herein, wherein the set of flags includes a RAP reserve flag, wherein the one or more other IEs include a RAP reserved IE when the RAP reserve flag is enabled.

Example 39 includes the method of examples 35-38 and/or some other example(s) herein, wherein the set of flags includes a header reserve flag, wherein the header IE includes a header reserved field when the header reserve flag is enabled Example 40 includes the method of examples 35-39 and/or some other example(s) herein, wherein the set of flags includes a manufacturer reserve flag, wherein the manufacturer IE includes a manufacturer reserved field when the manufacturer reserve flag is enabled.

Example 41 includes the method of examples 35-40 and/or some other example(s) herein, wherein the set of flags includes a security reserve flag, wherein the security IE includes a security reserved field when the security reserve flag is enabled.

Example 42 includes the method of examples 35-41 and/or some other example(s) herein, wherein the set of flags includes a RAP reserve flag, wherein the security IE includes a security reserved field when the security reserve flag is enabled.

Example 43 includes the method of examples 35-42 and/or some other example(s) herein, wherein the header IE includes a radio library (RL) descriptor field, wherein the RL descriptor field includes an RL ID field including an ID of an RL and an RL version field including a version of the RL.

Example 44 includes the method of examples 35-43 and/or some other example(s) herein, wherein the header IE includes a target platform descriptor field, wherein the target platform descriptor field includes a target platform ID field including an ID of a target platform of the RAP container and an target platform class field including a Mobile Device Reconfiguration Classes (MDRC) or Radio Equipment Reconfiguration Classes (RERC) of the target platform.

Example 45 includes the method of examples 4-44 and/or some other example(s) herein, wherein the RRE includes a communication services layer (CSL) and at least one radio computer, and the method includes: implementing a Multi-Radio Interface (MURI) and/or generalized MURI (gMURI) between the CSL and the at least one radio computer.

Example 46 includes the method of example 45 and/or some other example(s) herein, wherein the at least one radio computer includes a radio computer state (RCState) attribute, wherein the RCState attribute includes an internal state of the at least one radio computer, and the internal state of the at least one radio computer is one of inactive, active, or processing a RAP.

Example 47 includes the method of examples 45-46 and/or some other example(s) herein, wherein the at least one radio computer includes at least one RA, wherein the at least one RA includes an RA state attribute, the RA state attribute includes an internal state of the at least one RA, and the internal state of the at least one RA is one of inactive, active, installed, uninstalled, executed, available, or unavailable.

Example 48 includes the method of examples 45-47 and/or some other example(s) herein, wherein the at least one radio computer includes at least one radio operating system (ROS), wherein the at least one ROS includes an ROS state attribute, the ROS state attribute includes an internal state of the at least one ROS, and the internal state of the at least one ROS is one of inactive, active, error, or interrupted.

Example 49 includes the method of examples 45-48 and/or some other example(s) herein, wherein the at least one radio computer includes at least one radio computer measurement (RCMeas), wherein the at least one RCMeas includes an RCMeas state attribute, the RCMeas state attribute includes an internal state of the a corresponding receiver path (RxPath), and the internal state of the corresponding RxPath is one of available, not available, processed, or updated.

Example 50 includes the method of examples 45-49 and/or some other example(s) herein, wherein the at least one radio computer includes at least one channel object.

Example 51 includes the method of example 50 and/or some other example(s) herein, wherein the at least one channel object includes a channel profile, wherein the channel profile includes a channel profile state attribute, the channel profile state attribute includes an internal state of the channel profile, and the internal state of the channel profile is one of available, not available, processed, or updated.

Example 52 includes the method of examples 50-51 and/or some other example(s) herein, wherein the at least one channel object includes a channel measurements object, wherein the channel measurements object includes a channel measurements object state attribute, the channel measurements object attribute includes an internal state of the channel measurements object, and the internal state of the channel measurements object is one of available, not available, processed, or updated.

Example 53 includes the method of examples 50-52 and/or some other example(s) herein, wherein the at least one channel object includes an antenna profile, wherein the antenna profile includes an antenna profile state attribute, the antenna profile state attribute includes an internal state of the antenna profile, and the internal state of the antenna profile is one of available, not available, processed, or updated.

Example 54 includes the method of examples 45-53 and/or some other example(s) herein, wherein the at least one radio computer includes a link object, and the link object includes a radiofrequency (RF) configuration, a link profile, and a link measurements object.

Example 55 includes the method of example 54 and/or some other example(s) herein, wherein the RF configuration includes a transmission path (TxPath), wherein the TxPath includes a TxPath state attribute, the TxPath state attribute includes an internal state of the TxPath, and the internal state of the TxPath is one of active, inactive, available, or not available.

Example 56 includes the method of examples 54-55 and/or some other example(s) herein, wherein the RF configuration includes an RxPath, wherein the RxPath includes an RxPath state attribute, the RxPath state attribute includes an internal state of the RxPath, and the internal state of the RxPath is one of active, inactive, available, or not available.

Example 57 includes the method of examples 54-56 and/or some other example(s) herein, wherein the link profile includes a link profile state attribute, the link profile state attribute includes an internal state of the link profile, and the internal state of the link profile is one of active, inactive, available, not available, processed, or updated.

Example 58 includes the method of examples 54-57 and/or some other example(s) herein, wherein the link measurements object includes a link measurements object state attribute, the link measurements object attribute includes an internal state of the link measurements object, and the internal state of the link measurements object is one of active, inactive, available, not available, processed, or updated Example 59 includes the method of examples 47-58 and/or some other example(s) herein, wherein the at least one radio computer is a part of mobile device hardware working under ROS control and on which the at least one RA is executed.

Example 60 includes a reconfigurable radio equipment (RRE) configured to perform the method of any one of examples 1-59. Example 61 includes a user equipment (UE) configured to perform the method of any one of examples 1-59. Example 62 includes a network access node (NAN) configured to perform the method of any one of examples 1-59. Example 63 includes a network appliance configured to perform the method of any one of examples 1-59. Example 64 includes an edge compute node configured to perform the method of any one of examples 1-59.

Example 65 includes one or more computer readable media comprising instructions, wherein execution of the instructions by processor circuitry is to cause the processor circuitry to perform the method of any one of examples 1-59 and/or some other example(s) herein. Example 66 includes a computer program comprising the instructions of example 65 and/or some other example(s) herein. Example 67 includes an Application Programming Interface defining functions, methods, variables, data structures, and/or protocols for the computer program of example 61 and/or some other example(s) herein. Example 68 includes an apparatus comprising circuitry loaded with the instructions of example 65 and/or some other example(s) herein. Example 69 includes an apparatus comprising circuitry operable to run the instructions of example 65 and/or some other example(s) herein. Example 70 includes an integrated circuit comprising one or more of the processor circuitry of example 65 and the one or more computer readable media of example 65 and/or some other example(s) herein. Example 71 includes a computing system comprising the one or more computer readable media and the processor circuitry of example 65 and/or some other example(s) herein. Example 72 includes an apparatus comprising means for executing the instructions of example 65 and/or some other example(s) herein. Example 73 includes a signal generated as a result of executing the instructions of example 65 and/or some other example(s) herein. Example 74 includes a data unit generated as a result of executing the instructions of example 65 and/or some other example(s) herein. Example 75 includes the data unit of example 69 and/or some other example(s) herein, wherein the data unit is a datagram, network packet, data frame, data segment, a PDU, a service data unit, "SDU", a message, or a database object. Example 76 includes a signal encoded with the data unit of examples 74-75 and/or some other example(s) herein. Example 77 includes an electromagnetic signal carrying the instructions of example 65 and/or some other example(s) herein. Example 78 includes an apparatus comprising means for performing the method of any one of examples 1-59 and/or some other example(s) herein.

5. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," each of which may refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "establish" or "establishment" at least in some embodiments refers to (partial or in full) acts, tasks, operations, and/or the like, related to bringing or the readying the bringing of something into existence either actively or passively (e.g., exposing a device identity or entity identity). Additionally or alternatively, the term "establish" or "establishment" at least in some embodiments refers to (partial or in full) acts, tasks, operations, and/or the like, related to initiating, starting, or warming communication or initiating, starting, or warming a relationship between two entities or elements (e.g., establish a session, establish a session, and/or the like). Additionally or alternatively, the term "establish" or "establishment" at least in some embodiments refers to initiating something to a state of working readiness. The term "established" at least in some embodiments refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

The term "obtain" at least in some embodiments refers to (partial or in full) acts, tasks, operations, and/or the like, of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive the stream of packets (or the following parameters and templates or template values).

The term "receipt" at least in some embodiments refers to any action (or set of actions) involved with receiving or obtaining an object, data, data unit, and/or the like, and/or the fact of the object, data, data unit, and/or the like being received. The term "receipt" at least in some embodiments refers to an object, data, data unit, and the like, being pushed to a device, system, element, and/or the like (e.g., often referred to as a push model), pulled by a device, system, element, and/or the like (e.g., often referred to as a pull model), and/or the like.

The term "element" at least in some embodiments refers to a unit that is indivisible at a given level of abstraction and has a clearly defined boundary, wherein an element may be any type of entity including, for example, one or more devices, systems, controllers, network elements, modules, and/or the like, or combinations thereof.

The term "measurement" at least in some embodiments refers to the observation and/or quantification of attributes of an object, event, or phenomenon. Additionally or alternatively, the term "measurement" at least in some embodiments refers to a set of operations having the object of determining a measured value or measurement result, and/or the actual instance or execution of operations leading to a measured value.

The term "signal" at least in some embodiments refers to an observable change in a quality and/or quantity. Additionally or alternatively, the term "signal" at least in some embodiments refers to a function that conveys information about of an object, event, or phenomenon. Additionally or alternatively, the term "signal" at least in some embodiments refers to any time varying voltage, current, or electromagnetic wave that may or may not carry information. The term "digital signal" at least in some embodiments refers to a signal that is constructed from a discrete set of waveforms of a physical quantity so as to represent a sequence of discrete values.

The term "lightweight" or "lite" at least in some embodiments refers to an application or computer program designed to use a relatively small amount of resources such as having a relatively small memory footprint, low processor usage, and/or overall low usage of system resources. The term "lightweight protocol" at least in some embodiments refers to a communication protocol that is characterized by a relatively small overhead. Additionally or alternatively, the term "lightweight protocol" at least in some embodiments refers to a protocol that provides the same or enhanced services as a standard protocol, but performs faster than standard protocols, has lesser overall size in terms of memory footprint, uses data compression techniques for processing and/or transferring data, drops or eliminates data deemed to be nonessential or unnecessary, and/or uses other mechanisms to reduce overall overheard and/or footprint.

The term "identifier" at least in some embodiments refers to a value, or a set of values, that uniquely identify an identity in a certain scope. Additionally or alternatively, the term "identifier" at least in some embodiments refers to a sequence of characters that identifies or otherwise indicates the identity of a unique object, element, or entity, or a unique class of objects, elements, or entities. Additionally or alternatively, the term "identifier" at least in some embodiments refers to a sequence of characters used to identify or refer to an application, program, session, object, element, entity, variable, set of data, and/or the like. The "sequence of characters" mentioned previously at least in some embodiments refers to one or more names, labels, words, numbers, letters, symbols, and/or any combination thereof. Additionally or alternatively, the term "identifier" at least in some embodiments refers to a name, address, label, distinguishing index, and/or attribute. Additionally or alternatively, the term "identifier" at least in some embodiments refers to an instance of identification. The term "persistent identifier" at least in some embodiments refers to an identifier that is reused by a device or by another device associated with the same person or group of persons for an indefinite period.

The term "identification" at least in some embodiments refers to a process of recognizing an identity as distinct from other identities in a particular scope or context, which may involve processing identifiers to reference an identity in an identity database.

The terms "ego" (as in, e.g., "ego device") and "subject" (as in, e.g., "data subject") at least in some embodiments refers to an entity, element, device, system, and/or the like, that is under consideration or being considered. The terms "neighbor" and "proximate" (as in, e.g., "proximate device") at least in some embodiments refers to an entity, element, device, system, and/or the like, other than an ego device or subject device.

The term "network path" or "path" at least in some embodiments refers to a data communications feature of a communication system describing the sequence and identity of system components visited by one or more packets, where the components of the path may be either logical or physical. The term "network forwarding path" at least in some embodiments refers to an ordered list of connection points forming a chain of NFs and/or nodes, along with policies associated to the list.

The term "circuitry" at least in some embodiments refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an application-specific integrated circuit (ASIC), field-programmable gate array (FPGA), programmable logic controller (PLC), system on chip (SoC), system in package (SiP), multi-chip package (MCP), digital signal processor (DSP), and/or the like, that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" at least in some embodiments refers to, is part of, or includes circuitry capable of sequentially and automatically carrying out a sequence of arithmetic or logical operations, or recording, storing, and/or transferring digital data. The term "processor circuitry" at least in some embodiments refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry." The term "application processor" at least in some embodiments refers to a part of compute node hardware working under OS control and on which user applications, among others, are executed.

The term "memory" and/or "memory circuitry" at least in some embodiments refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data. The term "memory footprint" at least in some embodiments refers to the amount of memory that a program, application, or other unit of software or program code uses or references while running.

The term "interface circuitry" at least in some embodiments refers to, is part of, or includes circuitry that enables the exchange of information between two or more components or devices. The term "interface circuitry" at least in some embodiments refers to one or more hardware interfaces, for example, buses, I/O interfaces, peripheral component interfaces, network interface cards, and/or the like.

The term "device" at least in some embodiments refers to a physical entity embedded inside, or attached to, another physical entity in its vicinity, with capabilities to convey digital information from or to that physical entity.

The term "entity" at least in some embodiments refers to a distinct component of an architecture or device, or information transferred as a payload.

The term "controller" at least in some embodiments refers to an element or entity that has the capability to affect a physical entity, such as by changing its state or causing the physical entity to move.

The term "terminal" at least in some embodiments refers to point at which a conductor from a component, device, or network comes to an end. Additionally or alternatively, the term "terminal" at least in some embodiments refers to an electrical connector acting as an interface to a conductor and creating a point where external circuits can be connected. In some embodiments, terminals may include electrical leads, electrical connectors, electrical connectors, solder cups or buckets, and/or the like.

The term "compute node" or "compute device" at least in some embodiments refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment, end consuming device, appliance, or the like.

The term "computer system" at least in some embodiments refers to any type interconnected electronic devices, computer devices, or components thereof. Additionally, the terms "computer system" and/or "system" at least in some embodiments refer to various components of a computer that are communicatively coupled with one another. Furthermore, the term "computer system" and/or "system" at least in some embodiments refer to multiple computer devices and/or multiple computing systems that are communicatively coupled with one another and configured to share computing and/or networking resources.

The term "architecture" at least in some embodiments refers to a computer architecture or a network architecture. The term "computer architecture" at least in some embodiments refers to a physical and logical design or arrangement of software and/or hardware elements in a computing system or platform including technology standards for interacts therebetween. The term "network architecture" at least in some embodiments refers to a physical and logical design or arrangement of software and/or hardware elements in a network including communication protocols, interfaces, and media transmission.

The term "platform" at least in some embodiments refers to an environment in which software, applications, program code, and the like can be executed or otherwise operate. The term "platform" at least in some embodiments can include one or more of hardware, virtualized hardware, an embedded system (e.g., IoT device, or the like), an operating system (OS), a virtual machine, a container, a client application (e.g., web browser, mobile app, or the like), a distributed application, a web platform, cloud computing service, APIs, an integrated development environment, a sandbox, and/or other elements that program code is executed in or with.

The term "appliance," "computer appliance," or the like, at least in some embodiments refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" at least in some embodiments refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, and/or the like. Furthermore, the term "user equipment" or "UE" may include any type of wireless/wired device or any computing device including a wireless communications interface. Examples of UEs, client devices, and/or the like, include desktop computers, workstations, laptop computers, mobile data terminals, smartphones, tablet computers, wearable devices, machine-to-machine (M2M) devices, machine-type communication (MTC) devices, Internet of Things (IoT) devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, helmet-mounted display devices, augmented reality (AR) devices, virtual reality (VR) devices, mixed reality (MR) devices, and/or other like systems or devices.

The term "station" or "STA" at least in some embodiments refers to a logical entity that is a singly addressable instance of a medium access control (MAC) and physical layer (PHY) interface to the wireless medium (WM). The term "wireless medium" or WM" at least in some embodiments refers to the medium used to implement the transfer of protocol data units (PDUs) between peer physical layer (PHY) entities of a wireless local area network (LAN).

The term "network element" at least in some embodiments refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, network access node (NAN), base station, access point (AP), RAN device, RAN node, gateway, server, network appliance, network function (NF), virtualized NF (VNF), and/or the like.

The term "network controller" at least in some embodiments refers to a functional block that centralizes some or all of the control and management functionality of a network domain and may provide an abstract view of the network domain to other functional blocks via an interface.

The term "access point" or "AP" at least in some embodiments refers to an entity that contains one station (STA) and provides access to the distribution services, via the wireless medium (WM) for associated STAs. An AP comprises a STA and a distribution system access function (DSAF).

The term "network access node" or "NAN" at least in some embodiments refers to a network element in a radio access network (RAN) responsible for the transmission and reception of radio signals in one or more cells or coverage areas to or from a UE or station. A "network access node" or "NAN" can have an integrated antenna or may be connected to an antenna array by feeder cables. Additionally or alternatively, a "network access node" or "NAN" may include specialized digital signal processing, network function hardware, and/or compute hardware to operate as a compute node. In some examples, a "network access node" or "NAN" may be split into multiple functional blocks operating in software for flexibility, cost, and performance. In some examples, a "network access node" or "NAN" may be a base station (e.g., an evolved Node B (eNB) or a next generation Node B (gNB)), an access point and/or wireless network access point, router, switch, hub, radio unit or remote radio head, Transmission Reception Point (TRxP), a gateway device (e.g., Residential Gateway, Wireline 5G Access Network, Wireline 5G Cable Access Network, Wireline BBF Access Network, and the like), network appliance, and/or some other network access hardware.

The term "network access controller" at least in some embodiments refers to a functional block that centralizes some or all of the control and management functionality of a network domain and optionally provides an abstract view of its domain to other functional blocks via well-defined interfaces.

The term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, and/or the like). Such edge computing implementations can involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory.

The term "cloud computing" or "cloud" at least in some embodiments refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like).

The term "computing resource" or simply "resource" at least in some embodiments refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, and/or the like), operating systems, virtual machines (VMs), software/applications, computer files, and/or the like. A "hardware resource" at least in some embodiments refers to compute, storage, and/or network resources provided by physical hardware element(s). A "virtualized resource" at least in some embodiments refers to compute, storage, and/or network resources provided by virtualization infrastructure to an application, device, system, and/or the like The term "network resource" or "communication resource" at least in some embodiments refers to resources that are accessible by computer devices/systems via a communications network. The term "system resources" at least in some embodiments refers to any kind of shared entities to provide services, and may include computing and/or network resources. System resources may be considered as a set of coherent functions, network data objects or services, accessible through a server where such system resources reside on a single host or multiple hosts and are clearly identifiable.

The term "cloud service provider" (or CSP) indicates an organization which operates on large-scale "cloud" resources comprised of centralized, regional, and Edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to Edge computing.

The term "network function" or "NF" at least in some embodiments refers to a functional block within a network infrastructure that has one or more external interfaces and a defined functional behavior. The term "network service" or "NS" at least in some embodiments refers to a composition of Network Function(s) and/or Network Service(s), defined by its functional and behavioral specification(s).

The term "network function virtualization" or "NFV" at least in some embodiments refers to the principle of separating network functions from the hardware they run on by using virtualisation techniques and/or virtualization technologies. Additionally or alternatively, the term "network function virtualization" or "NFV" involves the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. Additionally or alternatively, NFV processing and data storage will occur at the Edge data centers that are connected directly to the local cellular site, within the infrastructure Edge. The term "virtualized NF" or "VNF" at least in some embodiments refers to an implementation of an NF that can be deployed on a Network Function Virtualisation Infrastructure (NFVI). Additionally or alternatively, the term "virtualized NF" or "VNF" at least in some embodiments refers to a software-based NF operating on multi-function, multi-purpose compute resources (e.g., x86, ARM processing architecture, and the like), which are used by NFV in place of dedicated physical equipment. The term "Network Functions Virtualisation Infrastructure Manager" or "NFVI" at least in some embodiments refers to a totality of all hardware and software components that build up the environment in which VNFs are deployed. The term "Virtualized Infrastructure Manager" or "VIM" at least in some embodiments refers to a functional block that is responsible for controlling and managing the NFVI compute, storage and network resources, usually within one operator's infrastructure domain.

The term "virtualization container" or "container" at least in some embodiments refers to a partition of a compute node that provides an isolated virtualized computation environment. The term "OS container" at least in some embodiments refers to a virtualisation container utilizing a shared Operating System (OS) kernel of its host, where the host providing the shared OS kernel can be a physical compute node or another virtualization container.

The term "virtual machine" or "VM" at least in some embodiments refers to a virtualized computation environment that behaves in a same or similar manner as a physical computer and/or a server. The term "hypervisor" at least in some embodiments refers to a software element that partitions the underlying physical resources of a compute node, creates VMs, manages resources for VMs, and isolates individual VMs from each other.

The term "edge compute node" or "edge compute device" at least in some embodiments refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Additionally or alternatively, the term "edge compute node" at least in some embodiments refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "cluster" at least in some embodiments refers to a set or grouping of entities as part of an Edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "Internet of Things" or "IoT" at least in some embodiments refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smarthome, smart building and/or smart city technologies), and the like. IoT devices are usually low-power devices without heavy compute or storage capabilities. The term "Edge IoT devices" at least in some embodiments refers to any kind of IoT devices deployed at a network's edge.

The term "radio technology" at least in some embodiments refers to technology for wireless transmission and/or reception of electromagnetic radiation for information transfer. The term "radio access technology" or "RAT" at least in some embodiments refers to the technology used for the underlying physical connection to a radio based communication network.

The term "communication protocol" (either wired or wireless) at least in some embodiments refers to a set of standardized rules or instructions implemented by a communication device and/or system to communicate with other devices and/or systems, including instructions for packetizing/depacketizing data, modulating/demodulating signals, implementation of protocols stacks, and/or the like. The term "protocol stack" at least in some embodiments refers to an implementation of a networking protocol suite or protocol family, wherein individual protocols within the suite are defined or designed for one or more specific purposes and each protocol module can be an individual layer of a stack of protocols.

The term "RAT type" at least in some embodiments may identify a transmission technology and/or communication protocol used in an access network, for example, new radio (NR), Long Term Evolution (LTE), narrowband IoT (NB-IOT), untrusted non-3GPP, trusted non-3GPP, trusted Institute of Electrical and Electronics Engineers (IEEE) 802 (e.g., [IEEE80211]; see also *IEEE Standard for Local and Metropolitan Area Networks: Overview and Architecture*, IEEE Std 802-2014, pp. 1-74 (30 Jun. 2014) ("[IEEE802]"), the contents of which is hereby incorporated by reference in its entirety), non-3GPP access, MuLTEfire, WiMAX, wireline, wireline-cable, wireline broadband forum (wireline-BBF), and the like. Examples of RATs and/or wireless communications protocols include Advanced Mobile Phone System (AMPS) technologies such as Digital AMPS (D-AMPS), Total Access Communication System (TACS) (and variants thereof such as Extended TACS (ETACS), and/or the like); Global System for Mobile Communications (GSM) technologies such as Circuit Switched Data (CSD), High-Speed CSD (HSCSD), General Packet Radio Service (GPRS), and Enhanced Data Rates for GSM Evolution (EDGE); Third Generation Partnership Project (3GPP) technologies including, for example, Universal Mobile Telecommunications System (UMTS) (and variants thereof such as UMTS Terrestrial Radio Access (UTRA), Wideband Code Division Multiple Access (W-CDMA), Freedom of Multimedia Access (FOMA), Time Division-Code Division Multiple Access (TD-CDMA), Time Division-Synchronous Code Division Multiple Access (TD-SCDMA), and/or the like), Generic Access Network (GAN)/Unlicensed Mobile Access (UMA), High Speed Packet Access (HSPA) (and variants thereof such as HSPA Plus (HSPA+), and/or the like), Long Term Evolution (LTE) (and variants thereof such as LTE-Advanced (LTE-A), Evolved UTRA (E-UTRA), LTE Extra, LTE-A Pro, LTE LAA, MuLTEfire, and/or the like), Fifth Generation (5G) or New Radio (NR), and/or the like; ETSI technologies such as High Performance Radio Metropolitan Area Network (HiperMAN) and the like; IEEE technologies such as [IEEE802] and/or WiFi (e.g., [OEEE80211] and variants thereof), Worldwide Interoperability for Microwave Access (WiMAX) (e.g., [WiMAX] and variants thereof), Mobile Broadband Wireless Access (MBWA)/iBurst (e.g., IEEE 802.20 and variants thereof), and/or the like; Integrated Digital Enhanced Network (iDEN) (and variants thereof such as Wideband Integrated Digital Enhanced Network (WiDEN); millimeter wave (mmWave) technologies/standards (e.g., wireless systems operating at 10-300 GHz and above such as 3GPP 5G, Wireless Gigabit Alliance (WiGig) standards (e.g., IEEE 802.11ad, IEEE 802.11 ay, and the like); short-range and/or wireless personal area network (WPAN) technologies/standards such as Bluetooth (and variants thereof such as Bluetooth 5.3, Bluetooth Low Energy (BLE), and/or the like), IEEE 802.15 technologies/standards (e.g., IEEE Standard for Low-Rate Wireless Networks, IEEE Std 802.15.4-2020, pp. 1-800 (23 Jul. 2020) ("[IEEE802154]"), ZigBee, Thread, IPv6 over Low power WPAN (6LoWPAN), WirelessHART, MiWi, ISA100.11a, IEEE Standard for Local and metropolitan area networks—Part 15.6: Wireless Body Area Networks, IEEE Std 802.15.6-2012, pp. 1-271 (29 Feb. 2012), WiFi-direct, ANT/ANT+, Z-Wave, 3GPP Proximity Services (ProSe), Universal Plug and Play (UPnP), low power Wide Area Networks (LPWANs), Long Range Wide Area Network (LoRA or LoRaWAN™), and the like; optical and/or visible light communication (VLC) technologies/standards such as IEEE Standard for Local and metropolitan area networks—Part 15.7: Short-Range Optical Wireless Communications, IEEE Std 802.15.7-2018, pp. 1-407 (23 Apr. 2019), and the like; V2X communication including 3GPP cellular V2X (C-V2X), Wireless Access in Vehicular Environments (WAVE) (IEEE Standard for Information technology—Local and metropolitan area networks—Specific requirements—Part 11: Wireless LAN Medium Access Control (MAC) and Physical Layer (PHY) Specifications Amendment 6: Wireless Access in Vehicular Environments, IEEE Std 802.11p-2010, pp. 1-51 (15 Jul. 2010) ("[IEEE80211p]"), which is now part of [IEEE80211]), IEEE 802.11bd (e.g., for vehicular ad-hoc environments), Dedicated Short Range Communications (DSRC), Intelligent-Transport-Systems (ITS) (including the European ITS-G5, ITS-GSB, ITS-GSC, and/or the like); Sigfox; Mobitex; 3GPP2 technologies such as cdmaOne (2G), Code Division Multiple Access 2000 (CDMA 2000), and Evolution-Data Optimized or Evolution-Data Only (EV-DO); Push-to-talk (PTT), Mobile Telephone System (MTS) (and variants thereof such as Improved MTS (IMTS), Advanced MTS (AMTS), and/or the like); Personal Digital Cellular (PDC); Personal Handy-phone System (PHS), Cellular Digital Packet Data (CDPD); Cellular Digital Packet Data (CDPD); DataTAC; Digital Enhanced Cordless Telecommunications (DECT) (and variants thereof such as DECT Ultra Low Energy (DECT ULE), DECT-2020, DECT-5G, and/or the like); Ultra High Frequency (UHF) communication; Very High Frequency (VHF) communication; and/or any other suitable RAT or protocol. In addition to the aforementioned RATs/standards, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "channel" at least in some embodiments refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some embodiments refers to a connection between two devices through a RAT for the purpose of transmitting and receiving information.

The term "subframe" at least in some embodiments at least in some embodiments refers to a time interval during which a signal is signaled. In some implementations, a subframe is equal to 1 millisecond (ms). The term "time slot" at least in some embodiments at least in some embodiments refers to an integer multiple of consecutive subframes. The term "superframe" at least in some embodiments at least in some embodiments refers to a time interval comprising two time slots.

The term "reliability" at least in some embodiments refers to the ability of a computer-related component (e.g., software, hardware, or network element/entity) to consistently perform a desired function and/or operate according to a specification. Additionally or alternatively, the term "reliability" at least in some embodiments refers to the probability that a product, system, or service will perform its intended function adequately for a specified period of time, or will operate in a defined environment with a low probability of failure. Additionally or alternatively, the term "reliability" in the context of network communications (e.g., "network reliability") at least in some embodiments refers to the ability of a network to carry out communication. The term "network reliability" at least in some embodiments refers to a probability or measure of delivering a specified amount of data from a source to a destination (or sink).

The term "flow" at least in some embodiments refers to a sequence of data and/or data units (e.g., datagrams, packets, or the like) from a source entity/element to a destination entity/element. Additionally or alternatively, the terms "flow" or "traffic flow" at least in some embodiments refer to an artificial and/or logical equivalent to a call, connection, or link. Additionally or alternatively, the terms "flow" or "traffic flow" at least in some embodiments refer to a sequence of packets sent from a particular source to a particular unicast, anycast, or multicast destination that the source desires to label as a flow; from an upper-layer viewpoint, a flow may include of all packets in a specific transport connection or a media stream, however, a flow is not necessarily 1:1 mapped to a transport connection. Additionally or alternatively, the terms "flow" or "traffic flow" at least in some embodiments refer to a set of data and/or data units (e.g., datagrams, packets, or the like) passing an observation point in a network during a certain time interval. Additionally or alternatively, the term "flow" at least in some embodiments refers to a user plane data link that is attached to an association. Examples are circuit switched phone call, voice over IP call, reception of an SMS, sending of a contact card, PDP context for internet access, demultiplexing a TV channel from a channel multiplex, calculation of position coordinates from geopositioning satellite signals, and/or the like For purposes of the present disclosure, the terms "traffic flow", "data flow", "dataflow", "packet flow", "network flow", and/or "flow" may be used interchangeably even though these terms at least in some embodiments refers to different concepts.

The term "dataflow" or "data flow" at least in some embodiments refers to the movement of data through a system including software elements, hardware elements, or a combination of both software and hardware elements. Additionally or alternatively, the term "dataflow" or "data flow" at least in some embodiments refers to a path taken by a set of data from an origination or source to destination that includes all nodes through which the set of data travels.

The term "stream" at least in some embodiments refers to a sequence of data elements made available over time. At least in some embodiments, functions that operate on a stream, which may produce another stream, are referred to as "filters," and can be connected in pipelines, analogously to function composition; filters may operate on one item of a stream at a time, or may base an item of output on multiple items of input, such as a moving average. Additionally or alternatively, the term "stream" or "streaming" at least in some embodiments refers to a manner of processing in which an object is not represented by a complete logical data structure of nodes occupying memory proportional to a size of that object, but are processed "on the fly" as a sequence of events.

The term "distributed computing" at least in some embodiments refers to computation resources that are geographically distributed within the vicinity of one or more localized networks' terminations. The term "distributed computations" at least in some embodiments refers to a model in which components located on networked computers communicate and coordinate their actions by passing messages interacting with each other in order to achieve a common goal.

The term "service" at least in some embodiments refers to the provision of a discrete function within a system and/or environment. Additionally or alternatively, the term "service" at least in some embodiments refers to a functionality or a set of functionalities that can be reused.

The term "microservice" at least in some embodiments refers to one or more processes that communicate over a network to fulfil a goal using technology-agnostic protocols (e.g., HTTP or the like). Additionally or alternatively, the term "microservice" at least in some embodiments refers to services that are relatively small in size, messaging-enabled, bounded by contexts, autonomously developed, independently deployable, decentralized, and/or built and released with automated processes. Additionally or alternatively, the term "microservice" at least in some embodiments refers to a self-contained piece of functionality with clear interfaces, and may implement a layered architecture through its own internal components. Additionally or alternatively, the term "microservice architecture" at least in some embodiments refers to a variant of the service-oriented architecture (SOA) structural style wherein applications are arranged as a collection of loosely-coupled services (e.g., fine-grained services) and may use lightweight protocols.

The term "network service" at least in some embodiments refers to a composition of Network Function(s) and/or Network Service(s), defined by its functional and behavioural specification.

The term "session" at least in some embodiments refers to a temporary and interactive information interchange between two or more communicating devices, two or more application instances, between a computer and user, and/or between any two or more entities or elements. Additionally or alternatively, the term "session" at least in some embodiments refers to a connectivity service or other service that provides or enables the exchange of data between two entities or elements. The term "network session" at least in some embodiments refers to a session between two or more communicating devices over a network. The term "web session" at least in some embodiments refers to session between two or more communicating devices over the Internet or some other network. The term "session identifier," "session ID," or "session token" at least in some embodiments refers to a piece of data that is used in network communications to identify a session and/or a series of message exchanges.

The term "quality" at least in some embodiments refers to a property, character, attribute, or feature of something as being affirmative or negative, and/or a degree of excellence of something. Additionally or alternatively, the term "quality" at least in some embodiments, in the context of data processing, refers to a state of qualitative and/or quantitative aspects of data, processes, and/or some other aspects of data processing systems.

The term "Quality of Service" or "QoS' at least in some embodiments refers to a description or measurement of the overall performance of a service (e.g., telephony and/or cellular service, network service, wireless communication/connectivity service, cloud computing service, and/or the like). In some cases, the QoS may be described or measured from the perspective of the users of that service, and as such, QoS may be the collective effect of service performance that determine the degree of satisfaction of a user of that service. In other cases, QoS at least in some embodiments refers to traffic prioritization and resource reservation control mechanisms rather than the achieved perception of service quality. In these cases, QoS is the ability to provide different priorities to different applications, users, or flows, or to guarantee a certain level of performance to a flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein. Additionally or alternatively, the term "Quality of Service" or "QoS' at least in some embodiments refers to mechanisms that provide traffic-forwarding treatment based on flow-specific traffic classification. In some implementations, the term "Quality of Service" or "QoS" can be used interchangeably with the term "Class of Service" or "CoS".

The term "forwarding treatment" at least in some embodiments refers to the precedence, preferences, and/or prioritization a packet belonging to a particular dataflow receives in relation to other traffic of other dataflows. Additionally or alternatively, the term "forwarding treatment" at least in some embodiments refers to one or more parameters, characteristics, and/or configurations to be applied to packets belonging to a dataflow when processing the packets for forwarding. Examples of such characteristics may include resource type (e.g., non-guaranteed bit rate (GBR), GBR, delay-critical GBR, and/or the like); priority level; class or classification; packet delay budget; packet error rate; averaging window; maximum data burst volume; minimum data burst volume; scheduling policy/weights; queue management policy; rate shaping policy; link layer protocol and/or RLC configuration; admission thresholds; and/or the like In some implementations, the term "forwarding treatment" may be referred to as "Per-Hop Behavior" or "PHB".

The term "queue" at least in some embodiments refers to a collection of entities (e.g., data, objects, events, and/or the like) are stored and held to be processed later. that are maintained in a sequence and can be modified by the addition of entities at one end of the sequence and the removal of entities from the other end of the sequence; the end of the sequence at which elements are added may be referred to as the "back", "tail", or "rear" of the queue, and the end at which elements are removed may be referred to as the "head" or "front" of the queue. Additionally, a queue may perform the function of a buffer, and the terms "queue" and "buffer" may be used interchangeably throughout the present disclosure. The term "enqueue" at least in some embodiments refers to one or more operations of adding an element to the rear of a queue. The term "dequeue" at least in some embodiments refers to one or more operations of removing an The term "PDU Connectivity Service" at least in some embodiments refers to a service that provides exchange of protocol data units (PDUs) between a UE and a data network (DN). The term "PDU Session" at least in some embodiments refers to an association between a UE and a DN that provides a PDU connectivity service (see e.g., 3GPP TS 38.415 v16.6.0 (2021-12-23) ("[TS38415]") and 3GPP TS 38.413 v16.8.0 (2021 Dec. 23) ("[TS38413]"), the contents of each of which are hereby incorporated by reference in their entireties); a PDU Session type can be IPv4, IPv6, IPv4v6, Ethernet, Unstructured, or any other network/connection type, such as those discussed herein. The term "PDU Session Resource" at least in some embodiments refers to an NG-RAN interface (e.g., NG, Xn, and/or E1 interfaces) and radio resources provided to support a PDU Session. The term "multi-access PDU session" or "MA PDU Session" at least in some embodiments refers to a PDU Session that provides a PDU connectivity service, which can use one access network at a time or multiple access networks simultaneously.

The term "network address" at least in some embodiments refers to an identifier for a node or host in a computer network, and may be a unique identifier across a network and/or may be unique to a locally administered portion of the network. Examples of network addresses include a Closed Access Group Identifier (CAG-ID), Bluetooth hardware device address (BD ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, Radio Network Temporary Identifier (RNTI), International Mobile Equipment Identity (IMEI), IMEI Type Allocation Code (IMEA/TAC), International Mobile Subscriber Identity (IMSI), IMSI software version (IMSISV), permanent equipment identifier (PEI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QoS Flow ID (QFI) and/or 5G QoS Identifier (5QI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, UE Access Category and Identity, and/or other cellular network related identifiers), an email address, Enterprise Application Server (EAS) ID, an endpoint address, an Electronic Product Code (EPC) as defined by the EPCglobal Tag Data Standard, a Fully Qualified Domain Name (FQDN), an internet protocol (IP) address in an IP network (e.g., IP version 4 (Ipv4), IP version 6 (IPv6), and/or the like), an internet packet exchange (IPX) address, Local Area Network (LAN) ID, a media access control (MAC) address, personal area network (PAN) ID, a port number (e.g., Transmission Control Protocol (TCP) port number, User Datagram Protocol (UDP) port number), QUIC connection ID, RFID tag, service set identifier (SSID) and variants thereof, telephone numbers in a public switched telephone network (PTSN), a socket address, universally unique identifier (UUID) (e.g., as specified in ISO/IEC 11578:1996), a Universal Resource Locator (URL) and/or Universal Resource Identifier (URI), Virtual LAN (VLAN) ID, an X.21 address, an X.25 address, Zigbee® ID, Zigbee® Device Network ID, and/or any other suitable network address and components thereof.

The term "application identifier", "application ID", or "app ID" at least in some embodiments refers to an identifier that can be mapped to a specific application or application instance; in the context of 3GPP 5G/NR systems, an "application identifier" at least in some embodiments refers to an identifier that can be mapped to a specific application traffic detection rule.

The term "endpoint address" at least in some embodiments refers to an address used to determine the host/authority part of a target URI, where the target URI is used to access an NF service (e.g., to invoke service operations) of an NF service producer or for notifications to an NF service consumer.

The term "network socket" or "socket" at least in some embodiments refers to an element that serves as an endpoint for sending and receiving data across a network or for inter-process communication. The structure and properties of a socket can be defined by one or more APIs, and may be identified by a socket address or the like.

The term "port" in the context of computer networks, at least in some embodiments refers to a communication endpoint, a virtual data connection between two or more entities, and/or a virtual point where network connections start and end. Additionally or alternatively, a "port" at least in some embodiments is associated with a specific process or service.

The term "application" at least in some embodiments refers to a computer program designed to carry out a specific task other than one relating to the operation of the computer itself. Additionally or alternatively, term "application" at least in some embodiments refers to a complete and deployable package, environment to achieve a certain function in an operational environment.

The term "algorithm" at least in some embodiments refers to an unambiguous specification of how to solve a problem or a class of problems by performing calculations, input/output operations, data processing, automated reasoning tasks, and/or the like.

The terms "instantiate," "instantiation," and the like at least in some embodiments refers to the creation of an instance. An "instance" also at least in some embodiments refers to a concrete occurrence of an object, which may occur, for example, during execution of program code.

The term "data processing" or "processing" at least in some embodiments refers to any operation or set of operations which is performed on data or on sets of data, whether or not by automated means, such as collection, recording, writing, organization, structuring, storing, adaptation, alteration, retrieval, consultation, use, disclosure by transmission, dissemination or otherwise making available, alignment or combination, restriction, erasure and/or destruction.

The term "packet processor" at least in some embodiments refers to software and/or hardware element(s) that transform a stream of input packets into output packets (or transforms a stream of input data into output data); examples of the transformations include adding, removing, and modifying fields in a packet header, trailer, and/or payload.

The term "data pipeline" or "pipeline" at least in some embodiments refers to a set of data processing elements (or data processors) connected in series and/or in parallel, where the output of one data processing element is the input of one or more other data processing elements in the pipeline; the elements of a pipeline may be executed in parallel or in time-sliced fashion and/or some amount of buffer storage can be inserted between elements.

The term "use case" at least in some embodiments refers to a description of a system from a user's perspective. Use cases sometimes treat a system as a black box, and the interactions with the system, including system responses, are perceived as from outside the system. Use cases typically avoid technical jargon, preferring instead the language of the end user or domain expert.

The term "analytics" at least in some embodiments refers to the discovery, interpretation, and communication of meaningful patterns in data.

The term "application programming interface" or "API" at least in some embodiments refers to a set of subroutine definitions, communication protocols, and tools for building software. Additionally or alternatively, the term "application programming interface" or "API" at least in some embodiments refers to a set of clearly defined methods of communication among various components. An API may be for a web-based system, operating system, database system, computer hardware, or software library.

The term "datagram" at least in some embodiments refers to a unit of data carried by a packet-switched network or otherwise associated with a packet-switched network. A datagram may be structured to have a header section or trailer section that carries control information and a payload section that carries user data. The term "datagram" at least in some embodiments may be synonymous with any of the following terms, even though they may refer to different aspects: "data unit", a "protocol data unit" or "PDU", a "service data unit" or "SDU", "frame", "packet", a "network packet", "segment", "block", "cell", "chunk", and/or the like. Examples of datagrams, network packets, and the like, include internet protocol (IP) packet, Internet Control Message Protocol (ICMP) packet, UDP packet, TCP packet, SCTP packet, ICMP packet, Ethernet frame, RRC messages/packets, SDAP PDU, SDAP SDU, PDCP PDU, PDCP SDU, MAC PDU, MAC SDU, BAP PDU. BAP SDU, RLC PDU, RLC SDU, WiFi frames as discussed in [IEEE80211], and/or other like data structures.

The term "information element" or "IE" at least in some embodiments refers to a structural element containing one or more fields. Additionally or alternatively, the term "information element" or "IE" at least in some embodiments refers to a field or set of fields defined in a standard or specification that is used to convey data and/or protocol information.

The term "field" at least in some embodiments refers to individual contents of an information element, or a data element that contains content. The term "data frame" or "DF" at least in some embodiments refers to a data type that contains more than one data element in a predefined order. The term "data element" or "DE" at least in some embodiments refers to a data type that contains one single data. Additionally or alternatively, the term "data element" at least in some embodiments refers to an atomic state of a particular object with at least one specific property at a certain point in time, and may include one or more of a data element name or identifier, a data element definition, one or more representation terms, enumerated values or codes (e.g., metadata), and/or a list of synonyms to data elements in other metadata registries. Additionally or alternatively, a "data element" at least in some embodiments refers to a data type that contains data, which may be referred to as the data element's content (or "content items"). Content items may include text content, attributes, properties, and/or other elements referred to as "child elements." Additionally or alternatively, data elements may include zero or more properties and/or zero or more attributes, each of which may be defined as database objects (e.g., fields, records, and/or the like), object instances, and/or other data elements. An "attribute" at least in some embodiments refers to a markup construct including a name-value pair that exists within a start tag or empty element tag. Attributes contain data related to its element and/or control the element's behavior.

The term "object" at least in some embodiments refers to one or more variables, functions, and/or data structures, or a combination thereof, which can contain data (in the form of fields (often referred to as "attributes" or "properties")) and/or code (in the form of procedures (often referred to as "methods")). Additionally or alternatively, term "object" at least in some embodiments refers to an instance of a class. Additionally or alternatively, term "object" at least in some embodiments refers to a database entity, a table, a column, a field, a record, and/or an association between data and a database entity.

The term "class" at least in some embodiments refers to an extensible program-code-template for creating objects, providing initial values for state (member variables) and implementations of behavior (member functions or methods).

The term "reference" at least in some embodiments refers to data useable to locate other data and may be implemented a variety of ways (e.g., a pointer, an index, a handle, a key, an identifier, a hyperlink, and/or the like).

The term "translation" at least in some embodiments refers to the process of converting or otherwise changing data from a first form, shape, configuration, structure, arrangement, embodiment, description, and/or the like into a second form, shape, configuration, structure, arrangement, embodiment, description, and/or the like; at least in some embodiments there may be two different types of translation: transcoding and transformation.

The term "transcoding" at least in some embodiments refers to taking information/data in one format (e.g., a packed binary format) and translating the same information/data into another format in the same sequence. Additionally or alternatively, the term "transcoding" at least in some embodiments refers to taking the same information, in the same sequence, and packaging the information (e.g., bits or bytes) differently.

The term "transformation" at least in some embodiments refers to changing data from one format and writing it in another format, keeping the same order, sequence, and/or nesting of data items. Additionally or alternatively, the term "transformation" at least in some embodiments involves the process of converting data from a first format or structure into a second format or structure, and involves reshaping the data into the second format to conform with a schema or other like specification. Transformation may include rearranging data items or data objects, which may involve changing the order, sequence, and/or nesting of the data items/objects. Additionally or alternatively, the term "transformation" at least in some embodiments refers to changing the schema of a data object to another schema.

The term "cryptographic hash function", "hash function", or "hash") at least in some embodiments refers to a mathematical algorithm that maps data of arbitrary size (sometimes referred to as a "message") to a bit array of a fixed size (sometimes referred to as a "hash value", "hash", or "message digest"). A cryptographic hash function is usually a one-way function, which is a function that is practically infeasible to invert.

The term "event", in probability theory, at least in some embodiments refers to a set of outcomes of an experiment (e.g., a subset of a sample space) to which a probability is assigned. Additionally or alternatively, the term "event" at least in some embodiments refers to a software message indicating that something has happened. Additionally or alternatively, the term "event" at least in some embodiments refers to an object in time, or an instantiation of a property in an object. Additionally or alternatively, the term "event" at least in some embodiments refers to a point in space at an instant in time (e.g., a location in space-time). Additionally or alternatively, the term "event" at least in some embodiments refers to a notable occurrence at a particular point in time.

The term "activation" in the context of "activation of a radio application" at least in some embodiments refers to placing a radio application into execution in a multiradio computer, to do its functionality as specified in the radio system specifications. Users may only request to use the services of active radio applications. An active radio application is consuming computation, memory, communications, and RF circuitry resources according to its needs in the operational state it is in. If deactivated, a radio application stops executing its behaviour and resets to its initial state, but is nevertheless readily available in the multiradio computer.

The term "administrative states" at least in some embodiments refers to the life-cycle of a radio application in the multiradio computer. Four distinct administrative states have been identified. A not installed radio application is unknown to the multiradio computer. An installed radio application is inside the multiradio computer boundaries, for instance stored in mass storage in a compressed format. A loaded (or instantiated) radio application is available for the user for activation and its parameters may be managed, but is not yet executing. An active radio application is executing in the multiradio computer, doing its functionality according to the radio system specifications, and consuming computation, memory, communications and RF circuitry resources according to its needs in the operational state it is in.

The term "association" in the context of reconfigurable radio equipment/systems" at least in some embodiments refers to a logical communication link to a peer communication equipment. In communications radio systems (e.g., cellular, local area) it means a two-directional link where both sides know the other is there. In broadcast radio systems, an association may be defined as the mobile device tuning to receive a certain channel, station, or equivalent. Some control signalling may be necessary to maintain the association and/or no user plane data transfer may occur with only an association present, but a flow may be established into an association for this purpose. The maximum amount of concurrent associations for a radio application is typically limited by the radio system specifications, for example it is unlikely that a cellular mobile device may have associations to the GGSNs of two or more operators at the same time.

The term "Baseband Parameter Aggregation" or "BPA" at least in some embodiments refers to a unit collecting all the context information to be transferred to the monitor. The BPA unit converts the context information into metric(s) such that a minimum bandwidth is consumed during the procedure of transferring the context information to the monitor. Those metrics may include Received Signal Strength Indication (RSSI) measurement, multi-RAT performance metrics, and/or the like broadcast identifier (broadcast ID): identifier linking a data packet to all available radio computers The term "Communication Services Layer" or "CSL" at least in some embodiments layer related to communication services supporting generic applications. The CSL supports generic applications like Internet access.

The term "configcodes" at least in some embodiments refers to a result of compiling the source codes of a Radio Application (RA), which is either configuration codes of Radio Virtual Machine (RVM) or executable codes for a particular target platform.

The term "data flow" at least in some embodiments refers to a user plane data link that is attached to an association. Examples are circuit switched phone call, voice over IP call, reception of an SMS, sending of a contact card, PDP context for internet access, demultiplexing a TV channel from a channel multiplex, calculation of position coordinates from geopositioning satellite signals, and/or the like. In some cases, a flow may only be established when there is already an association present. In some implementations, both sides of the association may initiate a flow, and both sides may terminate it. The maximum amount of flows in an association may be limited by the radio system specifications. It may be possible to move a flow from one association to another, even across radio applications. Additionally or alternatively, the term "data flow" at least in some embodiments refers to a logical channel between Flow Controller (FC) and an Unified Radio Applications (URA) created by FC to send to or receive data elements (octets, packets or other granularity) from URA.

The term "distributed computations" at least in some embodiments refers to a model in which components located on networked computers communicate and coordinate their actions by passing messages interacting with each other in order to achieve a common goal.

The term "environmental information" at least in some embodiments refers to a set of values that can affect the execution of RAs on a radio computer. Environmental Information includes information related to the execution of RA(s), such as Buffer Overflow, Resource Allocation, and/or the like The term "Functional Block" or "FB" in the context of reconfigurable radio systems (RRS) at least in some embodiments refers to a function needed for real-time implementation of radio application(s). A functional block includes not only the modem functions in Layer 1 (L1), Layer2 (L2), and Layer 3 (L3) but also all the control functions that should be processed in real-time for implementing given Radio Application(s). Functional blocks are categorized into standard functional blocks and user defined functional blocks. Standard functional blocks can be shared by many Radio Applications. For example, Forward Error Correction (FEC), Fast Fourier Transform (FFT)/Inverse Fast Fourier Transform (IFFT), (de)interleaver, turbo coding, Viterbi coding, Multiple Input Multiple Output (MIMO), beamforming, and/or the like are example categories of standard FBs. User defined functional blocks include those functional blocks that are dependent upon a specific Radio Application. They are used to support special function(s) required in a specific Radio Application or to support a special algorithm used for performance improvement. In addition, a user defined functional block can be used as a baseband controller functional block which controls the functional blocks operating in baseband processor in real-time and to control some context information processed in real-time. Each functional block has its unique name, Input, Output and properties.

The term "install" at least in some embodiments refers to a (potentially previously unknown) radio application package (RAP) into a multiradio computer, RE, and/or RRS. Semantically this means that the multiradio computer is aware of the radio application. Installation may have several steps for example related to authentication, verification, and compatibility checks. The RAP may be stored in mass storage in compressed format, for instance. Uninstalling a RAP means that the multiradio computer is no longer aware of it.

The term "multicast identifier" or "multicast ID" at least in some embodiments refers to an identifier linking a data packet to a group of radio computers. A group of radio computers includes at least two radio computers. The way for implementing the radio computer grouping is the choice of the manufacturers.

The term "multiradio computer" at least in some embodiments refers to a computing device that is the part of the connectivity system under the multiradio interface, containing the software defined radio (SDR) control framework, and a number of unified radio applications. The SDR control framework can be seen as the SDR hardware platform plus the radio operating system providing the execution environment for the radio applications. Together these parts provide the services of the multiradio interface.

The term "operational states" at least in some embodiments refers to resource(s) need(s) of a radio application when it is in the active administrative state. Technically, a resource need or description is attached to each operational state, which themselves describe more the temporal behaviour of the radio application when in that state. The active administrative state may be divided into one or more operational states, depending on if distinctive behaviour is found in the radio system (e.g., power-save vs. telephone call), and if these behaviour patterns have different enough resource needs. The definition of the operational states for a radio application targeted for a specific multiradio computer platform is the responsibility of the radio application designer.

The term "peer equipment" and/or "peer communication equipment" at least in some embodiments refers to any communication counterpart of SDR equipment. It can be reached by establishing a (logical) communications link (e.g., an association) between the SDR equipment and peer equipment. Examples of peer equipment are WLAN access points, IP access nodes in cellular networks, Bluetooth headsets, digital radio and TV broadcasting stations, GPS satellites, and/or the like.

The term "radio application" and/or "RA" at least in some embodiments refers to a software-based implementation of any specific radio access technology (RAT). A multiradio computer is able to run unified radio applications (URA), which additionally to the radio system specifications comply with the unified radio application interface (URAI).

The term "radio application package" and/or "RAP" at least in some embodiments refers to a software package that contains everything needed by a multiradio computer to run a URA. This includes the executable components, resource needs, manageable radio parameters, plus any metadata. The metadata may include any information needed for installation, authentication, integrity protection, and/or the like Separate RAPs of the same RA may be compiled for different hardware platforms. Variants of an RA may be included in the same package, or split into separate packages. Here, the variants may include one RA variant for first RAT radios (e.g., IEEE 802.11 radios), another RA variant for second RAT radios (e.g., 3GPP standards), and so forth.

The term "radio computer" at least in some embodiments refers to a part of an RE working under ROS control and on which RAs are executed; a radio computer may include programmable processors, hardware accelerators, peripherals, software, and/or the like; the RF part is considered to be part of peripherals, and the radio platform is the hardware part of the radio computer.

The term "Radio Control Framework" or "RCF" at least in some embodiments refers to control framework which, as a part of the OS, extends OS capabilities in terms of radio resource management. The RCF is a control framework includes a Configuration Manager (CM), Radio Connection Manager (RCM), Flow Controller (FC) and Multiradio Controller (MRC). The Resource Manager (RM) is typically part of OS.

The term "Radio Controller" or "RC" at least in some embodiments refers to a functional component of RA for transferring context information from corresponding RAs to monitor. An RC, which may operate in computational resources in non real-time, accesses RAs which operates in radio computer in real time. The monitor, to which the context information is transferred using RC, provides context information to Administrator and/or Mobility Policy Manager (MPM) for application(s) to be performed using the context information, for example, terminal-centric configuration.

The term "Radio Equipment" or "RE" at least in some embodiments refers to an electrical or electronic product, which intentionally emits and/or receives radio waves for the purpose of radio communication and/or radiodetermination, or an electrical or electronic product which must be completed with an accessory, such as antenna, so as to intentionally emit and/or receive radio waves for the purpose of radio communication and/or radiodetermination.

The term "radio frequency transceiver" or "RF transceiver" at least in some embodiments refers to part of a radio platform converting, for transmission, baseband signals into radio signals, and, for reception, radio signals into baseband signals.

The term "radio instance" at least in some embodiments refers to an activated radio application, extracted from the radio application package and put into execution by the multiradio computer, or readily available for execution. The radio parameters for the instance are available to be modi-fied by the user. It may be possible to instantiate the same radio application multiple times, with separate parameter sets and independent operation (within limits of shared resources).

The term "radio library" at least in some embodiments refers to a library of SFB that is provided by a platform vendor in a form of platform-specific executable code (SFBs implement reference codes of functions which are typical for radio signal processing. They are not atomic and their source codes are typed and visible for RA developers. An SFB is implemented through a Radio Hardware Abstraction Layer (RHAL) when the SFB is implemented on hardware accelerators, where the RHAL is part of an ROS.

The term "radio parameters" at least in some embodiments refers to parameters that a radio application exposes to a user and/or may be used to configure its behavior. These can be defined by the application designer. Example parameters may be for instance allowed frequency bands or channels, used variants (see e.g., RAP), authentication tokens, or similar.

The term "Radio Operating System" or "ROS" at least in some embodiments refers to any appropriate OS empowered by RCF. The ROS provides RCF capabilities as well as traditional management capabilities related to management of RP such as resource management, file system support, unified access to hardware resources, and/or the like The term "radio platform" at least in some embodiments refers to a part of Radio Equipment hardware which relates to radio processing capability, including programmable hardware components, hardware accelerators, RF transceiver, and antenna(s). A radio platform is a piece of hardware capable of generating RF signals or receiving RF signals, including Base-Band and RF processing. By nature, it is heterogeneous hardware including different processing elements such as fixed accelerators (e.g., Application-Specific Integrated Circuit (ASIC), or reconfigurable accelerators such as FPGAs, and/or the like). In case of multiple radio computers, there is an independent Radio Platform for each of the radio computers.

The term "radio reconfiguration" at least in some embodiments refers to reconfiguration of parameters related to air interface.

The term "radio system" refers to a system capable to communicate some user information by using electromagnetic waves.

The term "Radio Virtual Machine" or "RVM" at least in some embodiments refers to abstract machine which supports reactive and concurrent executions. An RVM may be implemented as a controlled execution environment which allows the selection of a trade-off between flexibility of base band code development and required (re-)certification efforts.

The term "RE Configuration Policy" at least in some embodiments refers to a machine-readable information object (InOb) that is generated by the RE manufacturer or its representative (such as the Conformity Contact Entity), and which contains instructions that are relevant for the RE to maintain compliance to the RED (e.g., valid hardware and software combinations). Security objectives regarding to the DoC should be understood as applying both to the DoC and the RE Configuration Policy. Procedures that involve decision making based on the DoC implicitly use the RE Configuration Policy.

The term "reconfigurable radio equipment" or "RRE" at least in some embodiments refers to an RE with radio communication capabilities providing support for radio reconfiguration. Examples of RREs include smartphones, feature phones, tablets, laptops, connected vehicle communication platforms, network platforms, IoT devices, and/or other like equipment.

The term "reconfigurable radio system" or "RRS" at least in some embodiments refers to a radio system using reconfigurable radio technology.

The term "reference point at least in some embodiments refers to a conceptual point at the conjunction of two non-overlapping functions that can be used to identify the type of information passing between these functions.

The term "resources" in the context of reconfigurable radio equipment/systems, at least in some embodiments refers to resources provided by the multiradio computer, to be used by one or more radio applications when they are active. Radio applications provide their resource needs (e.g., using operational states) so that the multiradio computer may judge whether these resources are available, in order to ensure non-conflicting operation with other applications. Resources may or may not be shared in the multiradio computer.

The term "routing entity at least in some embodiments refers to an entity which directs network packets from their source toward their destination through intermediate network nodes by specific packet forwarding mechanisms. In the present document, source and destination relate either to CSL or radio computers. The directing of packets may include decision making and physical routing.

The term "shadow radio platform at least in some embodiments refers to a platform where configcodes can be directly executed when it corresponds to the target radio platform or, when it corresponds to an RVM, compiled and executed. If the shadow radio platform is equivalent to the target radio platform, then a front-end compiler will generate the executable code for the target radio platform and configcodes are equivalent to the executable code for that radio platform.

The term "unicast identifier" or "unicast ID" at least in some embodiments refers to an identifier linking a data packet to a specific radio computer.

The term "Unified Radio Application" or "URA at least in some embodiments refers to an RA that complies with the reconfigurable RE framework.

The term "user" in the context of reconfigurable radio equipment/systems, refers to an abstract representation of any entity issuing command requests (e.g., using the services) to the multiradio computer. Three types of users are distinguished based on the type of services used: administrator for multiradio management plane, mobility policy manager for control plane, and networking stack for user plane.

The term "information object" or "InOb" refers to a data structure that includes one or more data elements. each of which includes one or more data values. Examples of InObs include electronic documents, database objects, data files, resources, webpages, web forms, applications (e.g., web apps), services, web services, media, or content, and/or the like. InObs may be stored and/or processed according to a data format. Data formats define the content/data and/or the arrangement of data elements for storing and/or communicating the InObs. Each of the data formats may also define the language, syntax, vocabulary, and/or protocols that govern information storage and/or exchange. Examples of the data formats that may be used for any of the InObs discussed herein may include Accelerated Mobile Pages Script (AMPscript), Abstract Syntax Notation One (ASN.1), Backus-Naur Form (BNF), extended BNF, Bencode, BSON, Cold-Fusion Markup Language (CFML), comma-separated values (CSV), Control Information Exchange Data Model (C2IEDM), Cascading Stylesheets (CSS), DARPA Agent Markup Language (DAML), Document Type Definition (DTD), Electronic Data Interchange (EDI), Extensible Data Notation (EDN), Extensible Markup Language (XML), Efficient XML Interchange (EXI), Extensible Stylesheet Language (XSL), Free Text (FT), Fixed Word Format (FWF), Cisco® Etch, Franca, Geography Markup Language (GML), Guide Template Language (GTL), Handlebars template language, Hypertext Markup Language (HTML), Interactive Financial Exchange (IFX), Keyhole Markup Language (KML), JAMscript, Java Script Object Notion (JSON), JSON Schema Language, Apache® MessagePack™, Mustache template language, Ontology Interchange Language (OIL), Open Service Interface Definition, Open Financial Exchange (OFX), Precision Graphics Markup Language (PGML), Google® Protocol Buffers (protobuf), Quicken® Financial Exchange (QFX), Regular Language for XML Next Generation (RelaxNG) schema language, regular expressions, Resource Description Framework (RDF) schema language, RESTful Service Description Language (RSDL), Scalable Vector Graphics (SVG), Schematron, Tactical Data Link (TDL) format (e.g., J-series message format for Link 16; JREAP messages; Multifuction Advanced Data Link (MADL), Integrated Broadcast Service/Common Message Format (IBS/CMF), Over-the-Horizon Targeting Gold (OTH-T Gold), Variable Message Format (VMF), United States Message Text Format (USMTF), and any future advanced TDL formats), VBScript, Web Application Description Language (WADL), Web Ontology Language (OWL), Web Services Description Language (WSDL), wiki markup or Wikitext, Wireless Markup Language (WML), extensible HTML (XHTML), XPath, XQuery, XML DTD language, XML Schema Definition (XSD), XML Schema Language, XSL Transformations (XSLT), YAML ("Yet Another Markup Language" or "YANL Ain't Markup Language"), Apache® Thrift, and/or any other data format and/or language discussed elsewhere herein.

Additionally or alternatively, the data format for the InObs may be document and/or plain text, spreadsheet, graphics, and/or presentation formats including, for example, American National Standards Institute (ANSI) text, a Computer-Aided Design (CAD) application file format (e.g., ".c3d", ".dwg", ".dft", ".iam", ".iaw", ".tct", and/or other like file extensions), Google® Drive® formats (including associated formats for Google Docs®, Google Forms®, Google Sheets®, Google Slides®, etc.), Microsoft® Office® formats (e.g., ".doc", ".ppt", ".xls", ".vsd", and/or other like file extension), OpenDocument Format (including associated document, graphics, presentation, and spreadsheet formats), Open Office XML (OOXML) format (including associated document, graphics, presentation, and spreadsheet formats), Apple® Pages®, Portable Document Format (PDF), Question Object File Format (QUOX), Rich Text File (RTF), TeX and/or LaTeX (".tex" file extension), text file (TXT), TurboTax® file (".tax" file extension), You Need a Budget (YNAB) file, and/or any other like document or plain text file format.

Additionally or alternatively, the data format for the InObs may be archive file formats that store metadata and concatenate files, and may or may not compress the files for storage. The term "archive file" refers to a file having a file format or data format that combines or concatenates one or more files into a single file or InOb. Archive files often store directory structures, error detection and correction information, arbitrary comments, and sometimes use built-in encryption. The term "archive format" refers to the data format or file format of an archive file, and may include, for example, archive-only formats that store metadata and concatenate files, for example, including directory or path information; compression-only formats that only compress a collection of files; software package formats that are used to create software packages (including self-installing files), disk image formats that are used to create disk images for mass storage, system recovery, and/or other like purposes; and multi-function archive formats that can store metadata, concatenate, compress, encrypt, create error detection and recovery information, and package the archive into self-extracting and self-expanding files. For the purposes of the present disclosure, the term "archive file" at least in some embodiments refers to an archive file having any of the aforementioned archive format types. Examples of archive file formats may include Android® Package (APK); Microsoft® Application Package (APPX); Genie Timeline Backup Index File (GBP); Graphics Interchange Format (GIF); gzip (.gz) provided by the GNU Project™; Java® Archive (JAR); Mike O'Brien Pack (MPQ) archives; Open Packaging Conventions (OPC) packages including OOXML files, OpenXPS files, etc.; Rar Archive (RAR); Red Hat® package/installer (RPM); Google® SketchUp backup File (SKB); TAR archive (".tar"); XPInstall or XPI installer modules; ZIP (.zip or .zipx); and/or the like. Additionally or alternatively, the archive file formats may be a suitable package file format such as, for example, TAR archive (".tar"), Android Package (".apk"), Debian Linux distribution format (".deb"), Apple® OS X or iOS package format (".pkg"), Snap package format (".snap"), Windows Installer package (".msi" or the like), and/or the like.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, and/or the like). Furthermore, various standards (e.g., 3GPP, ETSI, and/or the like) may define various message formats, PDUs, containers, frames, and/or other data structures, as comprising a sequence of optional or mandatory data elements (DEs), data frames (DFs), information elements (IEs), and/or the like. However, the requirements of any particular standard should not limit the scope of the present disclosure, and as such, any combination of containers, frames, DFs, DEs, IEs, values, components, fields, actions, features, and/or data structures are possible, including any combination of containers, frames, DFs, DEs, IEs, values, components, fields, actions, features, and/or data structures that are strictly required to be followed in order to conform to such standards or any combination of containers, frames, DFs, DEs, IEs, values, components, fields, actions, features, and/or data structures strongly recommended and/or used with or in the presence/absence of optional elements.

The present disclosure includes the aforementioned description and the accompanying drawings. The present disclosure shows and described, by way of examples and not of limitation, specific implementations in which the subject matter may be practiced. The present disclosure shows and describes the inventive aspects in sufficient detail to enable those skilled in the art to practice the teachings disclosed herein. Although the present disclosure shows and describes specific example implementations, various modifications and changes may be made to these implementations without departing from the broader scope of the present disclosure. Other aspects may be utilized and derived from the implementations discussed herein, such that structural and logical substitutions and changes may be made without departing from the scope of the present disclosure. The present disclosure is not to be taken in a limiting sense, and the scope of various aspects is defined by the appended claims, along with the full range of equivalents to which such claims are entitled.

The invention claimed is:

1. Reconfigurable radio equipment (RRE), comprising:
a communication services layer (CSL); and
a radio computer connected to the CSL, wherein the radio computer is to:
transmit a request for a radio application package (RAP) to a radio application (RA) store platform;
receive the requested RAP from the RA store platform, wherein the requested RAP includes compiled RA code in a Unified Radio Application (URA) field of the RAP and metadata for installation of the compiled RA code; and
install the compiled RA code included in the RAP using the metadata included in the RAP;
wherein:
a radio computer class ("RadioComputer") of the radio computer includes a radio computer state (RCState) attribute; and
the RCState attribute describes an internal state of the radio computer.

2. The RRE of claim 1, further comprising:
a MultiRadio Interface (MURI) that communicatively couples the CSL and the radio computer.

3. The RRE of claim 2, wherein the internal state of the radio computer is one of inactive, active, or processing a RAP.

4. The RRE of claim 2, wherein the RadioComputer includes an RA class ("RadioApp"), wherein the RadioApp includes an RA state attribute, wherein the RA state attribute describes an internal state of an RA, and the internal state of the RA is one of inactive, active, installed, uninstalled, executed, available, or unavailable.

5. The RRE of claim 2, wherein the RadioComputer includes a radio operating system class ("RadioOS"), wherein the RadioOS includes an RadioOS state attribute ("RadioOSState"), wherein the RadioOSState describes an internal state of the RadioOS, and the internal state of the RadioOS is one of inactive, active, error, or interrupted.

6. The RRE of claim 2, wherein the RadioComputer includes a channel class that includes a channel profile class ("ChannelProfile"), a channel measurement class ("ChannelMeasurements"), and an antenna class, wherein:
the ChannelProfile includes a channel profile state attribute ("ChannelProfileState"), the ChannelProfileState describes an internal state of the ChannelProfile, and the internal state of the ChannelProfile is one of available, not available, processed, or updated;
the ChannelMeasurements includes a channel measurements state attribute ("ChannelMeasurementsState"), the ChannelMeasurementsState describes an internal state of the ChannelMeasurements, and the internal state of the ChannelMeasurements is one of available, not available, processed, or updated; and
the antenna class includes an antenna profile class ("AntennaProfile"), wherein the AntennaProfile includes an antenna profile state attribute ("AntennaProfileState"), the AntennaProfileState describes an internal state of the AntennaProfile, and the internal state of the AntennaProfile is one of available, not available, processed, or updated.

7. The RRE of claim 2, wherein the RadioComputer includes a radio computer configuration class ("RCConfiguration"), the RCConfiguration includes a link profile class ("LinkProfile"), a link measurements class ("LinkMeasurements"), and a radiofrequency configuration class ("RFConfiguration"), and wherein:

the LinkProfile includes a link profile state class ("LinkProfileState"), wherein the LinkProfileState describes an internal state of LinkProfile, and the internal state of LinkProfile includes one of active, inactive, available, processed, not available, or updated;

the LinkMeasurements includes a link measurement types class ("LinkMeasurementsTypes"), wherein the LinkMeasurementsTypes describes an internal state of the LinkMeasurements, and the internal state of the LinkMeasurements includes one of active, inactive, available, processed, not available, or updated; and the RFConfiguration includes a transmission path class ("TxPath") and a receiver path class ("RxPath"), wherein:

the TxPath includes a TxPath state attribute ("txPathState"), the txPathState describes an internal state of the TxPath, and the internal state of the TxPath is one of active, inactive, available, or not available; and the RxPath includes an RxPath state attribute ("rxPathState"), the rxPathState describes an internal state of the RxPath, and the internal state of the RxPath is one of active, inactive, available, or not available.

8. The RRE of claim 2, wherein the RadioComputer includes a radio computer measurement class ("RCMeasurements"), wherein the RCMeasurements includes an RCMeasurements state attribute ("RCMeasurementsState"), the RCMeasurementsState describes an internal state of the RCMeasurements, and the internal state of the RCMeasurements is one of active, inactive, available, or not available.

\* \* \* \* \*